US012786303B2

(12) United States Patent
Chang et al.

(10) Patent No.: US 12,786,303 B2
(45) Date of Patent: Nov. 3, 2026

(54) USER INTERFACES FOR COMMUNICATION USING ELECTRONIC DEVICES

(71) Applicant: Apple Inc., Cupertino, CA (US)

(72) Inventors: Jae Woo Chang, Cupertino, CA (US); Oluwaseyi A. Amole, San Jose, CA (US); Jarrett A. Ford, Alameda, CA (US); Yi Huang, Cupertino, CA (US); Mohamed Khalaf, Croydon (GB); Marcel Van Os, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 255 days.

(21) Appl. No.: 18/544,401

(22) Filed: Dec. 18, 2023

(65) Prior Publication Data

US 2024/0380834 A1 Nov. 14, 2024

Related U.S. Application Data

(60) Provisional application No. 63/465,203, filed on May 9, 2023.

(51) Int. Cl.

| | |
|---|---|
| ***H04M 1/57*** | (2006.01) |
| ***G06F 3/0488*** | (2022.01) |
| ***G06F 9/451*** | (2018.01) |

(52) U.S. Cl.

CPC .......... *H04M 1/576* (2013.01); *G06F 3/0488* (2013.01); *G06F 9/451* (2018.02)

(58) Field of Classification Search

CPC ....... H04M 1/576; G06F 3/0488; G06F 9/451

See application file for complete search history.

(56) References Cited

U.S. PATENT DOCUMENTS

| | | | |
|---|---|---|---|
| 5,633,912 A | 5/1997 | Tsoi | |
| 5,644,628 A | 7/1997 | Schwarzer et al. | |
| 5,745,116 A | 4/1998 | Pisutha-Arnond | |
| 5,946,636 A * | 8/1999 | Uyeno | H04M 19/04 455/566 |
| 6,047,054 A | 4/2000 | Bayless et al. | |
| 6,070,068 A | 5/2000 | Sudo | |
| 6,269,159 B1 | 7/2001 | Cannon et al. | |
| 6,424,711 B1 | 7/2002 | Bayless et al. | |
| 6,516,202 B1 | 2/2003 | Hawkins et al. | |
| 6,583,806 B2 | 6/2003 | Ludwig et al. | |
| 6,593,949 B1 | 7/2003 | Chew et al. | |
| 6,725,228 B1 | 4/2004 | Clark et al. | |
| 6,751,446 B1 | 6/2004 | Kim et al. | |

(Continued)

FOREIGN PATENT DOCUMENTS

| | | |
|---|---|---|
| CN | 1444380 A | 9/2003 |
| CN | 1503593 A | 6/2004 |

(Continued)

OTHER PUBLICATIONS

International Preliminary Report on Patentability received for PCT Patent Application No. PCT/US2024/020988, mailed on Nov. 20, 2025, 17 pages.

(Continued)

*Primary Examiner* — William G Trost, IV

(74) *Attorney, Agent, or Firm* — YHE Law LLP

(57) ABSTRACT

The present disclosure generally relates to techniques and user interfaces for communication using electronic devices.

40 Claims, 62 Drawing Sheets

(56) References Cited

U.S. PATENT DOCUMENTS

| | | | | |
|---|---|---|---|---|
| 6,760,696 | B1 | 7/2004 | Goldberg et al. | |
| 6,768,722 | B1 | 7/2004 | Katseff et al. | |
| 6,965,376 | B2 | 11/2005 | Tani et al. | |
| 7,007,239 | B1 | 2/2006 | Hawkins et al. | |
| 7,085,257 | B1 | 8/2006 | Karves et al. | |
| 7,251,479 | B2 | 7/2007 | Holder et al. | |
| 7,289,614 | B1 | 10/2007 | Twerdahl et al. | |
| 7,295,852 | B1 | 11/2007 | Davis et al. | |
| 7,370,052 | B2 | 5/2008 | Starbuck et al. | |
| 7,479,949 | B2 | 1/2009 | Jobs et al. | |
| 7,536,704 | B2 | 5/2009 | Pierre et al. | |
| 7,664,485 | B2 | 2/2010 | Twerdahl et al. | |
| 7,680,513 | B2 | 3/2010 | Haitani et al. | |
| 7,685,530 | B2 | 3/2010 | Sherrard et al. | |
| 7,720,218 | B2 | 5/2010 | Abramson et al. | |
| 7,757,182 | B2 | 7/2010 | Elliott et al. | |
| 7,812,817 | B2 | 10/2010 | Robertson et al. | |
| 7,975,242 | B2 | 7/2011 | Forstall et al. | |
| 7,996,792 | B2 | 8/2011 | Anzures et al. | |
| 8,014,760 | B2 | 9/2011 | Forstall et al. | |
| 8,090,087 | B2 | 1/2012 | Jobs et al. | |
| 8,135,389 | B2 | 3/2012 | Forstall et al. | |
| 8,255,003 | B2 | 8/2012 | Forstall et al. | |
| 8,380,172 | B1 | 2/2013 | Wick et al. | |
| 8,452,342 | B2 | 5/2013 | Forstall et al. | |
| 8,503,654 | B1 | 8/2013 | Ludwig et al. | |
| 8,606,242 | B2 | 12/2013 | Kedefors et al. | |
| 8,972,904 | B2 | 3/2015 | Forstall et al. | |
| 9,325,852 | B2 | 4/2016 | Forstall et al. | |
| 9,706,054 | B2 | 7/2017 | Forstall et al. | |
| 10,033,872 | B2 | 7/2018 | Anzures et al. | |
| 10,320,987 | B2 | 6/2019 | Forstall et al. | |
| 10,536,819 | B2 | 1/2020 | Forstall et al. | |
| 10,732,834 | B2 | 8/2020 | Anzures et al. | |
| 11,039,283 | B2 | 6/2021 | Forstall et al. | |
| 11,176,726 | B2 * | 11/2021 | Tobin | G06T 13/80 |
| 11,360,634 | B1 * | 6/2022 | Chang | G06F 3/0481 |
| 2002/0045438 | A1 | 4/2002 | Tagawa et al. | |
| 2002/0073207 | A1 | 6/2002 | Widger et al. | |
| 2002/0075244 | A1 | 6/2002 | Tani et al. | |
| 2002/0077158 | A1 | 6/2002 | Scott | |
| 2002/0090972 | A1 | 7/2002 | Kuramatsu | |
| 2002/0093531 | A1 | 7/2002 | Barile | |
| 2002/0120696 | A1 | 8/2002 | Mousseau et al. | |
| 2003/0026402 | A1 | 2/2003 | Clapper | |
| 2003/0073430 | A1 | 4/2003 | Robertson et al. | |
| 2003/0080991 | A1 | 5/2003 | Crow et al. | |
| 2004/0023643 | A1 | 2/2004 | Vander Veen et al. | |
| 2004/0056837 | A1 | 3/2004 | Koga et al. | |
| 2004/0085259 | A1 * | 5/2004 | Tarlton | H04M 1/72427 345/2.3 |
| 2004/0203674 | A1 | 10/2004 | Shi et al. | |
| 2004/0252727 | A1 | 12/2004 | Mousseau et al. | |
| 2004/0268262 | A1 | 12/2004 | Gupta et al. | |
| 2005/0047629 | A1 | 3/2005 | Farrell et al. | |
| 2005/0071437 | A1 | 3/2005 | Bear et al. | |
| 2005/0123116 | A1 | 6/2005 | Gau | |
| 2005/0157174 | A1 | 7/2005 | Kitamura et al. | |
| 2005/0177445 | A1 | 8/2005 | Church | |
| 2005/0182798 | A1 | 8/2005 | Todd et al. | |
| 2005/0198153 | A1 | 9/2005 | Keohane et al. | |
| 2005/0264647 | A1 * | 12/2005 | Rzeszewski | H04N 7/147 348/14.02 |
| 2006/0002536 | A1 | 1/2006 | Ambrose | |
| 2006/0015819 | A1 | 1/2006 | Hawkins et al. | |
| 2006/0018446 | A1 | 1/2006 | Schmandt et al. | |
| 2006/0026521 | A1 | 2/2006 | Hotelling et al. | |
| 2006/0026536 | A1 | 2/2006 | Hotelling et al. | |
| 2006/0095524 | A1 | 5/2006 | Kay et al. | |
| 2006/0168539 | A1 | 7/2006 | Hawkins et al. | |
| 2006/0205432 | A1 | 9/2006 | Hawkins et al. | |
| 2006/0229107 | A1 | 10/2006 | Cho et al. | |
| 2006/0239419 | A1 | 10/2006 | Joseph et al. | |
| 2006/0253210 | A1 | 11/2006 | Rosenberg | |
| 2006/0281449 | A1 | 12/2006 | Kun et al. | |
| 2007/0123320 | A1 | 5/2007 | Han et al. | |
| 2007/0124676 | A1 | 5/2007 | Amundsen et al. | |
| 2007/0129059 | A1 | 6/2007 | Nadarajah et al. | |
| 2007/0133771 | A1 | 6/2007 | Stifelman et al. | |
| 2007/0143662 | A1 | 6/2007 | Carlson et al. | |
| 2007/0149188 | A1 | 6/2007 | Miyashita et al. | |
| 2007/0156886 | A1 | 7/2007 | Srivastava | |
| 2007/0203991 | A1 | 8/2007 | Fisher et al. | |
| 2007/0239831 | A1 | 10/2007 | Basu | |
| 2007/0242809 | A1 | 10/2007 | Mousseau et al. | |
| 2008/0055263 | A1 | 3/2008 | Lemay et al. | |
| 2008/0057926 | A1 | 3/2008 | Forstall et al. | |
| 2008/0077707 | A1 | 3/2008 | Ferguson et al. | |
| 2008/0163082 | A1 | 7/2008 | Rytivaara | |
| 2008/0167013 | A1 | 7/2008 | Novick et al. | |
| 2008/0168361 | A1 | 7/2008 | Forstall et al. | |
| 2008/0168379 | A1 | 7/2008 | Forstall et al. | |
| 2008/0168401 | A1 | 7/2008 | Boule et al. | |
| 2008/0201375 | A1 | 8/2008 | Khedouri et al. | |
| 2008/0207176 | A1 | 8/2008 | Brackbill et al. | |
| 2008/0273677 | A1 | 11/2008 | Alfano et al. | |
| 2009/0181651 | A1 * | 7/2009 | Klassen | H04M 1/72457 455/414.1 |
| 2009/0280868 | A1 | 11/2009 | Hawkins et al. | |
| 2010/0113103 | A1 * | 5/2010 | Lee | H04M 19/04 455/567 |
| 2010/0273466 | A1 | 10/2010 | Robertson et al. | |
| 2010/0279666 | A1 | 11/2010 | Small et al. | |
| 2011/0053563 | A1 * | 3/2011 | Bjorklund | H04M 1/6066 455/412.2 |
| 2011/0070890 | A1 * | 3/2011 | Wu | H04M 1/72457 455/445 |
| 2011/0105095 | A1 | 5/2011 | Kedefors et al. | |
| 2011/0254800 | A1 | 10/2011 | Anzures et al. | |
| 2012/0329435 | A1 | 12/2012 | Martin et al. | |
| 2013/0195258 | A1 | 8/2013 | Atef et al. | |
| 2014/0011485 | A1 | 1/2014 | Forstall et al. | |
| 2014/0036733 | A1 | 2/2014 | Teng et al. | |
| 2014/0256298 | A1 | 9/2014 | Moss et al. | |
| 2015/0052462 | A1 | 2/2015 | Kulkarni | |
| 2015/0319128 | A1 | 11/2015 | Benrikhi et al. | |
| 2016/0062573 | A1 * | 3/2016 | Dascola | G06F 3/0488 715/810 |
| 2016/0066277 | A1 * | 3/2016 | Yang | H04M 1/6066 455/418 |
| 2016/0292903 | A1 * | 10/2016 | Li | G06V 40/168 |
| 2016/0316349 | A1 | 10/2016 | Lee et al. | |
| 2017/0085716 | A1 | 3/2017 | Forstall et al. | |
| 2017/0223168 | A1 * | 8/2017 | Singh | H04W 4/12 |
| 2017/0279967 | A1 | 9/2017 | Forstall et al. | |
| 2018/0131732 | A1 | 5/2018 | Aronoff et al. | |
| 2018/0309875 | A1 | 10/2018 | Anzures et al. | |
| 2019/0163333 | A1 | 5/2019 | Kogan | |
| 2019/0394336 | A1 | 12/2019 | Forstall et al. | |
| 2020/0186976 | A1 | 6/2020 | Forstall et al. | |
| 2020/0356269 | A1 | 11/2020 | Anzures et al. | |
| 2020/0379617 | A1 * | 12/2020 | Chang | H04M 1/72433 |
| 2021/0321003 | A1 | 10/2021 | Forstall et al. | |
| 2021/0329427 | A1 | 10/2021 | Forstall et al. | |
| 2022/0191313 | A1 * | 6/2022 | Pan | G06F 1/1677 |
| 2022/0385763 | A1 | 12/2022 | Forstall et al. | |
| 2023/0362601 | A1 | 11/2023 | Forstall et al. | |
| 2023/0421698 | A1 | 12/2023 | Forstall et al. | |
| 2023/0421699 | A1 | 12/2023 | Forstall et al. | |

FOREIGN PATENT DOCUMENTS

| | | | |
|---|---|---|---|
| CN | 106791099 | A | 5/2017 |
| EP | 804009 | A2 | 10/1997 |
| EP | 859498 | A2 | 8/1998 |
| EP | 1069791 | A1 | 1/2001 |
| EP | 1621983 | A2 | 2/2006 |
| EP | 1635543 | A1 | 3/2006 |
| EP | 1763243 | A2 | 3/2007 |
| GB | 2338141 | A | 12/1999 |
| JP | 61-223928 | A | 10/1986 |
| JP | 4-236624 | A | 8/1992 |
| JP | 5-79951 | A | 3/1993 |

(56) References Cited

FOREIGN PATENT DOCUMENTS

| | | | | | |
|---|---|---|---|---|---|
| JP | 8-181781 | A | | 7/1996 | |
| JP | 10-105324 | A | | 4/1998 | |
| JP | 11-73275 | A | | 3/1999 | |
| JP | 2001-127888 | A | | 5/2001 | |
| JP | 2003-84877 | A | | 3/2003 | |
| JP | 2004-38896 | A | | 2/2004 | |
| JP | 2004-48804 | A | | 2/2004 | |
| JP | 2005-184539 | A | | 7/2005 | |
| JP | 2006-164033 | A | | 6/2006 | |
| JP | 2010-503332 | A | | 1/2010 | |
| WO | 97/08879 | A2 | | 3/1997 | |
| WO | 98/30002 | A2 | | 7/1998 | |
| WO | 98/48551 | A2 | | 10/1998 | |
| WO | 00/38042 | A1 | | 6/2000 | |
| WO | 02/32088 | A2 | | 4/2002 | |
| WO | 03/060622 | A2 | | 7/2003 | |
| WO | 2005/010738 | A2 | | 2/2005 | |
| WO | 2005/025081 | A1 | | 3/2005 | |
| WO | 2005/053279 | A1 | | 6/2005 | |
| WO | 2006/070228 | A2 | | 7/2006 | |
| WO | 2008/030780 | A1 | | 3/2008 | |
| WO | 2016/092383 | A1 | | 6/2016 | |
| WO | WO-2018001212 | A1 | * | 1/2018 | H04W 4/12 |
| WO | WO-2020171725 | A1 | * | 8/2020 | H04M 3/42059 |
| WO | WO-2020226785 | A1 | * | 11/2020 | H04L 51/10 |

OTHER PUBLICATIONS

Advisory Action received for U.S. Appl. No. 11/769,694, mailed on Feb. 23, 2011, 3 pages.
Applicant Initiated Interview Summary Received for U.S. Appl. No. 16/019,347, mailed on Feb. 10, 2020, 6 pages.
Applicant-Initiated Interview Summary received for U.S. Appl. No. 16/434,794, mailed on Sep. 11, 2020, 3 pages.
Applicant-Initiated Interview Summary received for U.S. Appl. No. 16/983,240, mailed on Dec. 13, 2021, 4 pages.
Applicant-Initiated Interview Summary received for U.S. Appl. No. 16/983,240, mailed on Sep. 23, 2021, 4 pages.
Corrected Notice of Allowance received for U.S. Appl. No. 16/434,794, mailed on Feb. 8, 2021, 3 pages.
Decision for Board of Appeal received for European Patent Application No. 11176480.9, mailed on May 11, 2022, 23 pages.
Decision on Appeal received for Japanese Patent Application No. 2017130486, mailed on Feb. 17, 2020, 14 pages (2 pages of English Translation and 12 pages of Official Copy).
Decision on Appeal received for U.S. Appl. No. 13/903,962, mailed on Jul. 2, 2019, 7 pages.
Decision to Grant received for European Patent Application No. 07844104.5, mailed on Oct. 25, 2018, 2 pages.
Decision to Grant received for European Patent Application No. 18192595.9, mailed on Nov. 16, 2023, 2 pages.
Decision to Refuse Application received for the European Patent Application No. 07841759.9, mailed on Dec. 8, 2011, 3 pages.
Extended European Search Report received for European Patent Application No. 11176480.9, mailed on Oct. 14, 2011, 9 pages.
Extended European Search Report received for European Patent Application No. 18192595.9, mailed on Dec. 19, 2018, 7 pages.
Final Office Action received for U.S. Appl. No. 11/769,694, Oct. 14, 2010, 12 pages.
Final Office Action received for U.S. Appl. No. 11/769,695, mailed on Jan. 21, 2011, 16 pages.
Final Office Action received for U.S. Appl. No. 11/969,908, mailed on Mar. 17, 2011, 13 pages.
Final Office Action received for U.S. Appl. No. 13/172,649, mailed on Sep. 5, 2013, 17 pages.
Final Office Action received for U.S. Appl. No. 13/903,962 mailed on Jul. 8, 2014, 8 pages.
Final Office Action received for U.S. Appl. No. 14/861,820, mailed on Jun. 9, 2017, 20 pages.
Final Office Action received for U.S. Appl. No. 16/983,240, mailed on Oct. 20, 2021, 28 pages.
Final Office Action received for U.S. Appl. No. 90/012,893, mailed on Apr. 24, 2014, 118 pages.
Final Office Action received for U.S. Appl. No. 13/903,962, mailed on Dec. 21, 2015, 10 pages.
Intention to Grant received for European Patent Application No. 07844104.5, mailed on May 8, 2018, 7 pages.
Intention to Grant received for European Patent Application No. 18192595.9, mailed on Jul. 11, 2023, 8 pages.
International Preliminary Report on Patentability received for PCT Patent Application No. PCT/US2007/077307, issued on Mar. 10, 2009, 12 pages.
International Preliminary Report on Patentability received for PCT Patent Application No. PCT/US2007/077436, issued on Mar. 10, 2009, 10 pages.
International Preliminary Report on Patentability received for PCT Patent Application No. PCT/US2007/077443, issued on Mar. 10, 2009, 6 pages.
International Preliminary Report on Patentability received for PCT Patent Application No. PCT/US2007/088884, issued on Jul. 7, 2009, 9 pages.
International Preliminary Report on Patentability received for PCT Patent Application No. PCT/US2008/050420, issued on Jul. 7, 2009, 8 pages.
International Search Report and Written Opinion for International Application No. PCT/US2008/050420, mailed on Jun. 2, 2008, 9 pages.
International Search Report and Written Opinion received for PCT Patent Application No. PCT/US2007/077307, mailed on Jul. 22, 2008, 16 pages.
International Search Report and Written Opinion received for PCT Patent Application No. PCT/US2007/077436, mailed on Jan. 28, 2008, 12 pages.
International Search Report and Written Opinion received for PCT Patent Application No. PCT/US2007/077443, mailed on Feb. 21, 2008, 8 pages.
International Search Report and Written Opinion received for PCT Patent Application No. PCT/US2007/080971, mailed on Apr. 15, 2008, 9 pages.
International Search Report and Written Opinion received for PCT Patent Application No. PCT/US2007/088884, mailed on May 21, 2008, 11 pages.
Minutes of the Oral Proceedings received for European Patent Application No. 11176480.9, mailed on Mar. 15, 2022, 3 pages.
Nokia,"7280 Interactive Demonstrations", Screenshot, available at <http://web.archive.org/web/20051112502636/europe.nokia.com/support/tutorials/7280/german/index.htm>, Nov. 25, 2005, 2 pages.
Non-Final Office Action received for U.S. Appl. No. 11/769,695, mailed on Oct. 27, 2011, 17 pages.
Non-Final Office Action received for U.S. Appl. No. 13/596,652, mailed on Sep. 19, 2012, 7 pages.
Non-Final Office Action received for U.S. Appl. No. 16/434,794, mailed on Apr. 16, 2020, 14 pages.
Non-Final Office Action received for U.S. Appl. No. 11/769,694, May 6, 2010, 11 pages.
Non-Final Office Action received for U.S. Appl. No. 11/769,695, mailed on Sep. 3, 2010, 21 pages.
Non-Final Office Action received for U.S. Appl. No. 11/770,720, mailed on Jan. 4, 2011, 11 pages.
Non-Final Office Action received for U.S. Appl. No. 11/960,673, mailed on Oct. 28, 2010, 10 pages.
Non-Final Office Action received for U.S. Appl. No. 11/969,908, mailed on Nov. 4, 2010, 11 pages.
Non-Final Office Action received for U.S. Appl. No. 13/172,649, mailed on Feb. 6, 2013, 14 pages.
Non-Final Office Action received for U.S. Appl. No. 13/172,649, mailed on Jan. 25, 2018, 6 pages.
Non-Final Office Action received for U.S. Appl. No. 13/176,703, mailed on Apr. 30, 2014, 10 pages.
Non-Final Office Action received for U.S. Appl. No. 13/903,962, mailed on Apr. 20, 2015, 6 pages.

(56) References Cited

OTHER PUBLICATIONS

Non-Final Office Action received for U.S. Appl. No. 13/903,962, mailed on Nov. 1, 2013, 6 pages.
Non-Final Office Action received for U.S. Appl. No. 14/632,817, mailed on Jun. 4, 2015, 10 pages.
Non-Final Office Action received for U.S. Appl. No. 14/861,820, mailed on Nov. 3, 2016, 22 pages.
Non-Final Office Action received for U.S. Appl. No. 15/137,127, mailed on Jan. 30, 2017, 8 pages.
Non-Final Office Action received for U.S. Appl. No. 15/620,662, mailed on Oct. 4, 2018, 8 pages.
Non-Final Office Action received for U.S. Appl. No. 16/019,647, mailed on Nov. 6, 2019, 22 pages.
Non-Final Office Action received for U.S. Appl. No. 16/739,728, mailed on Nov. 5, 2020, 8 pages.
Non-Final Office Action received for U.S. Appl. No. 16/983,240, mailed on Jun. 21, 2021, 24 pages.
Non-Final Office Action received for U.S. Appl. No. 17/306,236, mailed on Jan. 5, 2022, 11 pages.
Non-Final Office Action received for U.S. Appl. No. 17/322,455, mailed on Jan. 23, 2023, 9 pages.
Non-Final Office Action received for U.S. Appl. No. 17/878,766, mailed on Nov. 25, 2022, 11 pages.
Non-Final Office Action received for U.S. Appl. No. 90/012,893, mailed on Dec. 5, 2013, 119 pages.
Notice of Acceptance received for Australian Patent Application No. 2011244866, mailed on Jan. 14, 2015, 3 pages.
Notice of Acceptance received for Australian Patent Application No. 2015202221, mailed on Aug. 24, 2016, 2 pages.
Notice of Acceptance received for Australian Patent Application No. 2016269522, mailed on Jan. 7, 2019, 3 pages.
Notice of Acceptance received for Australian Patent Application No. 2019202688, mailed on Jun. 16, 2020, 3 pages.
Notice of Acceptance received for Australian Patent Application No. 2020239803, mailed on Mar. 2, 2022, 3 pages.
Notice of Allowance received for Chinese Patent Application No. 200780040362.1, mailed on Jan. 13, 2016, 4 pages (2 pages of English Translation and 2 pages of official copy).
Notice of Allowance received for Japanese Patent Application No. 2015-077930, mailed on Aug. 7, 2017, 3 pages (Only Official Copy). {See Communication under Rule 37 CFR § 1.98(a) (3)}.
Notice of Allowance received for Japanese Patent Application No. 2019-044116, mailed on Nov. 30, 2020, 4 pages, (1 page of English Translation and 3 pages of Official Copy).
Notice of Allowance received for Japanese Patent Application No. 2013-005672, mailed on May 11, 2015, 3 pages (Official Copy Only). {See Communication under Rule 37 CFR § 1.98(a) (3)}.
Notice of Allowance received for U.S. Appl. No. 11/969,908, mailed on Aug. 8, 2011, 11 pages.
Notice of Allowance received for U.S. Appl. No. 11/769,694, Apr. 15, 2011, 8 pages.
Notice of Allowance received for U.S. Appl. No. 11/769,694, mailed on Jun. 1, 2011, 21 pages.
Notice of Allowance received for U.S. Appl. No. 11/770,720, mailed on May 20, 2011, 8 pages.
Notice of Allowance received for U.S. Appl. No. 11/960,673, mailed on Mar. 31, 2011, 5 pages.
Notice of Allowance received for U.S. Appl. No. 11/969,908, mailed on Oct. 3, 2011, 7 pages.
Notice of Allowance received for U.S. Appl. No. 13/172,649, mailed on Apr. 17, 2018, 8 pages.
Notice of Allowance received for U.S. Appl. No. 13/176,703, mailed on Dec. 23, 2014, 2 pages.
Notice of Allowance received for U.S. Appl. No. 13/176,703, mailed on Oct. 21, 2014, 5 pages.
Notice of Allowance received for U.S. Appl. No. 13/418,322, mailed on May 11, 2012, 9 pages.
Notice of Allowance received for U.S. Appl. No. 13/596,652, mailed on Feb. 7, 2013, 7 pages.
Notice of Allowance received for U.S. Appl. No. 13/596,652, mailed on Jan. 9, 2013, 7 pages.
Notice of Allowance received for U.S. Appl. No. 13/903,962, mailed on Dec. 16, 2014, 9 pages.
Notice of Allowance received for U.S. Appl. No. 13/903,962, mailed on Sep. 17, 2019, 7 pages.
Notice of Allowance received for U.S. Appl. No. 14/632,817, mailed on Dec. 16, 2015, 6 pages.
Notice of Allowance received for U.S. Appl. No. 15/137,127, mailed on Mar. 27, 2017, 5 pages.
Notice of Allowance received for U.S. Appl. No. 15/620,662, mailed on Jan. 30, 2019, 5 pages.
Notice of Allowance received for U.S. Appl. No. 16/019,347, mailed on Mar. 27, 2020, 9 pages.
Notice of Allowance received for U.S. Appl. No. 16/434,794, mailed on Jan. 12, 2021, 13 pages.
Notice of Allowance received for U.S. Appl. No. 16/739,728, mailed on Feb. 26, 2021, 5 pages.
Notice of Allowance received for U.S. Appl. No. 16/983,240, mailed on Apr. 27, 2022, 9 pages.
Notice of Allowance received for U.S. Appl. No. 17/306,236, mailed on Mar. 28, 2022, 9 pages.
Notice of Allowance received for U.S. Appl. No. 17/322,455, mailed on Apr. 11, 2023, 7 pages.
Notice of Allowance received for U.S. Appl. No. 17/878,766, mailed on Apr. 11, 2023, 9 pages.
Notice of Allowance received for U.S. Appl. No. 14/861,820, mailed on Dec. 19, 2017, 13 pages.
Notice of Grant received for Chinese Patent Application No. 201210261995.8, mailed on Jul. 4, 2014, 2 pages (Official Copy only). {See Communication under Rule 37 CFR § 1.98(a) (3)}.
Notice of Intent received for U.S. Appl. No. 90/012,893, mailed on Aug. 8, 2014, 9 pages.
Office Action dated Dec. 4, 2009, received in European Patent Application No. 08727395.9, mailed on Dec. 4, 2009, 6 pages.
Office Action received for Australian Patent Application No. 2015202221, mailed on Feb. 29, 2016, 4 pages.
Office Action received for Australian Patent Application No. 2016269522, mailed on Jan. 5, 2018, 4 pages.
Office Action received for Australian Patent Application No. 2016269522, mailed on Oct. 4, 2018, 3 pages.
Office Action received for Australian Patent Application No. 2019202688, mailed on Feb. 21, 2020, 3 pages.
Office Action received for Australian Patent Application No. 2020239803, mailed on Jul. 28, 2021, 3 pages.
Office Action received for Chinese Patent Application No. 200780040362.1, mailed on Apr. 17, 2015, 6 pages (3 pages of English Translation and 3 pages of Official Copy).
Office Action Received for Chinese Patent Application No. 201210261995.8, mailed on Dec. 4, 2013, 5 pages (Official Copy only). {See Communication under Rule 37 CFR § 1.98(a) (3)}.
Office Action Received for European Patent Application No. 07814635.4, mailed on Feb. 24, 2010, 4 pages.
Office Action received for European Patent Application No. 07814635.4, mailed on Jun. 30, 2009, 3 pages.
Office Action received for European Patent Application No. 07841759.9, mailed on Aug. 13, 2009, 7 pages.
Office Action received for European Patent Application No. 07841759.9, mailed on May 25, 2010, 5 pages.
Office Action Received for European Patent Application No. 078441045, mailed on Nov. 10, 2015, 6 pages.
Office Action received for European Patent Application No. 11176480.9, mailed on Nov. 14, 2014, 5 pages.
Office Action received for European Patent Application No. 11176480.9, mailed on Nov. 8, 2016, 12 pages.
Office Action received for European Patent Application No. 18192595.9, mailed on Apr. 16, 2020, 5 pages.
Office Action received for European Patent Application No. 18192595.9, mailed on Dec. 4, 2020, 3 pages.
Office Action received for European Patent Application No. 18192595.9, mailed on Sep. 17, 2021, 5 pages.

(56) References Cited

OTHER PUBLICATIONS

Office Action Received for Japanese Patent Application No. 2013-005672, mailed on Jan. 7, 2014, 7 pages (4 pages of English Translation and 3 pages of Official Copy).
Office Action received for Japanese Patent Application No. 2015-077930, mailed on Aug. 19, 2016, 6 pages (3 pages of English Translation and 3 pages of Official Copy).
Office Action received for Japanese Patent Application No. 2015-077930, mailed on Dec. 18, 2015, 3 pages (Official Copy Only). {See Communication under Rule 37 CFR § 1.98(a) (3)}.
Office Action received for Japanese Patent Application No. 2015-077930, mailed on Mar. 3, 2017, 6 pages (3 pages of English Translation and 3 pages of Official Copy).
Office Action received for Japanese Patent Application No. 2017130486, mailed on Jul. 2, 2018, 8 pages (4 pages of English Translation and 4 pages of Official Copy).
Office Action received for Japanese Patent Application No. 2017130486, mailed on Nov. 12, 2018, 7 pages (3 pages of English Translation and 4 pages of Official Copy).
Office Action received for Japanese Patent Application No. 2019-044116, mailed on Jun. 8, 2020, 6 pages (3 pages of English Translation and 3 pages of Official Copy).
P900 User Guide, Sony Ericsson Mobile Communications AB, XP002479719, available at <http://www.sonyericcson.com/downloads/P900_UG_R1b_EN.pdf>, pp. 8, 16,17,20, 24-26,42-45, 137, 98 pages.
Summons to Attend Oral Proceedings received for European Patent Application No. 11176480.9, mailed on Apr. 26, 2016, 6 pages.
Summons to Attend Oral Proceedings received for European Patent Application No. 11176480.9, mailed on Nov. 23, 2020, 12 pages.
Summons to Attend Oral Proceedings received for the European Application No. 07841759.9, mailed on May 17, 2011, 4 pages.
Supplemental Notice of Allowance received for U.S. Appl. No. 16/019,347, mailed on Apr. 8, 2020, 2 pages.
Using Your Palm Treo 700w Smartphone, Palm, p. 30, 31, 48, 49, 52, 130, 253, 254, 2005-2006, 290 pages.
International Search Report and Written Opinion received for PCT Patent Application No. PCT/US2024/020988, mailed on Aug. 29, 2024, 23 pages.
Invitation to Pay Additional Fees and Partial International Search Report received for PCT Patent Application No. PCT/US2024/020988, mailed on Jul. 8, 2024, 16 pages.
Jurgen Kurz, "Microsoft Teams iPad: Die Wichtigsten Funktionen + Anleitungen", Available Online at: https://www.buero-kaizen.de/ipad-teams/, 2023, 14 pages (Official Copy only) {See Communication Under Rule 37 CFR § 1.98(a) (3)}.
Mehrotra Shikhar, "How to Change Your Profile Picture on WhatsApp", Available Online at: https://screenrant.com/change-profile-picture-whatsapp-how/, Apr. 9, 2022, 7 pages.
Men's Awareness, "WhatsApp Incoming Call. IT Channel Calling", Available Online at: https://www.youtube.com/watch?v=QsVvQW0lfWA, May 19, 2020, 3 pages.
Microsoft Teams, "How to Make and Receive Calls in Microsoft Teams", Available online at: https://www.youtube.com/watch?v=QInQPa7CGzs, Feb. 9, 2022, 2 pages.
Non-Final Office Action received for U.S. Appl. No. 18/220,221, mailed on Oct. 23, 2025, 8 pages.
Non-Final Office Action received for U.S. Appl. No. 18/238,404, mailed on Jun. 4, 2024, 12 pages.
Non-Final Office Action received for U.S. Appl. No. 18/238,410, mailed on Jun. 5, 2024, 13 pages.
Notice of Allowance received for U.S. Appl. No. 18/238,404, mailed on Aug. 23, 2024, 9 pages.
Notice of Allowance received for U.S. Appl. No. 18/238,410, mailed on Sep. 4, 2024, 9 pages.
Programmingknowledge2, "How to Change Your Profile Picture in Teams", Available online at: https://www.youtube.com/watch?v=5Qy4NTdu_Al, Apr. 23, 2022, 3 pages.

* cited by examiner

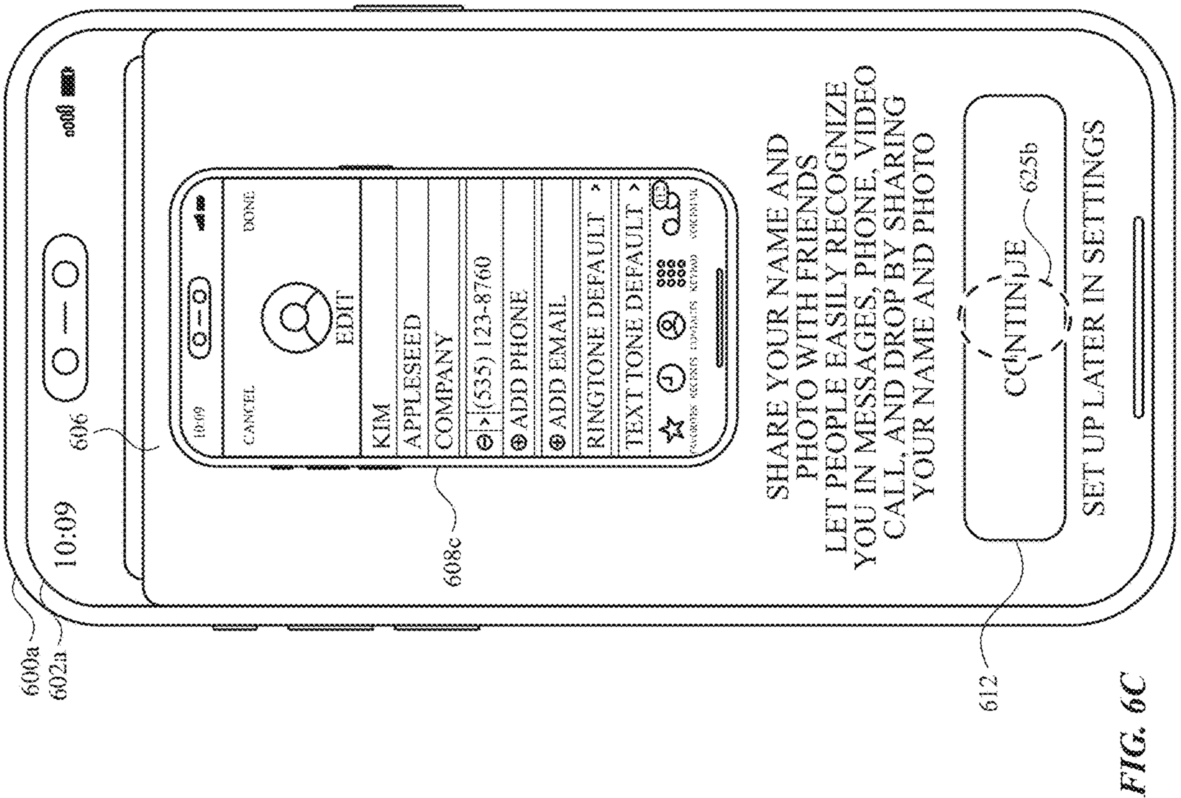
FIG. 6D
FIG. 6C
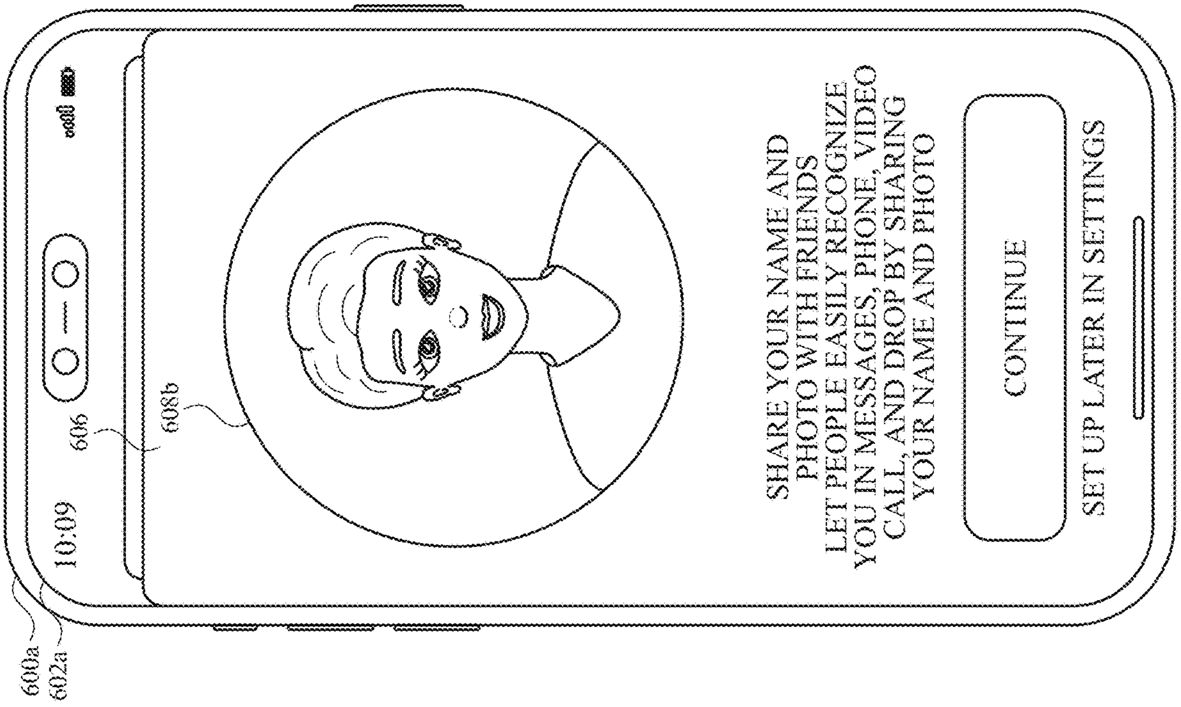

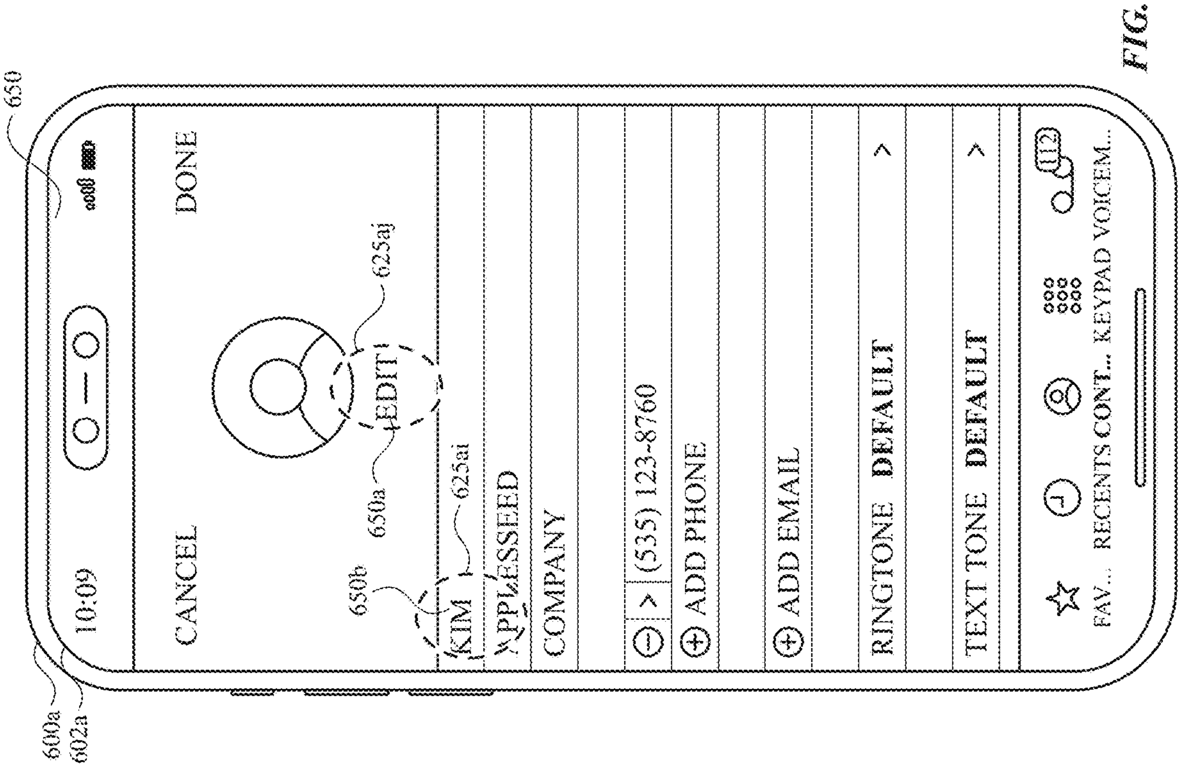
FIG. 6R1
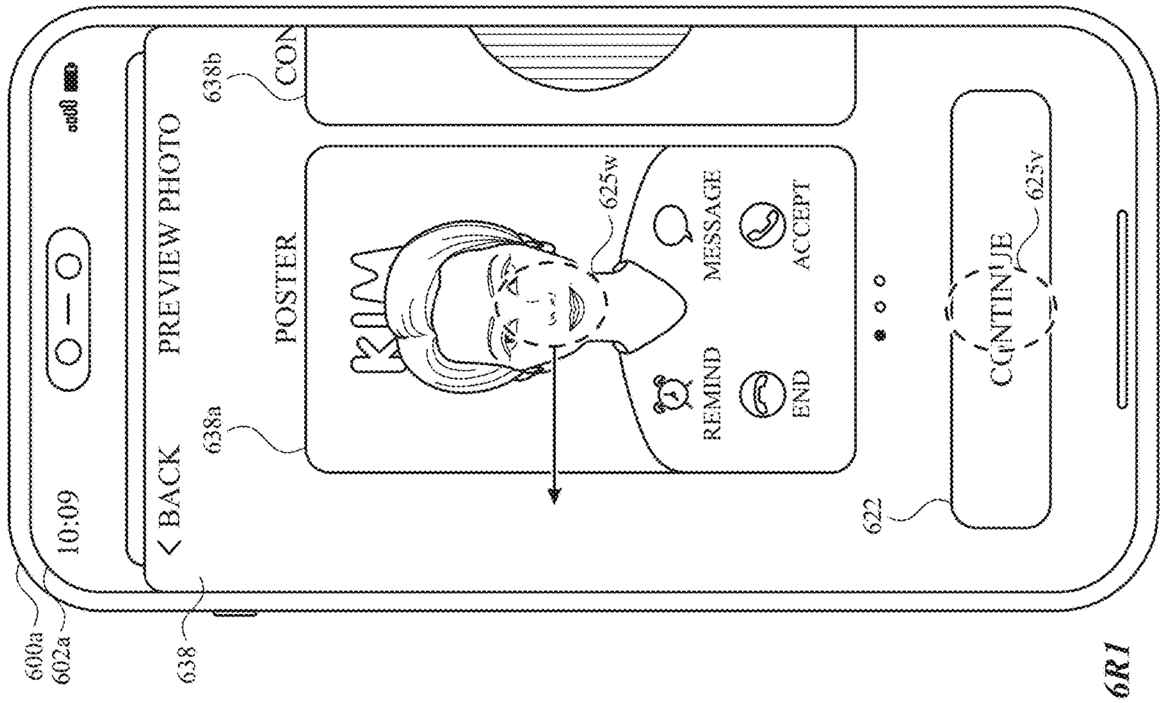
FIG. 6S

FIG. 8U
838
600
602
10:09
MOBILE
KIM
APPLESEED
806g
REMIND ME
MESSAGE
808
SLIDE TO ANSWER

*FIG. 10G*
1012
600b
602b
10:09
MOBILE
BRANDON
1012a
1012b
REMIND ME
MESSAGE
1014
SLIDE TO ANSWER

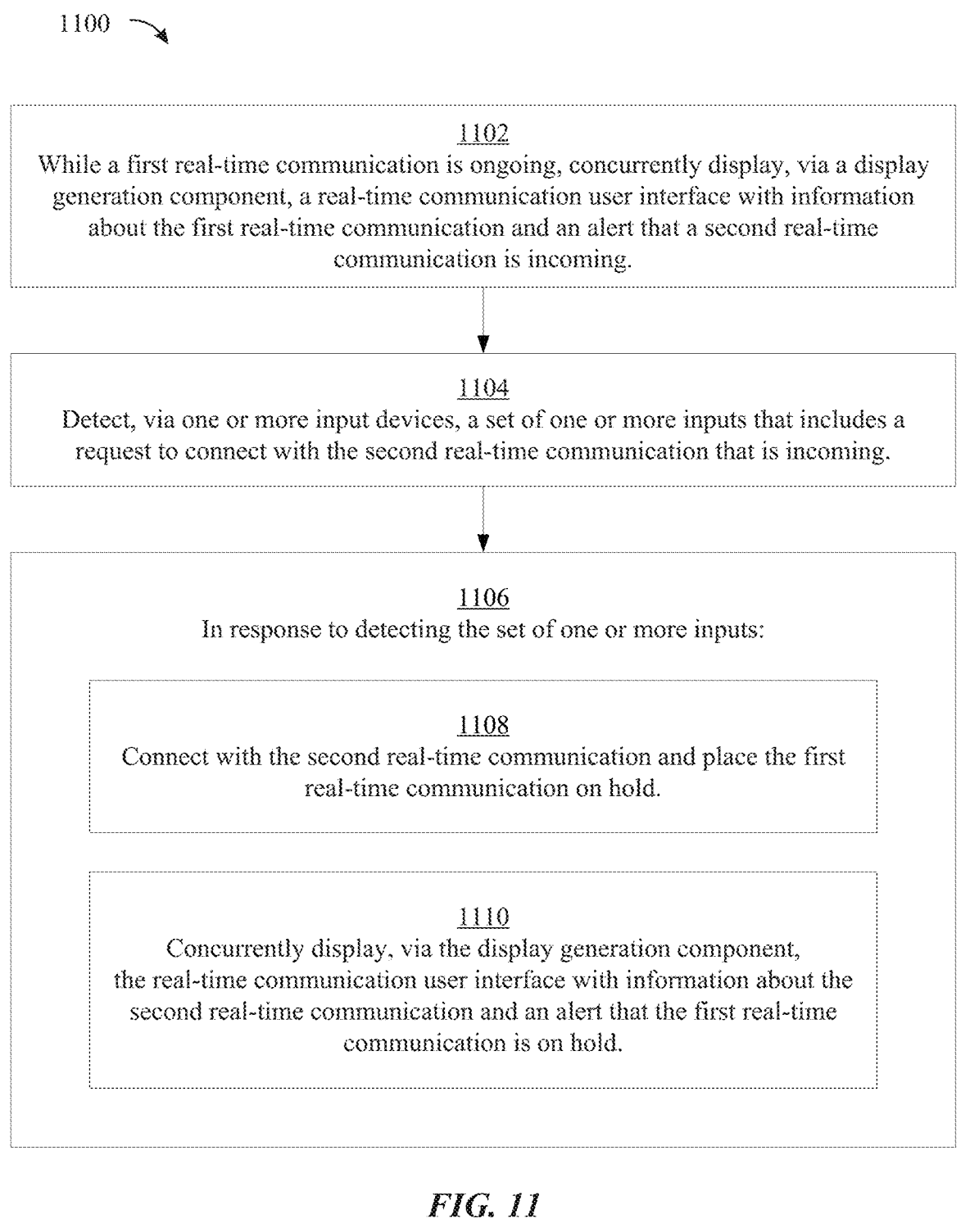

1100

1102
While a first real-time communication is ongoing, concurrently display, via a display generation component, a real-time communication user interface with information about the first real-time communication and an alert that a second real-time communication is incoming.

1104
Detect, via one or more input devices, a set of one or more inputs that includes a request to connect with the second real-time communication that is incoming.

1106
In response to detecting the set of one or more inputs:

1108
Connect with the second real-time communication and place the first real-time communication on hold.

1110
Concurrently display, via the display generation component, the real-time communication user interface with information about the second real-time communication and an alert that the first real-time communication is on hold.

*FIG. 11*

USER INTERFACES FOR COMMUNICATION USING ELECTRONIC DEVICES

CROSS-REFERENCE TO RELATED APPLICATIONS

This application claims priority to U.S. provisional patent application 63/465,203, entitled "USER INTERFACES FOR COMMUNICATION USING ELECTRONIC DEVICES", filed on May 9, 2023, the content of which is hereby incorporated by reference in its entirety.

FIELD

The present disclosure relates generally to computer user interfaces, and more specifically to techniques for communication using electronic devices, including audio and video communication.

BACKGROUND

Electronic devices provide user interfaces for various types of communication, including phone calls, video call, and text messages.

BRIEF SUMMARY

Some techniques for providing user interfaces for communication using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for communication using electronic devices. Such methods and interfaces optionally complement or replace other methods for communication using electronic devices. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: at a computer system that is in communication with a display generation component and one or more input devices: displaying, via the display generation component, a representation selection user interface; while displaying the representation selection user interface, detecting, via the one or more input devices, a request to edit a respective user representation that is displayed at a remote computer system in a respective communication context; and in response to detecting the request to edit the respective user representation: in accordance with a determination that the respective communication context is a first communication context, displaying, via the display generation component, a first representation editing user interface for editing a first user representation that is displayed by a remote computer system in the first communication context; and in accordance with a determination that the respective communication context is a second communication context that is different from the first communication context, displaying, via the display generation component, a second representation editing user interface for editing a second user representation that is displayed by a remote computer system in the second communication context.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a representation selection user interface; while displaying the representation selection user interface, detecting, via the one or more input devices, a request to edit a respective user representation that is displayed at a remote computer system in a respective communication context; in response to detecting the request to edit the respective user representation: in accordance with a determination that the respective communication context is a first communication context, displaying, via the display generation component, a first representation editing user interface for editing a first user representation that is displayed by a remote computer system in the first communication context; and in accordance with a determination that the respective communication context is a second communication context that is different from the first communication context, displaying, via the display generation component, a second representation editing user interface for editing a second user representation that is displayed by a remote computer system in the second communication context.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a representation selection user interface; while displaying the representation selection user interface, detecting, via the one or more input devices, a request to edit a respective user representation that is displayed at a remote computer system in a respective communication context; in response to detecting the request to edit the respective user representation: in accordance with a determination that the respective communication context is a first communication context, displaying, via the display generation component, a first representation editing user interface for editing a first user representation that is displayed by a remote computer system in the first communication context; and in accordance with a determination that the respective communication context is a second communication context that is different from the first communication context, displaying, via the display generation component, a second representation editing user interface for editing a second user representation that is displayed by a remote computer system in the second communication context.

In accordance with some embodiments, a computer system configured to communicate with a display generation component and one or more input devices is described. The computer system comprises: one or more processors; and memory storing one or more programs configured to be executed by the one or more processors, the one or more programs including instructions for: displaying, via the display generation component, a representation selection user interface; while displaying the representation selection user interface, detecting, via the one or more input devices, a request to edit a respective user representation that is displayed at a remote computer system in a respective communication context; and in response to detecting the request to edit the respective user representation: in accordance with a determination that the respective communication context is a first communication context, displaying, via the display generation component, a first representation editing user interface for editing a first user representation that is displayed by a remote computer system in the first communication context; and in accordance with a determination that the respective communication context is a second communication context that is different from the first communication context, displaying, via the display generation component, a second representation editing user interface for editing a second user representation that is displayed by a remote computer system in the second communication context.

In accordance with some embodiments, a computer system configured to communicate with a display generation component and one or more input devices is described. The computer system comprises: means for displaying, via the display generation component, a representation selection user interface; means for, while displaying the representation selection user interface, detecting, via the one or more input devices, a request to edit a respective user representation that is displayed at a remote computer system in a respective communication context; and means for, in response to detecting the request to edit the respective user representation: in accordance with a determination that the respective communication context is a first communication context, displaying, via the display generation component, a first representation editing user interface for editing a first user representation that is displayed by a remote computer system in the first communication context; and in accordance with a determination that the respective communication context is a second communication context that is different from the first communication context, displaying, via the display generation component, a second representation editing user interface for editing a second user representation that is displayed by a remote computer system in the second communication context.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, a representation selection user interface; while displaying the representation selection user interface, detecting, via the one or more input devices, a request to edit a respective user representation that is displayed at a remote computer system in a respective communication context; and in response to detecting the request to edit the respective user representation: in accordance with a determination that the respective communication context is a first communication context, displaying, via the display generation component, a first representation editing user interface for editing a first user representation that is displayed by a remote computer system in the first communication context; and in accordance with a determination that the respective communication context is a second communication context that is different from the first communication context, displaying, via the display generation component, a second representation editing user interface for editing a second user representation that is displayed by a remote computer system in the second communication context.

In accordance with some embodiments, a method is described. The method comprises: at a computer system that is in communication with a display generation component: receiving an incoming real-time communication from an entity; and in response to receiving the incoming real-time communication, and before the incoming real-time communication is accepted, displaying, via the display generation component, a respective representation of the entity, including: in accordance with a determination that a first set of criteria is met, wherein the first set of criteria includes a criterion that is met when the entity that initiated the incoming real-time communication has selected a first representation of the entity, displaying, via the display generation component, the first representation of the entity; and in accordance with a determination that a second set of criteria is met, wherein the second set of criteria includes a criterion that is met when the entity that initiated the incoming real-time communication has selected a second representation of the entity that is different from the first representation of the entity, displaying, via the display generation component, the second representation of the entity.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: receiving an incoming real-time communication from an entity; and in response to receiving the incoming real-time communication, and before the incoming real-time communication is accepted, displaying, via the display generation component, a respective representation of the entity, including: in accordance with a determination that a first set of criteria is met, wherein the first set of criteria includes a criterion that is met when the entity that initiated the incoming real-time communication has selected a first representation of the entity, displaying, via the display generation component, the first representation of the entity; and in accordance with a determination that a second set of criteria is met, wherein the second set of criteria includes a criterion that is met when the entity that initiated the incoming real-time communication has selected a second representation of the entity that is different from the first representation of the entity, displaying, via the display generation component, the second representation of the entity.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: receiving an incoming real-time communication from an entity; and in response to receiving the incoming real-time communication, and before the incoming real-time communication is accepted, displaying, via the display generation component, a respective representation of the entity, including: in accordance with a determination that a first set of criteria is met, wherein the first set of criteria includes a criterion that is met when the entity that initiated the incoming real-time communication has selected a first representation of the entity, displaying, via the display generation component, the first representation of the entity; and in accordance with a determination that a second set of criteria is met, wherein the second set of criteria includes a criterion that is met when the entity that initiated the incoming real-time communication has selected a second representation of the entity that is different from the first representation of the entity, displaying, via the display generation component, the second representation of the entity.

In accordance with some embodiments, a computer system configured to communicate with a display generation component is described. The computer system comprises: one or more processors; and memory storing one or more programs configured to be executed by the one or more processors, the one or more programs including instructions for: receiving an incoming real-time communication from an entity; and in response to receiving the incoming real-time communication, and before the incoming real-time communication is accepted, displaying, via the display generation component, a respective representation of the entity, including: in accordance with a determination that a first set of criteria is met, wherein the first set of criteria includes a criterion that is met when the entity that initiated the incoming real-time communication has selected a first representation of the entity, displaying, via the display generation component, the first representation of the entity; and in accordance with a determination that a second set of criteria is met, wherein the second set of criteria includes a criterion that is met when the entity that initiated the incoming real-time communication has selected a second representation of the entity that is different from the first representation of the entity, displaying, via the display generation component, the second representation of the entity.

In accordance with some embodiments, a computer system configured to communicate with a display generation component is described. The computer system comprises: means for receiving an incoming real-time communication from an entity; and means for, in response to receiving the incoming real-time communication, and before the incoming real-time communication is accepted, displaying, via the display generation component, a respective representation of the entity, including: in accordance with a determination that a first set of criteria is met, wherein the first set of criteria includes a criterion that is met when the entity that initiated the incoming real-time communication has selected a first representation of the entity, displaying, via the display generation component, the first representation of the entity; and in accordance with a determination that a second set of criteria is met, wherein the second set of criteria includes a criterion that is met when the entity that initiated the incoming real-time communication has selected a second representation of the entity that is different from the first representation of the entity, displaying, via the display generation component, the second representation of the entity.

In accordance with some embodiments, a computer program product is described. The computer program product comprises one or more programs configured to be executed by one or more processors of a computer system that is in communication with a display generation component, the one or more programs including instructions for: receiving an incoming real-time communication from an entity; and in response to receiving the incoming real-time communication, and before the incoming real-time communication is accepted, displaying, via the display generation component, a respective representation of the entity, including: in accordance with a determination that a first set of criteria is met, wherein the first set of criteria includes a criterion that is met when the entity that initiated the incoming real-time communication has selected a first representation of the entity, displaying, via the display generation component, the first representation of the entity; and in accordance with a determination that a second set of criteria is met, wherein the second set of criteria includes a criterion that is met when the entity that initiated the incoming real-time communication has selected a second representation of the entity that is different from the first representation of the entity, displaying, via the display generation component, the second representation of the entity.

In accordance with some embodiments, a method is described. The method comprises: at a computer system that is in communication with a display generation component and one or more input devices: while a first real-time communication is ongoing, concurrently displaying, via the display generation component: a real-time communication user interface with information about the first real-time communication; and an alert that a second real-time communication is incoming; detecting, via the one or more input devices, a set of one or more inputs that includes a request to connect with the second real-time communication that is incoming; and in response to detecting the set of one or more inputs: connecting with the second real-time communication and placing the first real-time communication on hold; and concurrently displaying, via the display generation component: the real-time communication user interface with information about the second real-time communication; and an alert that the first real-time communication is on hold.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: while a first real-time communication is ongoing, concurrently displaying, via the display generation component: a real-time communication user interface with information about the first real-time communication; and an alert that a second real-time communication is incoming; detecting, via the one or more input devices, a set of one or more inputs that includes a request to connect with the second real-time communication that is incoming; and in response to detecting the set of one or more inputs: connecting with the second real-time communication and placing the first real-time communication on hold; and concurrently displaying, via the display generation component: the real-time communication user interface with information about the second real-time communication; and an alert that the first real-time communication is on hold.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: while a first real-time communication is ongoing, concurrently displaying, via the display generation component: a real-time communication user interface with information about the first real-time communication; and an alert that a second real-time communication is incoming; detecting, via the one or more input devices, a set of one or more inputs that includes a request to connect with the second real-time communication that is incoming; and in response to detecting the set of one or more inputs: connecting with the second real-time communication and placing the first real-time communication on hold; and concurrently displaying, via the display generation component: the real-time communication user interface with information about the second real-time communication; and an alert that the first real-time communication is on hold.

In accordance with some embodiments, a computer system configured to communicate with a display generation component and one or more input devices is described. The computer system comprises: one or more processors; and memory storing one or more programs configured to be executed by the one or more processors, the one or more programs including instructions for: while a first real-time communication is ongoing, concurrently displaying, via the display generation component: a real-time communication user interface with information about the first real-time communication; and an alert that a second real-time communication is incoming; detecting, via the one or more input devices, a set of one or more inputs that includes a request to connect with the second real-time communication that is incoming; and in response to detecting the set of one or more inputs: connecting with the second real-time communication and placing the first real-time communication on hold; and concurrently displaying, via the display generation component: the real-time communication user interface with information about the second real-time communication; and an alert that the first real-time communication is on hold.

In accordance with some embodiments, a computer system configured to communicate with a display generation component and one or more input devices is described. The computer system comprises: means for, while a first real-time communication is ongoing, concurrently displaying, via the display generation component: a real-time communication user interface with information about the first real-time communication; and an alert that a second real-time communication is incoming; means for detecting, via the one or more input devices, a set of one or more inputs that includes a request to connect with the second real-time communication that is incoming; and means for, in response to detecting the set of one or more inputs: connecting with the second real-time communication and placing the first real-time communication on hold; and concurrently displaying, via the display generation component: the real-time communication user interface with information about the second real-time communication; and an alert that the first real-time communication is on hold.

In accordance with some embodiments, a computer program product is described. The computer program product comprises one or more programs configured to be executed by one or more processors of a computer system that is in communication with a display generation component and one or more input devices, the one or more programs including instructions for: while a first real-time communication is ongoing, concurrently displaying, via the display generation component: a real-time communication user interface with information about the first real-time communication; and an alert that a second real-time communication is incoming; detecting, via the one or more input devices, a set of one or more inputs that includes a request to connect with the second real-time communication that is incoming; and in response to detecting the set of one or more inputs: connecting with the second real-time communication and placing the first real-time communication on hold; and concurrently displaying, via the display generation component: the real-time communication user interface with information about the second real-time communication; and an alert that the first real-time communication is on hold.

In accordance with some embodiments, a method is described. The method comprises: at a computer system that is in communication with a display generation component: receiving an incoming real-time communication from an entity without answering the incoming real-time communication at the computer system; and after receiving the incoming real-time communication without answering the incoming real-time communication at the computer system, and while a voice message is being recorded by the entity, displaying, via the display generation component, a transcript of the voice message that is being recorded by the entity.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: receiving an incoming real-time communication from an entity without answering the incoming real-time communication at the computer system; and after receiving the incoming real-time communication without answering the incoming real-time communication at the computer system, and while a voice message is being recorded by the entity, displaying, via the display generation component, a transcript of the voice message that is being recorded by the entity.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: receiving an incoming real-time communication from an entity without answering the incoming real-time communication at the computer system; and after receiving the incoming real-time communication without answering the incoming real-time communication at the computer system, and while a voice message is being recorded by the entity, displaying, via the display generation component, a transcript of the voice message that is being recorded by the entity.

In accordance with some embodiments, a computer system configured to communicate with a display generation component is described. The computer system comprises: one or more processors; and memory storing one or more programs configured to be executed by the one or more processors, the one or more programs including instructions for: receiving an incoming real-time communication from an entity without answering the incoming real-time communication at the computer system; and after receiving the incoming real-time communication without answering the incoming real-time communication at the computer system, and while a voice message is being recorded by the entity, displaying, via the display generation component, a transcript of the voice message that is being recorded by the entity.

In accordance with some embodiments, a computer system configured to communicate with a display generation component is described. The computer system comprises: means for receiving an incoming real-time communication from an entity without answering the incoming real-time communication at the computer system; and means for, after receiving the incoming real-time communication without answering the incoming real-time communication at the computer system, and while a voice message is being recorded by the entity, displaying, via the display generation component, a transcript of the voice message that is being recorded by the entity.

In accordance with some embodiments, a computer program product is described. The computer program product comprises one or more programs configured to be executed by one or more processors of a computer system that is in communication with a display generation component, the one or more programs including instructions for: receiving an incoming real-time communication from an entity without answering the incoming real-time communication at the computer system; and after receiving the incoming real-time communication without answering the incoming real-time communication at the computer system, and while a voice message is being recorded by the entity, displaying, via the display generation component, a transcript of the voice message that is being recorded by the entity.

In accordance with some embodiments, a method is described. The method comprises: at a computer system that is in communication with a display generation component and one or more input devices: attempting to initiate an outgoing real-time communication with an entity; in response to a determination that attempting to initiate the real-time communication with the entity was unsuccessful, displaying, via the display generation component, a video message user interface element; detecting, via the one or more input devices, selection of the video message user interface element; and in response to detecting selection of the video message user interface element, initiating a process that includes recording a video and sending the video to the entity.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: attempting to initiate an outgoing real-time communication with an entity; in response to a determination that attempting to initiate the real-time communication with the entity was unsuccessful, displaying, via the display generation component, a video message user interface element; detecting, via the one or more input devices, selection of the video message user interface element; and in response to detecting selection of the video message user interface element, initiating a process that includes recording a video and sending the video to the entity.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: attempting to initiate an outgoing real-time communication with an entity; in response to a determination that attempting to initiate the real-time communication with the entity was unsuccessful, displaying, via the display generation component, a video message user interface element; detecting, via the one or more input devices, selection of the video message user interface element; and in response to detecting selection of the video message user interface element, initiating a process that includes recording a video and sending the video to the entity.

In accordance with some embodiments, a computer system configured to communicate with a display generation component and one or more input devices is described. The computer system comprises: one or more processors; and memory storing one or more programs configured to be executed by the one or more processors, the one or more programs including instructions for: attempting to initiate an outgoing real-time communication with an entity; in response to a determination that attempting to initiate the real-time communication with the entity was unsuccessful, displaying, via the display generation component, a video message user interface element; detecting, via the one or more input devices, selection of the video message user interface element; and in response to detecting selection of the video message user interface element, initiating a process that includes recording a video and sending the video to the entity.

In accordance with some embodiments, a computer system configured to communicate with a display generation component and one or more input devices is described. The computer system comprises: means for attempting to initiate an outgoing real-time communication with an entity; means for, in response to a determination that attempting to initiate the real-time communication with the entity was unsuccessful, displaying, via the display generation component, a video message user interface element; means for detecting, via the one or more input devices, selection of the video message user interface element; and means for, in response to detecting selection of the video message user interface element, initiating a process that includes recording a video and sending the video to the entity.

In accordance with some embodiments, a computer program product is described. The computer program product comprises one or more programs configured to be executed by one or more processors of a computer system that is in communication with a display generation component and one or more input devices, the one or more programs including instructions for: attempting to initiate an outgoing real-time communication with an entity; in response to a determination that attempting to initiate the real-time communication with the entity was unsuccessful, displaying, via the display generation component, a video message user interface element; detecting, via the one or more input devices, selection of the video message user interface element; and in response to detecting selection of the video message user interface element, initiating a process that includes recording a video and sending the video to the entity.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for communication using electronic devices, thereby increasing the effectiveness, efficiency, and user satisfaction with such devices. Such methods and interfaces may complement or replace other methods for communication using electronic devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 11 is a flow diagram illustrating methods for managing real-time communications, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for communication using electronic devices. In some embodiments, a user interface is displayed for editing a user representation for a communication context based on the communication context of a selected representation. In some embodiments, a representation of an entity that initiated a real-time communication is displayed based at least in part on a representation selected by the entity. In some embodiments, in response to a request to connect with an incoming second real-time communication during an ongoing first real-time communication, a computer system connects with the second real-time communication and provides an alert that the first real-time communication is on hold. In some embodiments, a transcript of a voice message is provided while the voice message is being recorded. In some embodiments, in response to an unsuccessful attempt to initiate a real-time communication with an entity, a user interface element is provided for initiating a process to record and send a video message to the entity. Such techniques can reduce the cognitive burden on a user who communicate using electronic devices, thereby enhancing productivity. Further, such techniques can reduce processor and battery power otherwise wasted on redundant user inputs.

Below, FIGS. 1A-1B, 2, 3, 4A-4B, and 5A-5C provide a description of exemplary devices for performing the techniques for communication using electronic devices.

Figure 6A:
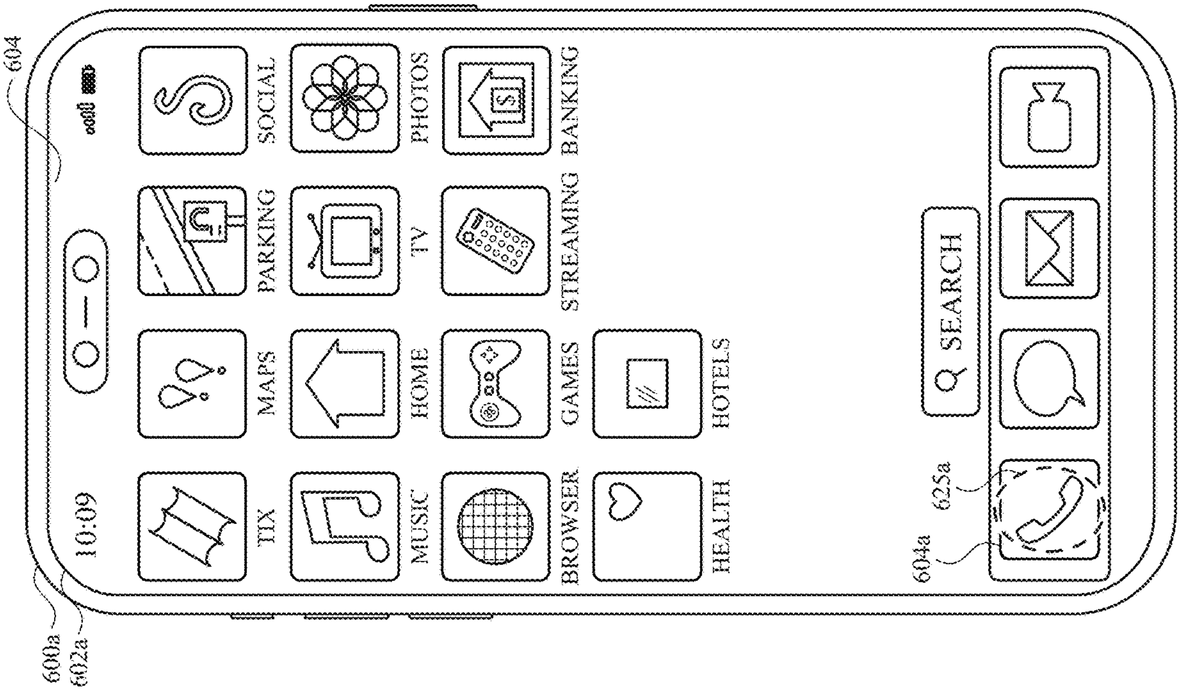
FIGS. 6A-6AG illustrate user interfaces for editing user representations for communication contexts, in accordance with some embodiments.
Figure 7:
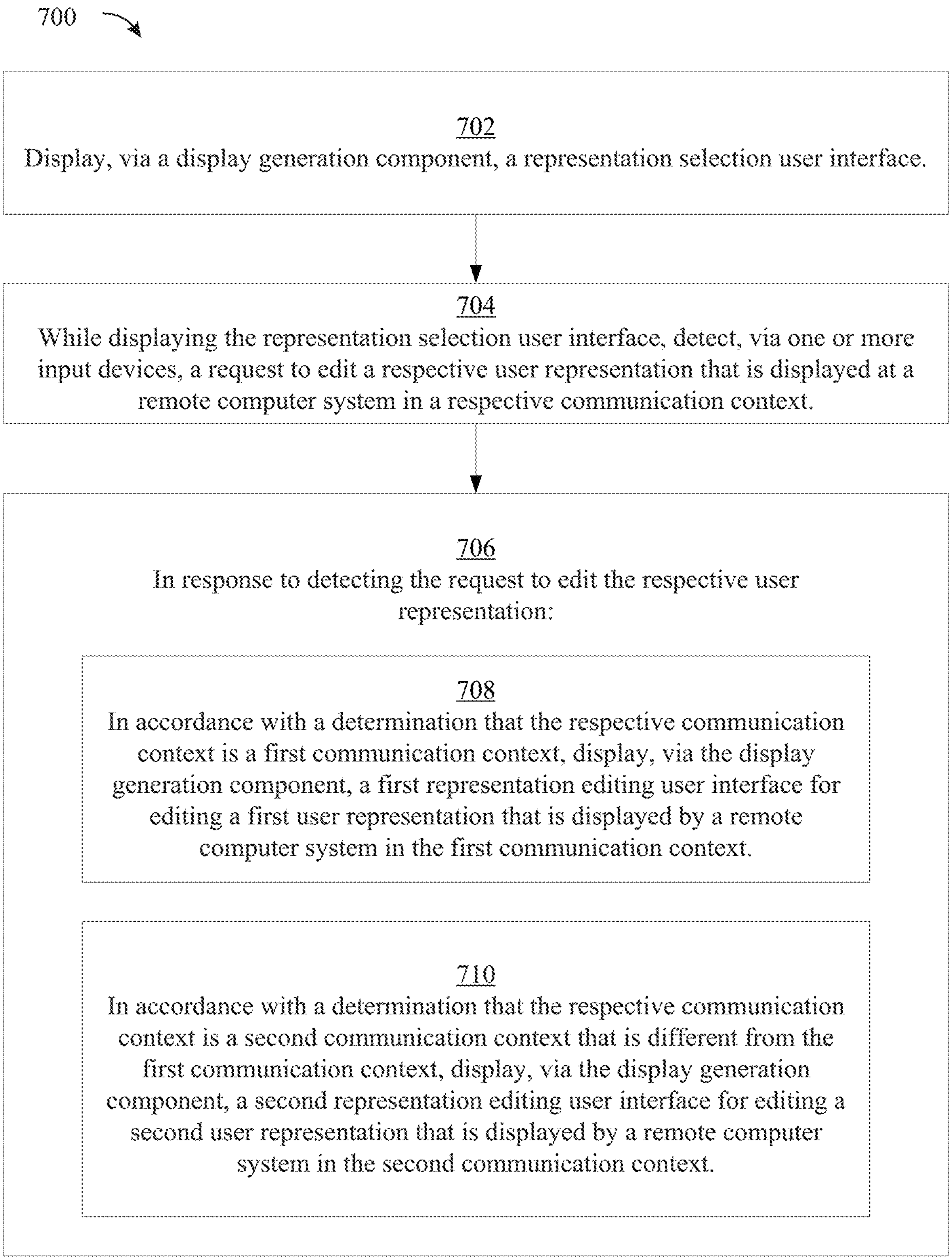
FIG. 7 is a flow diagram illustrating methods for editing user representations for communication contexts, in accordance with some embodiments.

FIGS. 6A-6AG illustrate exemplary user interfaces for editing user representations for communication contexts. FIG. 7 is a flow diagram illustrating methods of editing user representations for communication contexts in accordance with some embodiments. The user interfaces in FIGS. 6A-6AG are used to illustrate the processes described below, including the processes in FIG. 7.

Figure 8B:
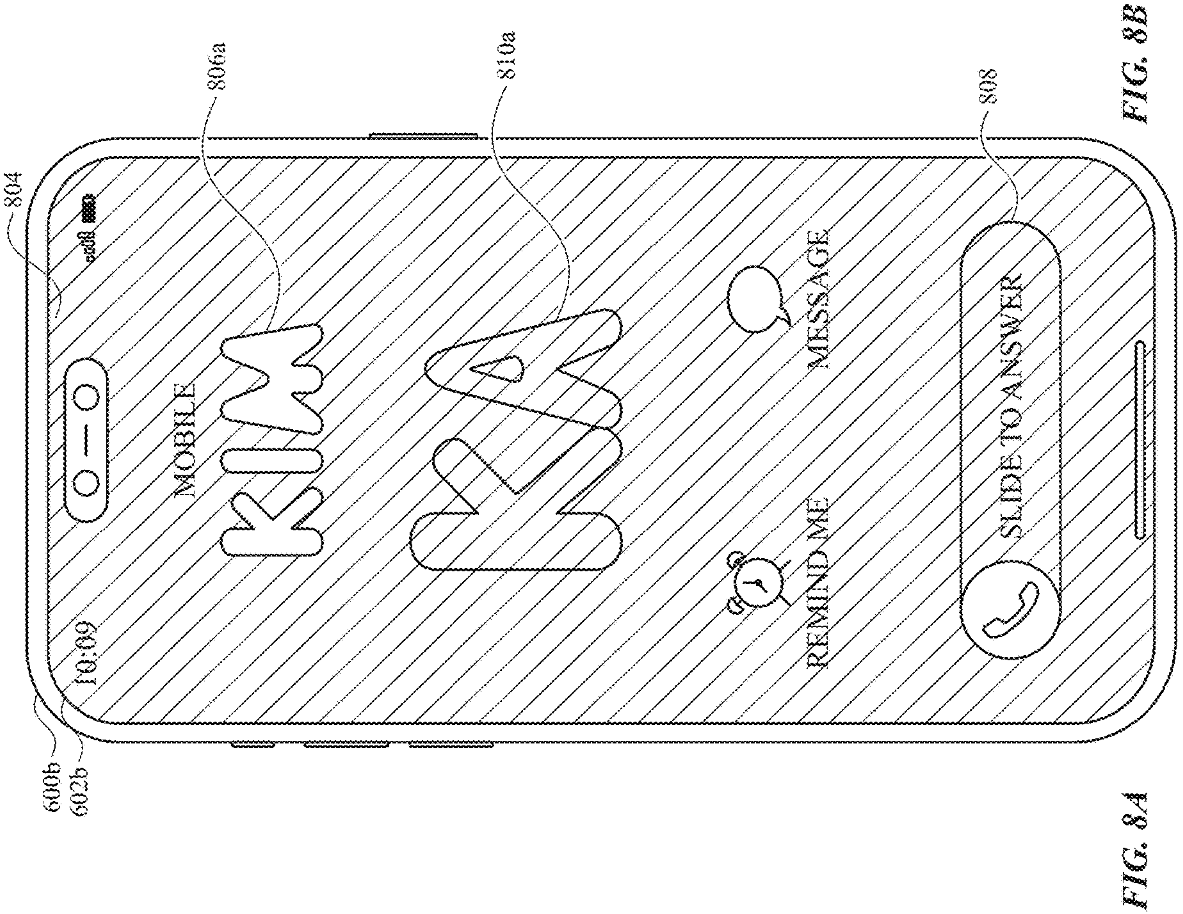
FIGS. 8A-8AE illustrate user interfaces for displaying a representation of an entity for a real-time communication, in accordance with some embodiments.
Figure 8A:
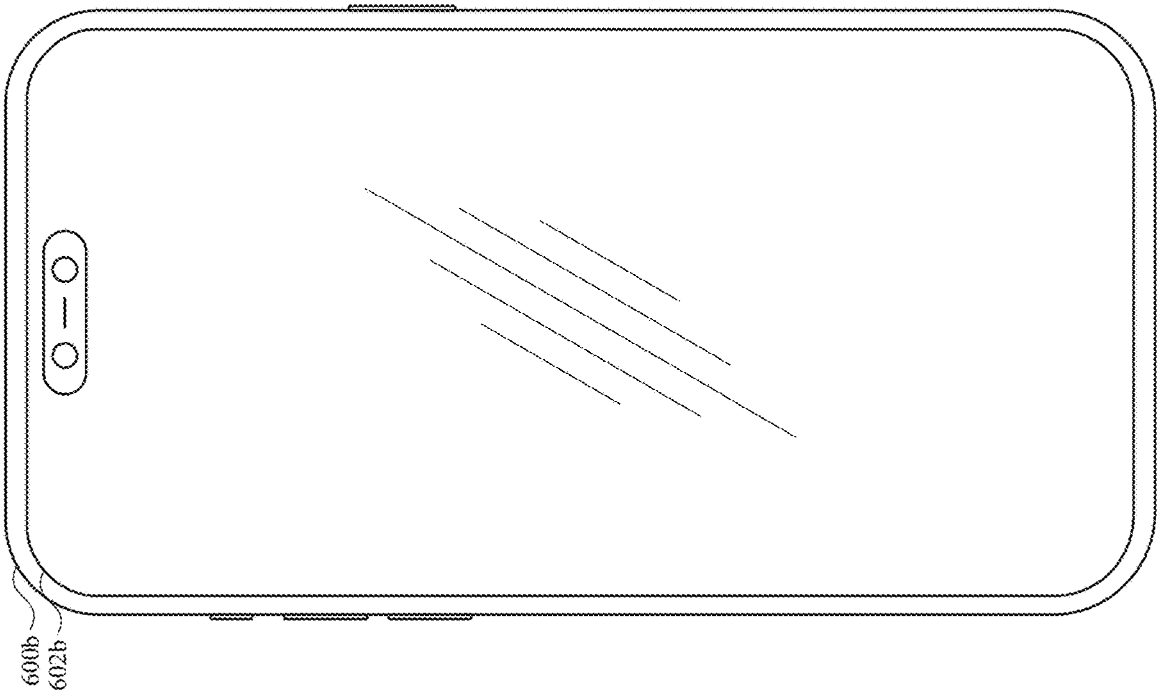
Figure 8D:
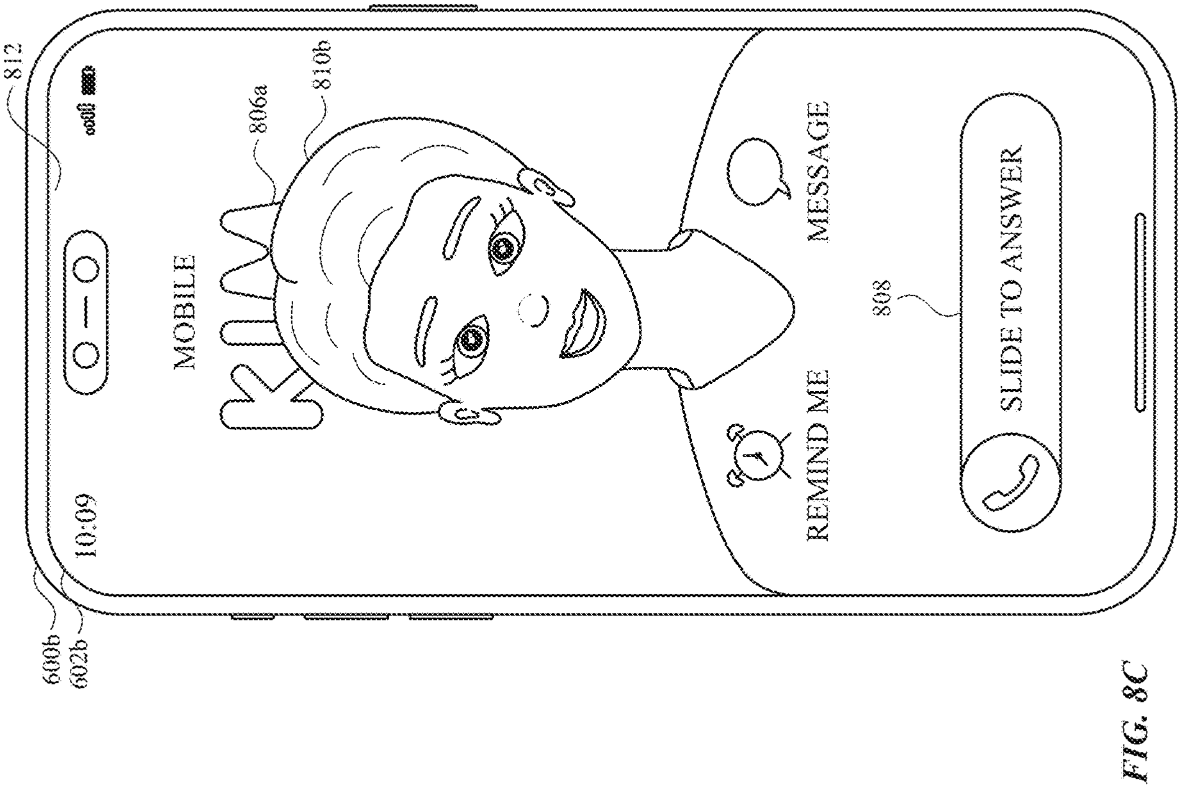
Figure 9:
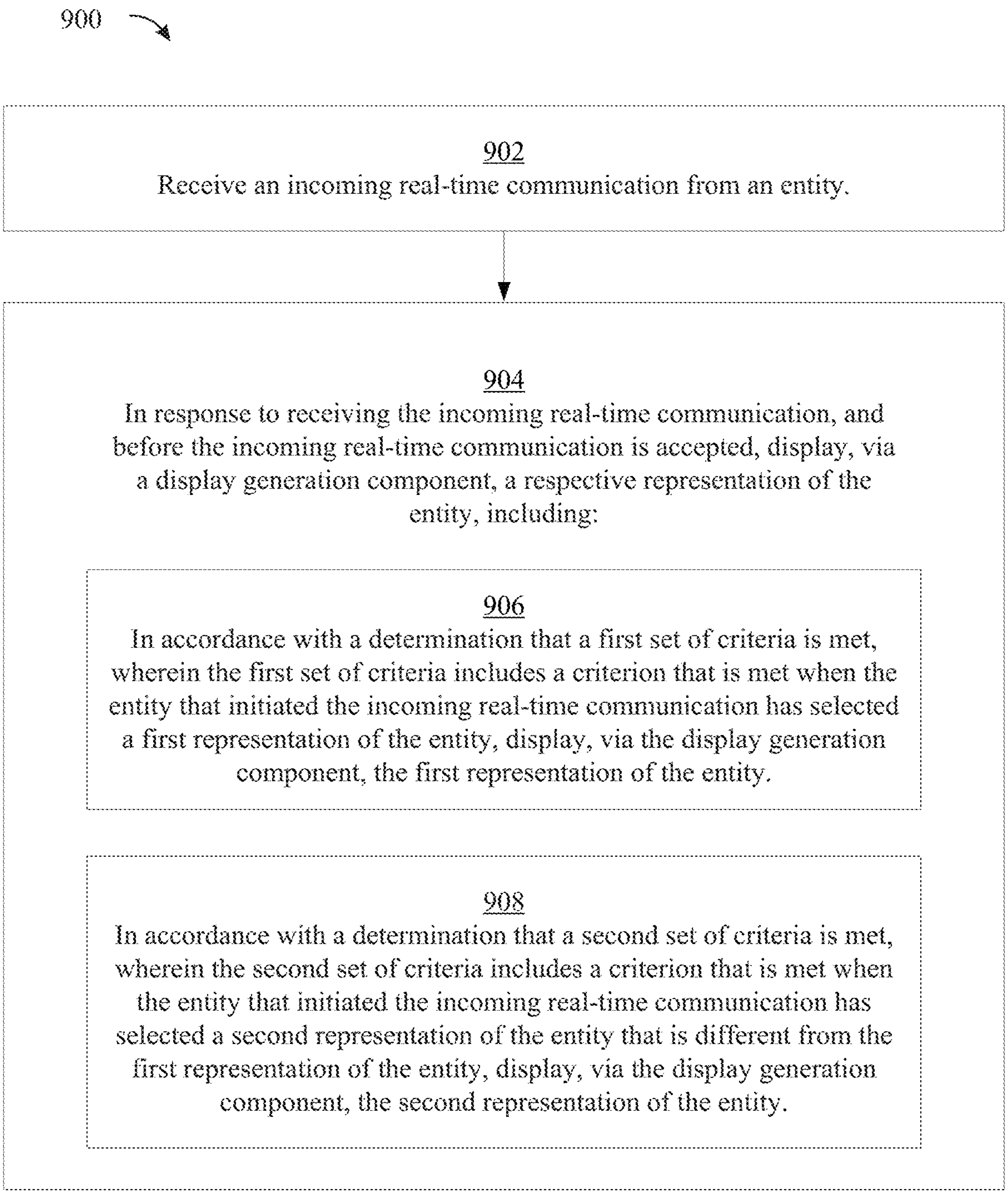
FIG. 9 is a flow diagram illustrating methods for displaying a representation of an entity for a real-time communication, in accordance with some embodiments.

FIGS. 8A-8AE illustrate exemplary user interfaces for displaying a representation of an entity for a real-time communication. FIG. 9 is a flow diagram illustrating methods of displaying a representation of an entity for a real-time communication in accordance with some embodiments. The user interfaces in FIGS. 8A-8AE are used to illustrate the processes described below, including the processes in FIG. 9.

FIGS. 10A-10G illustrate exemplary user interfaces for managing real-time communications. FIG. 11 is a flow diagram illustrating methods of managing real-time communications in accordance with some embodiments. The user interfaces in FIGS. 10A-10G are used to illustrate the processes described below, including the processes in FIG. 11.

Figure 12B:
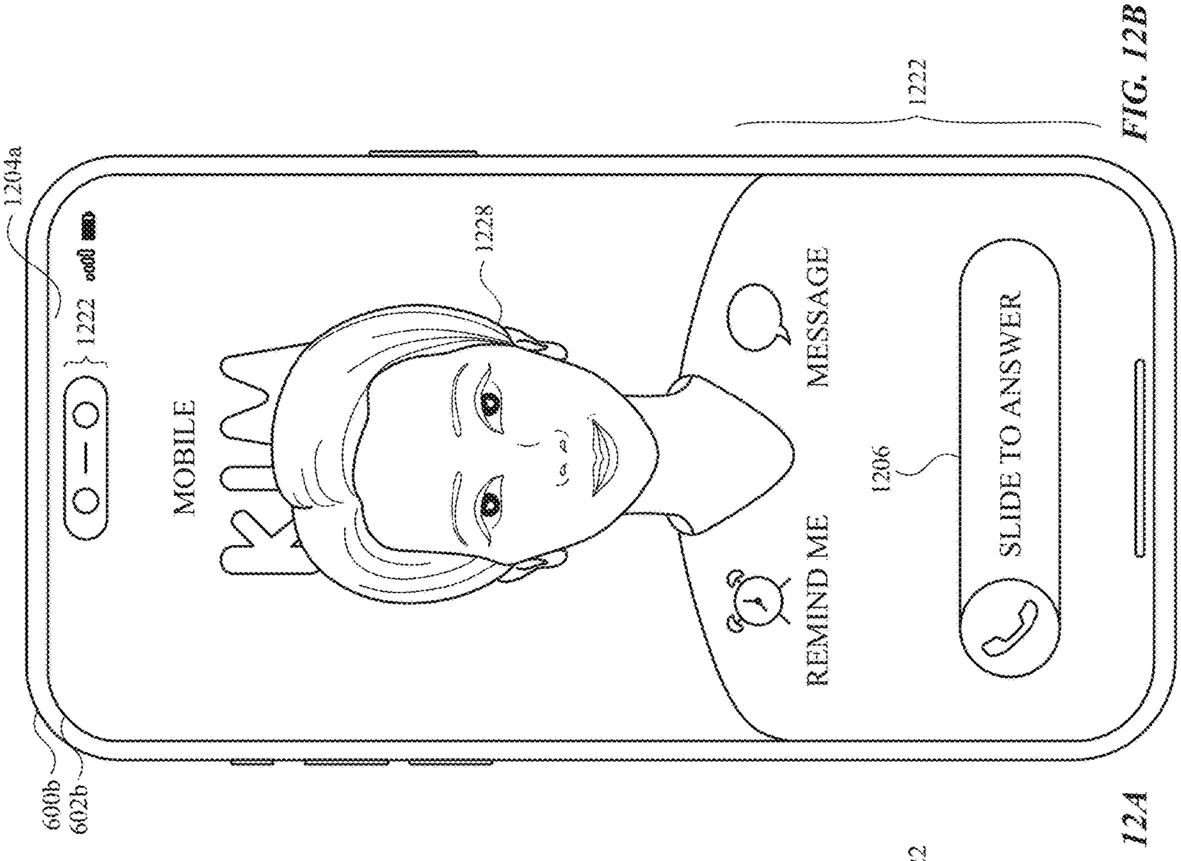
FIGS. 12A-12I illustrate user interfaces for providing a transcript of a voice message, in accordance with some embodiments.

FIGS. 12A-12I illustrate exemplary user interfaces for providing a transcript of a voice message. FIG. 13 is a flow diagram illustrating methods of providing a transcript of a voice message in accordance with some embodiments. The user interfaces in FIGS. 12A-12I are used to illustrate the processes described below, including the processes in FIG. 13.

FIGS. 14A-14K illustrate exemplary user interfaces for video messages. FIG. 15 is a flow diagram illustrating methods for video messages in accordance with some embodiments. The user interfaces in FIGS. 14A-14K are used to illustrate the processes described below, including the processes in FIG. 15.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms “first,” “second,” etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

The term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, “displaying” content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
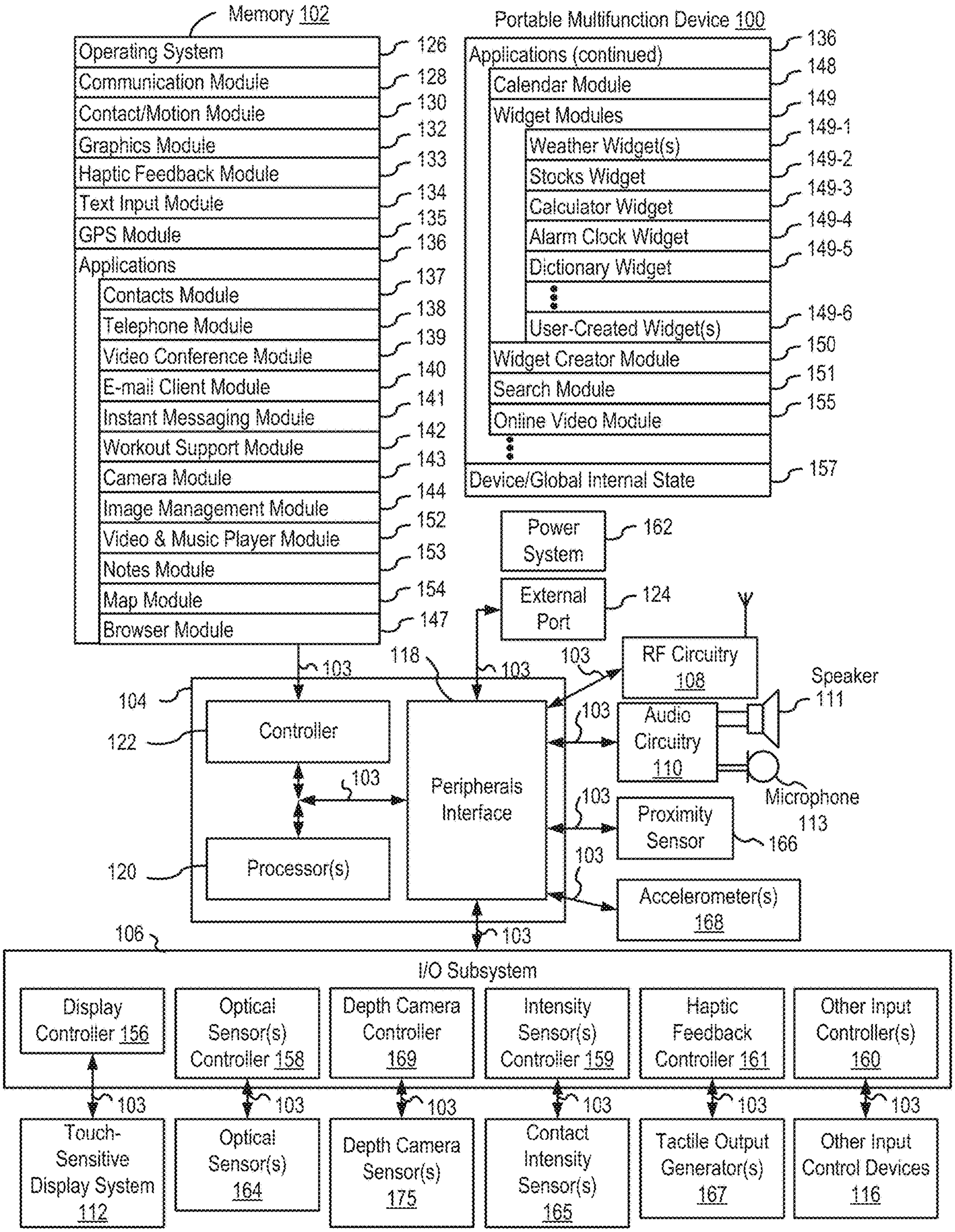
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a “touch screen” for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
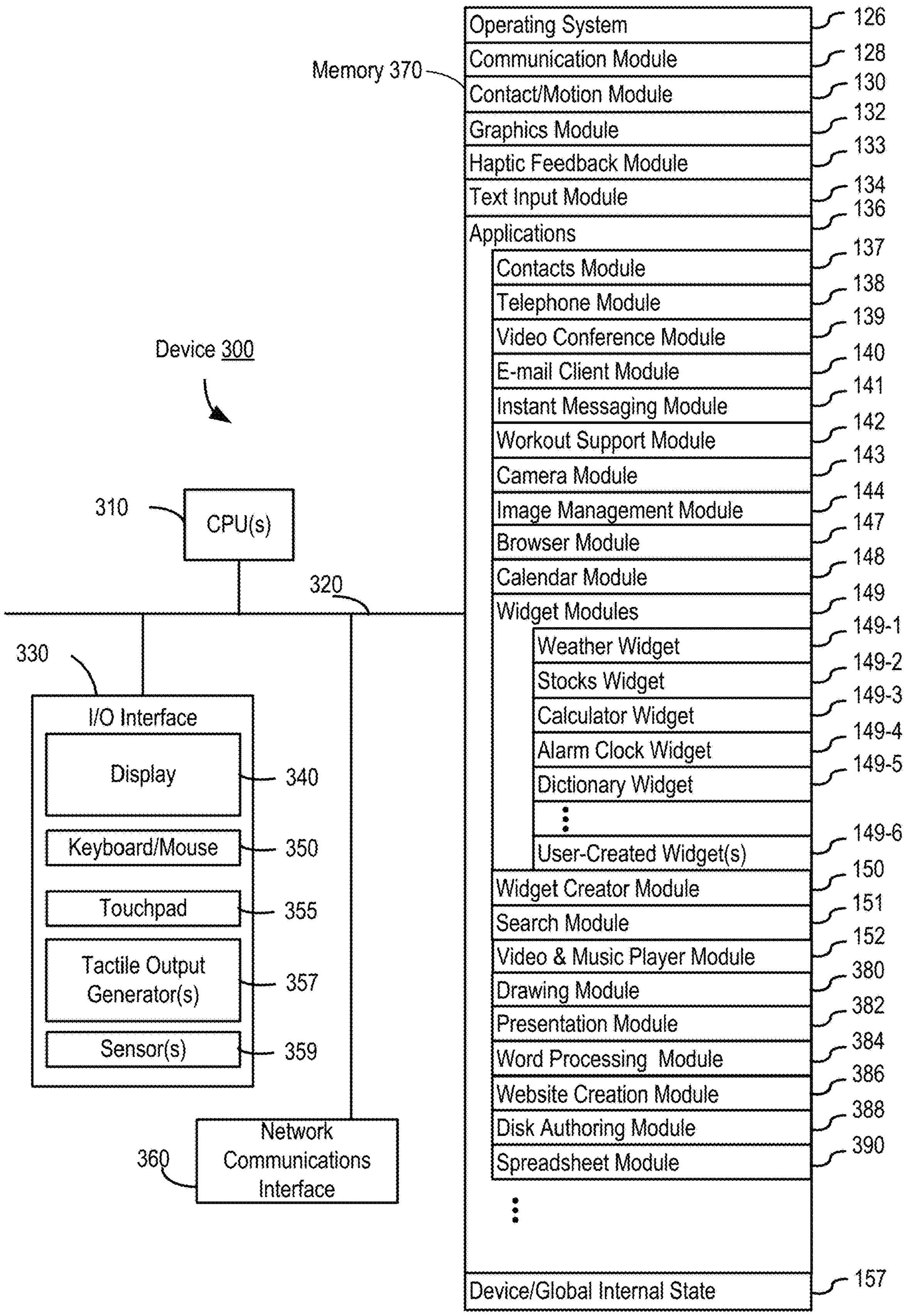
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
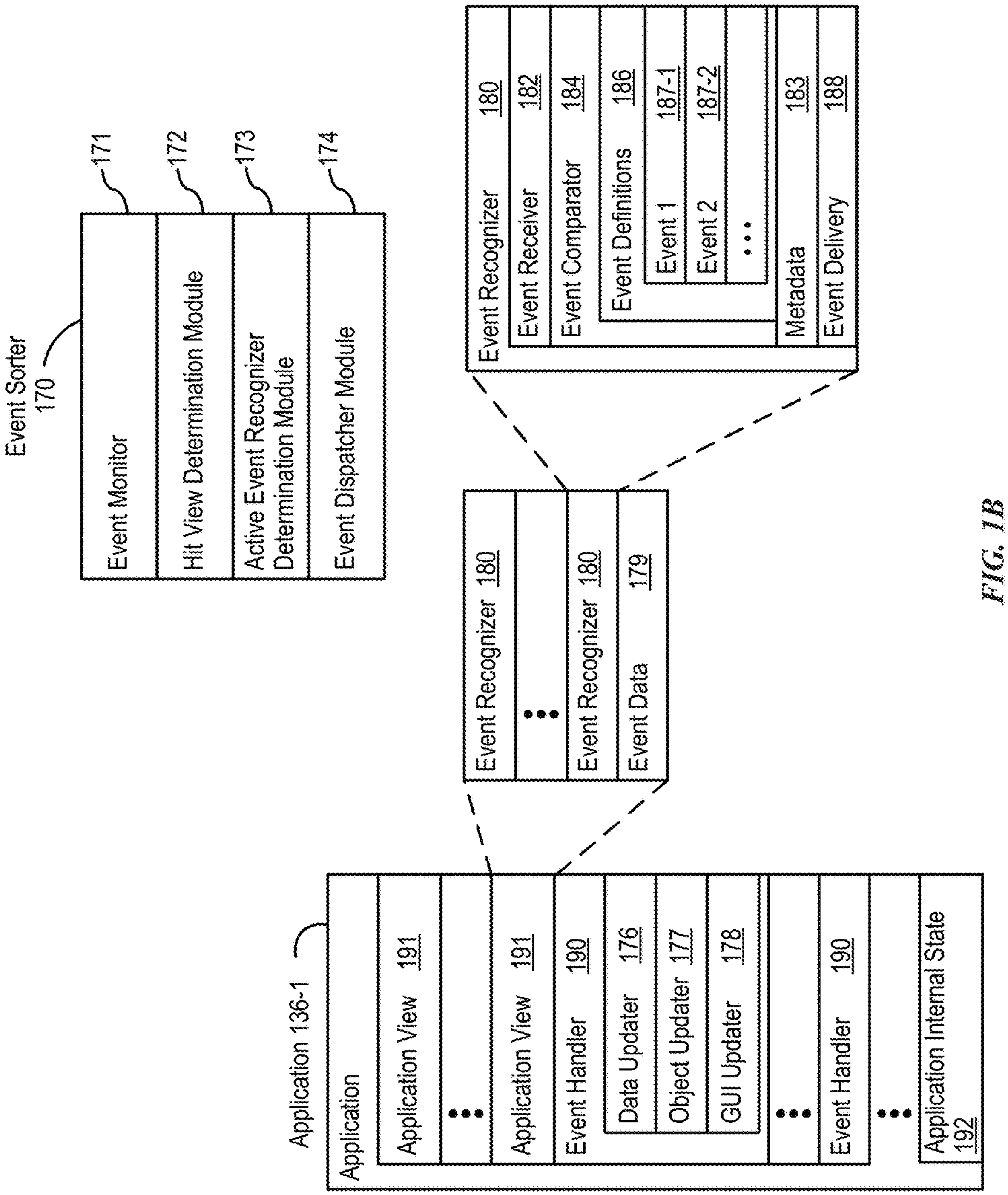
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
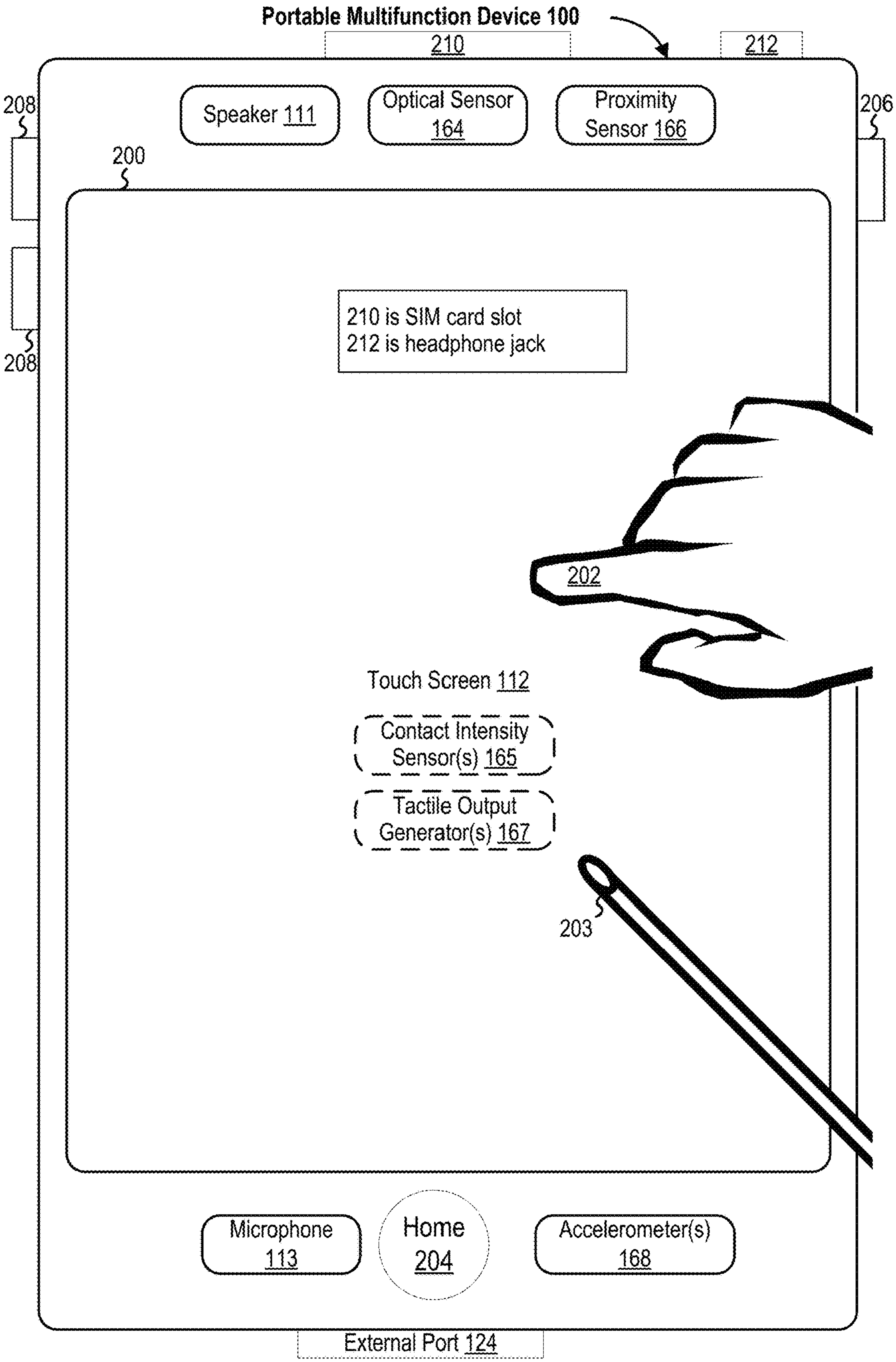
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as “home” or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child’s learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
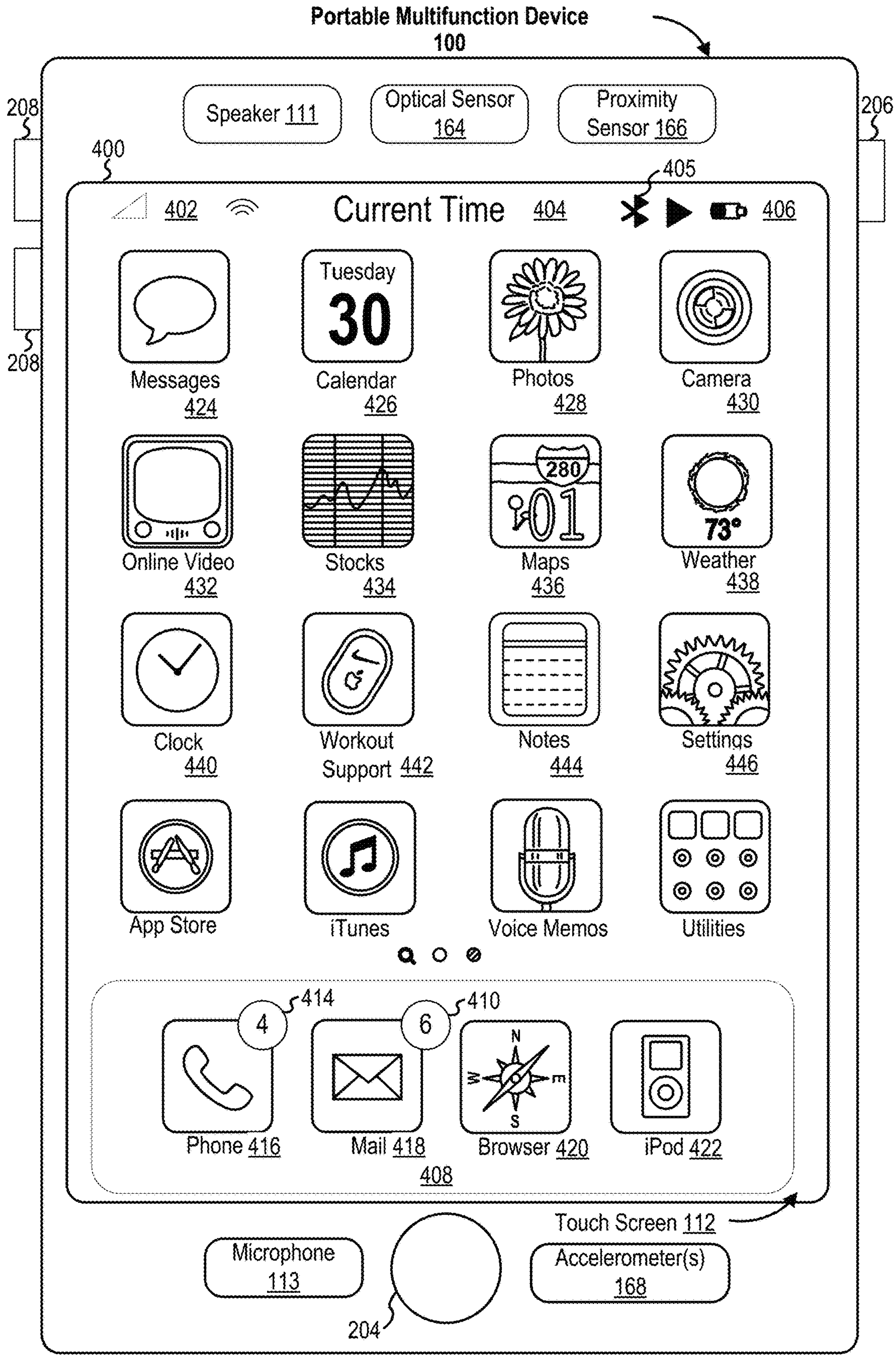
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
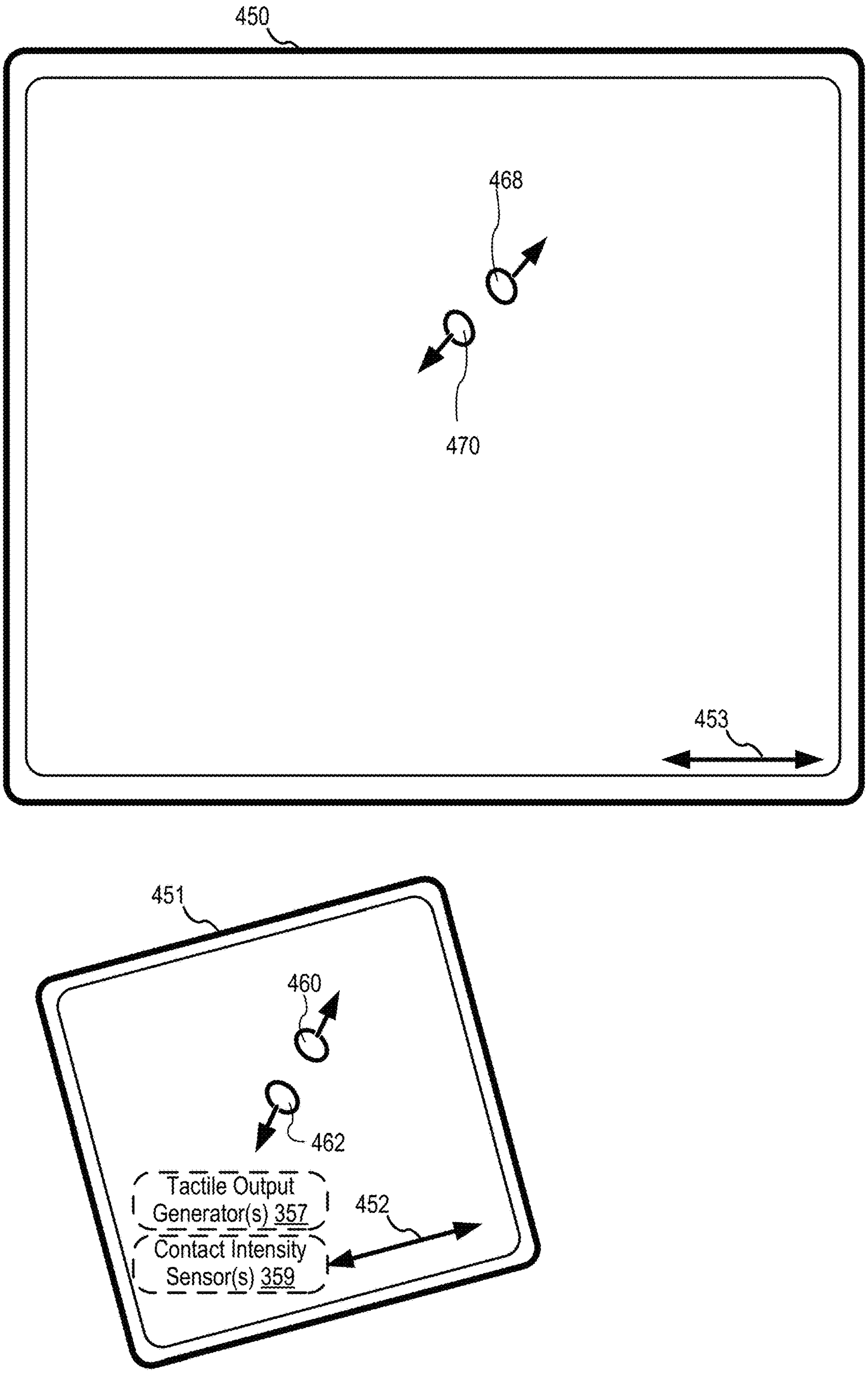
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
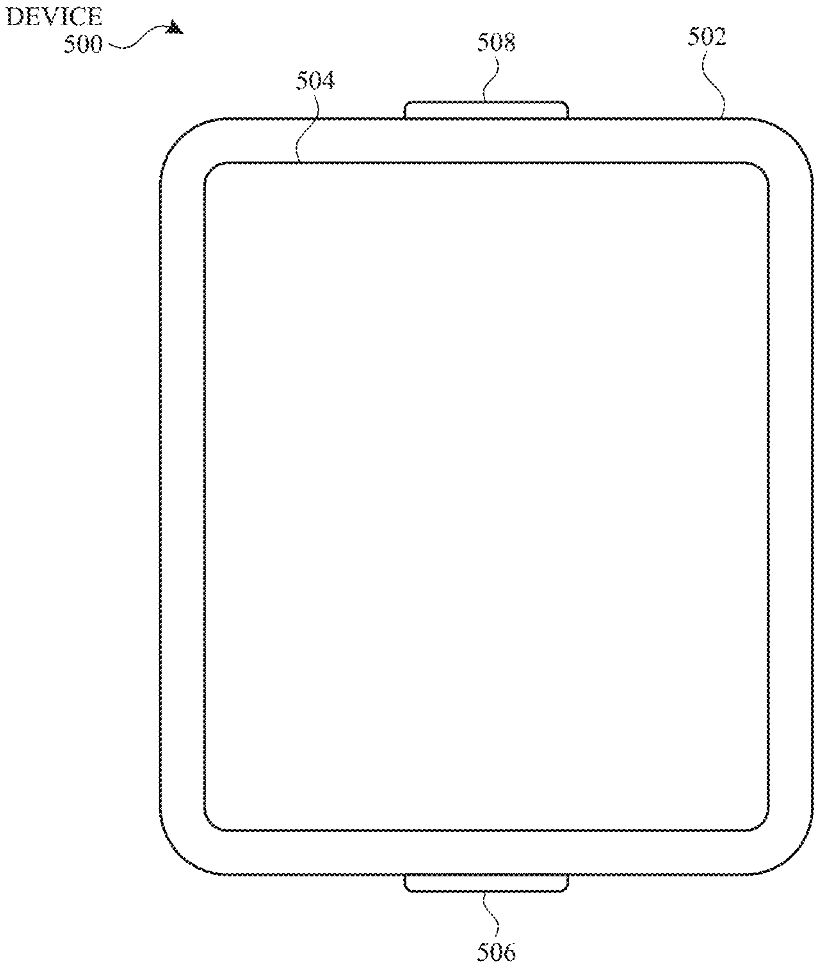
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
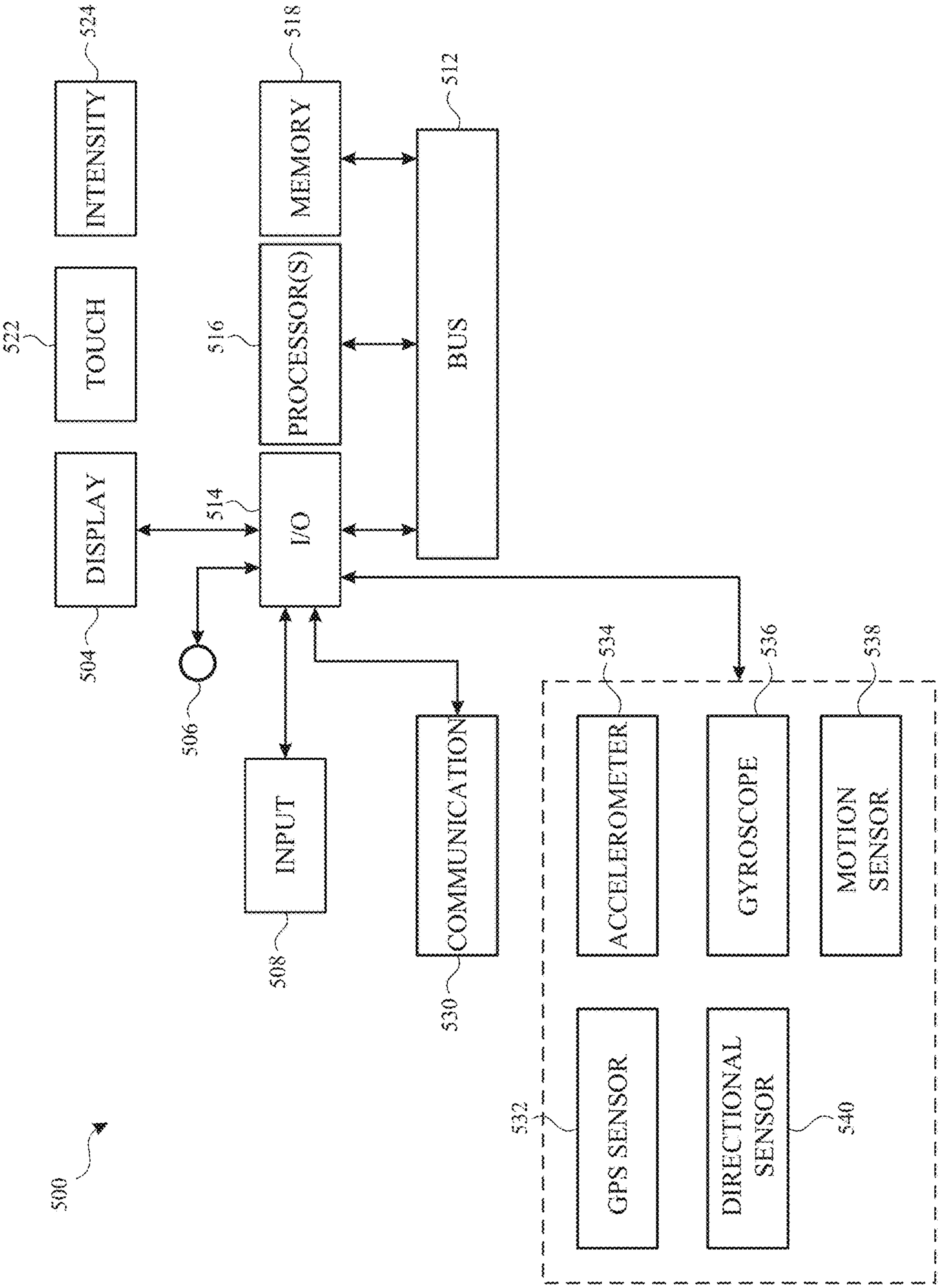
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including methods 700, 900, 1100, 1300, and 1500 (FIGS. 7, 9, 11, 13, and 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
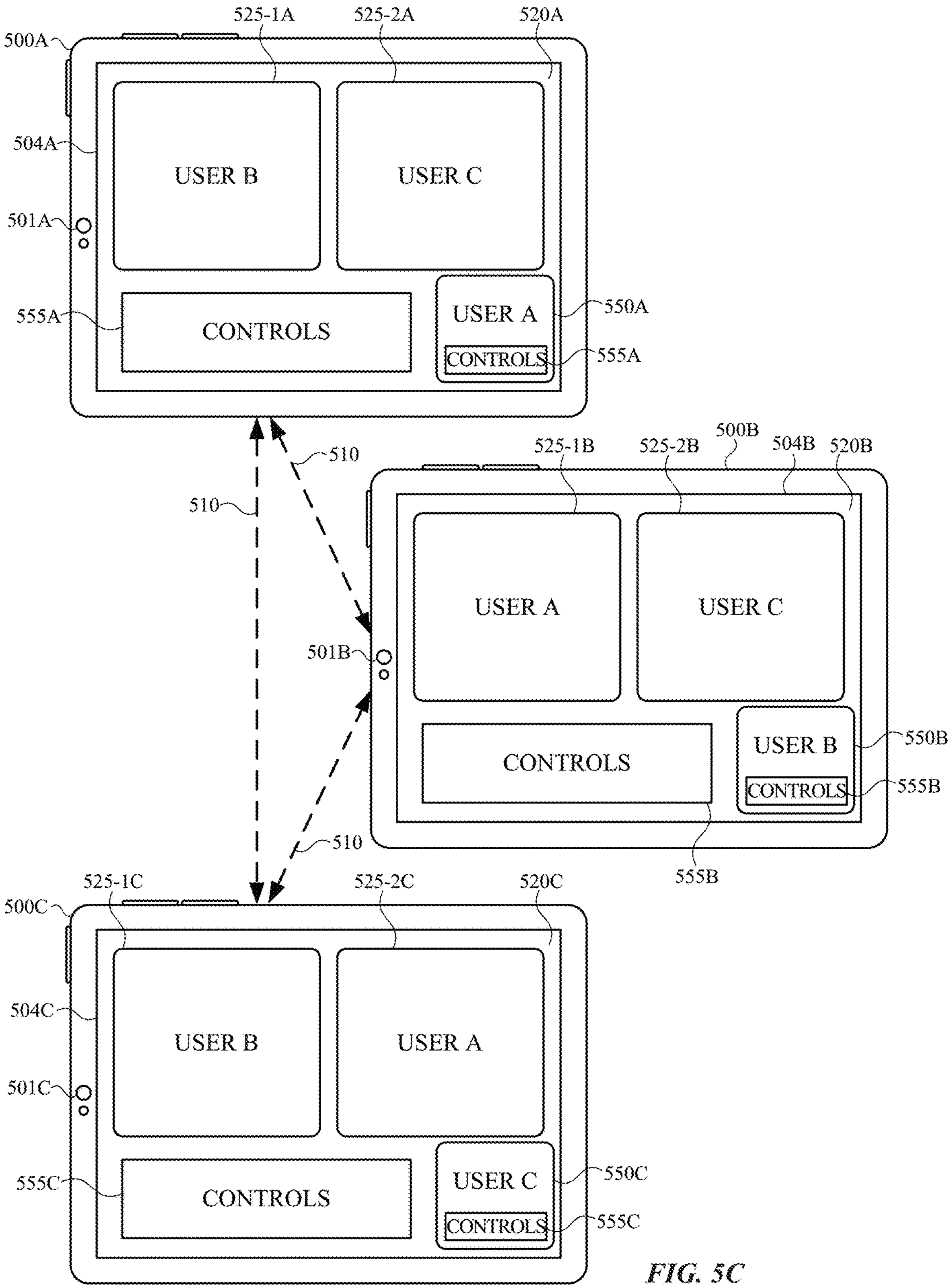
FIG. 5C illustrates an exemplary diagram of a communication session between electronic devices in accordance with some embodiments.

FIG. 5C depicts an exemplary diagram of a communication session between electronic devices 500A, 500B, and 500C. Devices 500A, 500B, and 500C are similar to electronic device 500, and each share with each other one or more data connections 510 such as an Internet connection, Wi-Fi connection, cellular connection, short-range communication connection, and/or any other such data connection or network so as to facilitate real time communication of audio and/or video data between the respective devices for a duration of time. In some embodiments, an exemplary communication session can include a shared-data session whereby data is communicated from one or more of the electronic devices to the other electronic devices to enable concurrent output of respective content at the electronic devices. In some embodiments, an exemplary communication session can include a video conference session whereby audio and/or video data is communicated between devices 500A, 500B, and 500C such that users of the respective devices can engage in real time communication using the electronic devices.

In FIG. 5C, device 500A represents an electronic device associated with User A. Device 500A is in communication (via data connections 510) with devices 500B and 500C, which are associated with User B and User C, respectively. Device 500A includes camera 501A, which is used to capture video data for the communication session, and display 504A (e.g., a touchscreen), which is used to display content associated with the communication session. Device 500A also includes other components, such as a microphone (e.g., 113) for recording audio for the communication session and a speaker (e.g., 111) for outputting audio for the communication session.

Device 500A displays, via display 504A, communication UI 520A, which is a user interface for facilitating a communication session (e.g., a video conference session) between device 500B and device 500C. Communication UI 520A includes video feed 525-1A and video feed 525-2A. Video feed 525-1A is a representation of video data captured at device 500B (e.g., using camera 501B) and communicated from device 500B to devices 500A and 500C during the communication session. Video feed 525-2A is a representation of video data captured at device 500C (e.g., using camera 501C) and communicated from device 500C to devices 500A and 500B during the communication session.

Communication UI 520A includes camera preview 550A, which is a representation of video data captured at device 500A via camera 501A. Camera preview 550A represents to User A the prospective video feed of User A that is displayed at respective devices 500B and 500C.

Communication UI 520A includes one or more controls 555A for controlling one or more aspects of the communication session. For example, controls 555A can include controls for muting audio for the communication session, changing a camera view for the communication session (e.g., changing which camera is used for capturing video for the communication session, adjusting a zoom value), terminating the communication session, applying visual effects to the camera view for the communication session, activating one or more modes associated with the communication session. In some embodiments, one or more controls 555A are optionally displayed in communication UI 520A. In some embodiments, one or more controls 555A are displayed separate from camera preview 550A. In some embodiments, one or more controls 555A are displayed overlaying at least a portion of camera preview 550A.

In FIG. 5C, device 500B represents an electronic device associated with User B, which is in communication (via data connections 510) with devices 500A and 500C. Device 500B includes camera 501B, which is used to capture video data for the communication session, and display 504B (e.g., a touchscreen), which is used to display content associated with the communication session. Device 500B also includes other components, such as a microphone (e.g., 113) for recording audio for the communication session and a speaker (e.g., 111) for outputting audio for the communication session.

Device 500B displays, via touchscreen 504B, communication UI 520B, which is similar to communication UI 520A of device 500A. Communication UI 520B includes video feed 525-1B and video feed 525-2B. Video feed 525-1B is a representation of video data captured at device 500A (e.g., using camera 501A) and communicated from device 500A to devices 500B and 500C during the communication session. Video feed 525-2B is a representation of video data captured at device 500C (e.g., using camera 501C) and communicated from device 500C to devices 500A and 500B during the communication session. Communication UI 520B also includes camera preview 550B, which is a representation of video data captured at device 500B via camera 501B, and one or more controls 555B for controlling one or more aspects of the communication session, similar to controls 555A. Camera preview 550B represents to User B the prospective video feed of User B that is displayed at respective devices 500A and 500C.

In FIG. 5C, device 500C represents an electronic device associated with User C, which is in communication (via data connections 510) with devices 500A and 500B. Device 500C includes camera 501C, which is used to capture video data for the communication session, and display 504C (e.g., a touchscreen), which is used to display content associated with the communication session. Device 500C also includes other components, such as a microphone (e.g., 113) for recording audio for the communication session and a speaker (e.g., 111) for outputting audio for the communication session.

Device 500C displays, via touchscreen 504C, communication UI 520C, which is similar to communication UI 520A of device 500A and communication UI 520B of device 500B. Communication UI 520C includes video feed 525-1C and video feed 525-2C. Video feed 525-1C is a representation of video data captured at device 500B (e.g., using camera 501B) and communicated from device 500B to devices 500A and 500C during the communication session. Video feed 525-2C is a representation of video data captured at device 500A (e.g., using camera 501A) and communicated from device 500A to devices 500B and 500C during the communication session. Communication UI 520C also includes camera preview 550C, which is a representation of video data captured at device 500C via camera 501C, and one or more controls 555C for controlling one or more aspects of the communication session, similar to controls 555A and 555B. Camera preview 550C represents to User C the prospective video feed of User C that is displayed at respective devices 500A and 500B.

While the diagram depicted in FIG. 5C represents a communication session between three electronic devices, the communication session can be established between two or more electronic devices, and the number of devices participating in the communication session can change as electronic devices join or leave the communication session. For example, if one of the electronic devices leaves the communication session, audio and video data from the device that stopped participating in the communication session is no longer represented on the participating devices. For example, if device 500B stops participating in the communication session, there is no data connection 510 between devices 500A and 500C, and no data connection 510 between devices 500C and 500B. Additionally, device 500A does not include video feed 525-1A and device 500C does not include video feed 525-1C. Similarly, if a device joins the communication session, a connection is established between the joining device and the existing devices, and the video and audio data is shared among all devices such that each device is capable of outputting data communicated from the other devices.

Figure 14B:
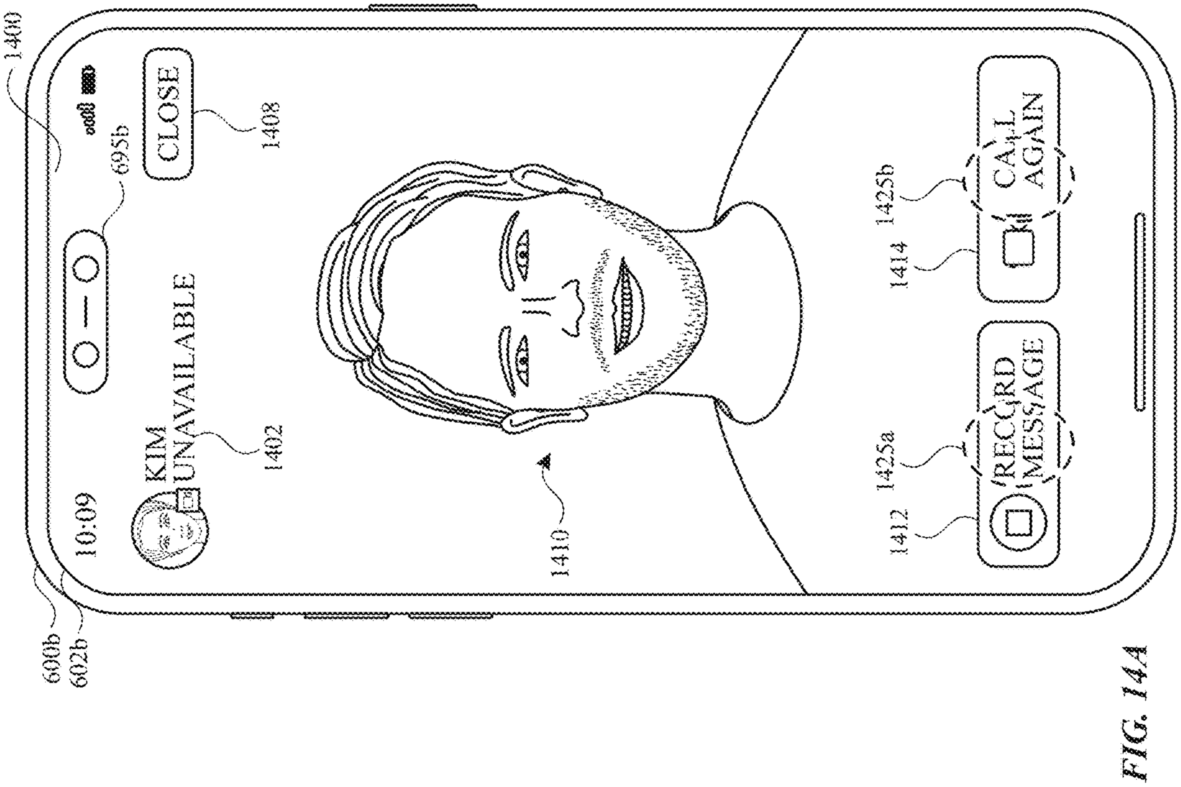
FIGS. 14A-14K illustrate user interfaces for video messages, in accordance with some embodiments.
Figure 14A:
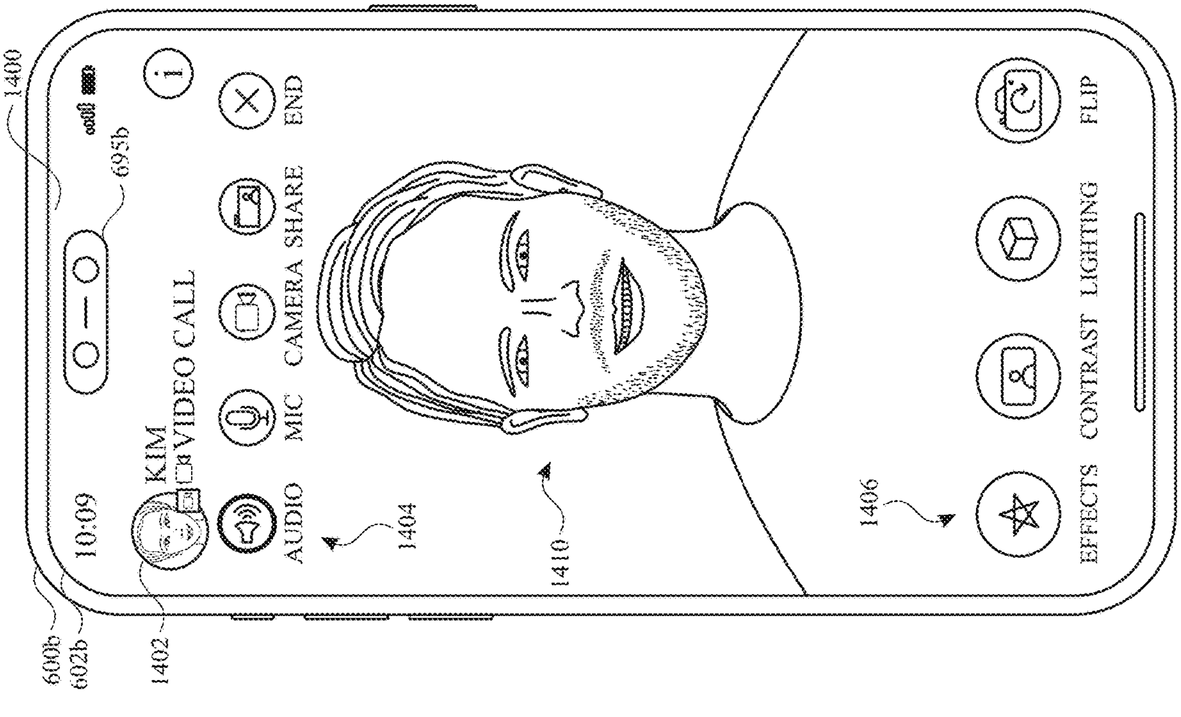
Figure 15:
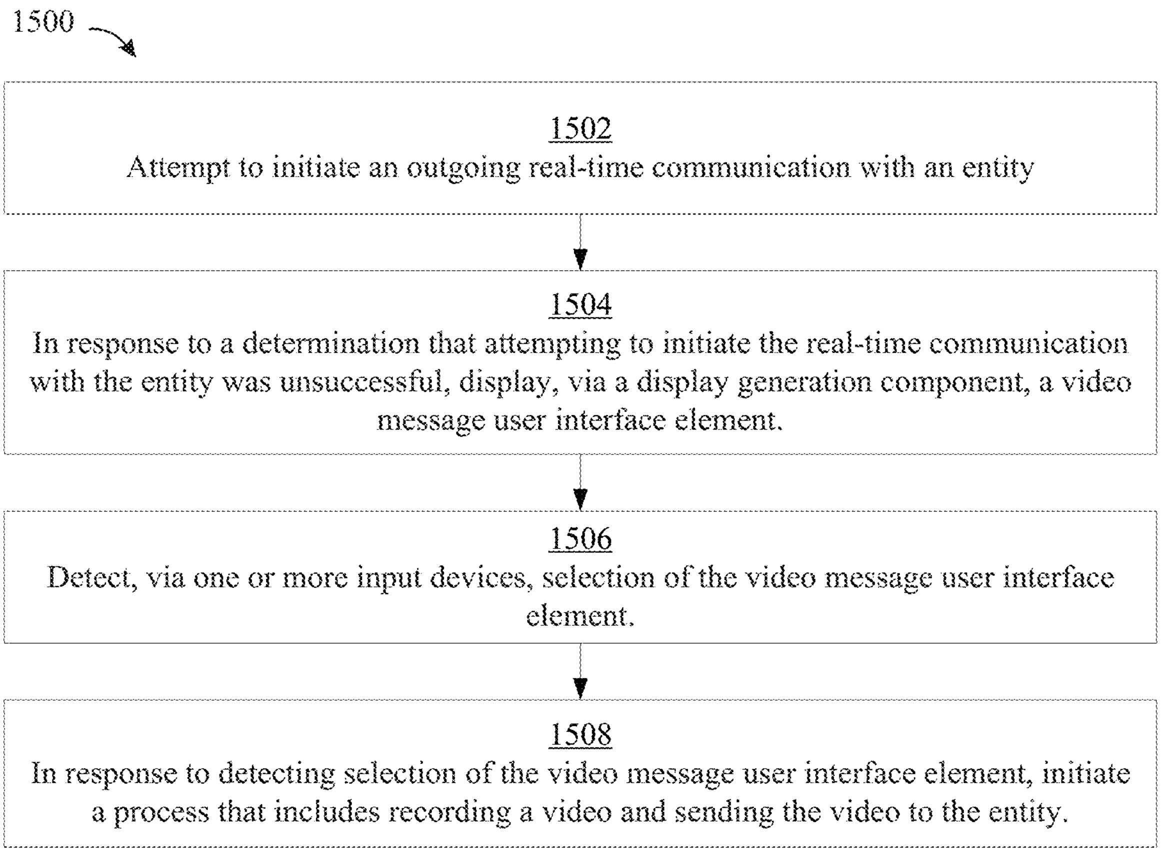
FIG. 15 is a flow diagram illustrating methods for video messages, in accordance with some embodiments.

The embodiment depicted in FIG. 5C represents a diagram of a communication session between multiple electronic devices, including the example communication sessions depicted in FIGS. 8B-8O and 8U-8AE and the communication session attempted in FIGS. 14A-14B. In some embodiments, the communication sessions depicted in FIGS. 8B-8O and 8U-8AE and the communication session attempted in FIGS. 14A-14B include two or more electronic devices, even if other electronic devices participating in the communication session are not depicted in the figures.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is powered on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off.

Attention is now directed towards embodiments of user interfaces ("UI") and associated processes that are implemented on an electronic device, such as portable multifunction device 100, device 300, or device 500.

FIGS. 6A-6AG illustrate exemplary user interfaces for editing user representations for communication contexts, in accordance with some embodiments. The user interfaces in these figures are used to illustrate the processes described below, including the processes in FIG. 7.

FIG. 6A illustrates computer system 600*a* (e.g., Kim's phone), which includes display 602*a*. In FIG. 6A, computer system 600*a* displays user interface 604 (e.g., a home screen or application springboard) that includes selectable user interface elements for launching respective applications. In response to selection 625*a* on phone application user interface element 604*a*, computer system 600*a* displays user interface 606 for creating, editing, and/or customizing user representations (e.g., user interfaces, call posters, contact profiles, contact photos, profile photos, and/or contact cards) for communication contexts. In some embodiments, computer system 600*a* displays user interface 606 the first time a user attempts to launch the phone application corresponding to phone application user interface element 604*a* after a software update has been installed on computer system 600*a* that adds the ability to create and/or customize user representations as will be discussed with reference to FIGS. 6B-6AG.

Figure 6B:
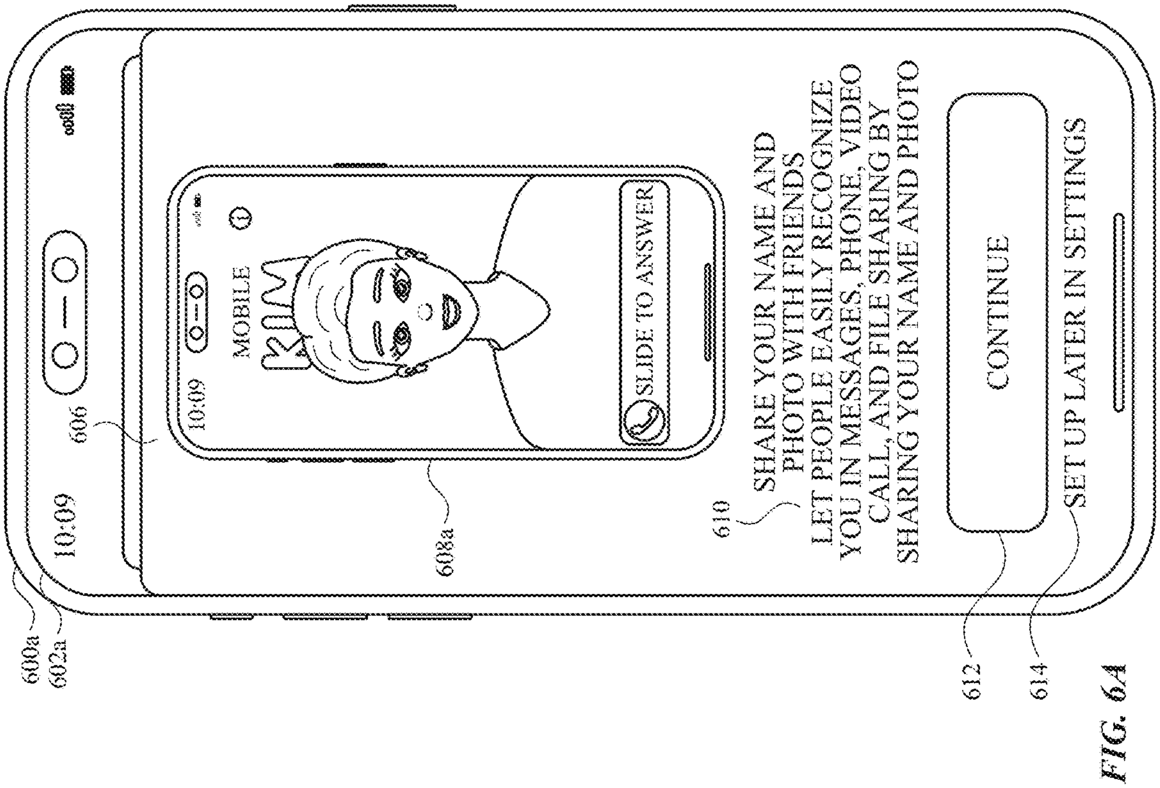

FIGS. 6B-6AG illustrate techniques for guiding a user through a process of creating and/or customizing user representations for different communication context. In FIG. 6B, user interface 606 includes representation 608*a* of a user interface for a first communication context. In some embodiments, the first communication context is a call and/or a user interface for a call (e.g., a phone call user interface or a video call user interface). A user interface for a call is also referred to as a call user interface, a poster, or a call profile. In some embodiments, the call profile is displayed by a computer system that is receiving a call from a user of computer system 600*a* (e.g., a call from computer system 600*a* or another computer system associated with the user of computer system 600*a*).

User interface 606 includes prompt 610 informing the user that a profile can be set up to share a name and photo with other users for different communication contexts, such as messages, phone, video calls, and file sharing. Continue user interface element 612 can be selected to continue the process of creating the user representations for different contexts. Set up later user interface element 614 can be selected to exit the process of creating the user interfaces (e.g., to cease display of user interface 606).

In some embodiments, computer system 600*a* displays a set of representations corresponding to different communication contexts in user interface 606. For example, as shown in FIG. 6C, after displaying representation 608*a*, computer system 600*a* displays (e.g., automatically displays, without user input) representation 608*b* corresponding to a second communication context, such as a profile for a message communication, file sharing function, or other context. In some embodiments, displaying representation 608*b* includes ceasing display of representation 608*a* and/or displaying an animation of representation 608*b* replacing representation 608*a* in user interface 606.

As shown in FIG. 6D, after displaying representation 608*b*, computer system 600*a* displays (e.g., automatically displays, without user input) representation 608*c* corresponding to a third communication context, such as a contact user interface (e.g., a contact card) that includes a representation (e.g., a photo, avatar, or monogram) and contact information for the user of computer system 600*a*, such as name, company, phone number(s), and email address(es). In some embodiments, displaying representation 608*c* includes ceasing display of representation 608*b* and/or displaying an animation of representation 608*c* replacing representation 608*b* in user interface 606. In some embodiments, computer system 600*a* continues to automatically cycle through representations 608*a*-608*c* while user interface 606 is displayed.

In FIG. 6D, computer system 600*a* detects selection 625*b* of continue user interface element 612, and in response, displays user interface 616 (shown in FIG. 6E) for creating and/or customizing a call user interface. User interface 616 includes representation 616*a* (e.g., a default representation) of a call user interface and selectable options for choosing a graphical representation for the call user interface. Camera icon 616*c* can be selected to capture a new photo for the call user interface, photos icon 616*b* can be selected to choose an existing photo for the call user interface, avatar icon 616*d* can be selected to choose an avatar (e.g., an emoji or a memoji) for the call user interface, and monogram icon 616*e* can be selected to choose a monogram for the call user interface.

Figure 6F:
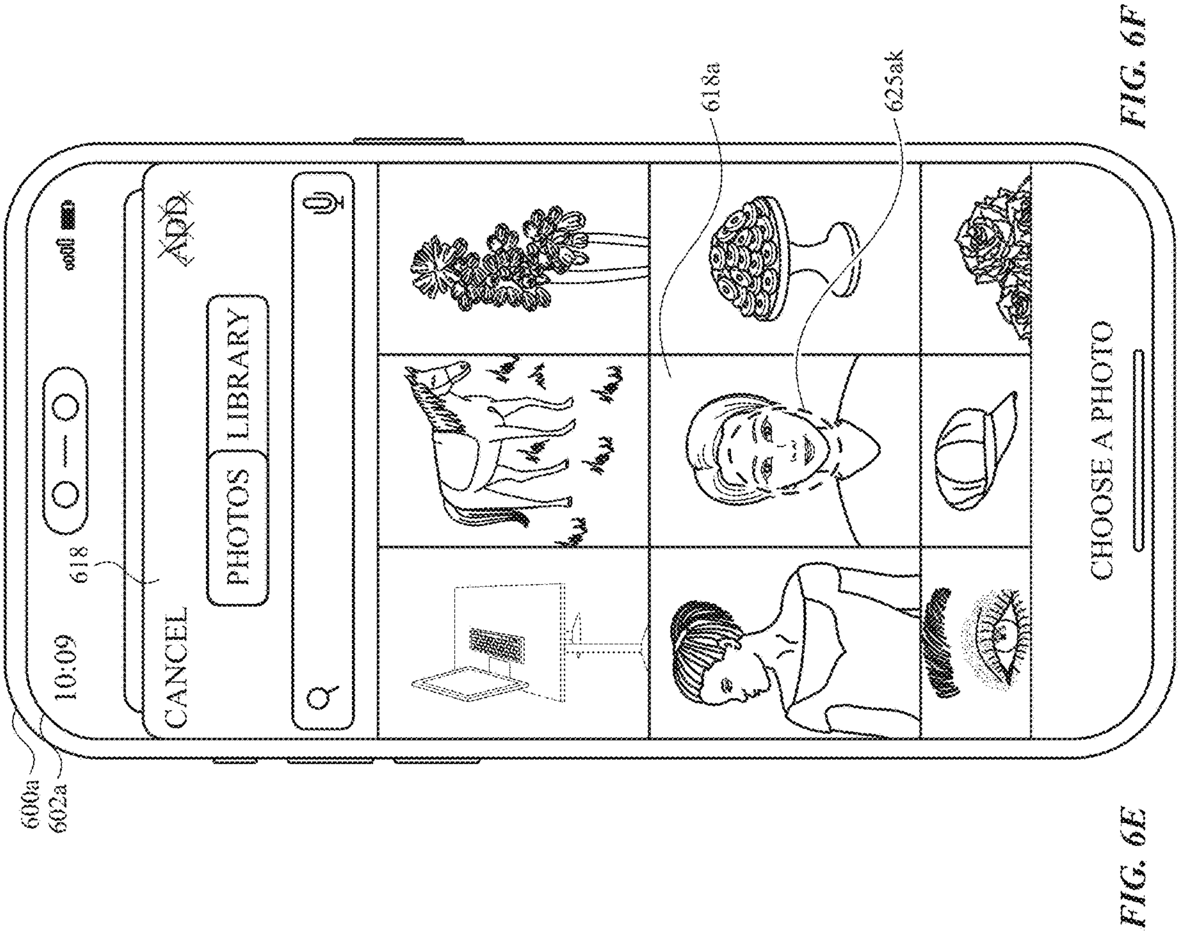
Figure 6E:
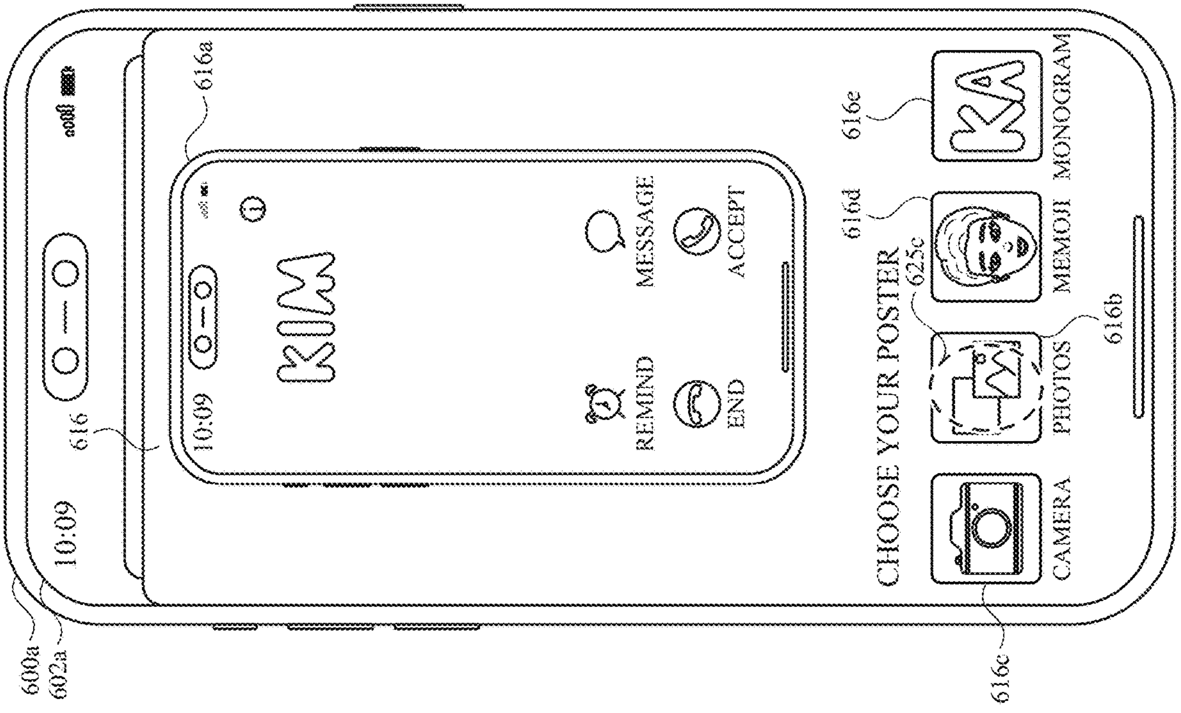
Figure 6H:
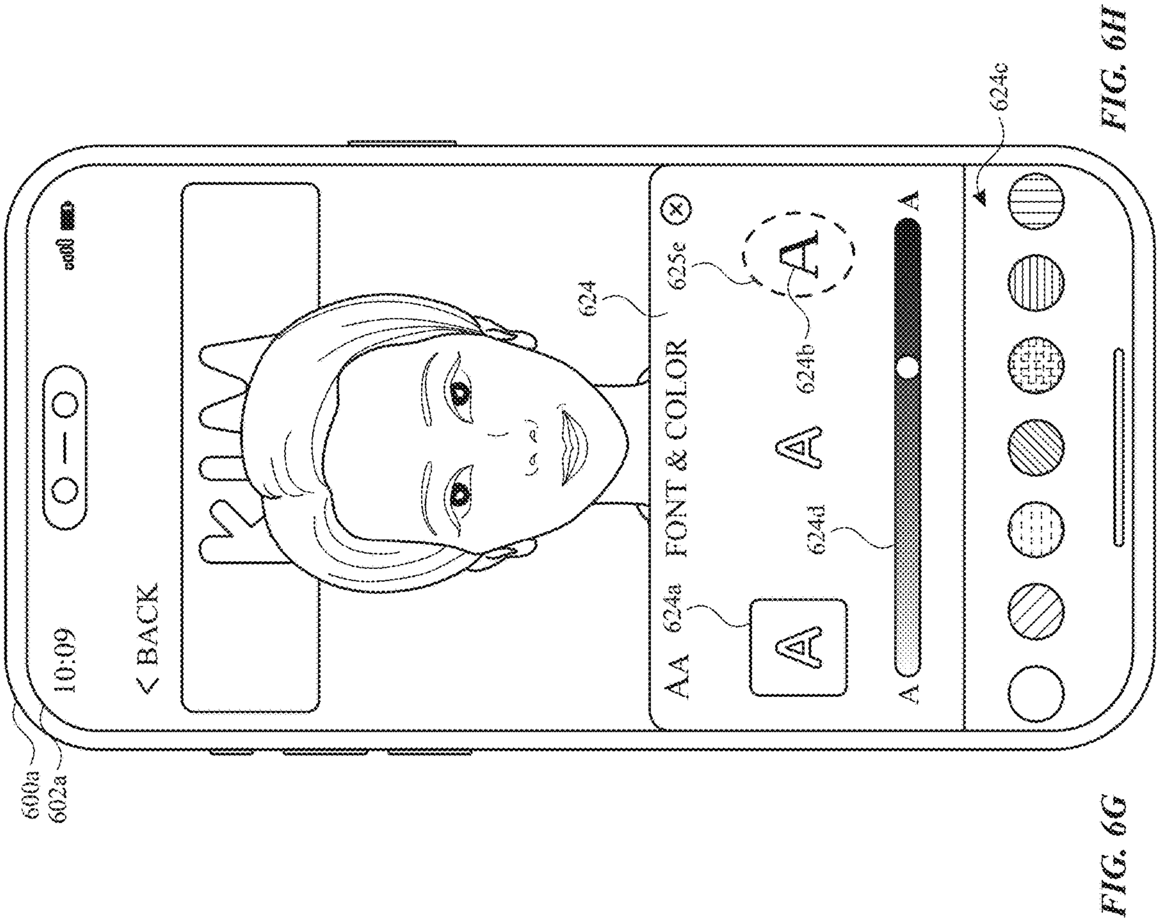
Figure 6G:
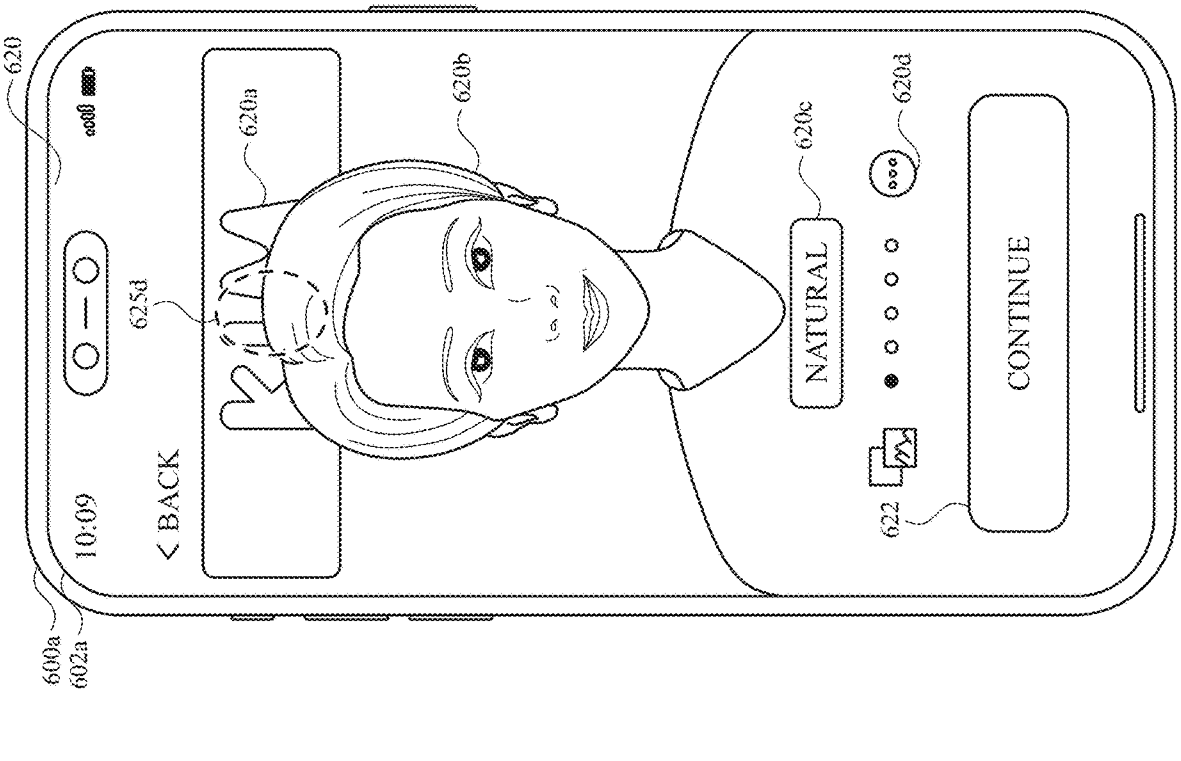

In FIG. 6E, computer system 600*a* detects selection 625*c* of photos icon 616*b*. In response to detecting selection 625*c* of photos icon 616*b*, computer system 600*a* displays user interface 618 for selecting an existing photo, as shown in FIG. 6F. Computer system 600*a* detects selection 625*ak* of photo 618*a*. After (e.g., in response to) detecting selection 625*ak* of photo 618*a*, computer system displays editing user interface 620 for creating the user interface for the first communication context, as shown in FIG. 6G. Editing user interface 620 includes name 620*a*, graphical representation 620*b*, style option 620*c*, menu option 620*d*, and continue option 622. Graphical representation 620*b* corresponds to photo 618*a* selected in FIG. 6F.

In FIG. 6G, computer system 600*a* detects selection 625*d* of name 620*a*. In response to detecting selection of name 620*a*, computer system 600*a* displays menu 624 for editing various characteristics of name 620*a*, such as font style, size, and color, as shown in FIG. 6H. Font size can be adjusted by interacting with user interface element 624*d* (e.g., a slider). A color of name 620*a* can be selected by choosing a color option from a set of color options 624*c*. A font style corresponding to font style option 624*a* is currently selected, as indicated by the outline around font style option 624*a*. In FIG. 6H, computer system 600*a* detects selection 625*e* of font style option 624*b*. In accordance with selection 625*e* of font style option 624*b*, computer system updates name 620*a* with a font style corresponding to the selected font style option, as shown in FIG. 6I.

Figure 6J:
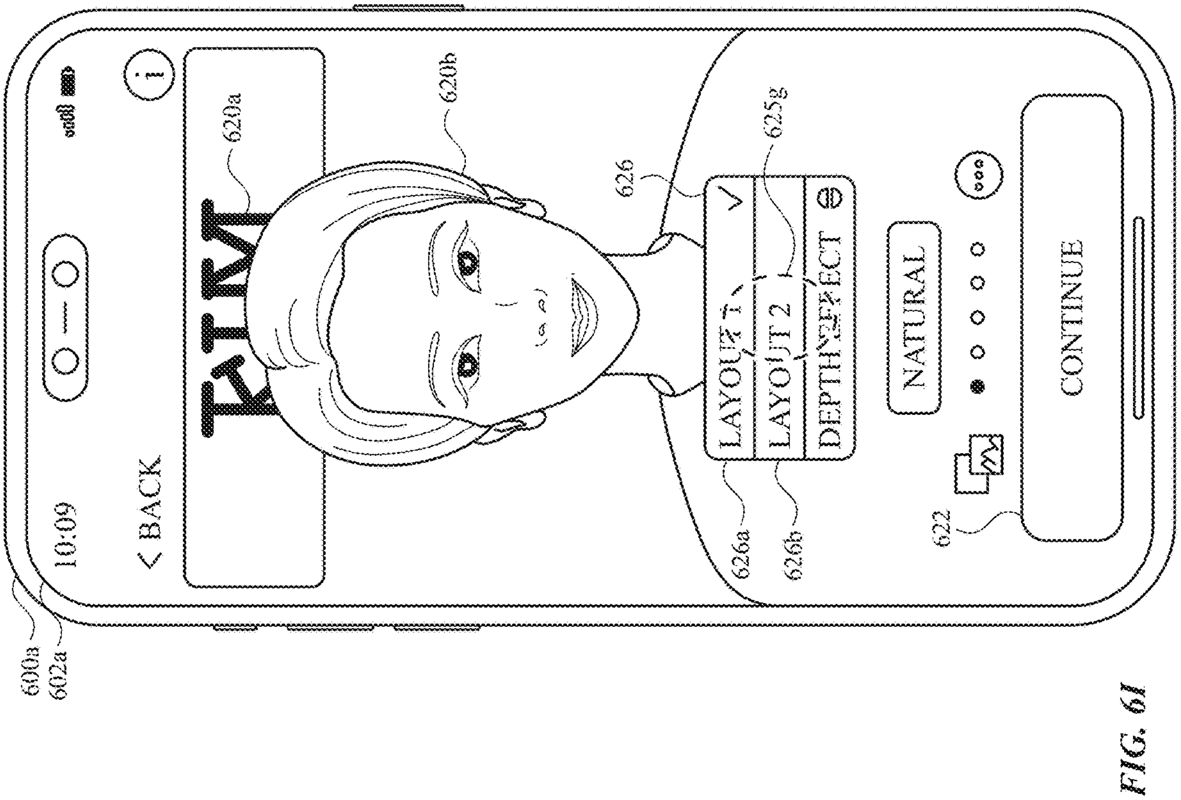
Figure 6I:
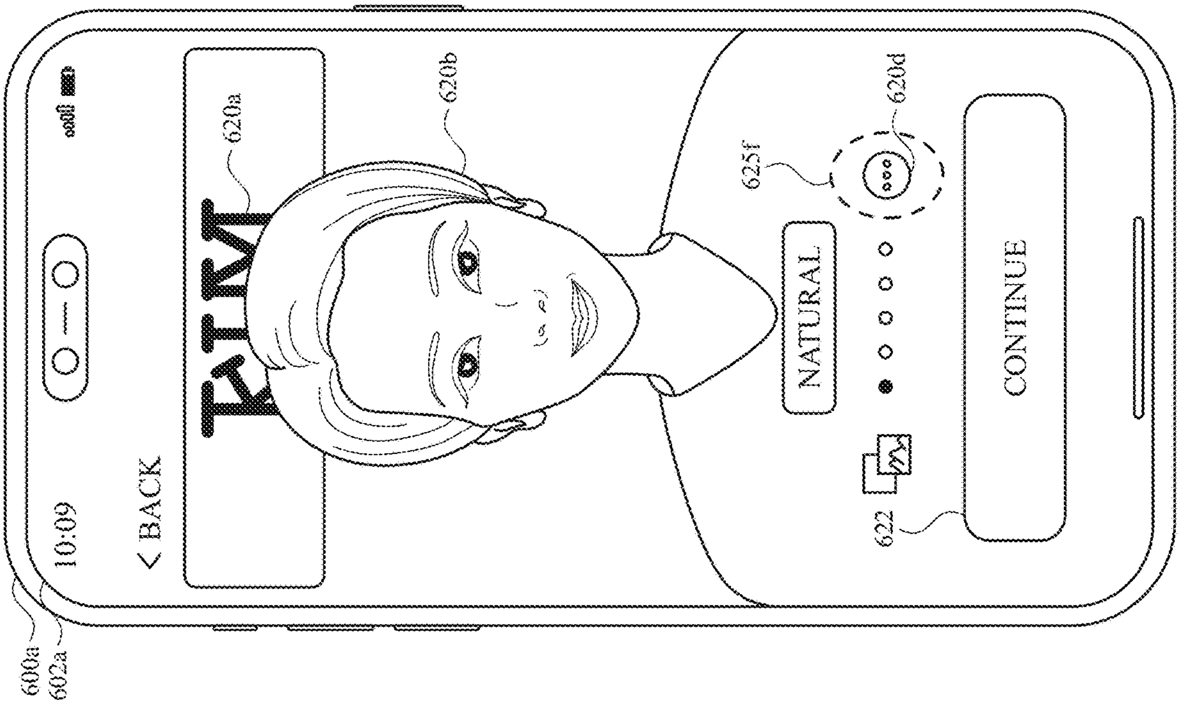

In FIG. 6I, computer system 600*a* detects selection 625*f* of menu option 620*d*. In response to detecting selection 625*f* of menu option 620*d*, computer system 600*a* displays menu 626, which includes first layout option 626*a* and second layout option 626*b*, as shown in FIG. 6J. First layout option 626*a* and second layout option 626*b* correspond to respective layouts of the call user interface. In some embodiments, the layout of the call user interface determines the placement and/or orientation of name 620*a* and/or a language of the call user interface.

Figure 6K:
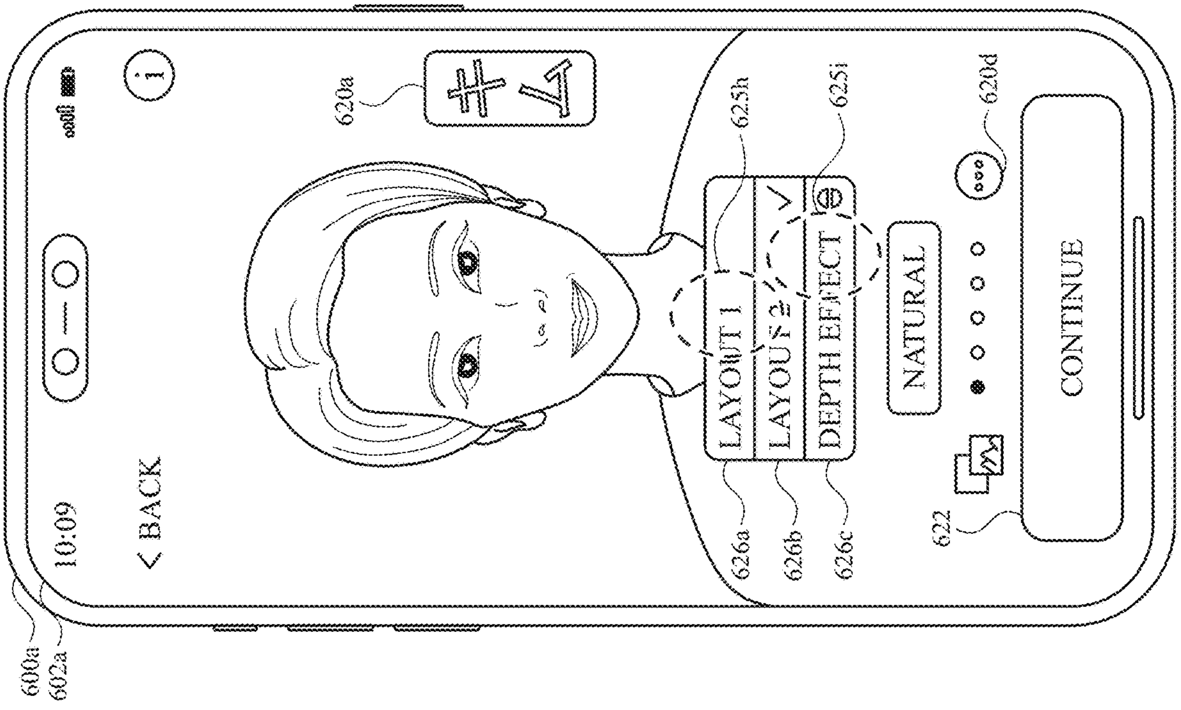

In FIG. 6J, first layout option 626*a* is currently selected, as indicated by the check mark on first layout option 626*a*. In response to detecting selection 625*g* of second layout option 626*b*, computer system 600*a* displays user interface 620 with a different layout, as shown in FIG. 6K. In FIG. 6K, name 620*a* is placed on the right side of user interface 620 and oriented vertically. The layout corresponding to second layout option 626*b* displays name 620*a* in Japanese (e.g., instead of English).

Figure 6L:
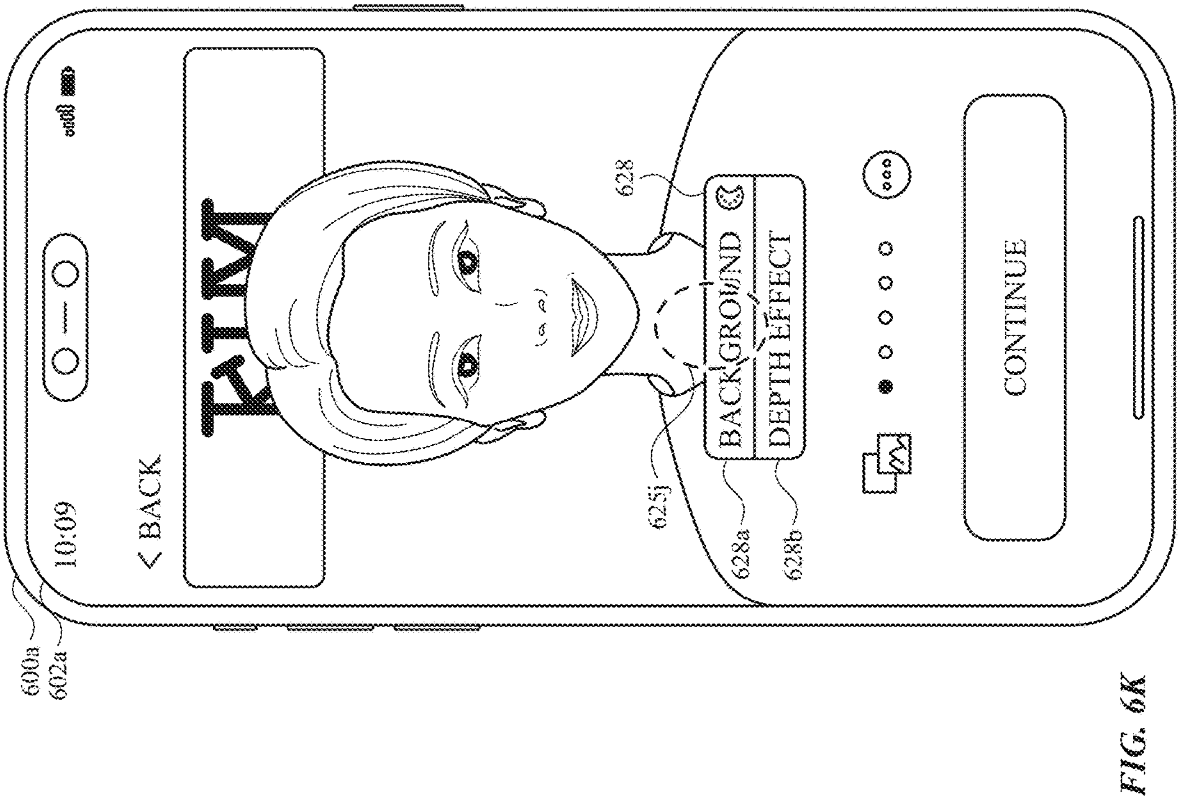

In FIG. 6K, computer system 600*a* detects selection 625*h* of first layout option 626*a* and selection 625*i* of depth effect option 626*c*. As shown in FIG. 6L, in response to detecting selection 625*h* of first layout option 626*a*, computer system 600*a* changes the layout of user interface 620 back to the layout option corresponding to first layout option 626*a*; and in response to detecting selection 625*i* of depth effect option 626*c*, computer system 600*a* displays menu 628. Menu 628 includes background option 628*a* and depth effect option 628*b*. In response to detecting selection 625*j* of background effect option 628*a*, computer system 600*a* displays background options menu 630 shown in FIG. 6M. Background options menu 630 includes background color options 630*a* and color adjuster 630*b*. In FIG. 6M, computer system detects selection 625*k* of background color option 630*a*1. In accordance with selection 625*k* of background color option 630*a*1, computer system 600*a* updates the background of user interface 620 with the background color corresponding to background color option 630*a*1, as shown in FIG. 6N.

Figure 6N:
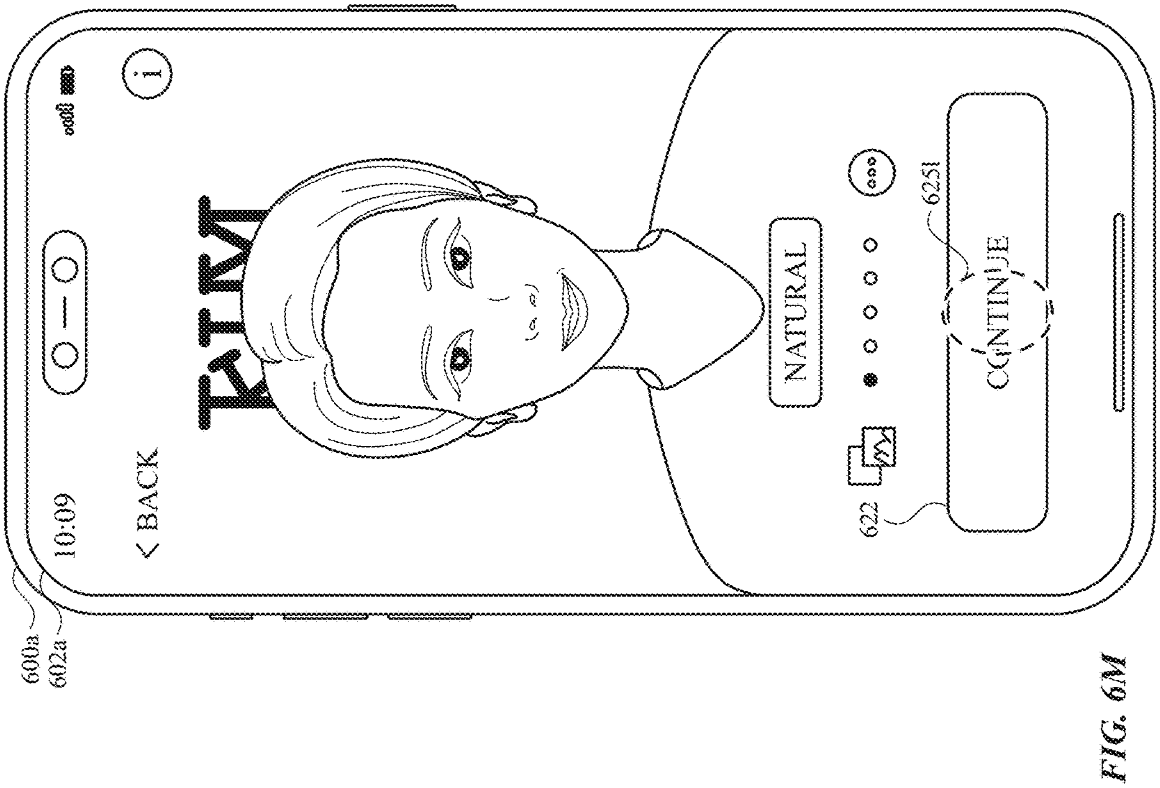
Figure 6M:
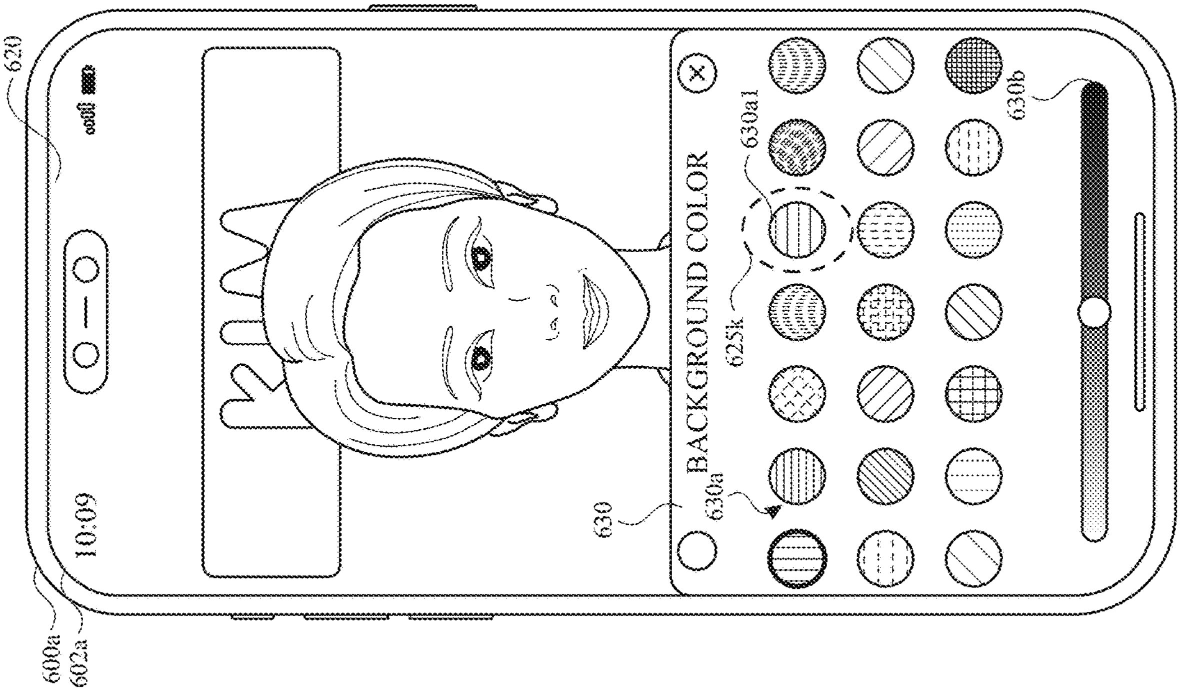
Figure 6O:
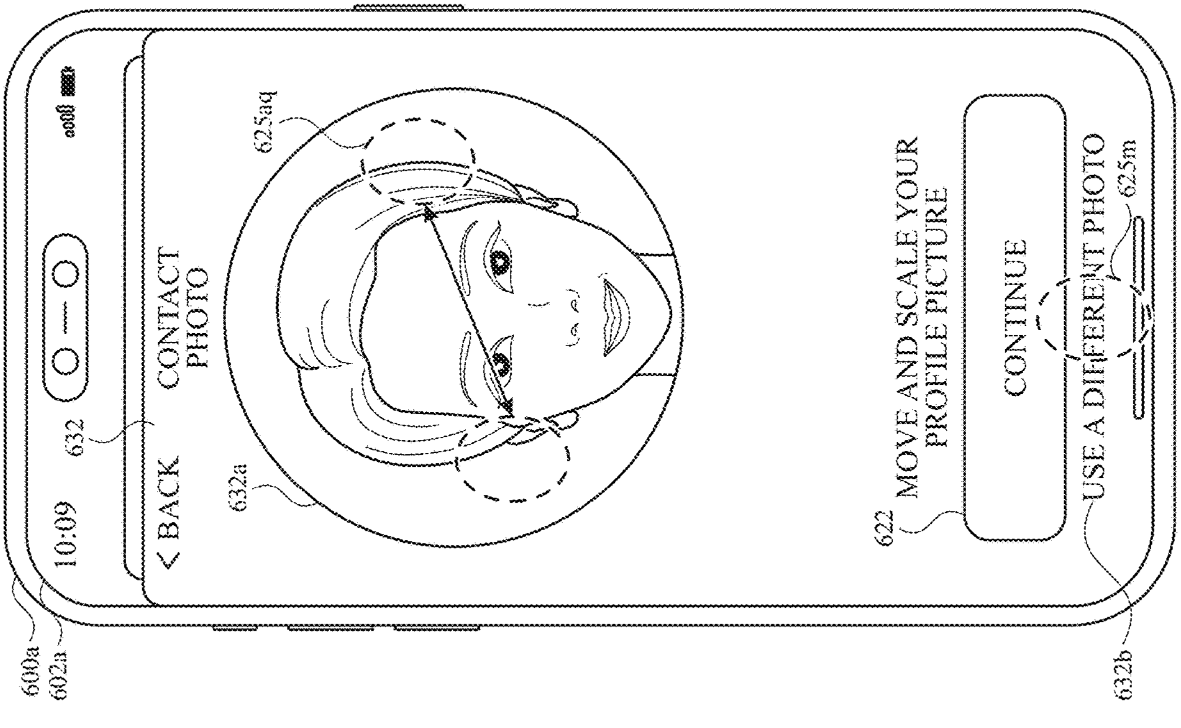

In FIG. 6N, the user is done editing the user representation for the first communication context. In some embodiments, the user of computer system 600*a* selects the user representation shown in user interface 620 of FIG. 6N as the user representation for the first communication context (e.g., by selecting continue option 622). In response to detecting selection 625*l* of continue option 622, computer system 600*a* displays user interface 632 for editing a user interface and/or user representation (e.g., a profile photo, avatar, or monogram) for a second communication context, as shown in FIG. 6O. In some embodiments, the second communication context includes messaging (e.g., text messaging and/or instant messaging), email, content sharing, social media, or other communication context (e.g., other than a phone call). User interface 632 includes graphical representation 632*a* (e.g., a photo, avatar, or monogram), instructions for editing graphical representation 632*a* (e.g., "Move and scale your profile picture"), change photo option 632*b*, and continue option 622. A user can change the position and/or scale of representation 632*a* via input 625*aq*. For example, in response to a pinch gesture, computer system 600*a* reduces the scale of (e.g., zooms out) representation 632*a*; in response to a de-pinch gesture, computer system 600*a* increases the scale of (e.g., zooms in) representation 632*a*; and in response to a swipe or tap and drag gesture, computer system 600*a* translates (e.g., displays a different portion of) representation 632*a*.

In FIG. 6O, computer system 600*a* detects selection 625*m* of change photo option 632*b*. In response to detecting selection 625*m* of change photo option 632*b*, computer system 600*a* displays user interface 634 for choosing an option for graphical representation 632*a*. User interface 634 includes representation 634*a* (e.g., a preview of graphical representation 632*a*), monogram option 634*b*, avatar option 634*c*, photo selector option 634*d*, and editing option 634*e*.

Figure 6P:
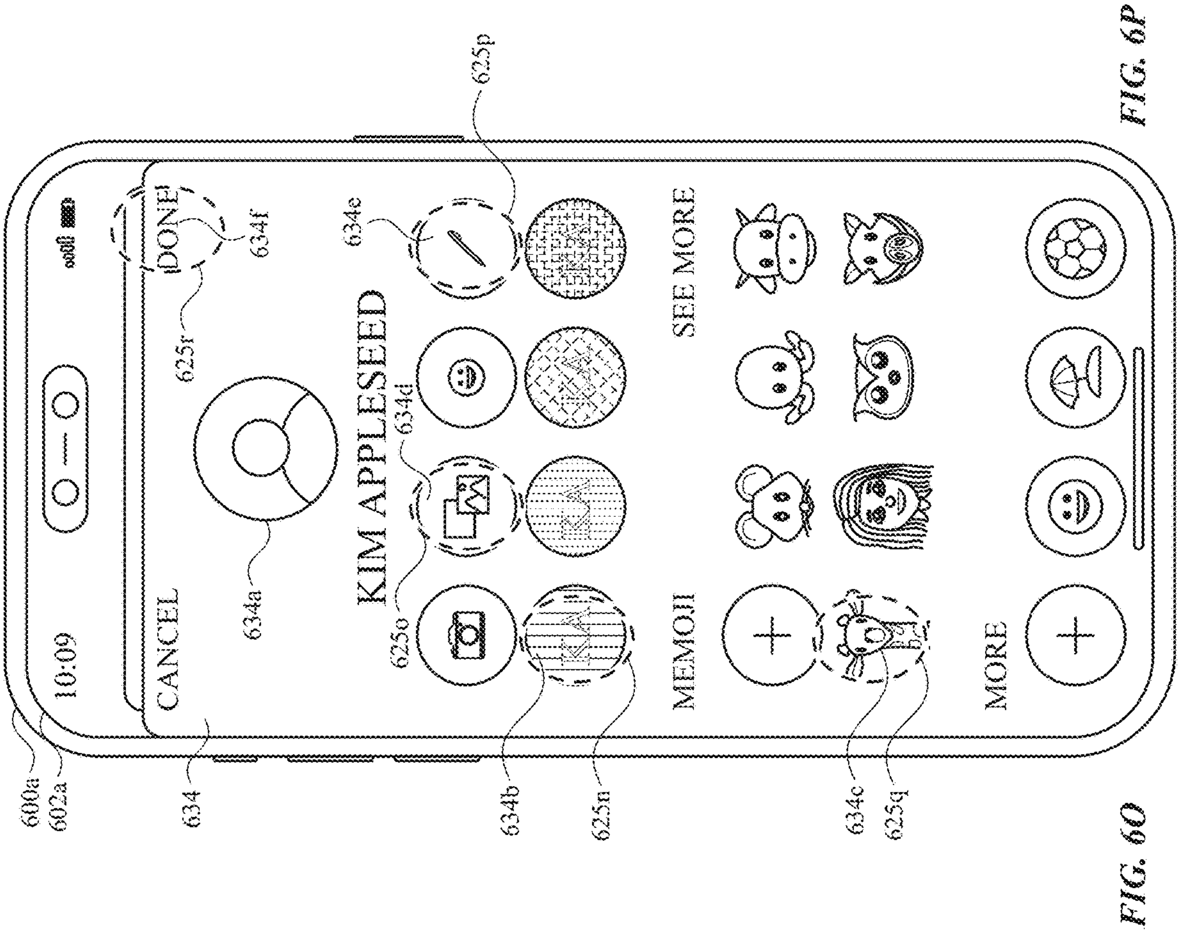

In some embodiments, in response to detecting selection 625*o* of photo selector option 634*d*, computer system 600*a* displays a user interface (e.g., 618) for selecting a photo for graphical representation 632*a*. In some embodiments, in response to detecting selection 625*p* of editing option 634*e*, computer system 600*a* displays a user interface (e.g., user interface 650 described with reference to FIG. 6AC) for editing user information (e.g., user information displayed in the user interface of the second communication context). In some embodiments, in response to detecting selection 625*q* of avatar option 634*c*, computer system 600*a* selects avatar option 634*c* for graphical representation 632*a*. In the embodiment illustrated in FIG. 6P, computer system 600*a* detects selection 625*n* of monogram option 634*b* and then detects selection 625*r* of done option 634*f*. In response to detecting selection 625*r* of done option 634*b*, computer system 600*a* displays user interface 632 with graphical representation 632*a* updated with the monogram corresponding to selected monogram option 634*b*, as shown in FIG. 6Q.

Figure 6Q:
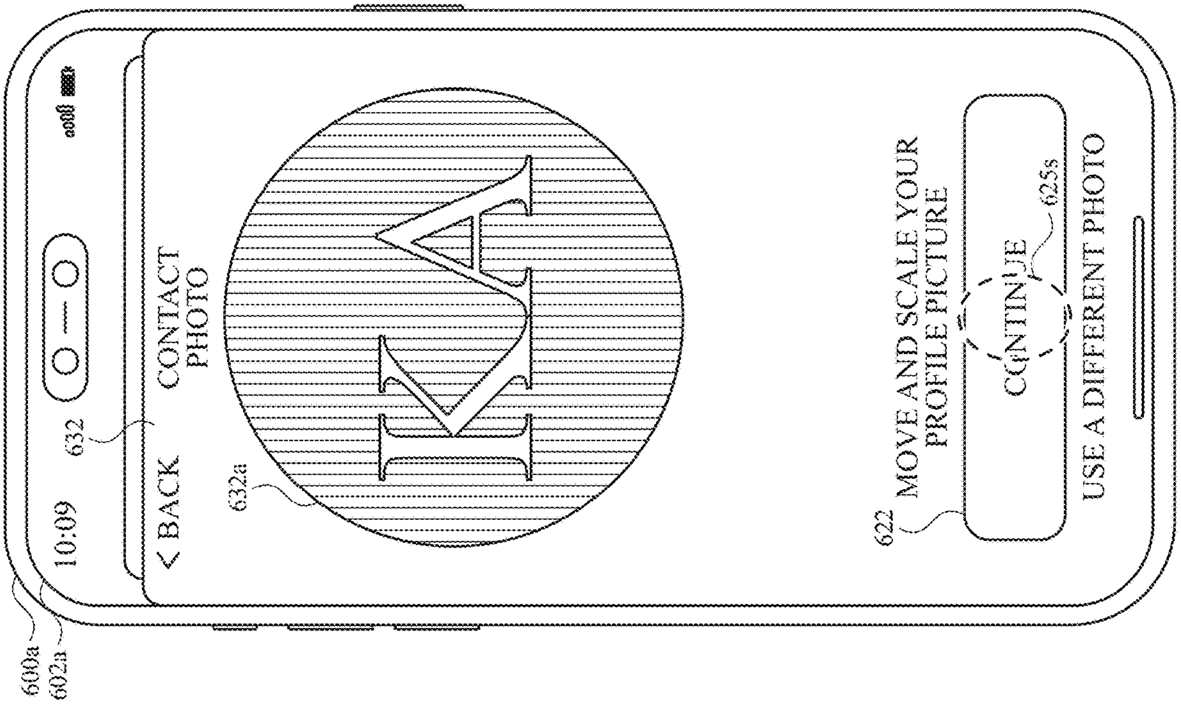
Figure 6R:
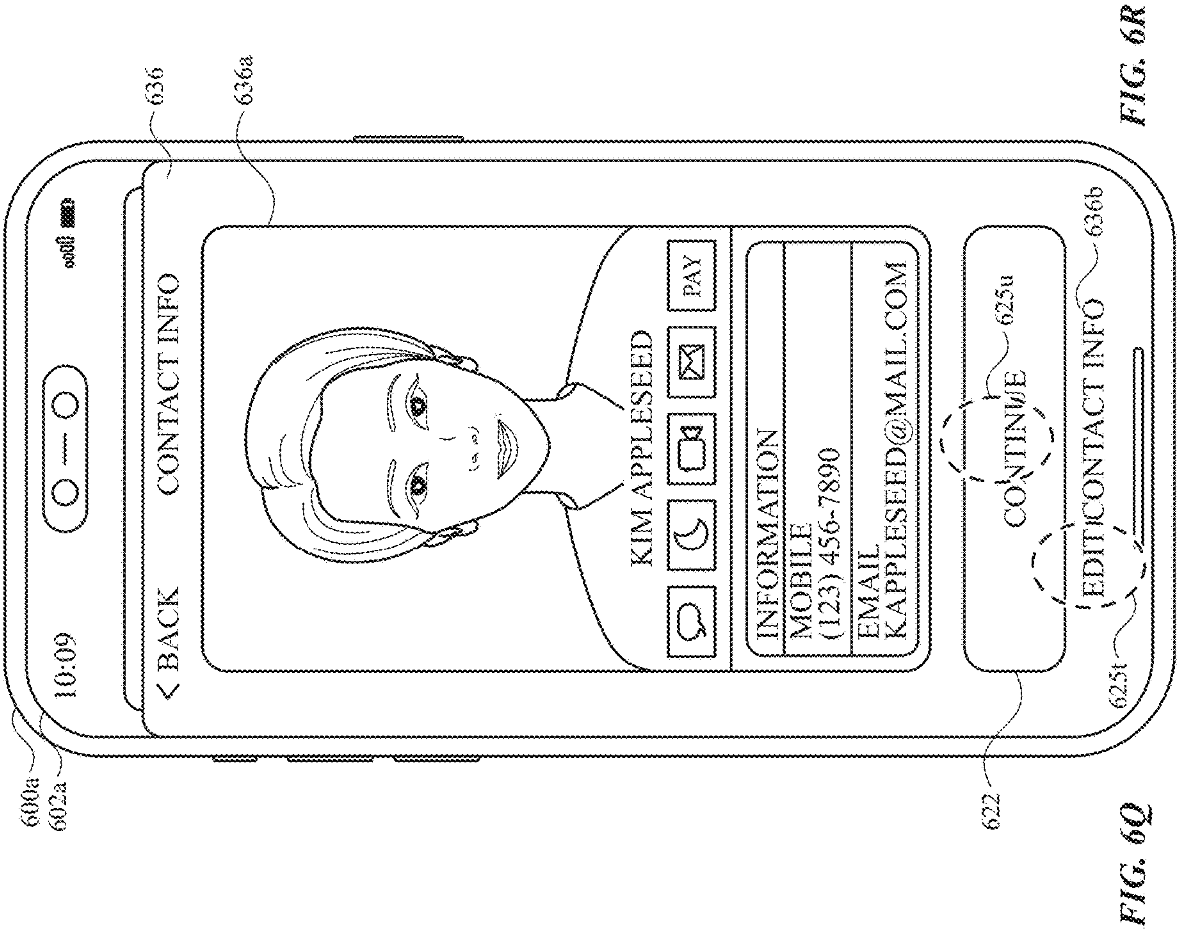

In FIG. 6Q, the user is done editing the user representation for the second communication context. In some embodiments, the user of computer system 600*a* selects graphical representation 632*a* shown in user interface 632 of FIG. 6Q as the user representation for the second communication context (e.g., by selecting continue option 622). In response to detecting selection 625*s* of continue option 622, computer system 600*a* displays user interface 636 for editing a user interface (e.g., a contact card) and/or user representation (e.g., a photo, avatar, or monogram) for a third communication context, as shown in FIG. 6R. In some embodiments, the third communication context includes contact information of a user (or a user interface with contact information of the user) such as name, phone number, and email address. In some embodiments, the information (or user interface with information) can be shared with other users.

User interface 636 includes representation 636*a* of the user interface (e.g., a contact card) for the third communication context and edit contact info option 636*b*. Computer system detects selection 625*t* of edit contact info option 636*b*. In response to detecting selection 625*t* of edit contact info option 636*b*, computer system 600*a* displays user interface 650 for editing contact information of the user of computer system 600*a*, as shown in FIG. 6R1. In response to detecting selection 625*aj* of edit option 650*a*, computer system 600*a* displays a user interface (e.g., user interface 632 or user interface 634) for selecting and/or editing a profile representation. In response to detecting selection 625*ai* of name field 650*b*, computer system 600*a* enables the user to edit a name used for the third communication context (e.g., the name included in a contact card). For example, in response to detecting selection 625*ai* of name field 650*b*, computer system 600*a* displays a cursor in name field 650*b* and displays a keyboard (e.g., a software keyboard) to edit the name. In some embodiments, other information in user interface 650, such as phone number and email address, can be edited in a similar manner as the name by selecting the respective field.

In FIG. 6R, the user of computer system 600*a* selects representation 636*a* shown in user interface 636 as the user representation for the third communication context (e.g., by selecting continue option 622). In response to detecting selection 625*u* of continue option 622, computer system 600*a* displays preview user interface 638 shown in FIG. 6S. User interface 638 includes previews of the user interfaces for the various contexts created in FIGS. 6E-6R1. Preview 638*a* is a representation of the user interface for the first communication context and preview 638*b* is a representation of the user interface for the second communication context. In some embodiments, in response to detecting input 625*w* (e.g., a swipe gesture and/or a tap and drag gesture on display 602*a*), computer system 600*a* scrolls preview 638*a* and preview 638*b* such that preview 638*b* is in the center of user interface 638 (e.g., as shown in FIG. 6W) or preview 638*c* is in the center of user interface 638 (e.g., as shown in FIG. 6X). Preview 638*c* is a representation of the user interface for the third communication context. In some embodiments, computer system 600*a* automatically scrolls the previews so that the user can preview the user interfaces for the various communication contexts without user input. In some embodiments, in response to detecting a selection of a preview, computer system 600*a* returns to the user interface for editing the user interface of the respective communication context. For example, in response to detecting a tap on preview 638*a*, computer system 600*a* displays user interface 616 shown in FIG. 6E.

In FIG. 6S, computer system 600*a* detects selection 625*v* of continue option 622. In response to detecting selection 625*v* of continue option 622, computer system 600*a* displays summary user interface 640, shown in FIG. 6T. Summary user interface 640 includes preview 638*a* (e.g., a preview of the user interface of the first communication context), preview 638*b* (e.g., a preview of the user interface of the second communication context), the name of the user of computer system 600*a*, an option (e.g., "Contacts Only") to select for computer system 600*a* to automatically share updates to the user interfaces of the communication contexts with contactable users of computer system 600*a*, and an option (e.g., "Always Ask") to select for computer system 600*a* to provide a prompt for confirmation to share the updates. In FIG. 6T, continue option 622 is updated to include the label "Done" to indicate that user interface 640 is the last interface in a set of user interfaces (e.g., the user interfaces shown in FIGS. 6B-6T) for setting up the representations for the communication contexts. In response to detecting selection 625*x* of continue option 622, computer system 600*a* completes the process of guiding a user through the user interfaces for creating and/or customizing the user interfaces for the various communication contexts.

Figure 6U:
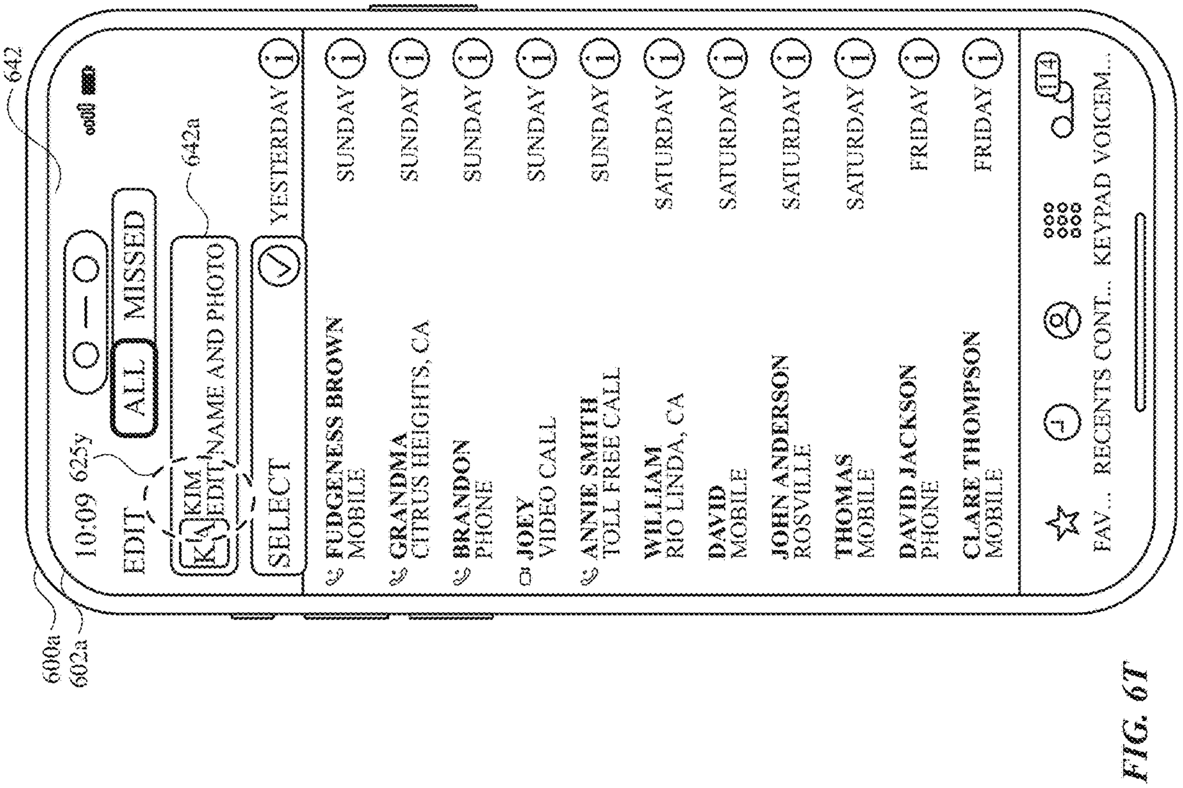
Figure 6T:
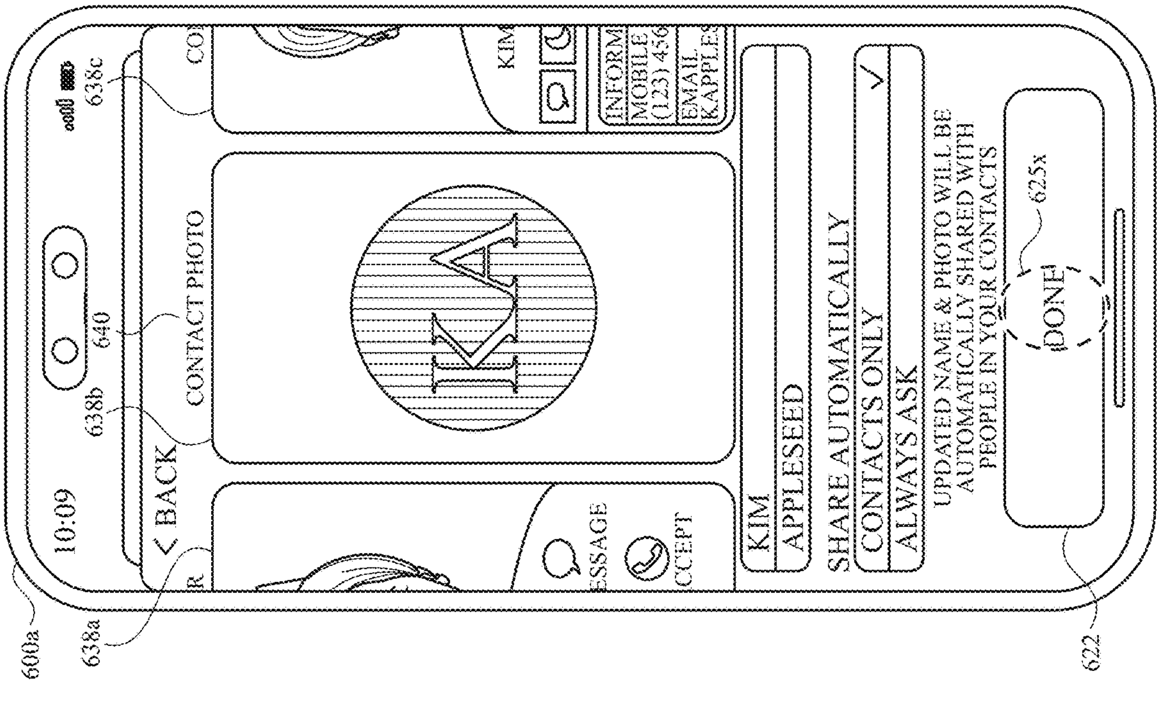
Figure 6W:
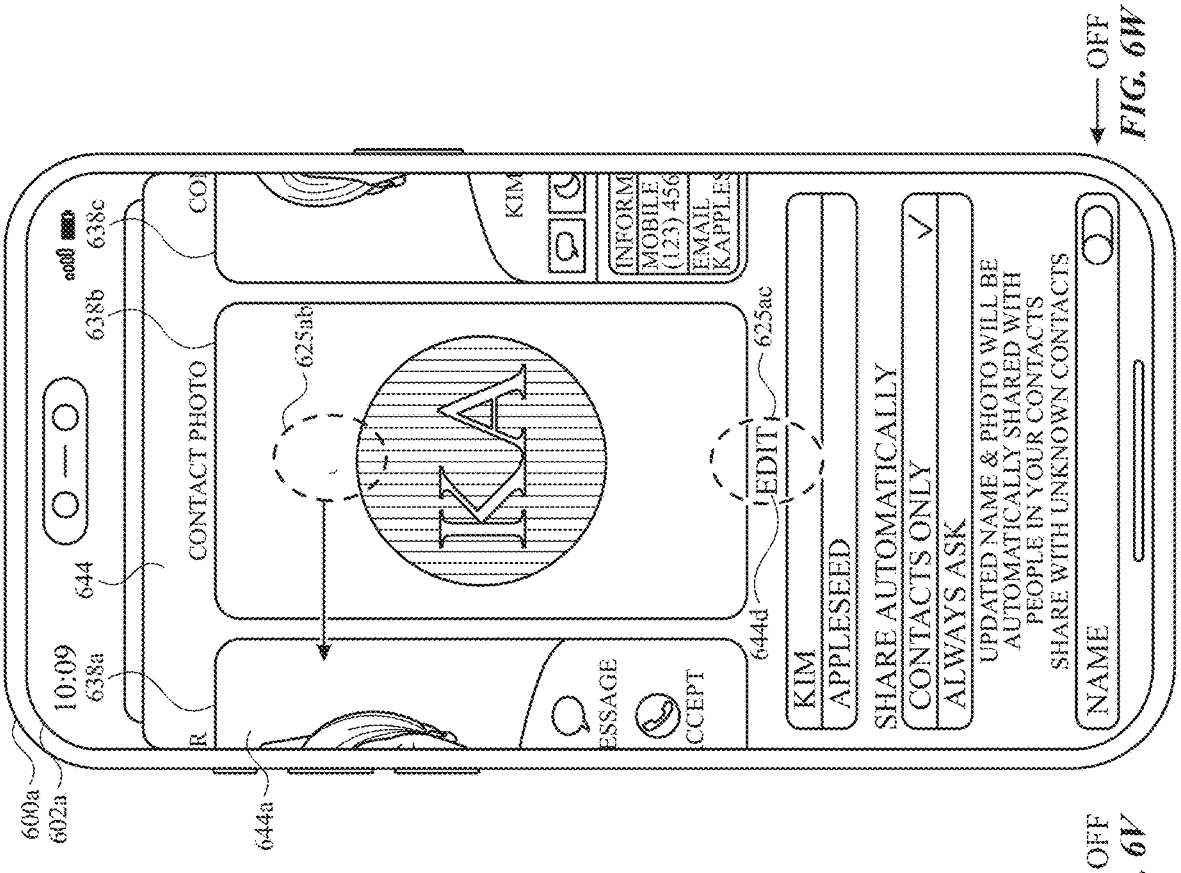
Figure 6V:
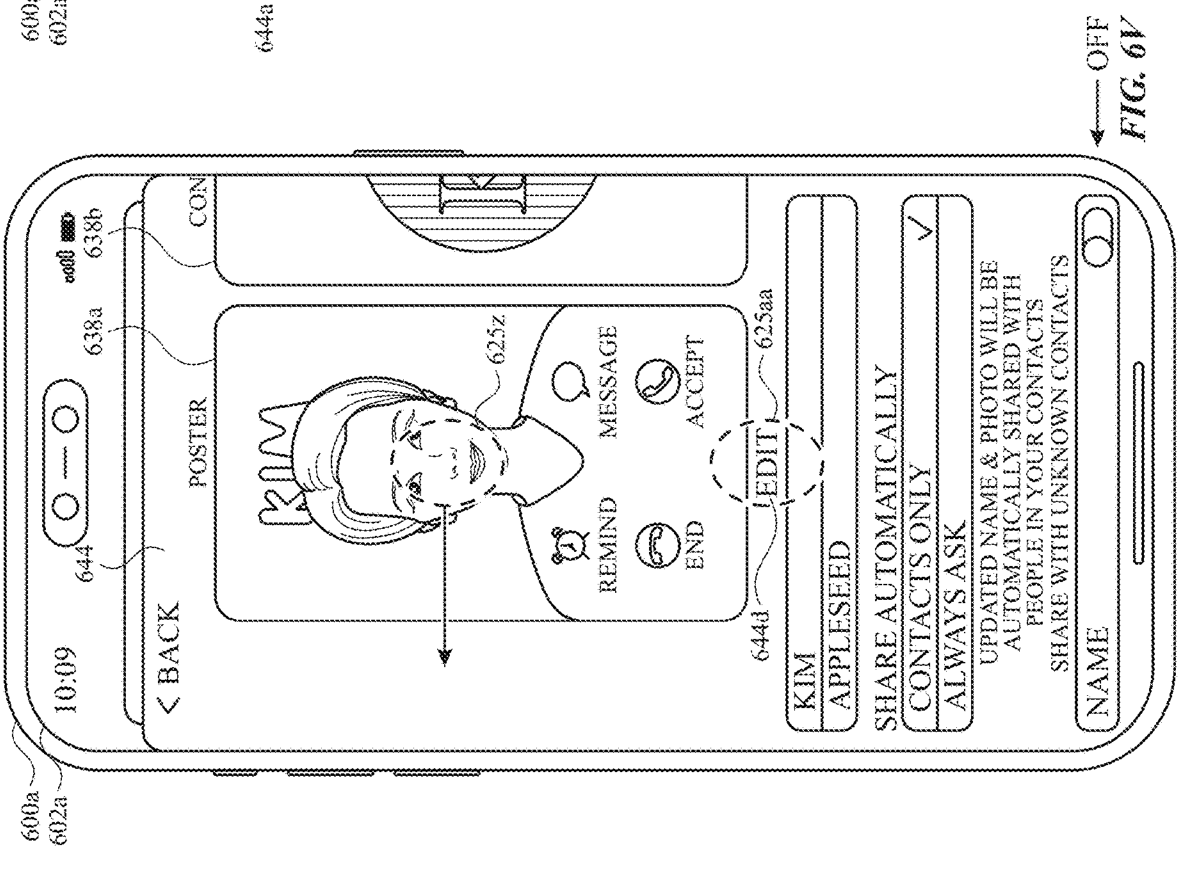

Turning to FIG. 6U, after creating and/or customizing the user interfaces for the communication contexts, computer system 600*a* detects a request (e.g., selection 625*a* of phone application user interface element 604*a*) to open a phone application. In response to detecting the request to open the phone application, computer system 600*a* displays phone application user interface 642 shown in FIG. 6U. User interface 642 includes edit name and photo option 642*a*. In response to detecting selection 625*y* of edit name and photo option 642, computer system 600*a* displays user interface 644 for selecting and editing the user interfaces of the communication contexts, as shown in FIG. 6V. User interface 644 includes preview 638*a* and preview 638*b*. Preview 638*a* corresponds to the representation of the first communication context. Preview 638*b* corresponds to the representation of the second communication context. In FIG. 6V, the representation of the first communication context is designated for selection, as indicated by preview 638*a* being in the center of user interface 644.

FIG. 6V illustrates input 625*z* (e.g., a swipe gesture or tap and drag gesture) and input 625*aa* (e.g., a tap gesture on edit option 644*d*). In response to detecting input 625*z*, computer system 600*a* designates the representation of the second communication context for selection by displaying preview 638*b* in the center of user interface 644, as shown in FIG. 6W (e.g., in response to detecting input 625*z*, computer system 600*a* changes the representation of the communication context that is designated for selection). In FIG. 6W, preview 638*a* is partially displayed on the left side of user interface 644 and preview 638*c* is partially displayed on the right side of user interface 644.

FIG. 6W illustrates input 625*ab* (e.g., a swipe gesture or tap and drag gesture) and input 625*ac* (e.g., a tap gesture on edit option 644*d*. In response to detecting input 625*ab*, computer system 600*a* designates the representation of the third communication context for selection by displaying preview 638*c* in the center of user interface 644, as shown in FIG. 6X (e.g., in response to detecting input 625*ab*, computer system 600*a* changes the representation of the communication context that is designated for selection). In FIG. 6X, preview 638*a* is removed from user interface 644 and preview 638*b* is partially displayed on the left side of user interface 644.

Figure 6Y:
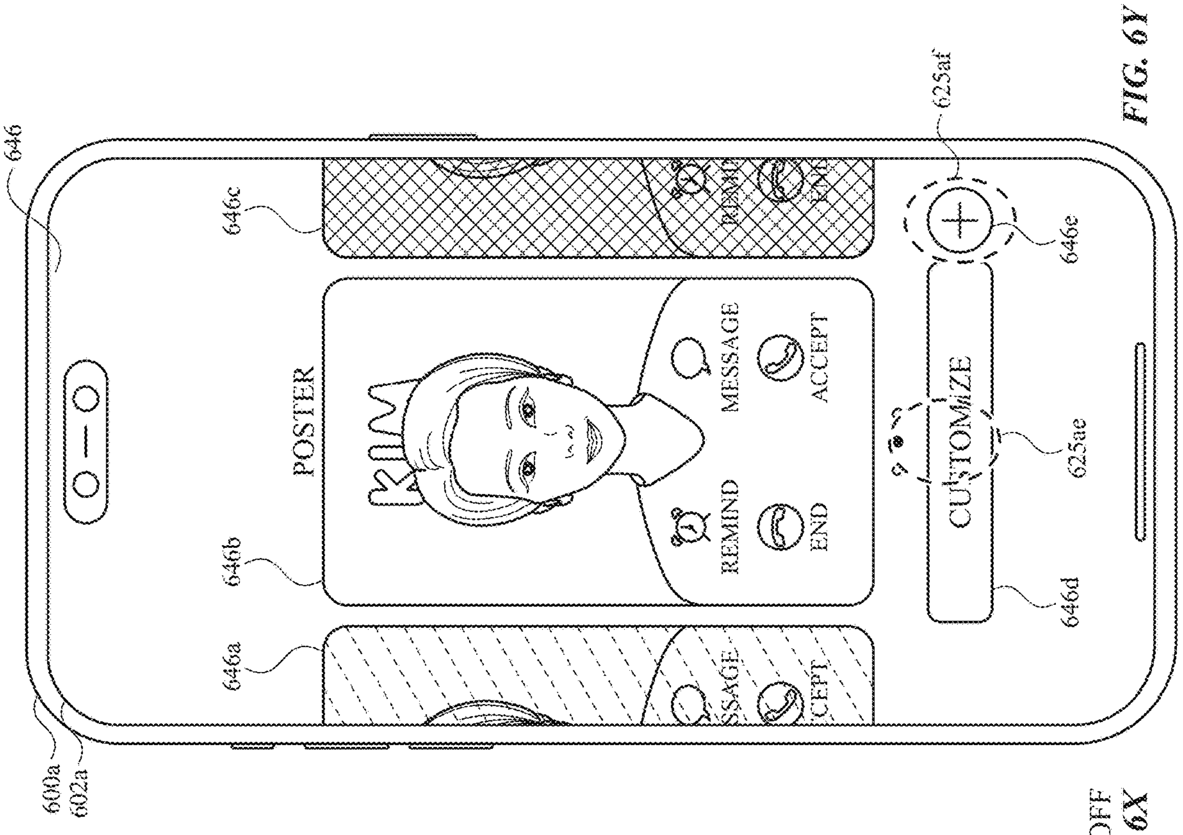
Figure 6X:
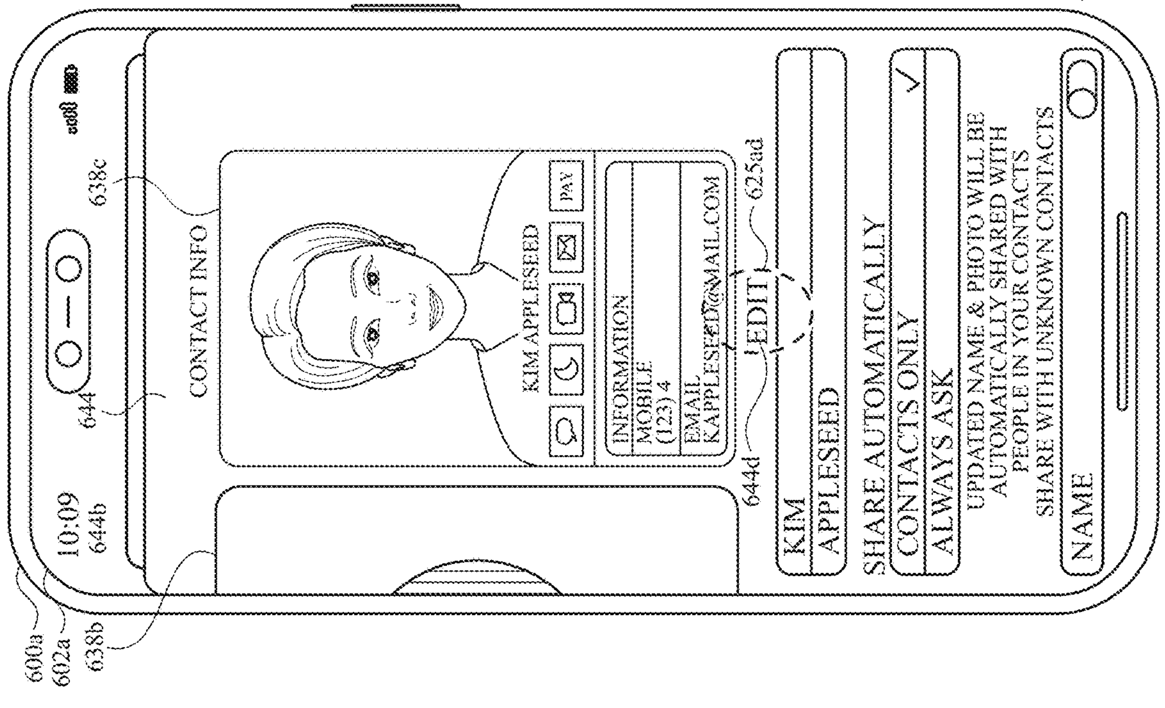
Figure 6Z:
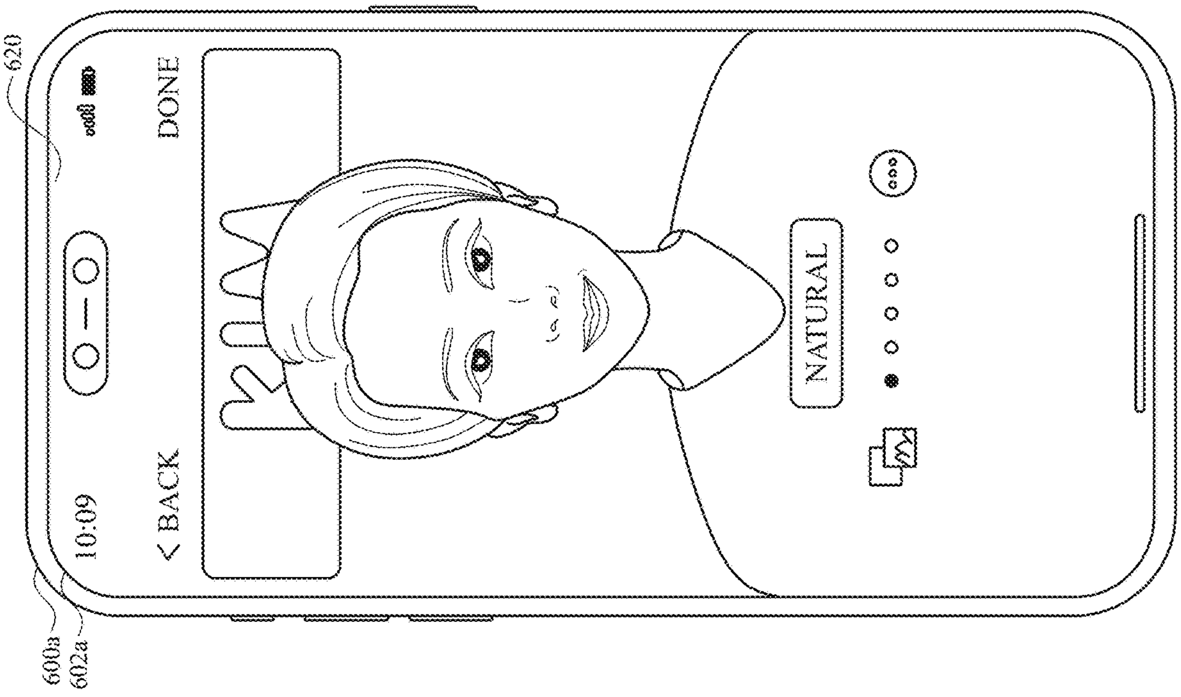
Figure 6A:
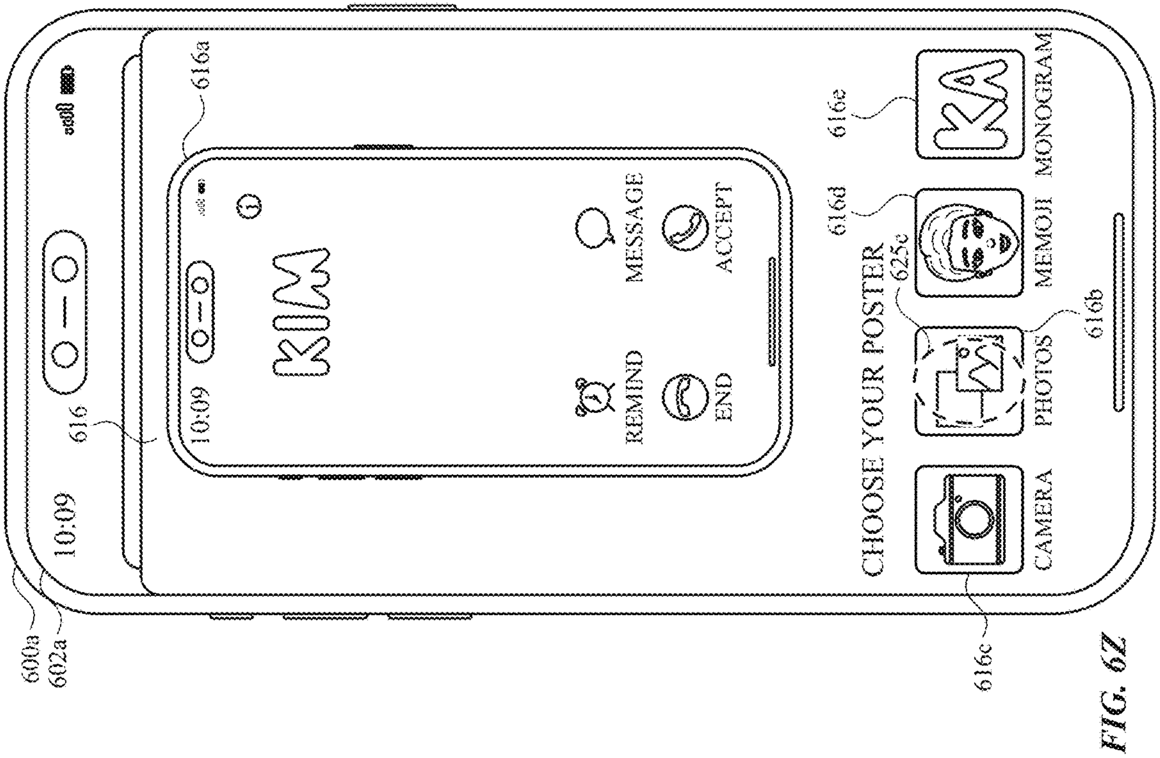
Figure 6A:
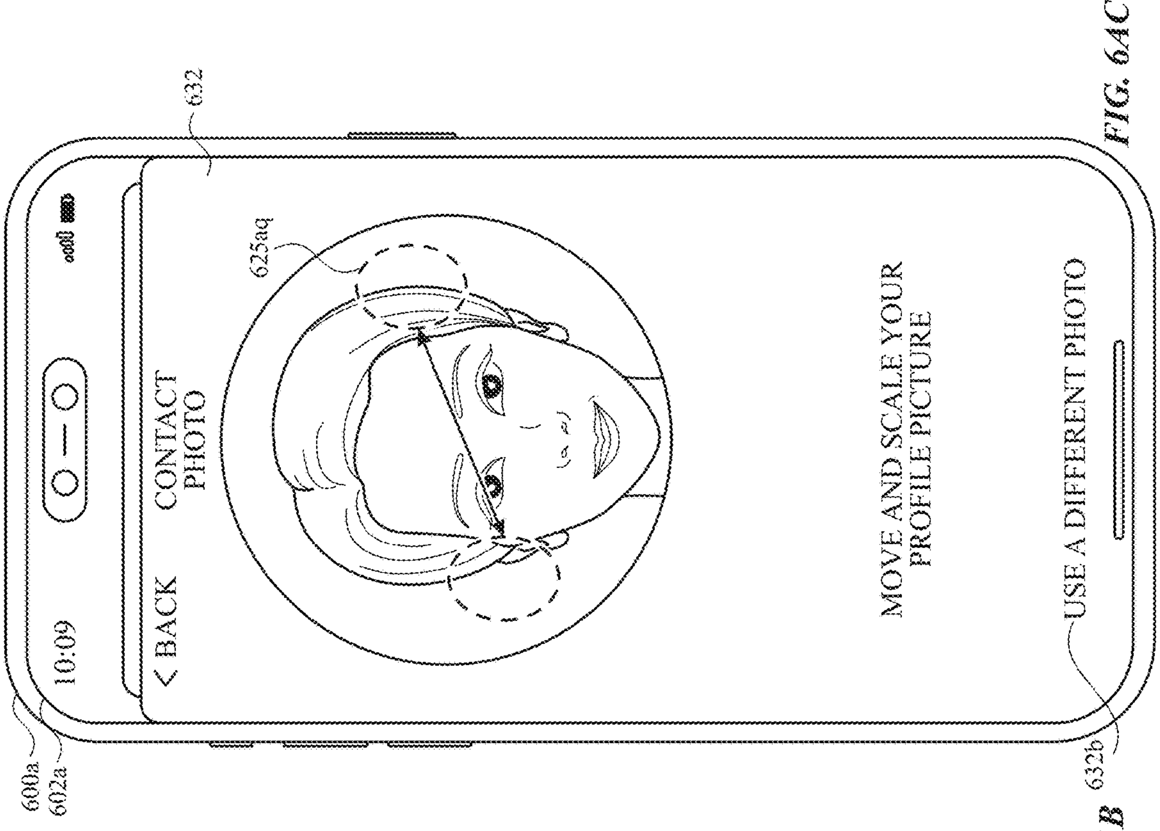
Figure 6A:
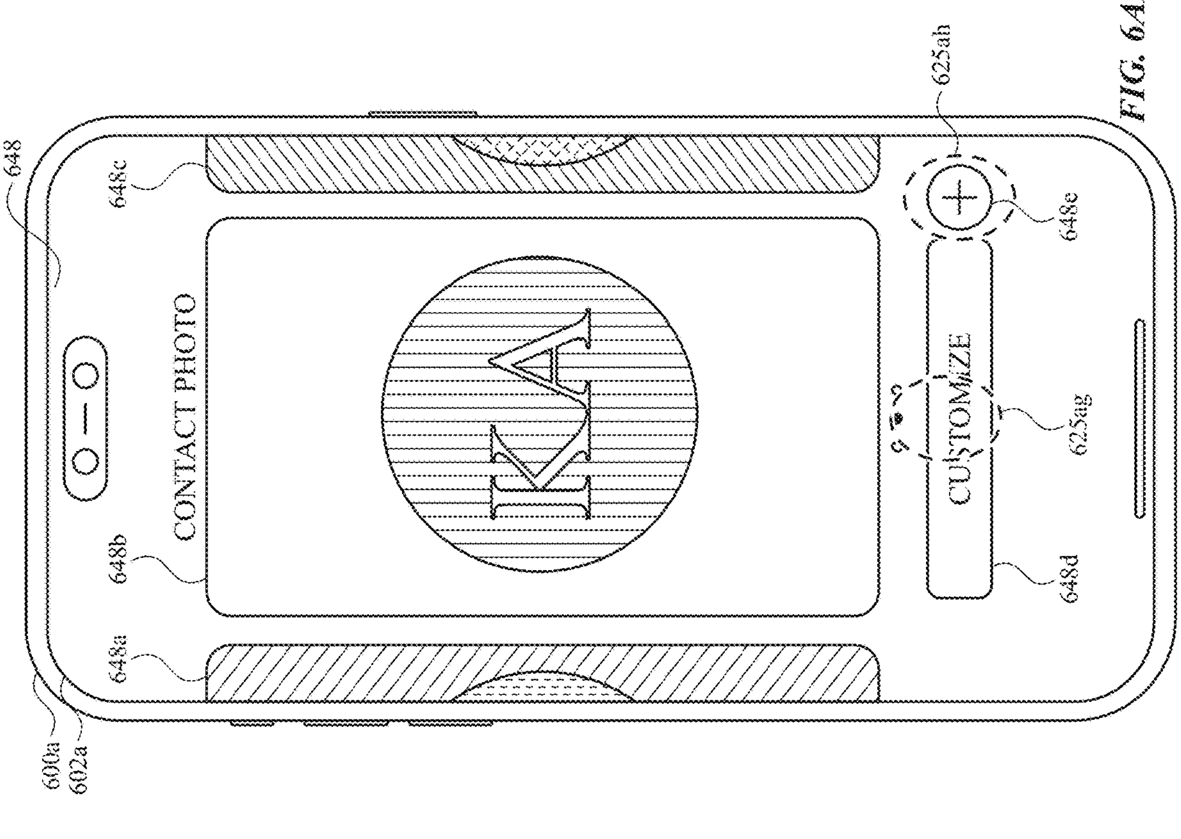
Figure 6A:
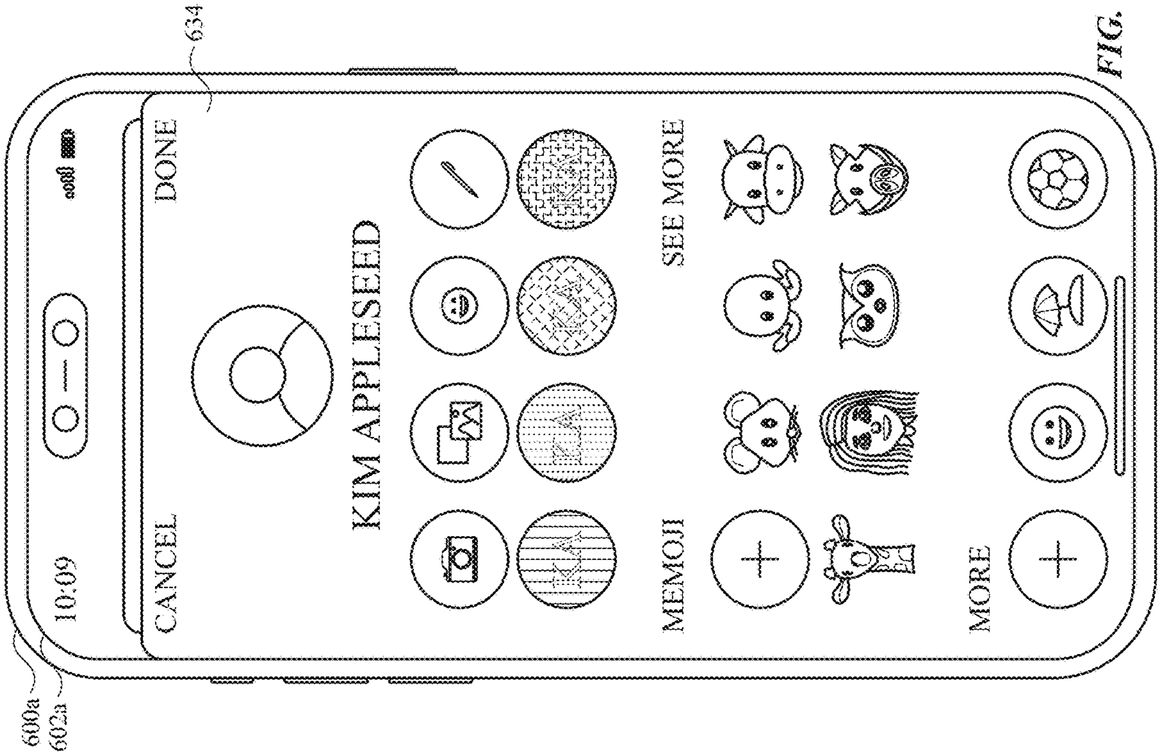
Figure 6A:
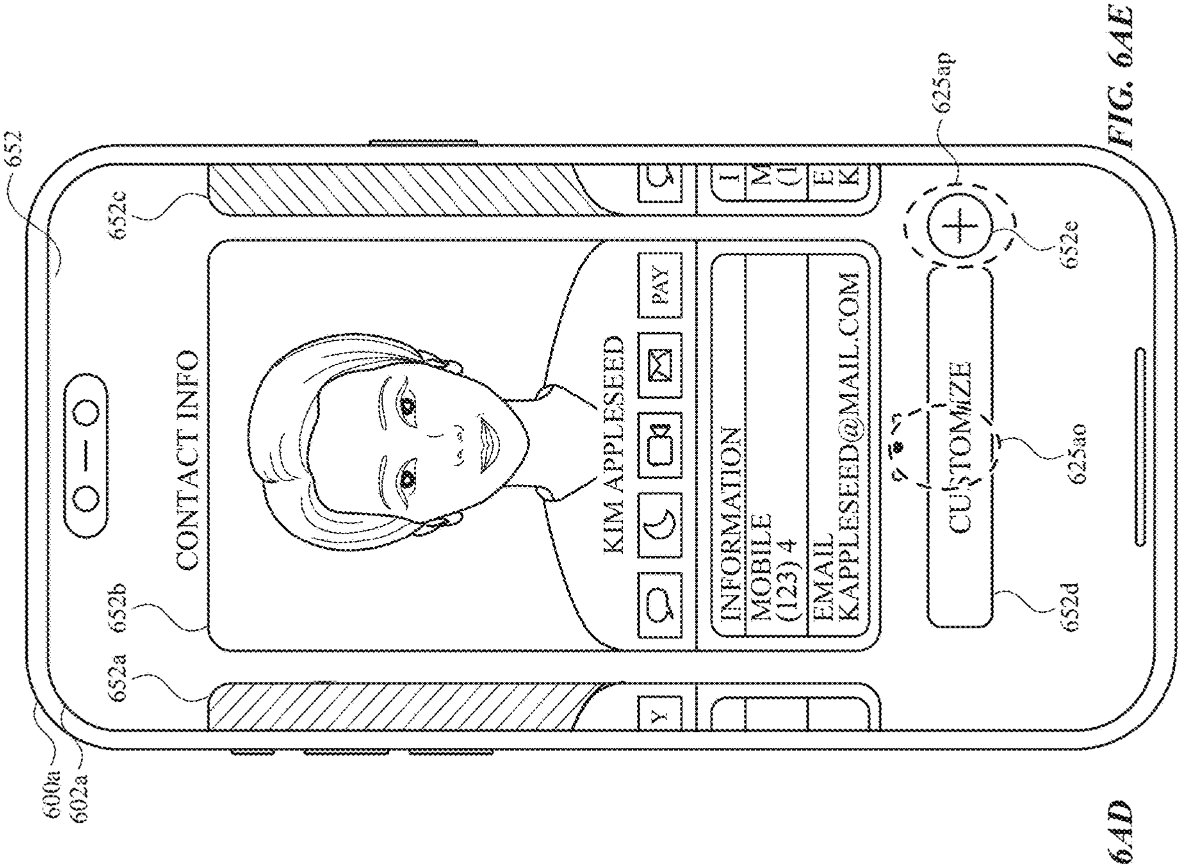
Figure 6A:
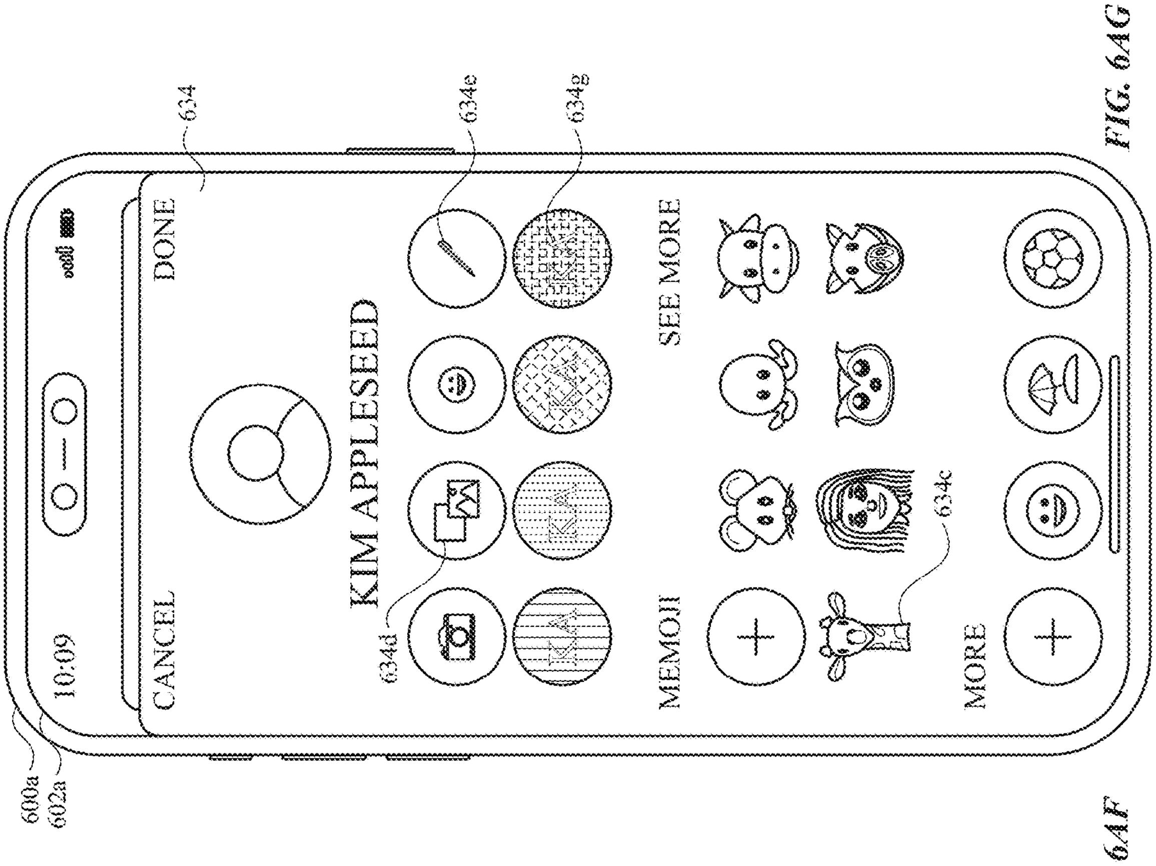
Figure 6A:
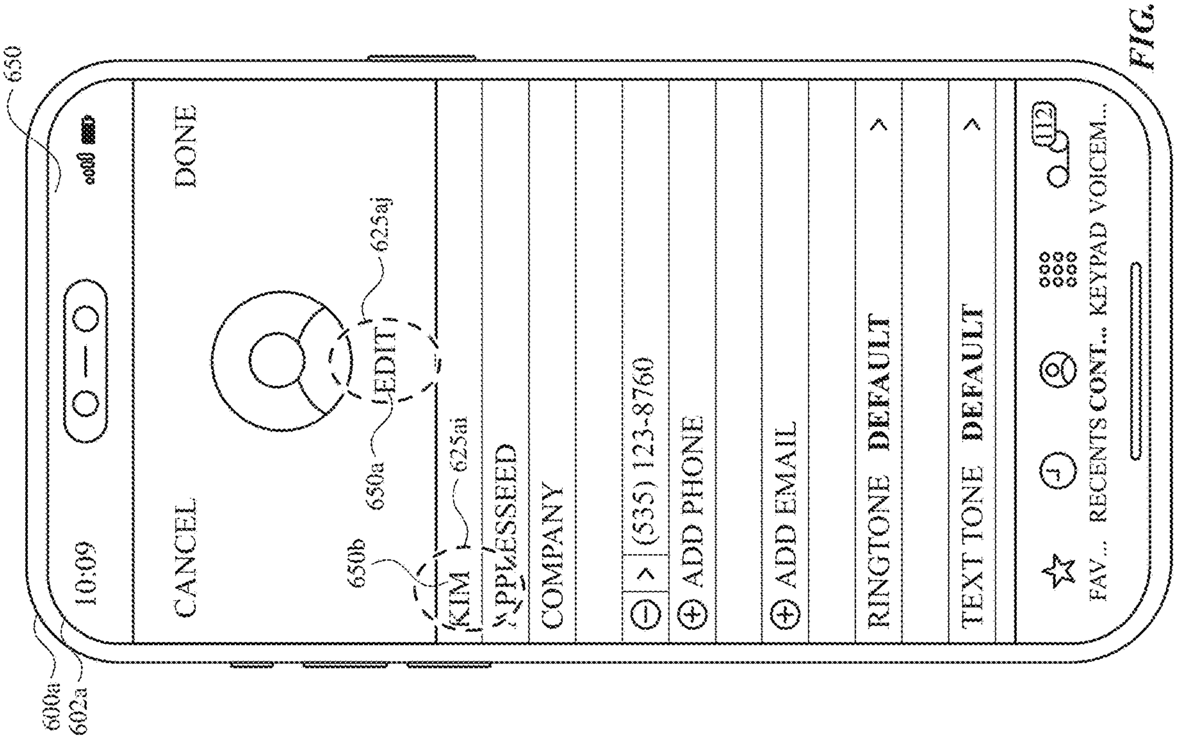

Turning to FIG. 6Y, in response to detecting input 625*aa* on edit option 644*d* in FIG. 6V, computer system 600*a* displays user interface 646 (e.g., shown in FIG. 6Y) for creating and/or customizing one or more user interfaces for the first communication context. User interface 646 includes representation 646*a* of a first user interface for the first communication context, representation 646*b* of a second user interface for the first communication context, and representation 646*c* of a third user interface for the first communication context. A user can select the desired user interface for the first communication context by selecting (e.g., by tapping on) the corresponding representation in user interface 646. In response to detecting selection 625*ae* of customize option 646*d*, computer system 600*a* displays user interface 620 for editing the user interface designated in FIG. 6Y corresponding to representation 646*b*. User interface 620 is described above with reference to FIGS. 6G-6N. In some embodiments, a user can create (e.g., add) a new user interface for the first communication context by selecting add option 646*e*. In response to detecting selection 625*af* of add option 646*e* in FIG. 6Y, computer system 600*a* displays user interface 616 for creating a new user interface for the first communication context, as shown in FIG. 6AA. User interface 616 is described with reference to FIG. 6E.

Turning to FIG. 6AB, in response to detecting input 625*ac* on edit option 644*d* in FIG. 6W, computer system 600*a* displays user interface 648 for creating and/or customizing one or more user interfaces for the second communication context. User interface 648 includes representation 648*a* of a first user interface for the second communication context, representation 648*b* of a second user interface for the second communication context, and representation 648*c* of a third user interface for the second communication context. A user can select the desired user interface for the second communication context by selecting (e.g., by tapping on) the corresponding representation in user interface 648. In response to detecting selection 625*ag* of customize option 648*d*, computer system 600*a* displays user interface 632 for editing the user interface designated in FIG. 6AB corresponding to representation 648*b*. User interface 632 is described above with reference to FIG. 6O. In some embodiments, a user can create (e.g., add) a new user interface for the second communication context by selecting add option 648*e*. In response to detecting selection 625*ah* of add option 648*e* in FIG. 6AB, computer system 600*a* displays user interface 634 for creating a new user interface for the second communication context, as shown in FIG. 6AD. User interface 634 is described with reference to FIG. 6P.

Turning to FIG. 6AE, in response to detecting input 625*ad* on edit option 644*d* in FIG. 6X, computer system 600*a* displays user interface 652 for creating and/or customizing one or more user interfaces for the third communication context. User interface 652 includes representation 652*a* of a first user interface for the third communication context, representation 652*b* of a second user interface for the third communication context, and representation 652*c* of a third user interface for the third communication context. A user can select the desired user interface for the third communication context by selecting (e.g., by tapping on) the corresponding representation in user interface 652. In response to detecting selection 625*ao* of customize option 652*d*, computer system 600*a* displays user interface 650 (e.g., shown in FIG. 6AF) for editing the user interface designated in FIG. 6AE corresponding to representation 652*b*. User interface 650 is described above with reference to FIG. 6R1. In some embodiments, a user can create (e.g., add) a new user interface for the third communication context by selecting add option 652*e*. In response to detecting selection 625*ap* of add option 652*e* in FIG. 6AE, computer system 600*a* displays user interface 634 for creating a new user interface for the third communication context, as shown in FIG. 6AG. User interface 634 is described with reference to FIG. 6P.

In the user interfaces described with reference to FIGS. 6A-6AG, the user of computer system 600*a* edits representations of communication contexts associated with the user of computer system 600*a* (e.g., his or her own representations). In some embodiments, the user interfaces described with reference to FIGS. 6A-6AG are used to edit one or more representations of communication contexts associated with an entity other than the user of computer system 600*a*. In some embodiments, the techniques and user interfaces described with reference to FIGS. 6V-6AG can be used to edit representations for communication contexts of a contactable entity of computer system 600*a*. For example, computer system 600*b* (e.g., John's phone) described below can display user interface 644 to select, create, and/or edit (e.g., customize) representations of the user of computer system 600*a* (e.g., Kim) to be displayed on computer system 600*b* in various communication contexts (e.g., John can edit a representation of Kim that is displayed on his phone when he receives a call, text message, or other communication from Kim). The representation of the user of computer system 600*a* that is displayed on computer system 600*b* is described in greater detail with reference to FIGS. 8A-8AE. In some embodiments, computer system 600*b* displays a representation selected by the user of computer system 600*a* (e.g., selected by the user of computer system 600*a* via the user interfaces described in FIGS. 6A-6AG). In some embodiments, computer system 600*b* displays a representation selected by the user of computer system 600*b* (e.g., selected by the user of computer system 600*b* via user interfaces analogous to the user interfaces described in FIGS. 6V-6AG).

FIG. 7 is a flow diagram illustrating a method for editing user representations for communication contexts using a computer system in accordance with some embodiments. Method 700 is performed at a computer system (e.g., 100, 300, 500, 600*a*, 600*b*, 600*c*, and/or 600*d*) (e.g., a smart phone, a smart watch, a tablet computer, a laptop computer, a desktop computer, a wearable device, and/or head-mounted device) that is in communication with (e.g., includes and/or is connected to) a display generation component (e.g., 112, 156, 602*a*, 602*b*, 602*c*, and/or 602*d*) (e.g., a display, touch-screen display, a monitor, a holographic display system, and/or a head-mounted display system) and one or more input devices (e.g., 112, 113, 116, 204, 206, 208, 602*a*, 602*b*, 602*c*, and/or 602*d*) (e.g., a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)). Some operations in method 700 are, optionally, combined, the orders of some operations are, optionally, changed, and some operations are, optionally, omitted.

As described below, method 700 provides an intuitive way for editing user representations for communication contexts. The method reduces the cognitive burden on a user for editing user representations for communication contexts, thereby creating a more efficient human-machine interface. For battery-operated computing devices, enabling a user to edit user representations for communication contexts faster and more efficiently conserves power and increases the time between battery charges.

The computer system displays (702), via the display generation component, a selection user interface (e.g., 638, 640, and/or 644) (e.g., a user interface for selecting a user representation and/or designating a user representation associated with a communication context). While displaying the representation selection user interface, the computer system (e.g., 600*a*) detects (704), via the one or more input devices, a request (e.g., 625*aa*, 625*z*, 625*ac*, 625*ab*, and/or 625*ad*) to edit a respective user representation (e.g., a user representation represented by 638*a*, 638*b*, or 638*c*) that is displayed at a remote computer system (e.g., 600*b*) in a respective communication context. In some embodiments, the request to edit the respective user representation includes a set of one or more inputs (e.g., one or more manual inputs, button presses, touch inputs, contacts on a touch-sensitive surface, body gestures, and/or voice inputs). In some embodiments, the respective communication context corresponds to a mode of communication (e.g., phone call, video call, or text message) and/or a user interface associated with one or more modes of communication (e.g., a contact card with information for communicating with an entity, such as phone number(s) and/or email address(es)). In some embodiments, the respective user representation is displayed at a remote computer system that is in communication (e.g., real-time communication and/or asynchronous communication) with the computer system.

In response (706) to detecting the request to edit the respective user representation: in accordance with a determination that the respective communication context is a first communication context (e.g., the respective user representation is a first user representation that is displayed at a remote computer system in a first communication context) (e.g., that 638*a* is centered in user interface 644), the computer system displays (708), via the display generation component, a first representation editing user interface (e.g., 646) for editing (and/or, in some embodiments, creating) a first user representation (e.g., a user representation represented by 646*a*, 646*b*, or 646*c*) that is displayed by a remote computer system in the first communication context; and in accordance with a determination that the respective communication context is a second communication context (e.g., the respective user representation is a second user representation that is displayed by a remote computer system in a second communication context) (e.g., that 638*b* is centered in user interface 644) that is different from the first communication context, the computer system displays (710), via the display generation component, a second representation editing user interface (e.g., 648 or 652) for editing (and/or, in some embodiments, creating) a second user representation (e.g., a user representation represented by 648*a*, 648*b*, or 648*c*) that is displayed by a remote computer system in the second communication context. In some embodiments, the first user representation is different from the second user representation (e.g., a user can create different user representations for different communication contexts). Having a first user representation that is different from the second user representation enables the computer system to provide the user with the ability to quickly and easily create different representations for different communication context, thereby providing improved visual feedback to the user and reducing the number of inputs needed to perform an operation. Displaying the representation editing user interface based on a communication context enables the computer system to provide the user with a desired representation for editing and to provide the user with the ability to quickly and easily select and edit representations associated with different communication contexts with fewer user inputs, thereby performing an operation when a set of conditions has been met without requiring further user input, providing improved visual feedback to the user, and reducing the number of inputs needed to perform an operation.

In some embodiments, the respective communication context includes (e.g., is) a real-time communication (e.g., a live communication, a phone call, an audio call, a video call, and/or an audio/video call) (e.g., the phone call in FIGS. 8B-8F). In some embodiments, the respective user representation is displayed by the remote computer system in a user interface of a real-time communication application. Displaying a user interface for editing a representation that is displayed in a real-time communication enables the computer system to provide the user with the ability to customize a representation for communication such as, e.g., phone calls and video calls, thereby providing control options without cluttering the user interface with additional displayed controls. In some embodiments, the respective communication context includes (e.g., is) displaying a representation (e.g., 832*a* and/or a profile) of a contactable entity (e.g., a user associated with the computer system and/or the respective user representation; e.g., a person, business, service, and/or group of entities with which the computer system can initiate communication) (e.g., in user interface 832). In some embodiments, the respective user representation is displayed by the remote computer system in a user interface of a real-time communication application, a messaging application, an email application, a content-sharing application. In some embodiments, the respective user representation is displayed by the remote computer system in a notification associated with a communication from a user associated with the respective user representation. Displaying a user interface for editing a representation that is displayed for a contactable entity enables the computer system to provide the user with the ability to customize a representation for communication techniques such as, e.g., text message and email, thereby providing control options without cluttering the user interface with additional displayed controls. In some embodiments, the respective communication context includes (e.g., is) displaying contact information (e.g., 830*a* and/or a contact card) for a user associated with the respective user representation (e.g., a user associated with the computer system; e.g., a person, business, service, and/or group of entities with which the computer system can initiate communication) (e.g., in user interface 830). Displaying a user interface for editing a representation that is displayed with contact information of the user enables the computer system to provide the user with the ability to customize contact information interfaces such as, e.g., contact cards, thereby providing control options without cluttering the user interface with additional displayed controls.

In some embodiments, the first user representation is displayed in a user interface (e.g., 814) associated with the first communication context and the second user representation is displayed in a user interface (e.g., 830 and/or 832) associated with the second communication context that is different from the user interface associated with the first communication context (e.g., the respective user representation is included in a user interface that is based on context). Displaying the first user representation in a user interface associated with the first communication context and displaying the second user representation in a user interface associated with the second communication context that is different from the user interface associated with the first communication context enables the computer system to provide a representation that is relevant to a particular context, and thus more relevant to the user, which makes use of the computer system more efficient and reduced errors, thereby providing improved visual feedback to the user and reducing the number of inputs needed to perform and operation.

In some embodiments, while displaying the selection user interface, the computer system: designates (e.g., for selection) a first representation (e.g., 638*a*) of a communication context (e.g., a representation of the first communication context); detects a swipe gesture (e.g., on a touch-sensitive surface that is in communication with the computer system) (e.g., 625*z* and/or 625*ab*); and in response to detecting the swipe gesture, designates (e.g., for selection) a second representation (e.g., 638*b* or 638*c*) of a communication context (e.g., a representation of a different communication context and/or a representation of the second communication context). In some embodiments, the request to edit the respective user representation that is displayed at a remote computer system in a respective communication context includes a swipe gesture to scroll a set of representations of respective communication contexts. Designating the second representation of a communication context in response to detecting a swipe gesture enables the user to quickly and efficiently select a representation for editing, thereby reducing the number of inputs needed to perform an operation.

In some embodiments, the computer system: creates (e.g., via the first representation editing user interface in response to detecting a set of one or more inputs) the first user representation (e.g., the user representation represented by 646*a*, 648*a*, or 652*a*) that is displayed by a remote computer system in the first communication context; and creates (e.g., via the first representation editing user interface in response to detecting a set of one or more inputs) a third user representation (e.g., different from the first user representation) (e.g., the user representation represented by 646*b*, 646*c*, 648*b*, 648*c*, 652*b*, or 652*c*) that is displayed by a remote computer system in the first communication context (e.g., a user can create multiple different user representations for the same communication context). Creating the third user representation that is displayed by a remote computer system in the first communication context enables the user to quickly and easily create multiple representations for the same communication context, thereby reducing the number of inputs needed to perform an operation.

In some embodiments, the computer system: displays, via the display generation component, the first user representation (or, in some embodiments, a representation of the first user representation) (e.g., 638*a*); and after displaying the representation of the first communication context, displays, via the display generation component, the second user representation (or, in some embodiments, a representation of the second user representation) (e.g., 638*b* and/or 638*c*), including displaying an animation that includes the first user representation and the second user representation (e.g., an animation of the first user representation moving away from a center of a display, the second user representation moving towards the center of the display, ceasing display of the first user representation, and/or the second user representation appearing). Displaying an animation that includes the first user representation and the second user representation informs the user that there are more then one user representation and enables the computer system to display more than one user representation without requiring user input, thereby providing improved visual feedback to the user and reducing the number of inputs needed to perform an operation.

In some embodiments, the remote computer system displays the respective user representation when the remote computer system is operating in the respective communication context (e.g., computer system 600*b* displays the user representation represented by 638*a*, 638*b*, 638*c*, 646*a*, 646*b*, 646*c*, 652*a*, 652*b*, or 652*c* based on the communication context of the remote computer system). In some embodiments, in accordance with (or, in some embodiments, in response to) a determination that the remote computer system is operating in the respective communication context (e.g., the first communication context or the second communication context), the computer system displays the respective user representation (e.g., the first user representation or the second user representation, respectively). Displaying the respective user representation at the remote computer system when the remote computer system is operating in the respective communication context provides the user with content that is relevant to the current context, thereby providing improved visual feedback to the user.

In some embodiments, the respective user representation includes a photo (e.g., 618, 620*b*, and/or 632*a*). Including a photo in the respective user representation enables the user to create a more detailed representation and to efficiently customize the representation with fewer inputs, thereby reducing the number of inputs needed to perform an operation. In some embodiments, the respective user representation includes an avatar (e.g., a character, a representation with an appearance that is based on one or more physical characteristics of the entity, and/or a representation with an appearance that is not based on a physical characteristic of the entity) (e.g., 608*a* in FIG. 6B, 608*b* in FIG. 6C, 634*c*, or 810*b*). Including an avatar in the respective user representation enables the user to create a more detailed representation and to efficiently customize the representation with fewer inputs, thereby reducing the number of inputs needed to perform an operation. In some embodiments, the computer system displays, via the display generation component, an animation that includes movement over time of the avatar (e.g., as described in FIGS. 8C-8D). Displaying an animation that includes movement over time of the avatar enables the user to create a more dynamic representation and to efficiently customize the representation with fewer inputs, thereby reducing the number of inputs needed to perform an operation. In some embodiments, the respective user representation includes a monogram (e.g., one or more initials of a name of the entity) (e.g., 634*b*, 632*a* in FIG. 6Q, and/or 810*a*). In some embodiments, the monogram includes a motif of two or more letters (e.g., the initials of the entity) that are interwoven or otherwise combined. Including a monogram in the respective user representation enables the user to efficiently customize the representation with fewer inputs, thereby reducing the number of inputs needed to perform an operation.

Note that details of the processes described above with respect to method 700 (e.g., FIG. 7) are also applicable in an analogous manner to the methods described below. For example, methods 900, 1100, 1300, and/or 1500 optionally include one or more of the characteristics of the various methods described above with reference to method 700. For example, a user representation edited as described in method 700 is displayed as the respective representation of the entity in method 900, as the real-time communication user interface in method 1100, with the transcript of the voice message in method 1300, and/or with the video message user interface element in method 1500. For brevity, these details are not repeated below.

FIGS. 8A-8AE illustrate exemplary user interfaces for displaying a representation of an entity for a real-time communication, in accordance with some embodiments. The user interfaces in these figures are used to illustrate the processes described below, including the processes in FIG. 9.

FIGS. 8A-8AE illustrate techniques for displaying a representation of an entity in a real-time communication interface (e.g., a representation of a caller in a phone user interface). FIG. 8A illustrates computer system 600*b* (e.g., John's phone). In FIG. 8A, computer system 600*b* is in a sleep state, an inactive state, and/or a reduced power state. In FIGS. 8B-8E, computer system 600*b* receives an incoming phone call from a caller (e.g., a contactable user) named Kim (e.g., the user of computer system 600*a* in FIGS. 6A-6AG). In some embodiments, the representation of the caller that is displayed by computer system 600*b* in response to receiving the incoming call is based on a representation of the caller that has been created, customized, and/or selected by the caller or a user of computer system 600*a* (e.g., via the techniques described with reference to FIGS. 6A-6AG).

In accordance with a determination that a first representation is associated with the caller for a phone call communication context (e.g., via selection of the representation by the caller or via selection of the representation by the user of computer system 600*b*), computer system 600*b* displays call user interface 804 shown in FIG. 8B. Call user interface 804 includes name 806*a*, graphical representation 810*a* (e.g., a monogram), and answer option 808. In some embodiments, the first communication context described with reference to FIGS. 6A-6AG includes the phone call communication context.

Figure 8C:
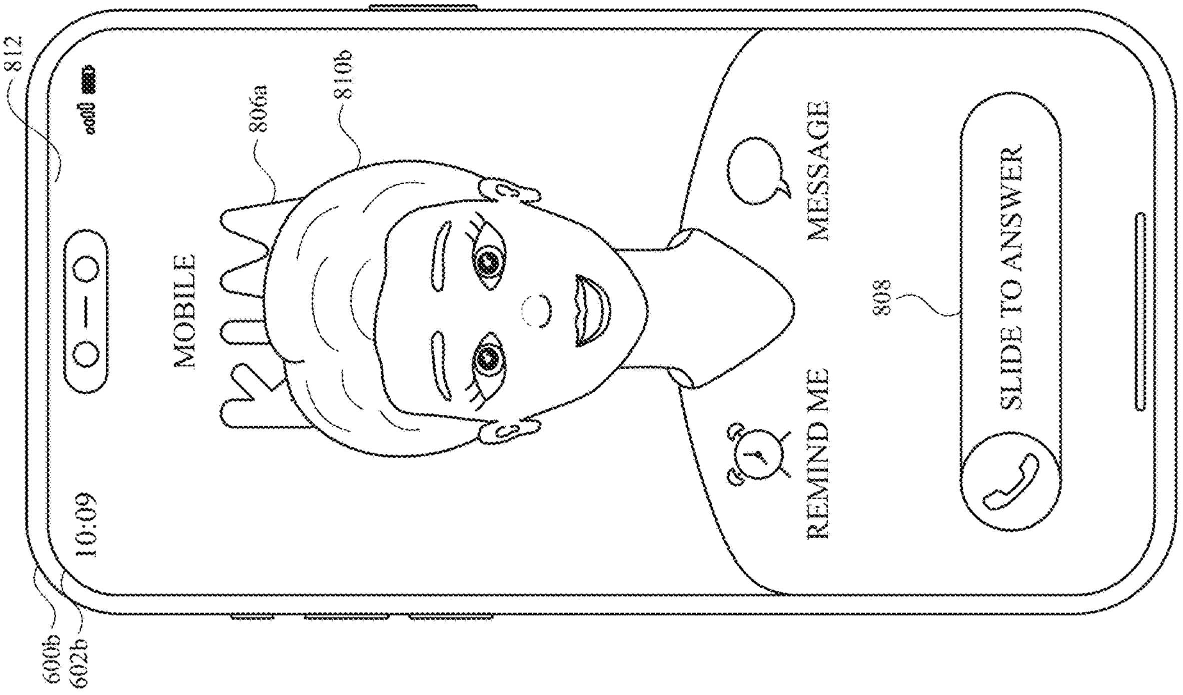

In accordance with a determination that a second representation is associated with the caller for the phone call communication context, computer system 600*b* displays call user interface 812 shown in FIG. 8C. Call user interface 812 includes name 806*a*, graphical representation 810*b* (e.g., an avatar and/or a representation that includes features based on anatomical features of the user of computer system 600*a*), and answer option 808. In some embodiments, graphical representation 810*b* moves based on a predetermined animation or detected movement of the caller. For example, in FIG. 8D, movement of a head of the caller is captured by a camera of the computer system of the caller and graphical representation 810*a* moves (e.g., tilts) in accordance with the movement of the head of the caller.

Figure 8F:
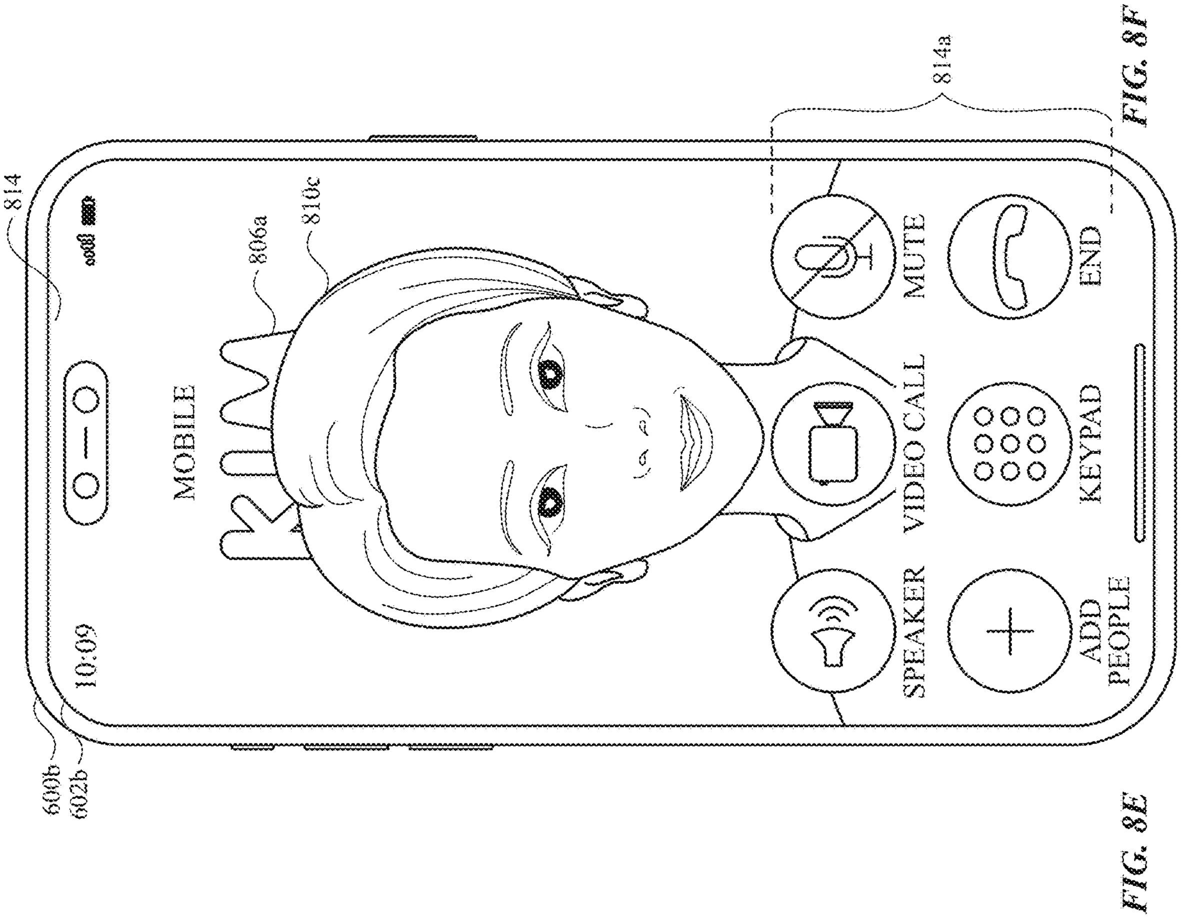
Figure 8E:
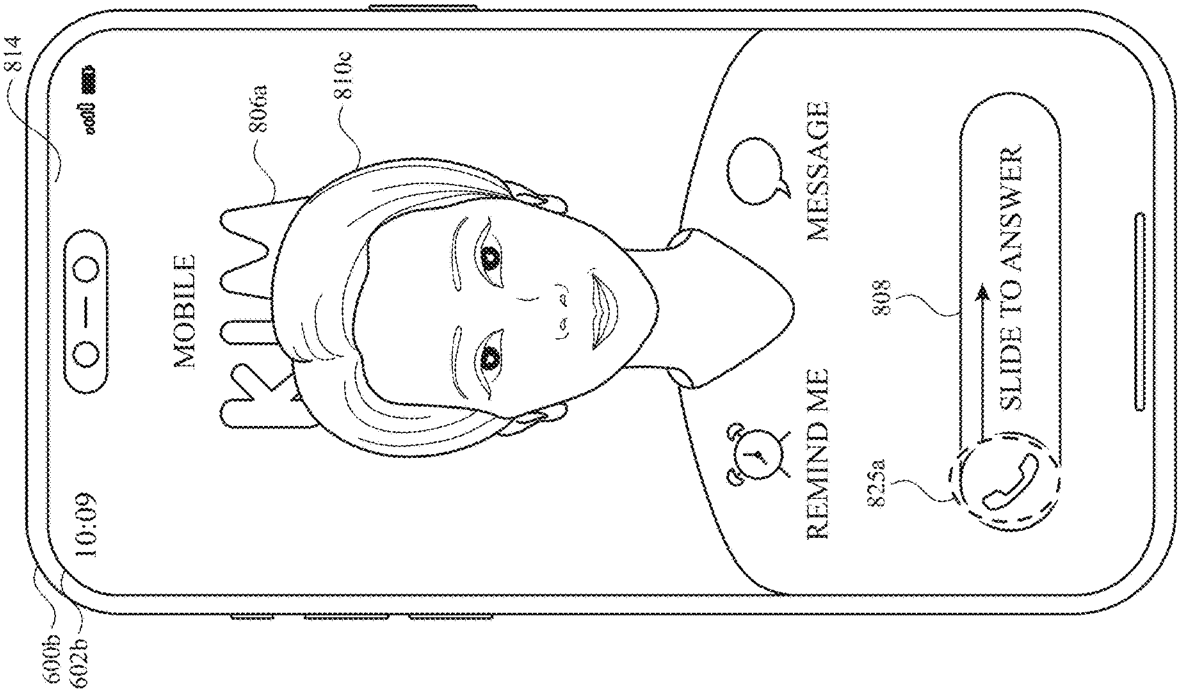

In accordance with a determination that a third representation is associated with the caller for a phone call communication context, computer system 600*b* displays call user interface 814 shown in FIG. 8E. Call user interface 804 includes name 806*a*, graphical representation 810*c* (e.g., a photo), and answer option 808.

In FIG. 8E, computer system 600*b* detects selection 825*a* (e.g., a swipe gesture or tap and drag gesture) of answer option 808. In response to detecting selection 825*a* of answer option 808, computer system 600*b* answers the incoming call and displays call user interface 814 as shown in FIG. 8F. In some embodiments, computer system 600*b* enlarges or zooms graphical representation 810*c* when the call is answered, as shown in FIG. 8F. When the call is answered, computer system 600*b* displays selectable call controls 814*a* for performing functions associated with the call (e.g., an option to end the call, an option to display a keypad, an option to mute or unmute a microphone, an option to add people to the call, an option to initiate a video call with the caller, and/or an option to enable or disable a speaker for audio of the call).

Figure 8H:
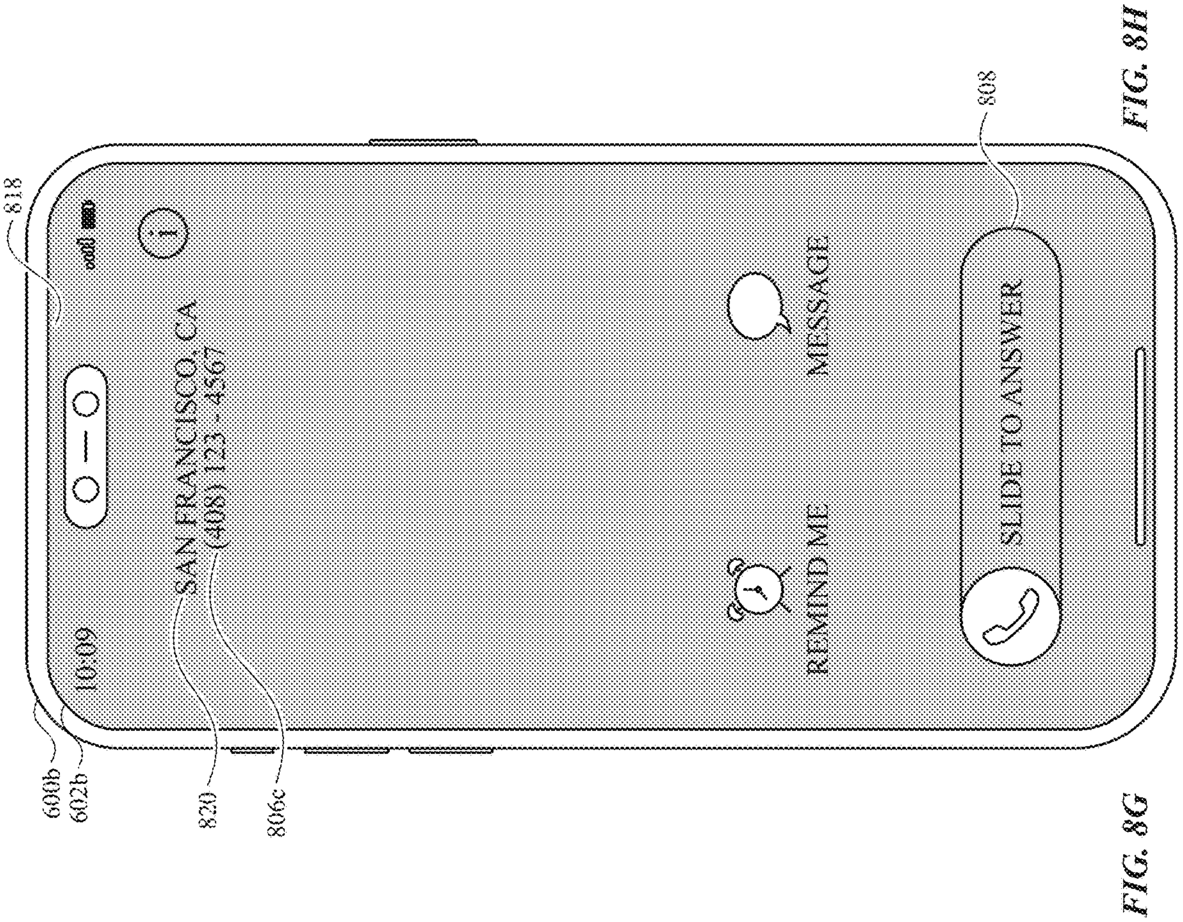
Figure 8G:
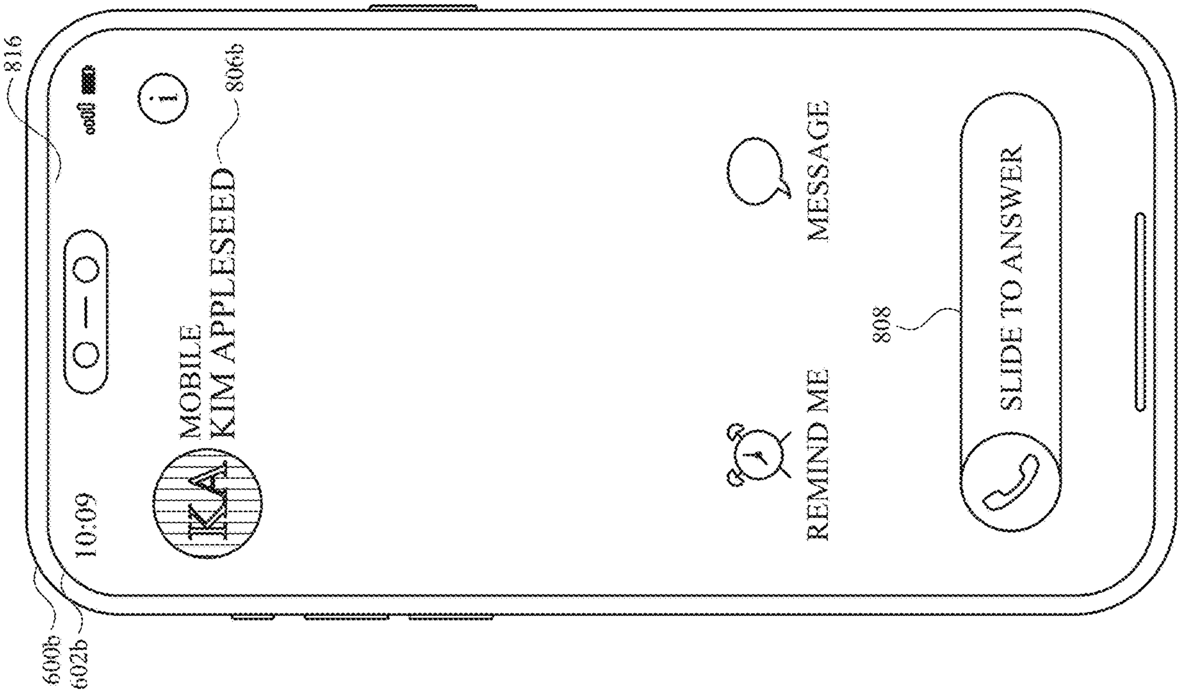

In some embodiments, when an incoming call is received from the caller, in accordance with a determination that the caller does not have a representation associated with the phone call communication context (e.g., neither the caller nor the user of computer system 600*b* has created or selected a representation for the caller for a phone call communication context) but has a representation for another communication context (e.g., a profile picture for text messages or other communication protocols), computer system 600*b* displays representation 806*b* of the other communication context (e.g., a profile picture, monogram, avatar, or other image from a contact card), as displayed in call user interface 816 shown in FIG. 8G.

In some embodiments, when an incoming call is received, in accordance with a determination that the call is from an unknown caller, computer system 600*b* displays a call user interface (e.g., call user interface 818 shown in FIG. 8H) with a predetermined background color so that the user can easily identify that the call is from an unknown caller. In some embodiments, the predetermined background color is not used, and cannot be selected for use, in any other call user interface on computer system 600*b* (e.g., the background color is unique for unknown callers). Call user interface 818 includes number 806*c* of the incoming call and location 820 associated with the number of the incoming call.

In some embodiments, when an incoming call is received, in accordance with a determination that the call is from an authorized business, computer system 600*b* displays a call user interface (e.g., call user interface 822 shown in FIG. 8I) with a predetermined background color so that the user can easily identify that the call is from an authorized business. In some embodiments, the predetermined background color is not used, and cannot be selected for use, in any other call user interface on computer system 600*b* (e.g., the background color is unique for authorized businesses). Call user interface 822 includes representation 806*d*, which includes the name and number of the business.

Figure 8J:
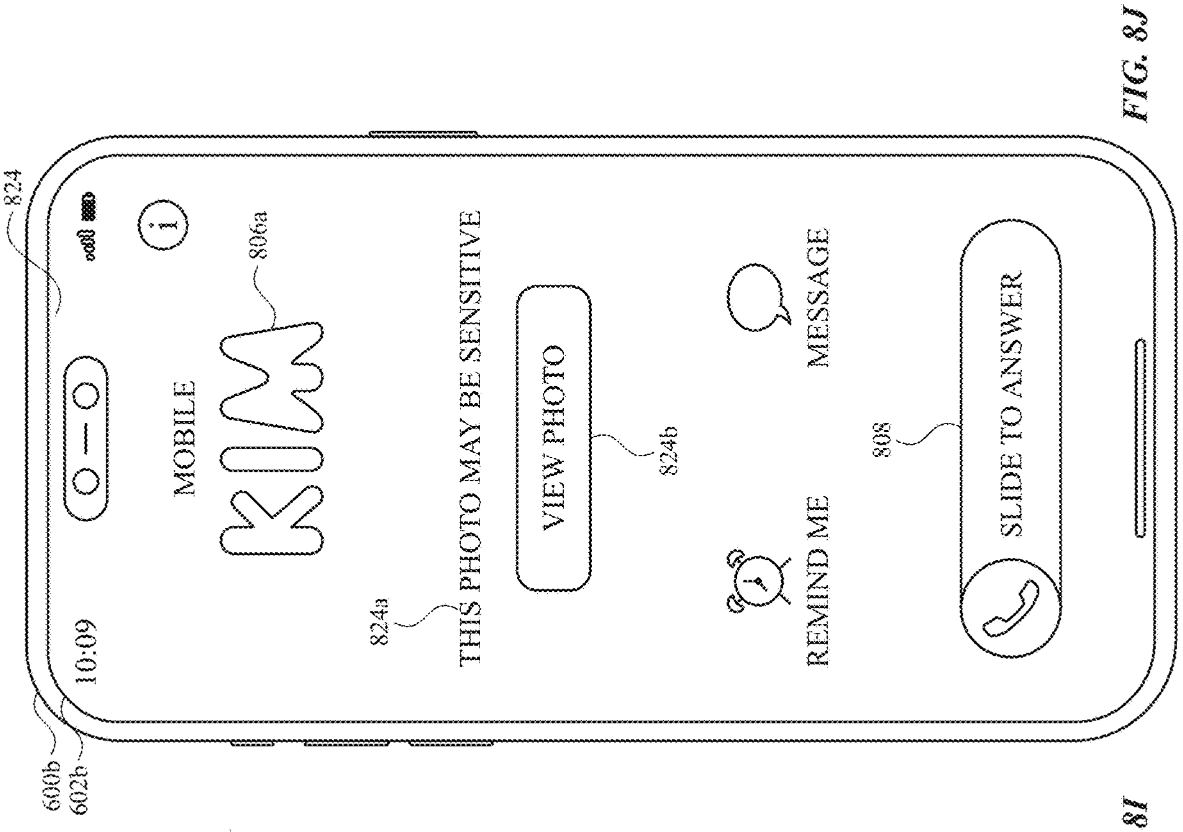

In some embodiments, when an incoming call is received, in accordance with a determination that the representation associated with the caller includes potentially sensitive content (e.g., a potentially sensitive photo), computer system 600*b* displays a call user interface (e.g., call user interface 824 shown in FIG. 8J) without the potentially sensitive content. Call user interface 824 includes name 806*a* of the caller, indication 824*a* that the representation includes a photo that may be sensitive, and view photo option 824*b* that can be selected to cause computer system 600*b* to display the photo. In some embodiments, in response to selection of view photo option 824*b*, computer system 600*b* displays the photo automatically for future calls from the caller. In some embodiments, after selection of view photo option 824*b*, for future calls from the caller, computer system 600*b* displays view photo option 824*b* without displaying the potentially sensitive photo.

In some embodiments, when an incoming call is received, in accordance with a determination that the call is associated with a predetermined region (e.g., a geographic region), computer system 600*b* displays a call user interface (e.g., call user interface 826 shown in FIG. 8K) with format associated with the region. For example, when the caller is located in Japan, user interface 825 includes Japanese characters and orients name 806*e* of the caller vertically. In some embodiments, the region is based on a region associated with the caller, a region setting of a computer system of the caller, a region setting of computer system 600*b*, a location of the caller (e.g., a location of computer system 600*a*), and/or a location of computer system 600*b*. In some embodiments, a user can select the format associated with the region for the representation of the caller independent from the caller or computer system 600*b* being otherwise associated with the region.

Figure 8I:
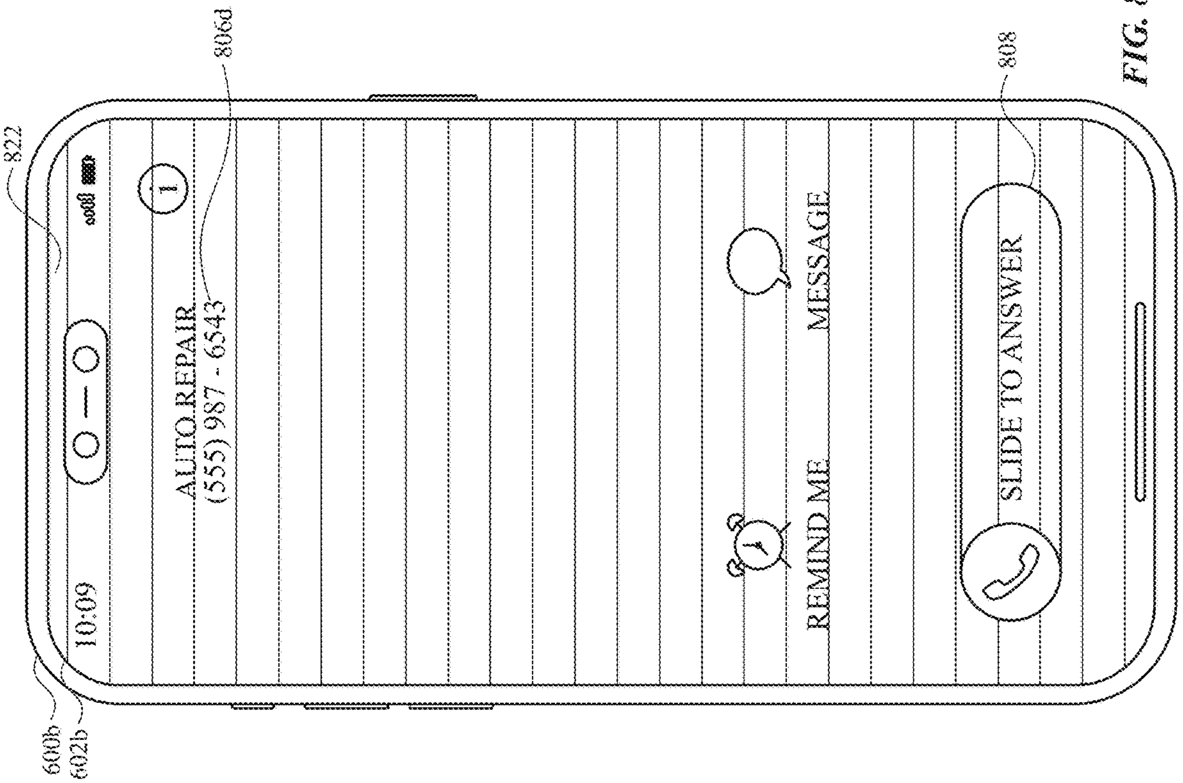
Figure 8K:
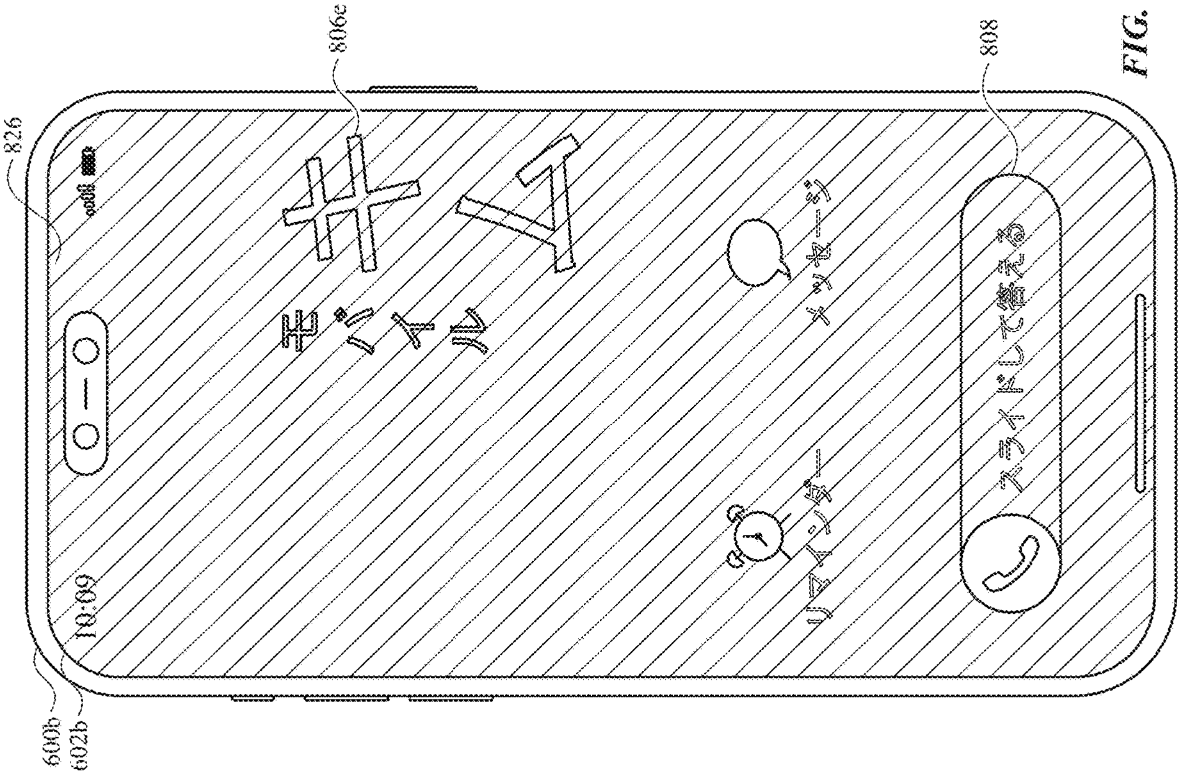
Figure 8L:
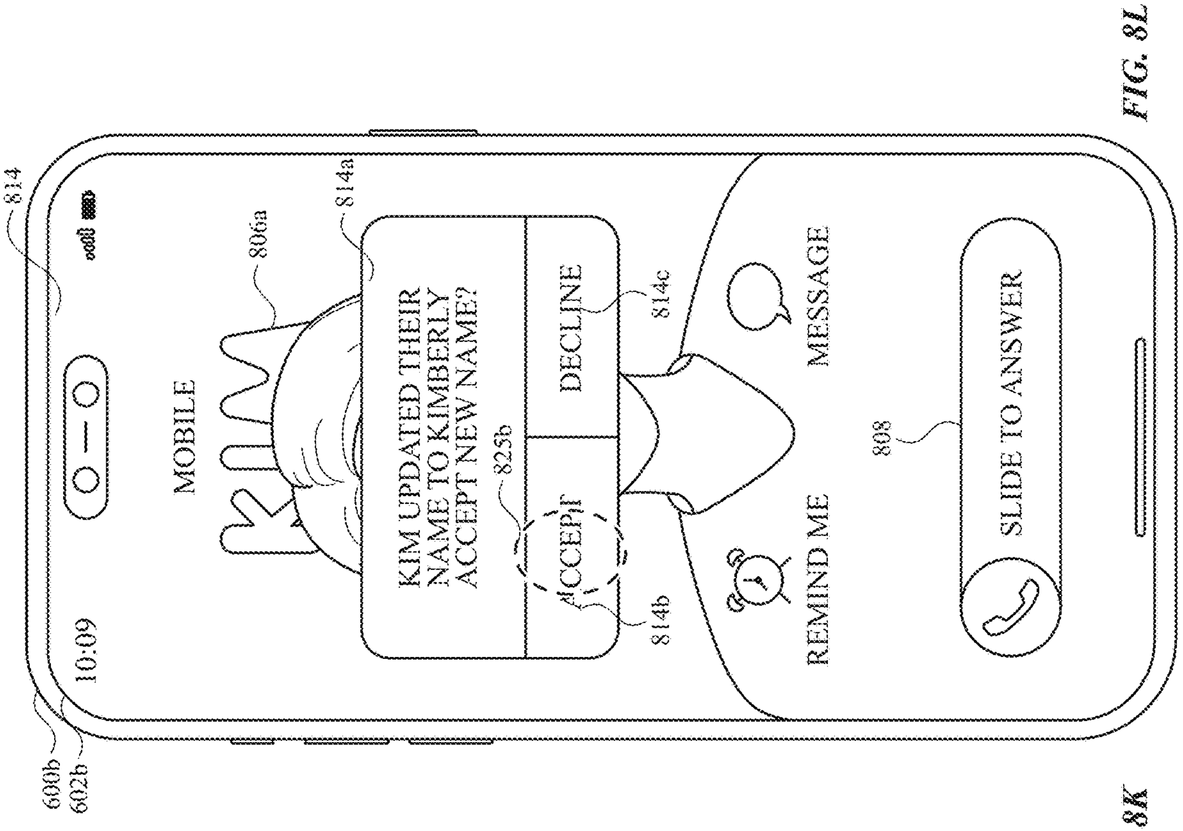

In some embodiments, when an incoming call is received, in accordance with a determination that the caller has updated the name associated with the caller, computer system 600*b* displays a prompt to accept or decline the updated name. For example, in FIG. 8L, computer system 600*b* displays prompt 814*a* in call user interface 814. Call user interface 814 is described with reference to FIG. 8E. Prompt 814*a* incudes accept option 814*b* and decline option 814*c*. In response to detecting selection 825*b* of accept option 814*b*, computer system 600*b* displays updated name 806*f* in call user interface 814 as shown in FIG. 8M.

In some embodiments, if a representation associated with a caller for a phone communication context has been updated since a most recent communication with the caller, computer system 600*b* automatically displays the updated representation when the incoming call is answered. For example, in response to detecting selection 825*a* of answer option 808 in FIG. 8E, in accordance with a determination that the representation of the caller has been updated since a most recent communication with the caller, computer system 600*b* displays call user interface 828 shown in FIG. 8N. Call user interface 828 includes updated representation 806*g* of the caller, call control option 828*b*, and update indicator 828*a*. In some embodiments, update indicator 828*a* includes a graphical representation (e.g., a photo, avatar, or monogram) of the caller. In FIG. 8O, computer system 600*b* replaces update indicator 828*a* with information option 828*c*. Changing update indicator 828*a* to information option 828*c* indicates to the user that the representation of the caller has been updated and that information option 828*c* can be selected to change the representation of the caller back to the previous representation and/or edit the representation of the caller (e.g., a representation of the caller in a contacts application on computer system 600*b*).

Figure 8N:
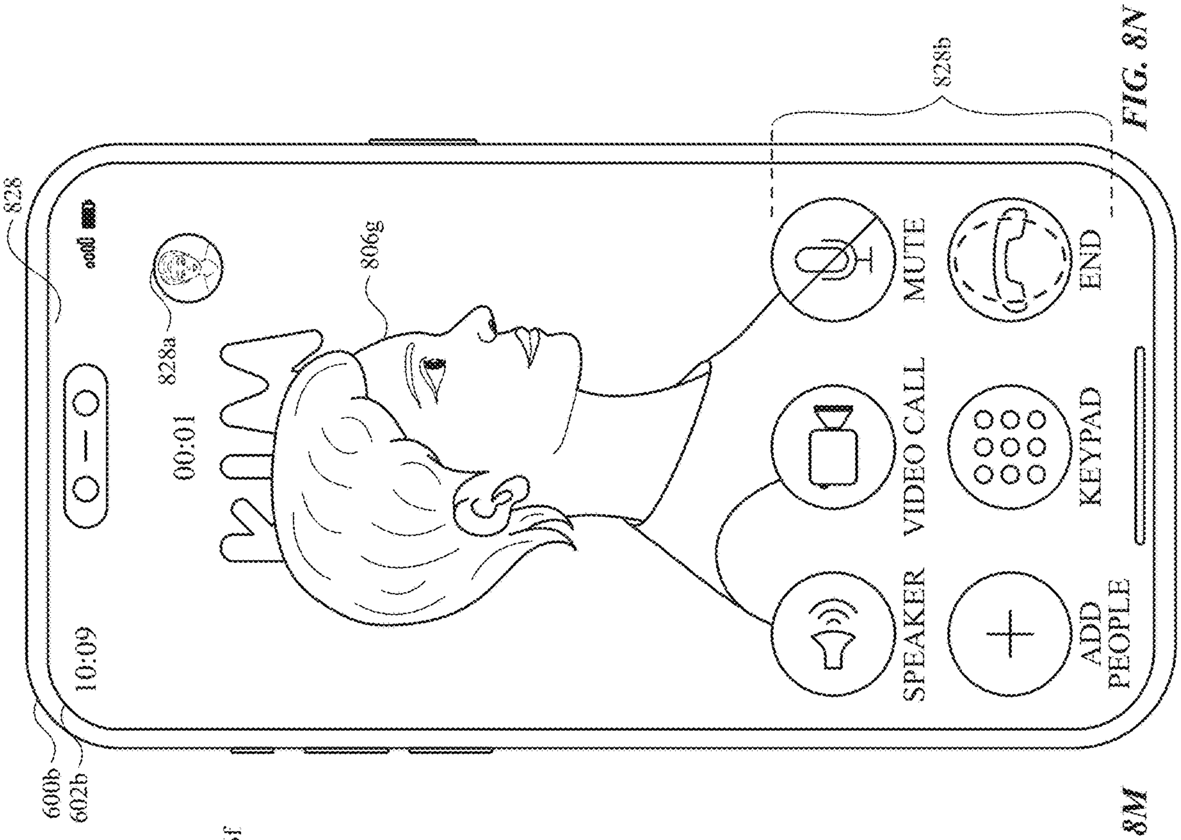
Figure 8M:
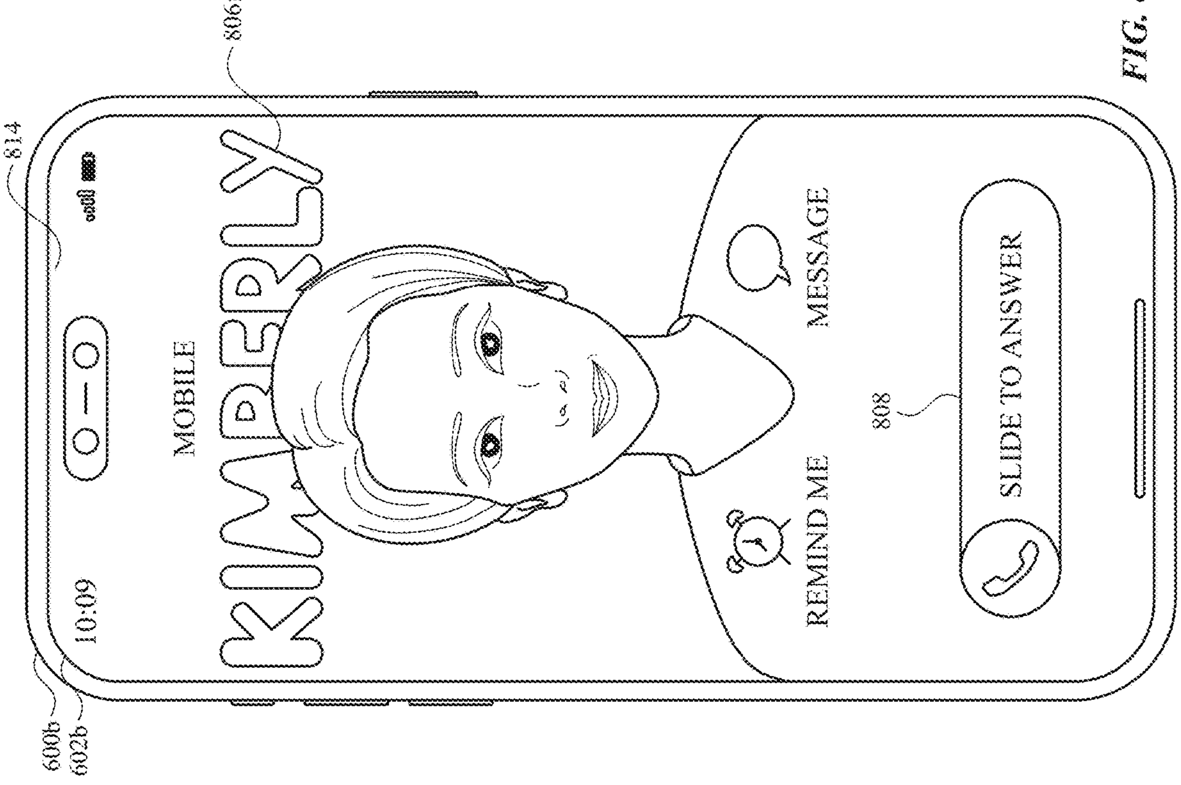
Figure 8O:
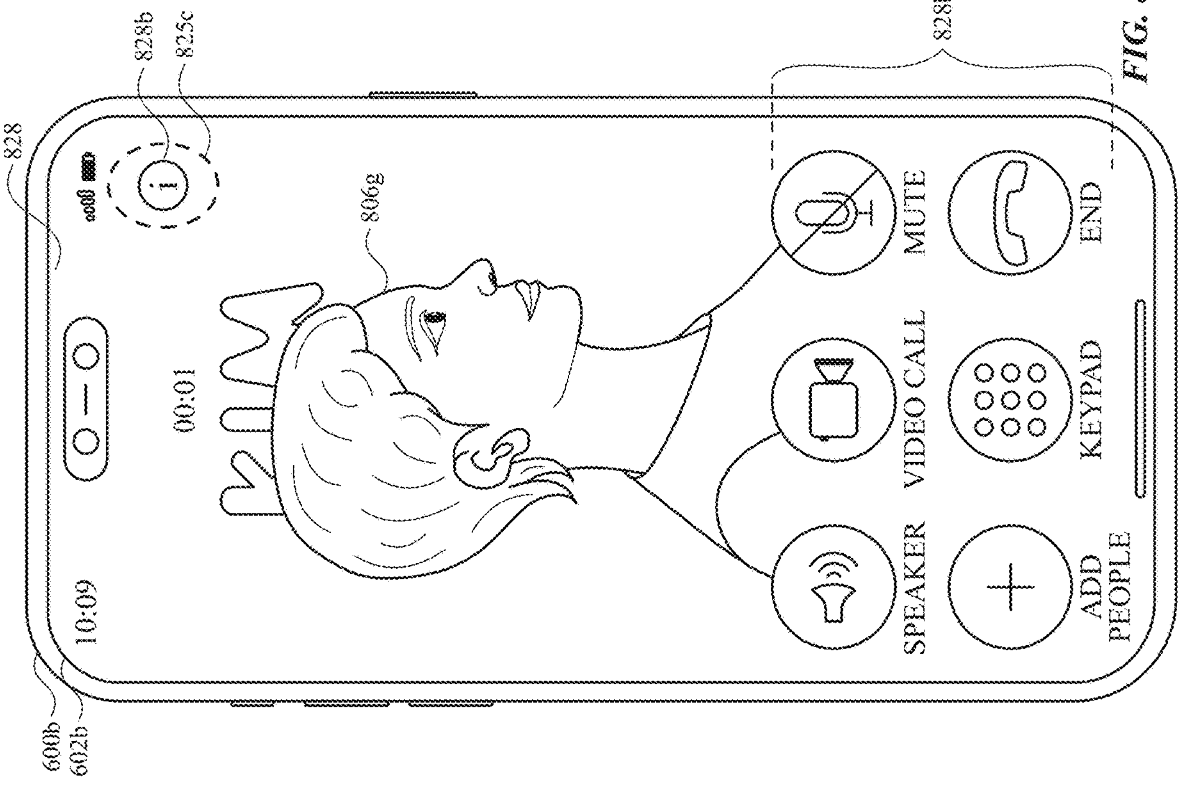
Figure 8P:
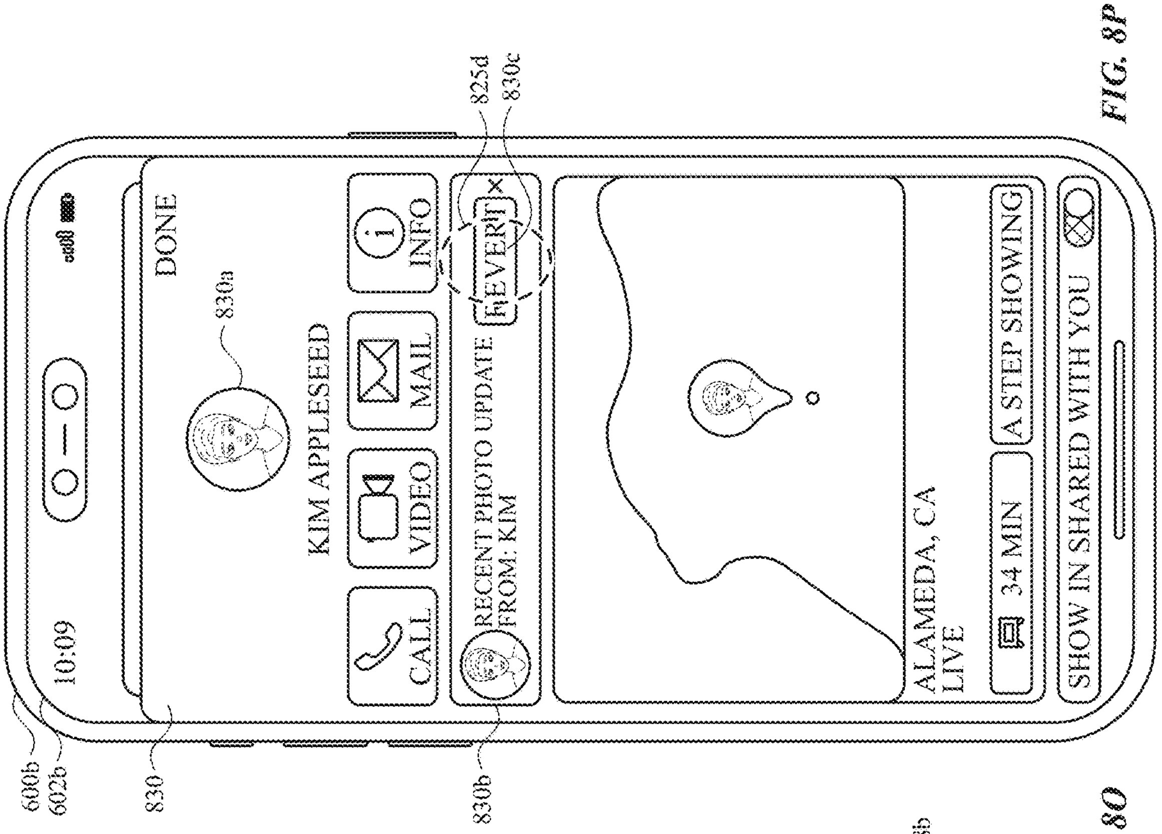

In FIG. 8O, computer system 600*b* detects selection 825*c* of information option 828*c*. In response to detecting selection 825*c* of information option 828*c*, computer system 600*b* displays user interface 830 (e.g., a contact card) that includes information associated with the caller. User interface 830 includes representation 830*a* of the caller and user interface element 830*b*, which includes a notification of a recent photo update for the caller and revert option 830*c*. In response to detecting selection 825*d* of revert option 830*c*, computer system 600*b* changes the representation of the caller back to the previous version and updates user interface 830 accordingly, as shown in FIG. 8Q.

Figure 8R:
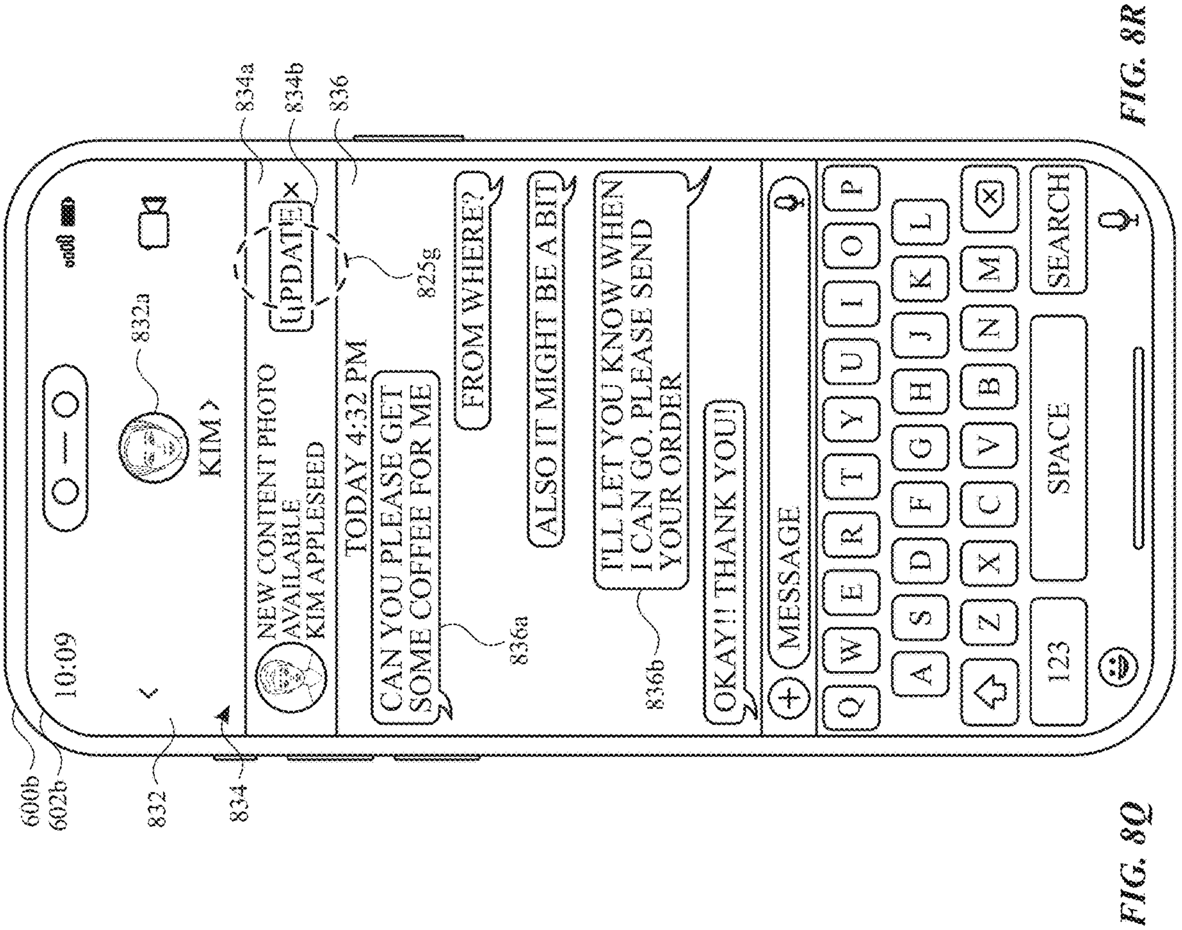
Figure 8Q:
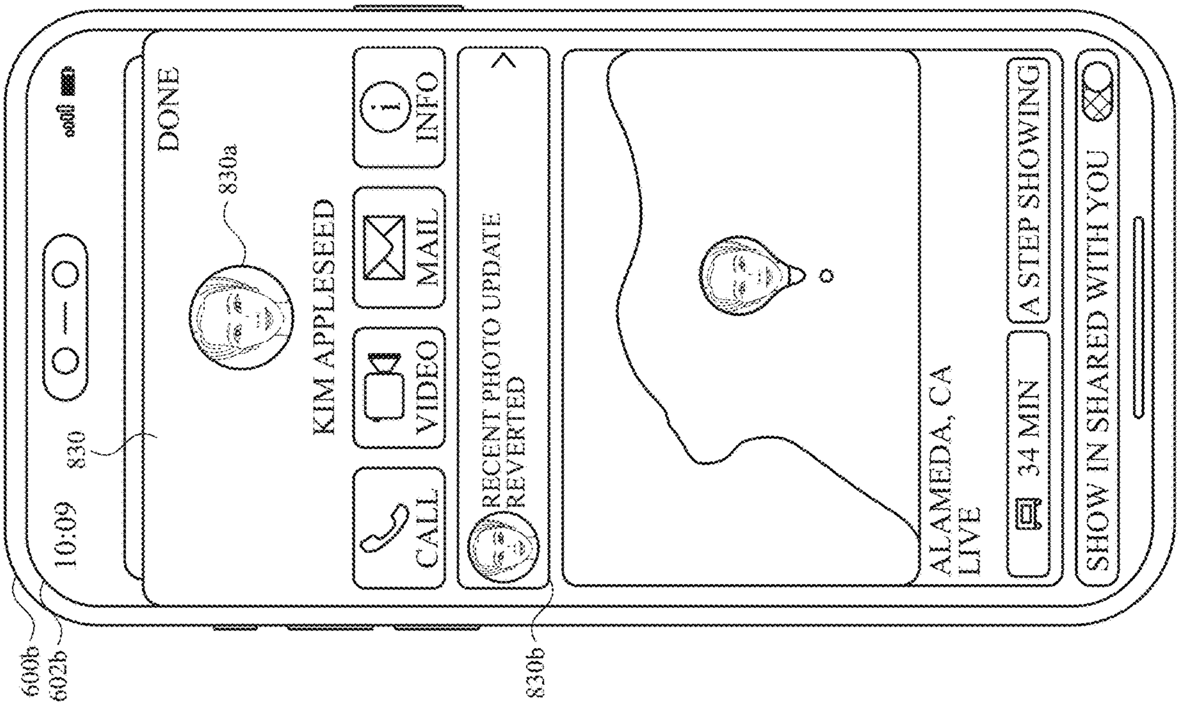
Figure 8T:
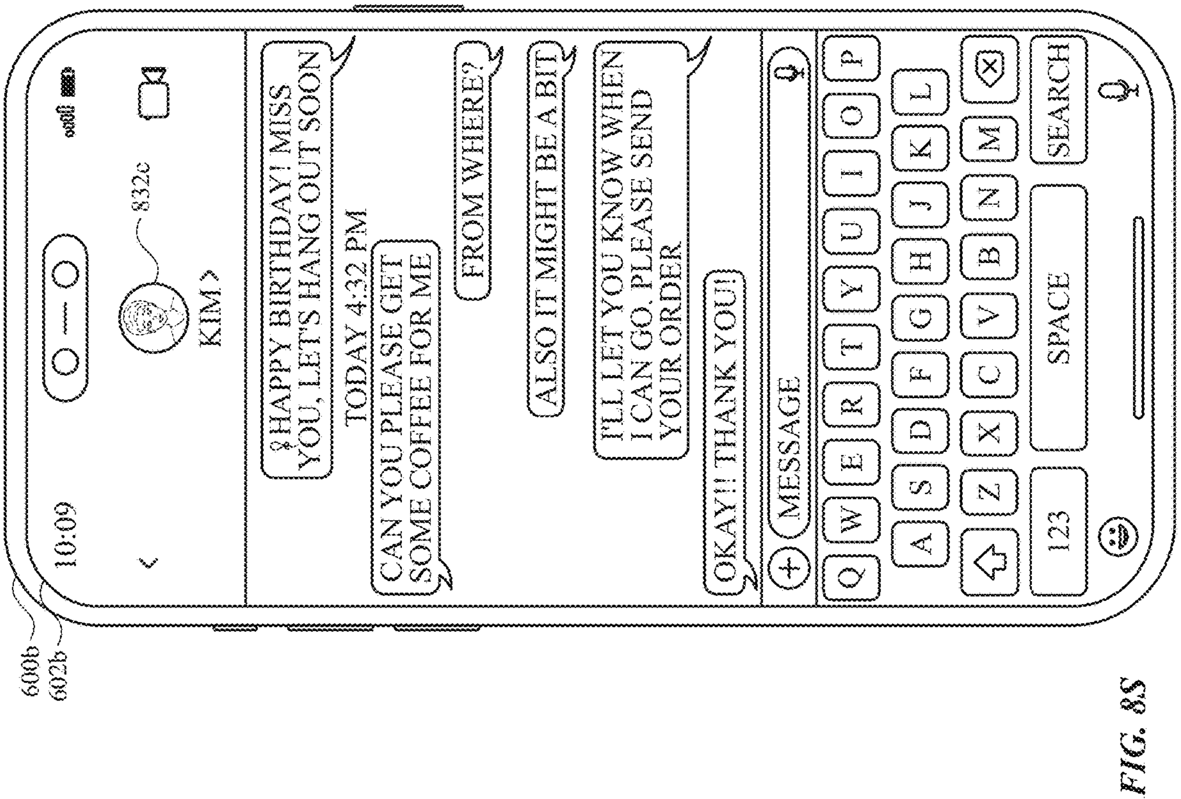
Figure 8S:
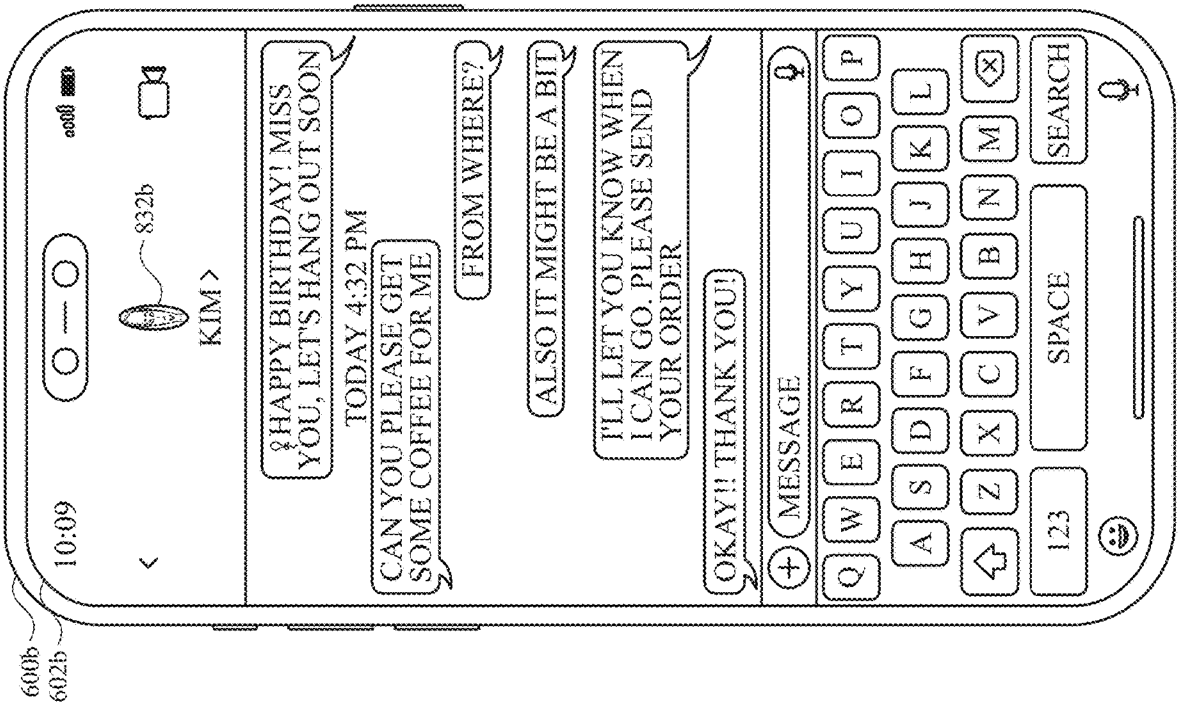

Turning to FIG. 8R, computer system 600*b* displays user interface 832 of a messaging application. User interface 832 displays a message conversation between a remote participant, Kim (e.g., the user of computer system 600*a*), and the user of computer system 600*b*. User interface 832 includes representation 832*a* of the remote participant, notification 834, and message region 836. Message region 836 includes messages between the user of computer system 600*b* and the remote participant (e.g., message 936*a* from the remote participant to the user of computer system 600*b* and message 836*b* from the user of computer system 600*b* to the remote participant). Notification 834 includes indication 834*a* that a new contact photo is available for the remote participant of the message conversation, along with a preview of the new contact photo, and update option 834*b*. In response to detecting selection 825*g* of update option 834*b*, computer system 600*b* changes representation 832*a* from the existing (or previous) representation of the remote participant to the updated representation of the remote participant. In some embodiments, computer system 600*b* displays an animation of the representation of the remote participant changing from representation 832*a* to intermediate representation 832*b* (shown in FIG. 8S) and then to updated representation 832*c* (shown in FIG. 8T). In some embodiments, the animation simulates a coin flipping or spinning around a vertical axis from one side of the coin to another side of the coin (e.g., representation 832*a* is on one side of the coin and the updated representation 832*c* is on the other side of the coin). In some embodiments, computer system 600*b* displays updated representation 832*c* automatically (e.g., without user input) the first time that user interface 832 is displayed after the remote participant has updated the representation.

Figure 8U:

Turning to FIG. 8U, in some embodiments, when an incoming call is received from the caller, in accordance with a determination that the caller does not have a representation associated with the phone call communication context (e.g., neither the caller nor the user of computer system 600*b* has created or selected a representation for the caller for a phone call communication context), computer system 600*b* displays default representation 806*g* (e.g., only a name), as displayed in call user interface 838.

Figure 8V:
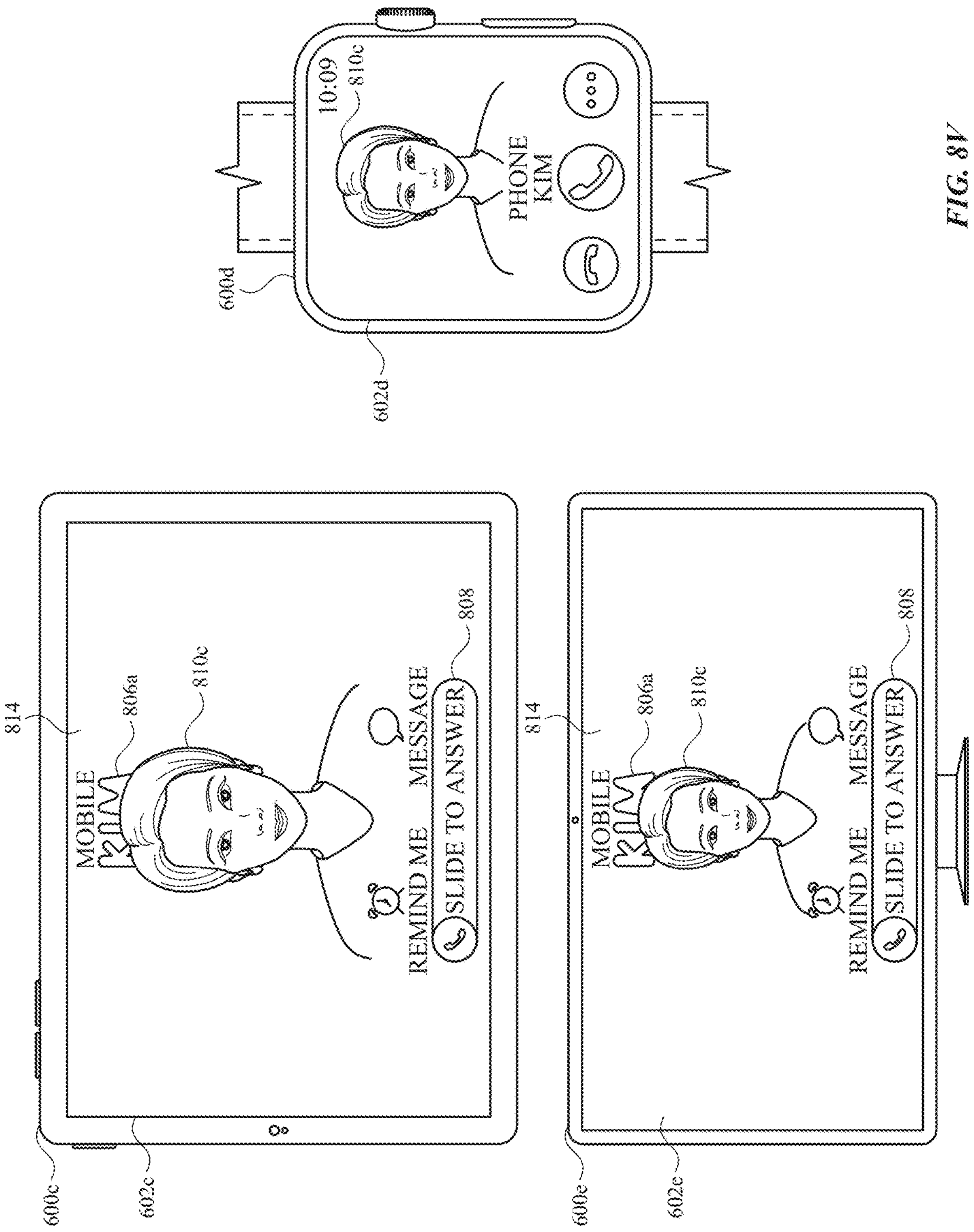

Turning to FIG. 8V, in some embodiments, the representation selected by a user for a communication context can be displayed on different types of computer systems. For example, FIG. 8V illustrates representation 810*c* displayed on display 602*b* of tablet computer 600*b*, display 602*c* of desktop computer 600*c*, and display 602*d* of watch computer 600*d*.

Figure 8W:
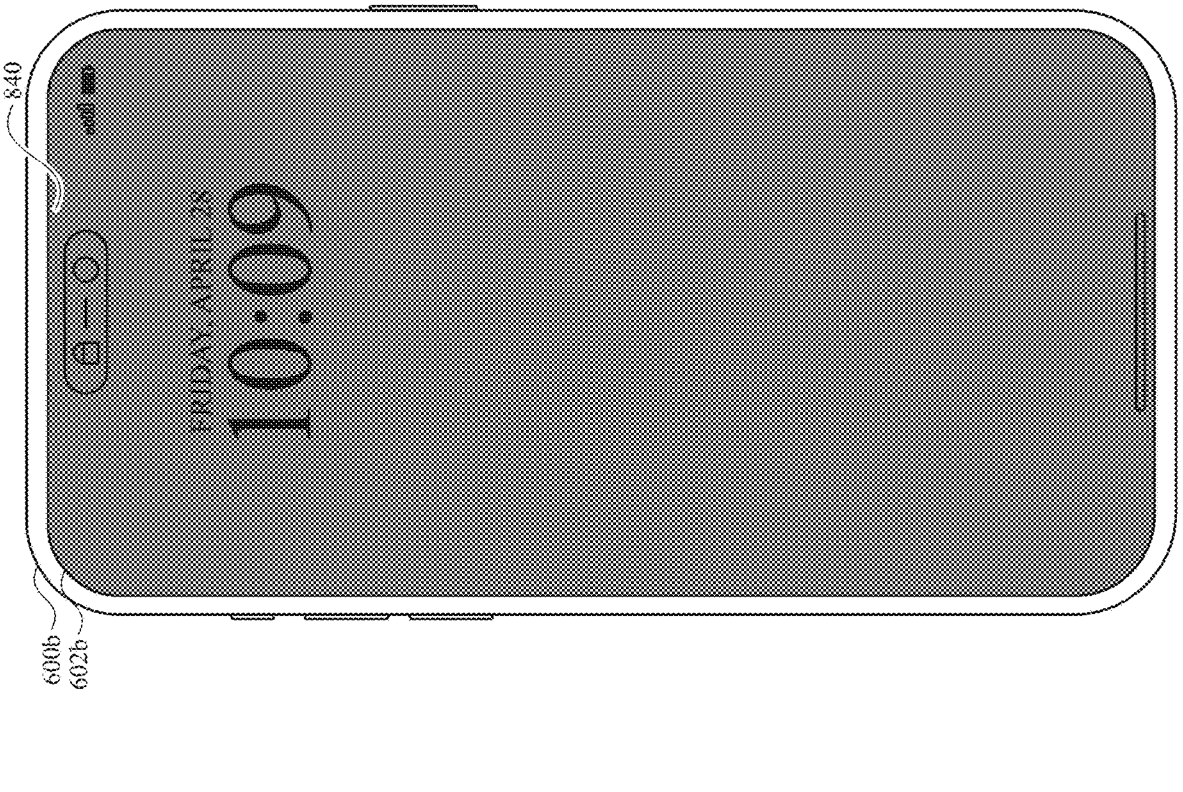
Figure 8X:
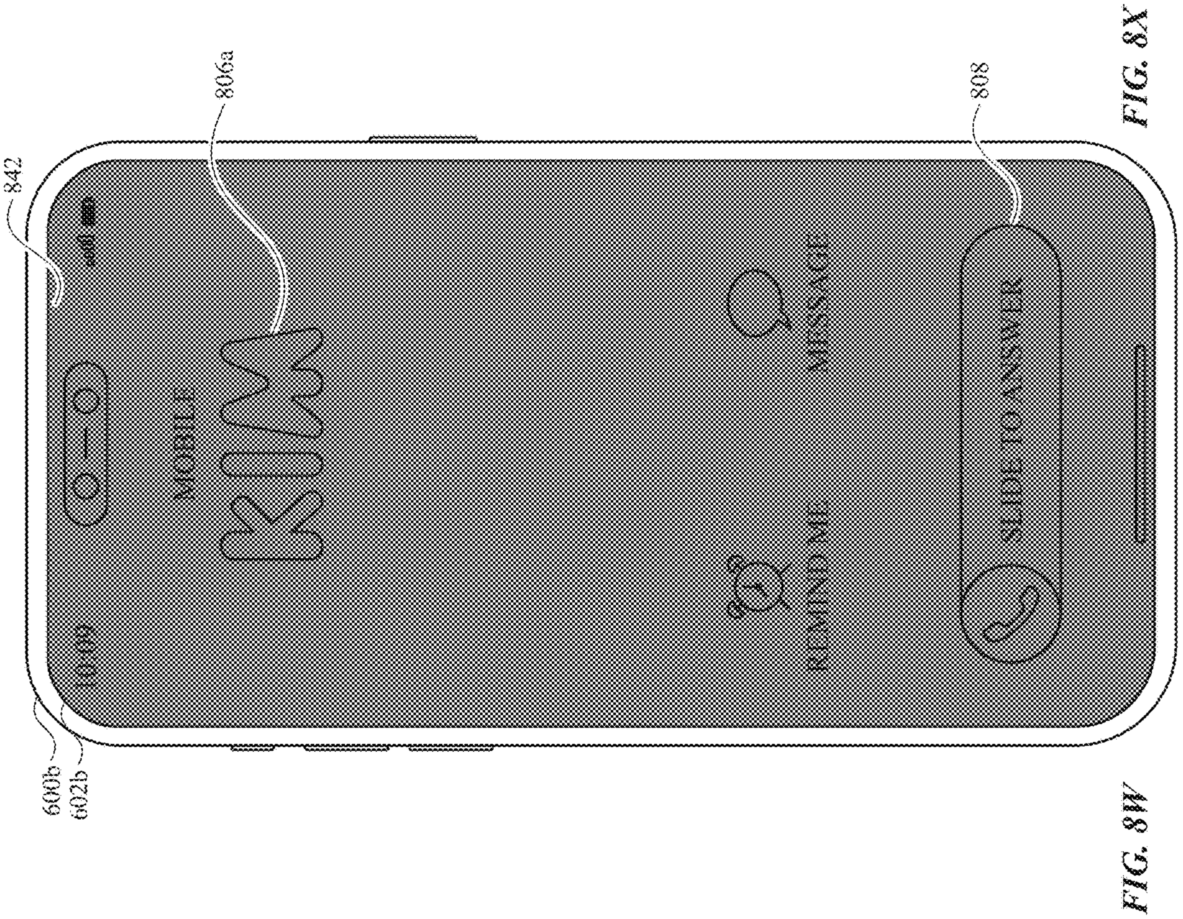
Figure 8Z:
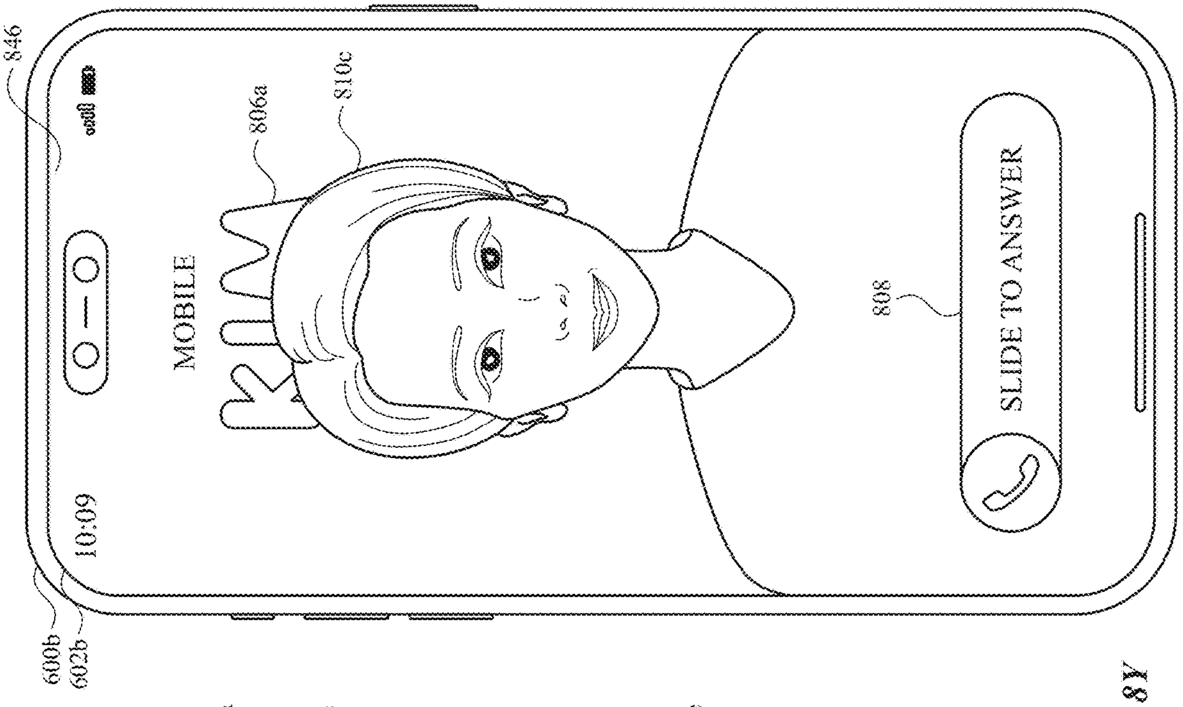

Turning to FIGS. 8W-8Z, an embodiment is illustrated in which a call is received while computer system 600*b* is in reduced power state (e.g., a sleep state and/or an inactive state). FIG. 8W illustrates computer system 600*b* displaying user interface 840 (e.g., a lock screen or a wake screen) in a reduced power state in which display 602*a* is in a dimmed or reduced brightness state. In FIG. 8X, computer system 600*b* receives an incoming call. In response to receiving the incoming call, computer system 600*b* displays user interface 842 with name 806*a* and answer option 808 while remaining in the reduced power state (e.g. display 602*a* remains in the dimmed and/or reduced brightness state) and without displaying representation 810*c*.

While displaying user interface 842 shown in FIG. 8X, computer system 600*b* detects a request to exit the reduced power state. In some embodiments, the request to exit the reduced power state includes an input on display 602*a*, a button press, and/or motion of computer system 600*b* that is determined to indicate that computer system 600*b* is being raised and/or looked at by a user. In response to detecting the request to exit the reduced power state, computer system 600*b* exits the reduced power state and displays representation 810*c* (e.g., computer system 600*b* displays call user interface 804, 812, 814, or 846).

Figure 8Y:
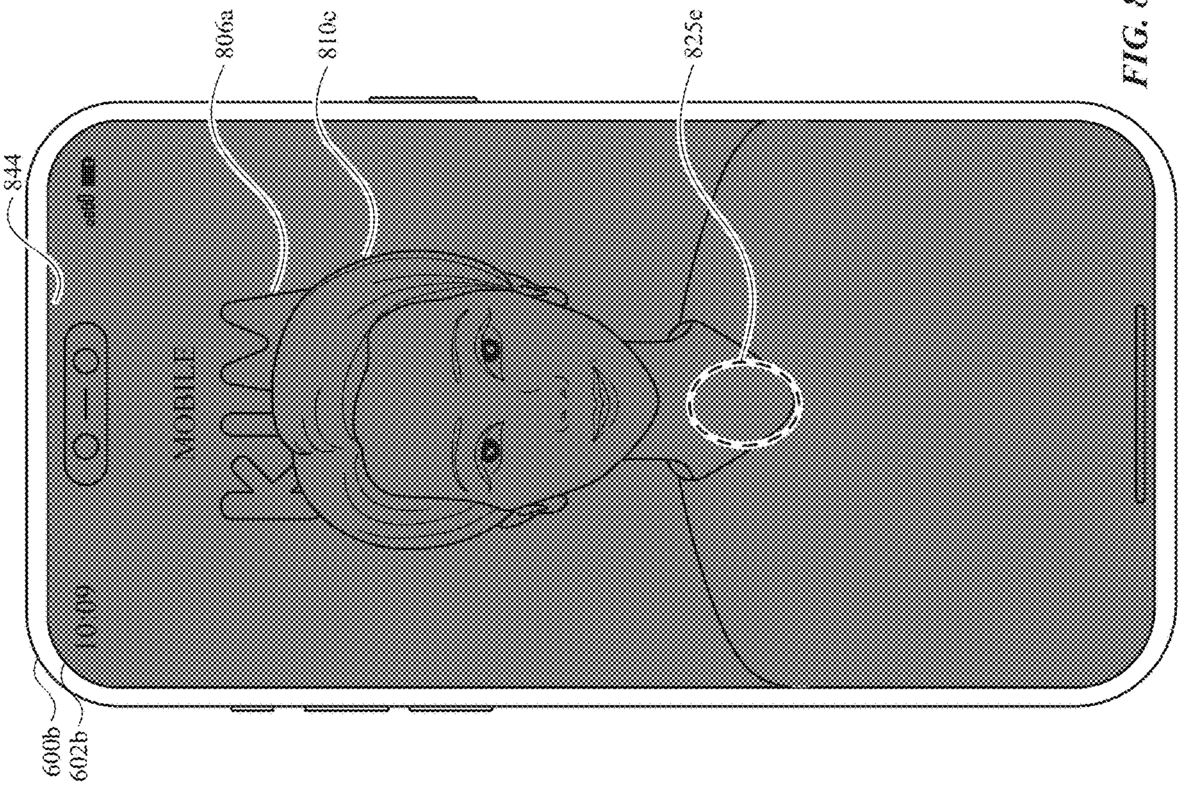
Figure 8A:
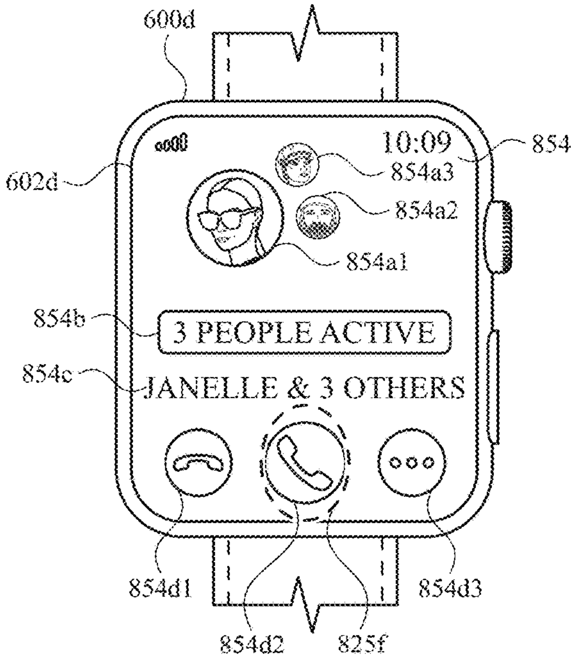
Figure 8A:
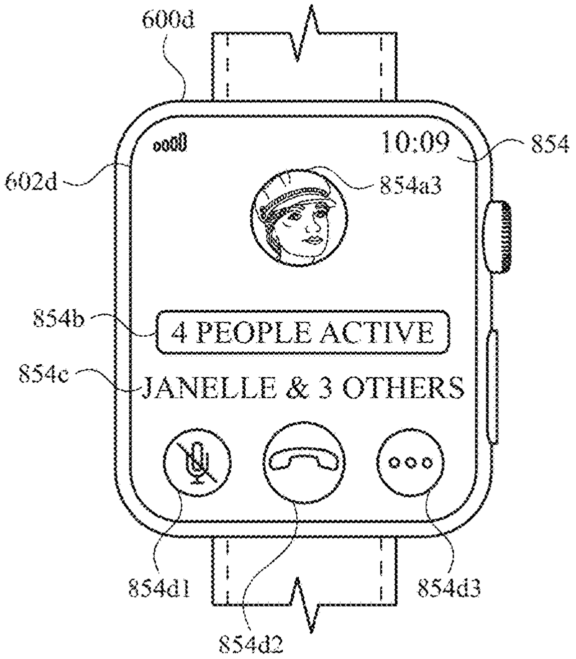
Figure 8A:
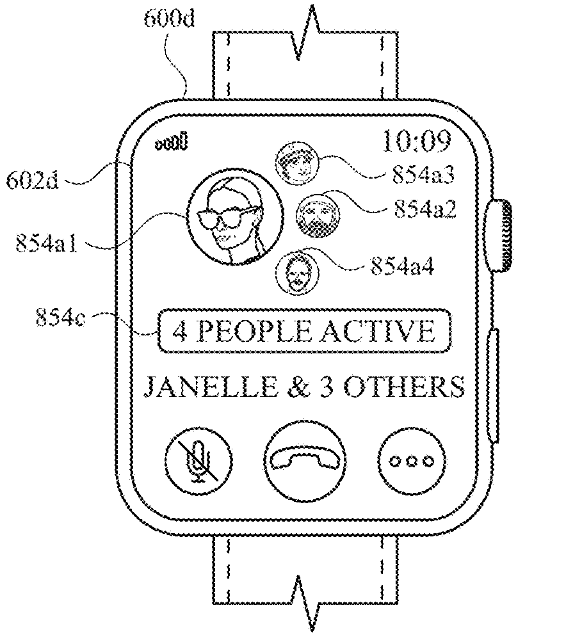
Figure 8A:
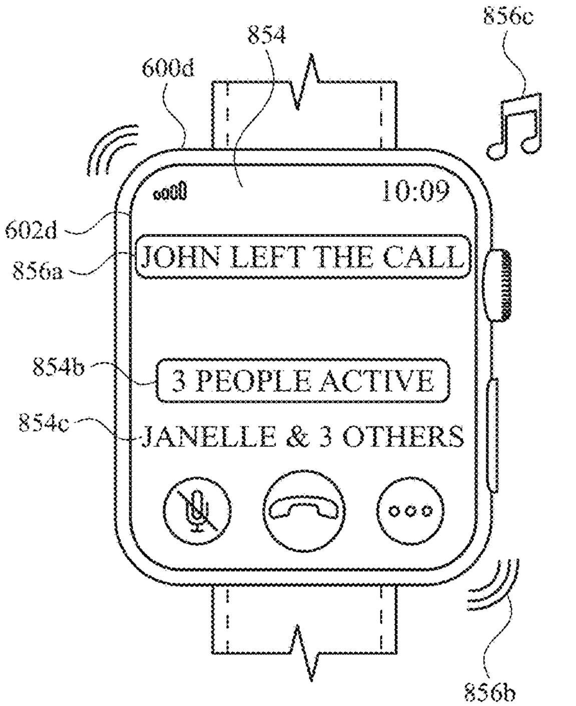
Figure 8A:
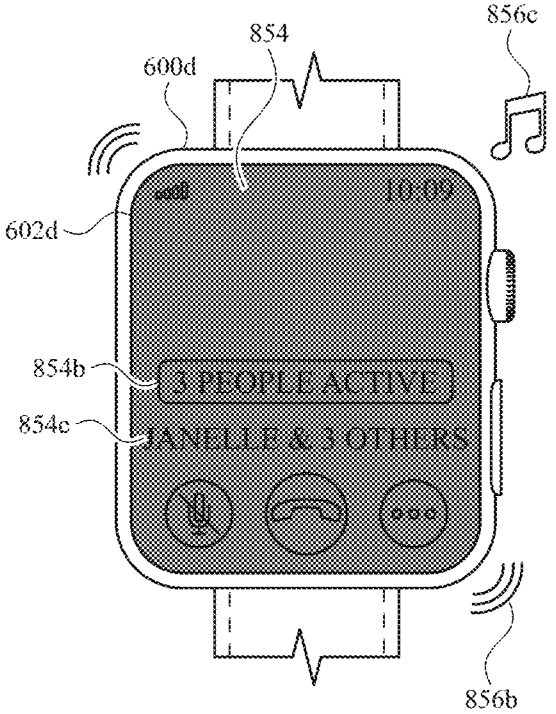

In some embodiments, in response to receiving the incoming call in FIG. 8W, computer system 600*b* displays user interface 844 with name 806*a* and representation 844 while remaining in the reduced power state (e.g. display 602*a* remains in the dimmed and/or reduced brightness state) and without displaying answer option 808, as shown in FIG. 8Y. In response to detecting a request to exit the reduced power state, computer system 600*b* exits the reduced power state and displays answer option 808 as shown in call user interface 846 in FIG. 8Z.

FIGS. 8AA-8AD illustrate techniques and user interfaces for providing a call with three or more participants, in accordance with some embodiments. In FIG. 8AA, computer system 600*d* receives a request to join a call (e.g., an audio call) with a group of four people (e.g., three remote people and the user of computer system 600*d*). In response to receiving the request to join the call, computer system 600*d* displays incoming call user interface 854. Call user interface 854 includes participant representations 854*a*1-854*a*3 of the participants (e.g., respective individual participants) that are actively in the group call. In some embodiments, computer system 600*d* displays a single representation that represents the group of participants as a whole (e.g., a group representation). Status indicator 854*b* (e.g., "3 people active") indicates the number of people that are actively in the group call. Group indicator 854*c* (e.g., Janelle & 3 Others") describes the group. Call control options 854*d*1-854*d*3 can be selected to perform respective functions associated with the group call. In response to detecting selection 825*f* of answer option 854*d*2, computer system 600*d* answers the group call so that the user of computer system 600*d* is an active participant. In response to computer system 600*d* joining the call, computer system 600*d* updates status indicator 854*b* to indicate that four people are active, as shown in FIG. 8AB.

In some embodiments, computer system 600*d* enlarges the representation of a participant that is actively speaking and removes display of representations of other (e.g., all other) participants. For example, in FIG. 8AB, the remote participant corresponding to participant representation 854*a*3 is actively speaking. As a result, computer system 600*d* enlarges display of participant representation 854*a*3 and does not display representations of other participants (e.g., participant representations 854*al* and 854*a*3).

In some embodiments, computer system 600*d* displays a representation of a participant that is actively speaking (or that was most recently speaking) at a larger size than representations of participants that are not speaking (or have not spoken as recently). For example, in FIG. 8AC, the participant corresponding to participant representation 854*al* is actively speaking (or was the participant that most recently spoke). As a result, computer system 600*d* displays participant representation 854*al* at a larger size than participant representations 854*a*2, 854*a*3, and 854*a*4. Notably, compared to call user interface 854 in FIG. 8AA, since computer system 600*d* is an active participant in the call, computer system 600*d* displays participant representation 854*a*4 corresponding to the user of computer system 600*d*.

In FIG. 8AD, a remote participant, John, leaves the group call. In response to the remote participant leaving the call, computer system 600*d* updates status indicator 854*b* and provides a notification. In some embodiments, providing the notification includes displaying notification 856*a* (e.g., "John left the call"), outputting tactile notification 856*b*, and/or outputting audio notification 856*c*. In some embodiments, if computer system 600*d* is in a reduced power state (e.g., a sleep state and/or an inactive state) when the remote participant leaves the call, computer system 600*d* remains in the reduced power state and provides an audio and/or tactile output, without displaying a notification (e.g., without displaying notification 856*a*), as shown in FIG. 8AE. In some embodiments, the techniques and user interfaces described with reference to FIGS. 8AA-AE are performed on computer system 600*a*, computer system 600*b*, computer system 600*c*, and/or computer system 600*e*.

FIG. 9 is a flow diagram illustrating a method for displaying a representation of an entity for a real-time communication using a computer system in accordance with some embodiments. Method 900 is performed at a computer system (e.g., 100, 300, 500, 600*a*, 600*b*, 600*c*, and/or 600*d*) (e.g., a smart phone, a smart watch, a tablet computer, a laptop computer, a desktop computer, a wearable device, and/or head-mounted device) that is in communication with (e.g., includes and/or is connected to) a display generation component (e.g., 112, 156, 602*a*, 602*b*, 602*c*, and/or 602*d*) (e.g., a display, touch-screen display, a monitor, a holographic display system, and/or a head-mounted display system). In some embodiments, the computer system is in communication with (e.g., includes and/or is connected to) one or more input devices (e.g., 112, 113, 116, 204, 206, 208, 602*a*, 602*b*, 602*c*, and/or 602*d*) (e.g., a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)).

As described below, method 900 provides an intuitive way for displaying a representation of an entity for a real-time communication. The method reduces the cognitive burden on a user for displaying a representation of an entity for a real-time communication, thereby creating a more efficient human-machine interface. For battery-operated computing devices, enabling a user to display a representation of an entity for a real-time communication faster and more efficiently conserves power and increases the time between battery charges. Some operations in method 900 are, optionally, combined, the orders of some operations are, optionally, changed, and some operations are, optionally, omitted.

The computer system receives (902) an incoming real-time communication (or, in some embodiments, receives an indication, such as data, information, and/or a signal, of an incoming real-time communication) from an entity (e.g., an entity that initiated the incoming real-time communication, a caller, a person, a user, a business, and/or a group) (e.g., 600*b* receives an incoming real-time communication in FIGS. 8B, 8C, 8D, 8E, 8G, 8H, 8I, 8J, 8K, 8L, 8M, 8U, 8V, 8X, 8Y, and 8Z). In some embodiments, the real-time communication is a phone call. In some embodiments, the real-time communication is an audio call. In some embodiments, the real-time communication is a video call. In some embodiments, the real-time communication includes real-time audio and/or video communication (e.g., an audio and/or video conference). In some embodiments, the real-time communication includes communication between two or more participants. In response to receiving the incoming real-time communication (or in some embodiments, in response to receiving an indication, such as data, information, and/or a signal, of the incoming real-time communication), and before the incoming real-time communication is accepted (e.g., before the incoming real-time communication is answered), the computer system displays (904), via the display generation component, a respective representation (e.g., 804, 806*a*, 806*b*, 806*c*, 806*d*, 806*e*, 806*f*, 806*g*, 810*a*, 812, 810*b*, 810*c*, 814, 816, 818, 822, 826, 838, 842, 844, and/or 846) of the entity, including: in accordance with a determination that a first set of criteria is met, wherein the first set of criteria includes a criterion that is met when the entity (e.g., "Kim" in FIGS. 8B-8E) that initiated the incoming real-time communication has selected a first representation of the entity (e.g., according to any of the techniques described in FIGS. 6A-6AG), the computer system displays (906), via the display generation component, the first representation of the entity (e.g., the respective representation of the entity includes (e.g., is) the first representation of the entity) (e.g., if the entity has selected a first representation for a real-time communication context, the computer system displays the first representation); and in accordance with a determination that a second set of criteria (e.g., a set of criteria that is different from the first set of criteria) is met, wherein the second set of criteria includes a criterion that is met when the entity that initiated the incoming real-time communication has selected a second representation of the entity that is different from the first representation of the entity, the computer system displays (908), via the display generation component, the second representation of the entity (e.g., the respective representation of the entity includes (e.g., is) the second representation of the entity) (e.g., if the entity has selected a second representation for the real-time communication context, the computer system displays the second representation). Displaying the respective representation of the entity in response to receiving the incoming real-time communication and before the incoming real-time communication is accepted informs the user of the entity that is attempting to communicate with the user, thereby providing improved visual feedback. Displaying a representation of the entity based on the representation selected by the entity enables the computer system to quickly and efficiently inform the user of the entity that initiated the incoming real-time communication and for the representation to be customized without having to navigate a user interface when the real-time communication is being received, thereby performing an operation when a set of conditions has been met without requiring further user input, providing improved visual feedback to the user, and reducing the number of inputs needed to perform an operation.

In some embodiments, the respective representation of the entity includes (e.g., is) a visual representation (e.g., 804, 806*a*, 806*b*, 806*c*, 806*d*, 806*e*, 806*f*, 806*g*, 810*a*, 812, 810*b*, 810*c*, 814, 816, 818, 822, 826, 838, 842, 844, and/or 846) that has been selected by the entity. Displaying a visual representation that has been selected by the entity enables the computer system to quickly and efficiently inform the user of the entity that initiated the incoming real-time communication without the need to navigate the user interface, thereby providing improved visual feedback and reducing the number of inputs needed to perform an operation. In some embodiments, the visual representation of the entity includes (e.g., is) a photo (e.g., of the entity) (e.g., 810*c*). Displaying a photo that has been selected by the entity enables the computer system to quickly and efficiently inform the user of the entity that initiated the incoming real-time communication without the need to navigate the user interface, thereby providing improved visual feedback and reducing the number of inputs needed to perform an operation. In some embodiments, the visual representation of the entity includes (e.g., is) an avatar (e.g., 810*b*, a character, a representation with an appearance that is based on one or more physical characteristics of the entity, and/or a representation with an appearance that is not based on a physical characteristic of the entity). Displaying an avatar that has been selected by the entity enables the computer system to quickly and efficiently inform the user of the entity that initiated the incoming real-time communication without the need to navigate the user interface, thereby providing improved visual feedback and reducing the number of inputs needed to perform an operation. In some embodiments, before the incoming real-time communication is accepted (e.g., while the incoming real-time communication is waiting to be answered), the computer system displays, via the display generation component, an animation (e.g., the animation of 810*b* shown and described with reference to FIGS. 8C-8D) that includes movement over time of the avatar (e.g., a predetermined animation and/or an animation that is based on physical movement of the entity). Displaying an animation that includes movement over time of the avatar enables the computer system to quickly and efficiently inform the user of the entity that initiated the incoming real-time communication and adds a dynamic element to the user interface without the need to navigate the user interface, thereby providing improved visual feedback and reducing the number of inputs needed to perform an operation. In some embodiments, the visual representation of the entity includes a monogram (e.g., 810*a*) (e.g., one or more initials of a name of the entity). In some embodiments, the monogram includes a motif of two or more letters (e.g., the initials of the entity) that are interwoven or otherwise combined. Displaying a monogram that has been selected by the entity enables the computer system to quickly and efficiently inform the user of the entity that initiated the incoming real-time communication without the need to navigate the user interface, thereby providing improved visual feedback and reducing the number of inputs needed to perform an operation.

In some embodiments, displaying the respective representation of the entity before the incoming real-time communication is accepted includes displaying the respective representation of the entity at a first magnification (e.g., the magnification of 810*c* shown in FIG. 8E); the computer system accepts (e.g., via 825*a*) the real-time communication (e.g., the incoming real-time communication); and in response to accepting the real-time communication (e.g., the incoming real-time communication), the computer system displays, via the display generation component, the respective representation of the entity at a second magnification (e.g., the magnification of 810*c* in FIG. 8F) that is greater than the first magnification (e.g., the computer system zooms in on the respective representation of the entity in response to accepting the real-time communication). Displaying the respective representation of the entity at a second magnification that is greater than the first magnification in response to accepting the real-time communication improves the visibility of the representation of the entity without the user having to provide additional input, thereby providing improved visual feedback to the user and reducing the number of inputs needed to perform an operation.

In some embodiments, after displaying the respective representation of the entity (e.g., 810*c* in FIG. 8F), the computer system receives an incoming second real-time communication from the entity; and in response to receiving the incoming second real-time communication, and before the incoming real-time communication is accepted, the computer system displays (e.g., automatically displaying without user input), via the display generation component, an updated respective representation (e.g., 806*g*) selected by the entity that is different from the respective representation of the entity (e.g., if the entity selects a new representation after the first real-time communication, the computer system displays the new representation in response to receiving the incoming second real-time communication). Displaying an updated respective representation selected by the entity that is different from the respective representation of the entity in response to receiving the incoming second real-time communication, and before the incoming real-time communication is accepted enables the computer system to automatically adapt to updates to the selected representation and more accurately inform the user of the entity that is initiating the real-time communication without requiring additional input, thereby providing improved visual feedback to the user and reducing the number of inputs needed to perform an operation.

In some embodiments, after displaying the respective representation (e.g., 810*c* in FIG. 8F) of the entity, the computer system receives an incoming third real-time communication from the entity; the computer system detects a request (e.g., 825*a*) (e.g., selection of an answer user interface element) to accept (e.g., answer and/or connect with) the incoming third real-time communication from the entity; and in response to detecting the request to accept the incoming third real-time communication, the computer system accepts (e.g., answers) the incoming third real-time communication and displays, via the display generation component, an updated respective representation (e.g., 806*g*) selected by the entity that is different from the respective representation of the entity (e.g., as shown in FIG. 8N) (e.g., if the entity selects a new representation after the first real-time communication, the computer system displays the new representation in response to accepting the incoming third real-time communication). Displaying an updated respective representation selected by the entity in response to detecting the request to accept the incoming third real-time communication, enables the computer system to automatically adapt to updates to the selected representation and more accurately inform the user of the entity that is initiating the real-time communication without requiring additional input, thereby providing improved visual feedback to the user and reducing the number of inputs needed to perform an operation.

In some embodiments, after displaying the respective representation of the entity, in response to a determination that a current respective representation selected by the entity is different from the respective representation of the entity displayed in response to receiving the incoming real-time communication (e.g., a determination that the user has updated the respective representation), the computer system displays, via the display generation component, an indication (e.g., 828*a*, 828*b*, 830*a*, 830*b*, 830*c*, 832*a*, 832*b*, and/or 832*c*) that the current respective representation is an updated respective representation (e.g., the respective representation selected by the entity has been updated since a communication context associated with the entity was last accessed). In some embodiments, displaying the indication that the current respective representation is an updated respective representation includes displaying a representation of the updated respective representation. In some embodiments, displaying the indication that the current respective representation is an updated respective representation includes displaying a first indication and then replacing display of the first indication with a second indication that is different from the first indication (e.g., changing the indication from the first indication to the second indication). In some embodiments, replacing display of the first indication with the second indication includes ceasing display of the first indication. In some embodiments, replacing display of the first indication with the second indication includes displaying an animation over time of the first indication changing to the second indication (e.g., an animation of a coin flipping and/or an animation that includes one or more intermediate states). Displaying an indication that the current respective representation is an updated respective representation in response to a determination that the current respective representation selected by the entity is different from the respective representation of the entity displayed in response to receiving the incoming real-time communication automatically informs the user of a change in the selected representation, thereby providing improved visual feedback to the user and performing an operation when a set of conditions has been met without requiring further user input.

In some embodiments, the computer system detects a selection (e.g., 825*c* and/or 825*d*) of the indication that the current respective representation is an updated respective representation; in response to detecting the selection of the indication that the current respective representation is an updated respective representation, the computer system displays, via the display generation component, a revert user interface element (e.g., 830*c*) (e.g., in a user interface of the real-time communication or in another user interface); the computer system detects a selection (e.g., 825*d*) of the revert user interface element; and after (e.g., in response to) detecting the selection of the revert user interface element, the computer system displays, via the display generation component, the respective representation (e.g., 830*a*) of the entity displayed in response to receiving the incoming real-time communication (e.g., display the previous representation of the entity). Displaying the revert user interface element in response to detecting the selection of the indication that the current respective representation is an updated respective representation informs the user of the option to revert the respective representation to a previous representation and enables the user to quickly and efficiently revert the respective representation to a previous representation, thereby providing improved visual feedback to the user and reducing the number of inputs needed to perform an operation. In some embodiments, displaying the revert user interface element includes displaying the revert user interface element in a user interface (e.g., 832) of a messaging application. Displaying the revert user interface element in a user interface of a messaging application informs the user of the option to revert the respective representation to a previous representation from a messaging communication context and enables the user to quickly and efficiently revert the respective representation to a previous representation, thereby providing improved visual feedback to the user and reducing the number of inputs needed to perform an operation.

In some embodiments, displaying the respective representation of the entity is performed while the computer system is in a reduced-power state (e.g., compared to a normal operating state) (e.g., FIG. 8X and/or FIG. 8Y). In some embodiments, while the computer system is in the reduced-power state, a display of the computer system has a reduced brightness (e.g., compared to a normal operating state) and/or has reduced functionality (e.g., compared to a normal operating state). Displaying the respective representation of the entity is performed while the computer system is in a reduced-power state enables the computer system to inform the user of the entity that initiated the real-time communication while reducing power consumption, thereby providing improved visual feedback and improving battery life. In some embodiments, displaying the respective representation of the entity while the computer system is in a reduced-power state includes displaying the respective representation (e.g., 810*c* in FIG. 8Y) of the entity without displaying a (e.g., any) user-interactive graphical user interface element (e.g., 808) (e.g., without displaying any graphical buttons for controlling the computer system); while displaying the respective representation of the entity while the computer system is in the reduced-power state, the computer system detects a predefined movement of the computer system (or, in some embodiments, a portion of the computer system) (e.g., a movement that is indicative of picking up the computer system, looking at the computer system, and/or a wrist raise gesture); and in response to detecting the predefined movement of the computer system, the computer system displays (e.g., maintaining display of) the respective representation (e.g., 810*c* in FIG. 8Y) of the entity without displaying a (e.g., any) user-interactive graphical user interface element (e.g., 808) (e.g., without displaying any graphical buttons for controlling the computer system). Displaying the respective representation of the entity without displaying a user-interactive graphical user interface element in response to detecting the predefined movement of the computer system enables the computer system to inform the user of the entity that initiated the real-time communication while reducing power consumption, thereby providing improved visual feedback and improving battery life. In some embodiments, the computer system is in communication with (e.g., includes and/or is connected to) a touch-sensitive surface (e.g., 602*b*) (e.g., a touch-sensitive display); after displaying the respective representation of the entity without displaying a (e.g., any) user-interactive graphical user interface element in response to detecting the predefined movement of the computer system, the computer system detects a contact (e.g., 825*e*, a tap, and/or other touch gesture) on the touch-sensitive surface; and in response to detecting the contact on the touch-sensitive surface, the computer system displays, via the display generation component, one or more user interface elements (e.g., 808 shown in FIG. 8Z) (e.g., user-interactive user interface elements, selectable user interface elements, selectable options, buttons, selectable icons, and/or affordances) for performing respective functions associated with the incoming real-time communication (e.g., a graphical element that when selected causes the computer system to accept the incoming real-time communication; a graphical element that when selected causes the computer system to decline the incoming real-time communication; a graphical element that when selected causes the computer system to send the incoming real-time communication to a voicemail service; a graphical element that when selected causes the computer system to initiate a message (e.g., a text message or email) to the entity; and/or a graphical element that when selected causes the computer system to initiate a process for setting a reminder to call the entity). Displaying one or more user interface elements for performing respective functions associated with the incoming real-time communication in response to detecting the contact on the touch-sensitive surface enables the computer system to provide controls when they are relevant to the user without additional input and while reducing power consumption, thereby providing improved visual feedback, providing additional control options without cluttering the user interface with additional displayed controls, and improving battery life.

In some embodiments, displaying the respective representation of the entity includes displaying the respective representation of the entity with a black background (e.g., without displaying a background). Displaying the respective representation of the entity includes displaying the respective representation of the entity with a black background informs the user of the entity that initiated the incoming real-time communication while reducing power consumption, thereby providing improved visual feedback and improving battery life.

In some embodiments, the respective representation of the entity includes a name (e.g., 806*a*, 806*b*, 806*c*, 806*d*, 806*e*, 806*f*, and/or 806*g*) selected by the entity. Including a name selected buy the entity in the respective representation of the entity enables the computer system to quickly and efficiently inform the user of the entity that initiated the incoming real-time communication and to customize the respective representation without the user navigating a user interface, thereby providing improved visual feedback to the user and reducing the number of inputs needed to perform an operation. In some embodiments, displaying the respective representation of the entity includes: in accordance with a determination that the name selected by the entity is different from a name (e.g., a previous name) associated with the entity by the computer system (e.g., 806*a* in FIG. 8L) (e.g., in an account and/or application associated with the computer system) and the name selected by the entity has been approved (e.g., via selection 825*b* of 814*b*) by a user associated with the computer system, the computer system displays the respective representation of the entity with the name selected by the entity (e.g., 806*f*); and in accordance with a determination that the name selected by the entity is different from a name associated with the entity by the computer system and the name selected by the entity has not been approved by a user associated with the computer system (e.g., 814*c* is selected in FIG. 8L), the computer system displays the respective representation of the entity with the name associated with the entity by the computer system. Displaying an updated representation of the entity with the name selected by the entity based on whether the name has been approved by the user of the computer system enables the computer system to avoid confusion that can cause user error and require additional inputs, thereby providing improved visual feedback to the user and reducing the number of inputs needed to perform an operation.

In some embodiments, displaying the respective representation of the entity includes displaying a name of the entity in a font selected by the entity (e.g., via 625*c* in FIG. 6H). Displaying the name of the entity in the font selected by the entity enables the computer system to quickly and efficiently inform the user of the entity that initiated the incoming real-time communication and to customize the respective representation without requiring the user to navigate the user interface, thereby providing improved visual feedback and reducing the number of inputs needed to perform an operation. In some embodiments, displaying the respective representation of the entity includes displaying a name of the entity and an image in a format selected by the entity (e.g., via 625*g* in FIG. 6J and/or 625*h* in FIG. 6K). Displaying the name of the entity and an image in the format selected by the entity enables the computer system to quickly and efficiently inform the user of the entity that initiated the incoming real-time communication and to customize the respective representation without requiring the user to navigate the user interface, thereby providing improved visual feedback and reducing the number of inputs needed to perform an operation. In some embodiments, displaying the respective representation of the entity includes displaying a visual representation of the entity with a color selected by the entity (e.g., via selection of a color option in 624*c* of FIG. 6H). Displaying the visual representation of the entity with a color selected by the entity enables the computer system to quickly and efficiently inform the user of the entity that initiated the incoming real-time communication and to customize the respective representation without requiring the user to navigate the user interface, thereby providing improved visual feedback and reducing the number of inputs needed to perform an operation.

In some embodiments, displaying the respective representation of the entity includes: in accordance with a determination that a user associated with the computer system (e.g., the recipient of the real-time communication) has selected a third representation of the entity (e.g., via one or more of the techniques shown an described in FIGS. 6V-6AG) that is different from a representation selected by the entity (e.g., a recipient of the incoming real-time communication has overridden the preference of the entity for the representation of the entity), displaying, via the display generation component, the third representation of the entity (e.g., the representation selected by the user associated with the computer system). In some embodiments, the first set of criteria is not met and the second set of criteria is not met if the user associated with the computer system has selected a third representation of the entity that is different from a representation selected by the entity. Displaying the third representation of the entity in accordance with a determination that a user associated with the computer system has selected a third representation of the entity that is different from a representation selected by the entity enables the computer system to display a representation of the entity that is familiar to the user without additional user input when the incoming real-time communication is received and to better inform the user of the entity that initiated the real-time communication, thereby performing an operation when a set of conditions has been met without requiring further user input, providing improved visual feedback, and reducing the number of inputs needed to perform an operation. In some embodiments, displaying the third representation of the entity (e.g., the representation selected by the user associated with the computer system) includes displaying the third representation of the entity with a first layout (e.g., the layout shown in FIG. 6J, FIG. 8B, FIG. 8C, or FIG. 8E) (e.g., configuration of a name, photo, and/or call status identifier) and displaying the first representation (or, in some embodiments, the second representation) of the entity (e.g., the representation selected by the caller) includes displaying the first representation (or, in some embodiments, the second representation) with a second layout (e.g., the layout shown in FIG. 6K or FIG. 8K) that is different from the first layout (e.g., the representation displayed when the recipient has overridden the caller's selected representation has a different layout than the representation selected by the caller). Displaying the third representation of the entity with a first layout displaying the first representation with a second layout that is different from the first layout enables the computer system to customize the representation of the entity without requiring additional user input and to better inform the user of the entity, thereby providing improved visual feedback and reducing the number of inputs needed to perform an operation.

In some embodiments, the first set of criteria includes a criterion that is met when the computer system is a first type of computer system (e.g., 600*a* or 600*b*) (e.g., phone, tablet computer, desktop computer, laptop computer, or watch) or a second type of computer system (e.g., 600*c*, 600*d*, or 600*e*) that is different from the first type of computer system (e.g., the respective representation of the entity is used on different platforms). In some embodiments, the second set of criteria includes a criterion that is met when the computer system is the first type of computer system or the second type of computer system. Including a criterion that is met when the computer system is a first type of computer system or a second type of computer system that is different from the first type of computer system enables the respective representation to be displayed on different types of computer system and for the computer system to provide consistency to the user across platforms to avoid user confusion and input errors, thereby providing improved visual feedback and reducing the number of inputs needed to perform an operation.

In some embodiments, displaying the respective representation of the entity includes: in accordance with a determination that the incoming real-time communication is from an unknown entity (e.g., an unknown caller, an unknown source, and/or a number or entity that is not saved as a contact by the computer system), displaying the respective representation of the entity with a first predefined color (e.g., as shown and described with reference to FIG. 8H) (e.g., a color that identifies the incoming real-time communication as being from an unknown caller or source; and/or a color that is unique to unknown callers). In some embodiments, in accordance with a determination that the incoming real-time communication is from an unknown entity, the computer system displays the respective representation of the entity with text and/or a background having the first predefined color. Displaying the respective representation of the entity with a first predefined color in accordance with a determination that the incoming real-time communication is from an unknown entity enables the computer system to quickly and efficiently inform the user that the incoming real-time communication is from an unknown entity to avoid unnecessary inputs (e.g., answering an undesired real-time communication), thereby performing an operation when a set of conditions has been met without requiring further user input, providing improved visual feedback, and reducing the number of inputs needed to perform an operation. In some embodiments, the first predefined color is not available for selection (e.g., by a user such as the caller or the recipient) as a color for the respective representation (e.g., the first predefined color is not available for selection in set of color options 624*c*). Having the first predefined color not be available for as a color for the respective representation enables the computer system to quickly and efficiently inform the user that the incoming real-time communication is from an unknown entity to avoid unnecessary inputs (e.g., answering an undesired real-time communication), thereby providing improved visual feedback and reducing the number of inputs needed to perform an operation.

In some embodiments, displaying the respective representation of the entity includes: in accordance with a determination that the incoming real-time communication is from a business (e.g., an official business), displaying the respective representation of the entity with a second predefined color (e.g., a color that identifies the incoming real-time communication as being a known or official business; and/or a color that is unique to official businesses) (e.g., as shown and described with reference to FIG. 8I). In some embodiments, in accordance with a determination that the incoming real-time communication is from a business, the computer system displays the respective representation of the entity with text and/or a background having the second predefined color. Displaying the respective representation of the entity with a second predefined color in accordance with a determination that the incoming real-time communication is from a business enables the computer system to quickly and efficiently inform the user that the incoming real-time communication is from a business and prevent errors by avoiding confusion with other types of entities, thereby performing an operation when a set of conditions has been met without requiring further user input, providing improved visual feedback, and reducing the number of inputs needed to perform an operation. In some embodiments, the second predefined color is not available for selection (e.g., by a user such as the caller or the recipient) as a color for the respective representation (e.g., the second predefined color is not available for selection in set of color options 624*c*). Having the second predefined color not available for as a color for the respective representation enables the computer system to inform the user of the entity and avoid confusion with other types of entities, thereby providing improved visual feedback and reducing the number of inputs needed to perform an operation.

In some embodiments, displaying the respective representation of the entity includes: in accordance with a determination that a visual representation has not been selected (e.g., by the caller or the recipient) for the entity (e.g., neither the caller nor the recipient has set up a custom appearance for the representation of the caller), displaying the respective representation of the entity with a predefined (e.g., generic) visual representation (e.g., a visual representation that is not unique to the entity) (e.g., as shown in FIG. 8U). Displaying the respective representation of the entity with a predefined visual representation in accordance with a determination that a visual representation has not been selected for the entity enables the computer system to customize the respective representation based on the entity without requiring a user to navigate the user interface, thereby performing an operation when a set of conditions has been met without requiring further user input, providing improved visual feedback, and reducing the number of inputs needed to perform an operation.

In some embodiments, in accordance with a determination that a real-time communication (e.g., an incoming rea-time communication or an outgoing real-time communication) is determined to be an emergency communication (e.g., an SOS call, a call to or from an emergency service, and/or a call to or from 911), the computer system displays a real-time communication user interface (e.g., a call user interface) with a dark (e.g., a black) background. Displaying the real-time communication interface with a dark background provides the user with privacy and avoids drawing attention to the computer system in a potential emergency.

In some embodiments, displaying the respective representation of the entity includes: in accordance with a determination that a respective geographic region associated with the incoming real-time communication is a first geographic region (e.g., the entity is determined to be located in or otherwise associated with the first geographic region, the computer system receiving the incoming real-time communication is determined to be physically located in the first geographic region, and/or a parameter of the computer system receiving the incoming real-time communication is set to the first geographic region), displaying the respective representation of the entity in a first format (e.g., a first layout, a first font, a first size, a first color, and/or a first configuration) (e.g., the layout shown in FIG. 8B); and in accordance with a determination that the respective geographic region associated with the incoming real-time communication is a second geographic region that is different from the first geographic region (e.g., the entity is determined to be located in or otherwise associated with the second geographic region, the computer system receiving the incoming real-time communication is determined to be physically located in the second geographic region, and/or a parameter of the computer system receiving the incoming real-time communication is set to the second geographic region), displaying the respective representation of the entity in a second format (e.g., a second layout, a second font, a second size, a second color, and/or a second configuration) (e.g., the layout shown in FIG. 6K or FIG. 8K) that is different from the first format. Displaying the respective representation of the entity in a format that is based on a geographic region enables the computer system to customize the respective representation for different regions and provide a representation that is appropriate for a particular region without requiring the user to provide additional user input, thereby performing an operation when a set of conditions has been met without requiring further user input, providing improved visual feedback, and reducing the number of inputs needed to perform an operation.

In some embodiments, the respective geographic region is a geographic region associated with the entity (e.g., the format is based on a geographic region of the caller). Displaying the respective representation based on the geographic region associated with the entity enables the computer system to customize the respective representation based on a region relevant to the entity without requiring a user to navigate a user interface, thereby providing improved visual feedback and reducing the number of inputs needed to perform an operation. In some embodiments, the respective geographic region is a geographic region associated with a recipient of the incoming real-time communication (e.g., a geographic region associated with the computer system and/or a user associated with the computer system). Displaying the respective representation based on the geographic region associated with the recipient of the incoming real-time communication enables the computer system to customize the respective representation based on a region relevant to the recipient of the incoming real-time communication without requiring a user to navigate a user interface, thereby providing improved visual feedback and reducing the number of inputs needed to perform an operation. In some embodiments, the respective geographic region is a geographic region associated with a setting of the computer system (e.g., a geographic region setting of the computer system). Displaying the respective representation based on the geographic region associated with a setting of the computer system enables the computer system to customize the respective representation in a way that is relevant to the computer system receiving the incoming real-time communication without requiring a user to navigate a user interface, thereby providing improved visual feedback and reducing the number of inputs needed to perform an operation. In some embodiments, the respective geographic region is associated with a language setting of the computer system (e.g., the computer system displays the respective representation in different formats for different language settings; e.g., the computer system displays the respective representation in a different format when a language setting is set to English than when the language setting is set to Japanese, Korean, or Chinese). Displaying the respective representation based on a language setting of the computer system enables the computer system to customize the respective representation in a way that is relevant to the computer system receiving the incoming real-time communication without requiring a user to navigate a user interface, thereby providing improved visual feedback and reducing the number of inputs needed to perform an operation. In some embodiments, the respective representation is displayed in a format associated with the respective geographic region (e.g., the first format or the second format) when the computer system is not physically located in the geographic region (e.g., a user can select the format associated with the respective geographic region for use outside the respective geographic region). Displaying the respective representation in a format associated with the respective geographic region when the computer system is not physically located in the geographic region enables the computer system to provide a format of a region that may be desirable to a user even if the user, the entity, or the computer system are not otherwise associated with the geographic region, thereby providing improved visual feedback and reducing the number of inputs needed to perform an operation.

In some embodiments, the real-time communication includes three or more participants (e.g., active participants and/or invited participants; e.g., the entity, a user associated with the computer system, and one or more other participants) (e.g., as described with reference to FIGS. 8AA-8AE). In some embodiments, in response to a determination (e.g., after the incoming real-time communication is accepted and/or while the real-time communication is in progress) that a number of active participants of the real-time communication has changed (e.g., a participant has joined or left the real-time communication), the computer system outputs a tactile output (e.g., 856*b*) (e.g., without displaying a notification). Outputting a tactile output in response to a determination that a number of active participants of the real-time communication has changed enables the computer system to quickly and efficiently inform the user of a change in the state of the real-time communication without navigating a user interface or having to activate a display, thereby performing an operation when a set of conditions has been met without requiring further user input, providing improved visual feedback, and reducing the number of inputs needed to perform an operation. In some embodiments, after outputting the tactile output, the computer system detects a predefined movement of the computer system (or, in some embodiments, a portion of the computer system) (e.g., a movement that is indicative of picking up the computer system, looking at the computer system, and/or a wrist raise gesture); and in response to detecting the predefined movement of the computer system, the computer system displays a notification (e.g., 856*a*) that includes information about the change in the number of active participants of the real-time communication (e.g., a name of a participant that joined or left the real-time communication, a time that the participant joined or left the real-time communication, and/or whether the participant joined or left the real-time communication). Displaying a notification that includes information about the change in the number of active participants of the real-time communication in response to detecting the predefined movement of the computer system enables the computer system to avoid unnecessarily displaying the notification (e.g., when the user is not looking at the computer system) to reduce power consumption, and to display the notification when there is an indication that the user desires the notification, thereby performing an operation when a set of conditions has been met without requiring further user input, providing improved visual feedback, and improving battery life.

Note that details of the processes described above with respect to method 900 (e.g., FIG. 9) are also applicable in an analogous manner to the methods described above and below. For example, methods 700, 1100, 1300, and/or 1500 optionally include one or more of the characteristics of the various methods described above with reference to method 900. For example, the respective representation of the entity in method 900 is selected as described in method 700 and/or displayed according to the techniques described method 900 in the real-time communication user interface in method 1100, with the transcript of the voice message in method 1300, and/or with the video message user interface element in method 1500. For brevity, these details are not repeated below.

FIGS. 10A-10G illustrate exemplary user interfaces for managing real-time communications and, in particular, switching between real-time communications (e.g., phone calls), in accordance with some embodiments. The user interfaces in these figures are used to illustrate the processes described below, including the processes in FIG. 11.

Figure 10B:
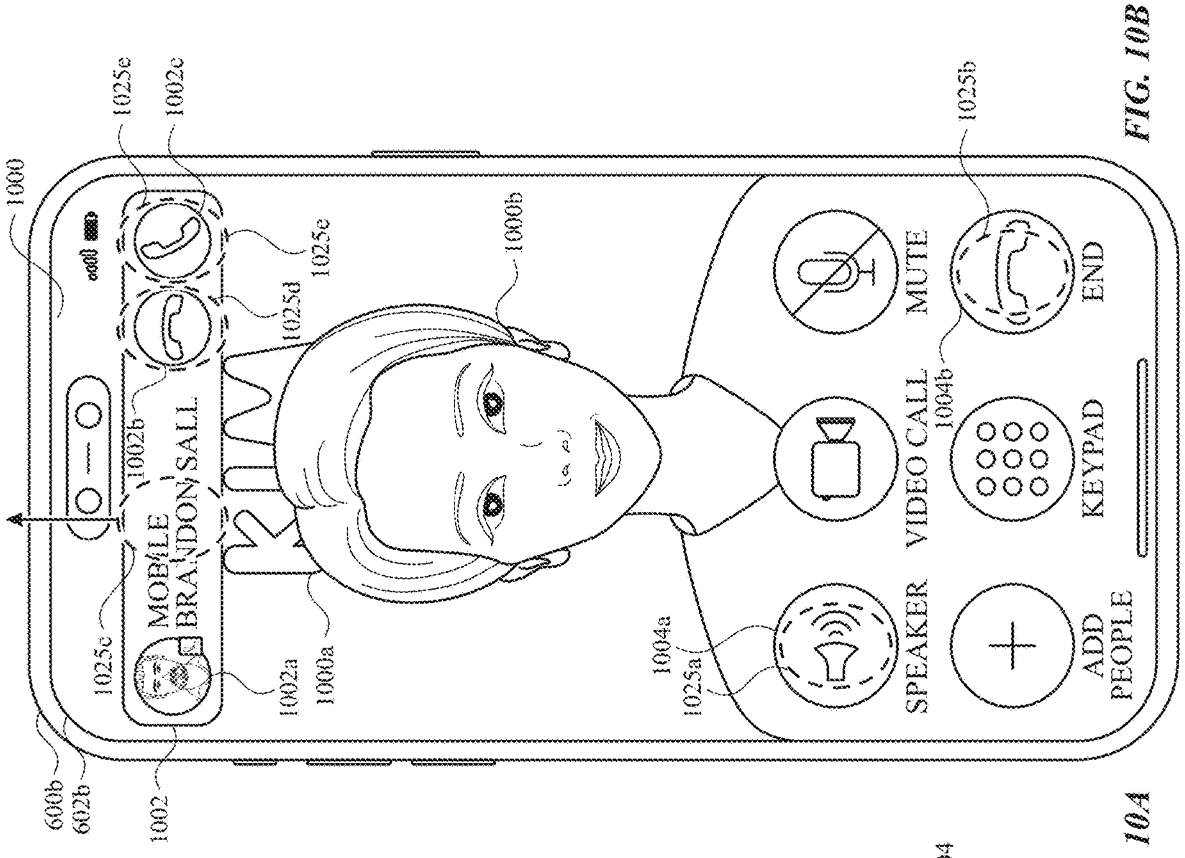
FIGS. 10A-10G illustrate user interfaces for managing real-time communications, in accordance with some embodiments.
Figure 10A:
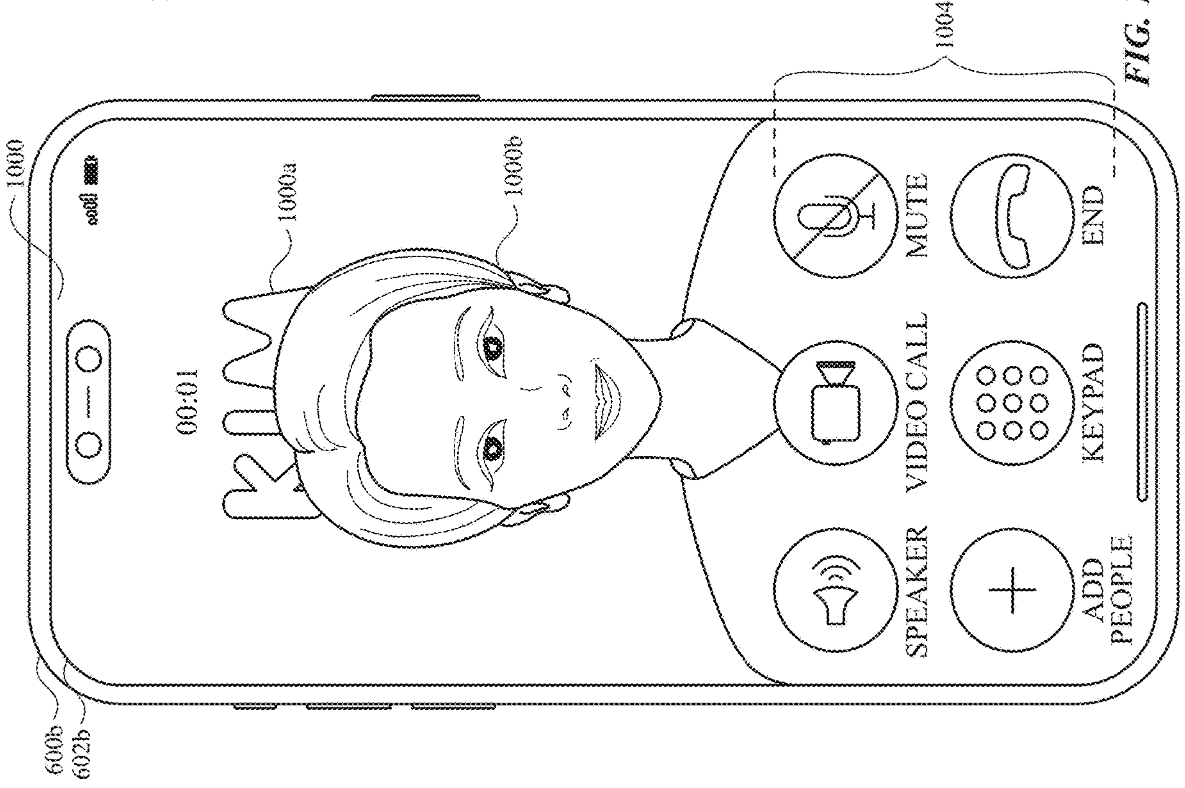

In FIG. 10A, computer system **600*b* is in an ongoing first real-time communication (e.g., a phone call with Kim). Computer system 600*b* displays a user interface for the first real-time communication, call user interface 1000. Call interface 1000 includes information about the first real-time communication and call control options 1004**. The information about the first real-time communication includes, e.g., the duration of the first real-time communication, the name of the caller of the first real-time communication, and a graphical representation of the caller of the first real-time communication.

In FIG. 10B, while the first real-time communication is ongoing, computer system **600*b* receives an incoming second real-time communication (e.g., a phone call from Brandon Sall). In response to receiving the incoming second real-time communication, computer system 600*b* displays alert 1002. In the example illustrated in FIG. 10B, alert 1002 is displayed concurrently with (e.g., overlaid on) call user interface 1000. Alert 1002 includes information 1002*a*** about the second real-time communication, such as the caller's name, a photo or other graphical representation of the caller, and an indication of the device from which the caller is calling (e.g., "Mobile").

Figure 10D:
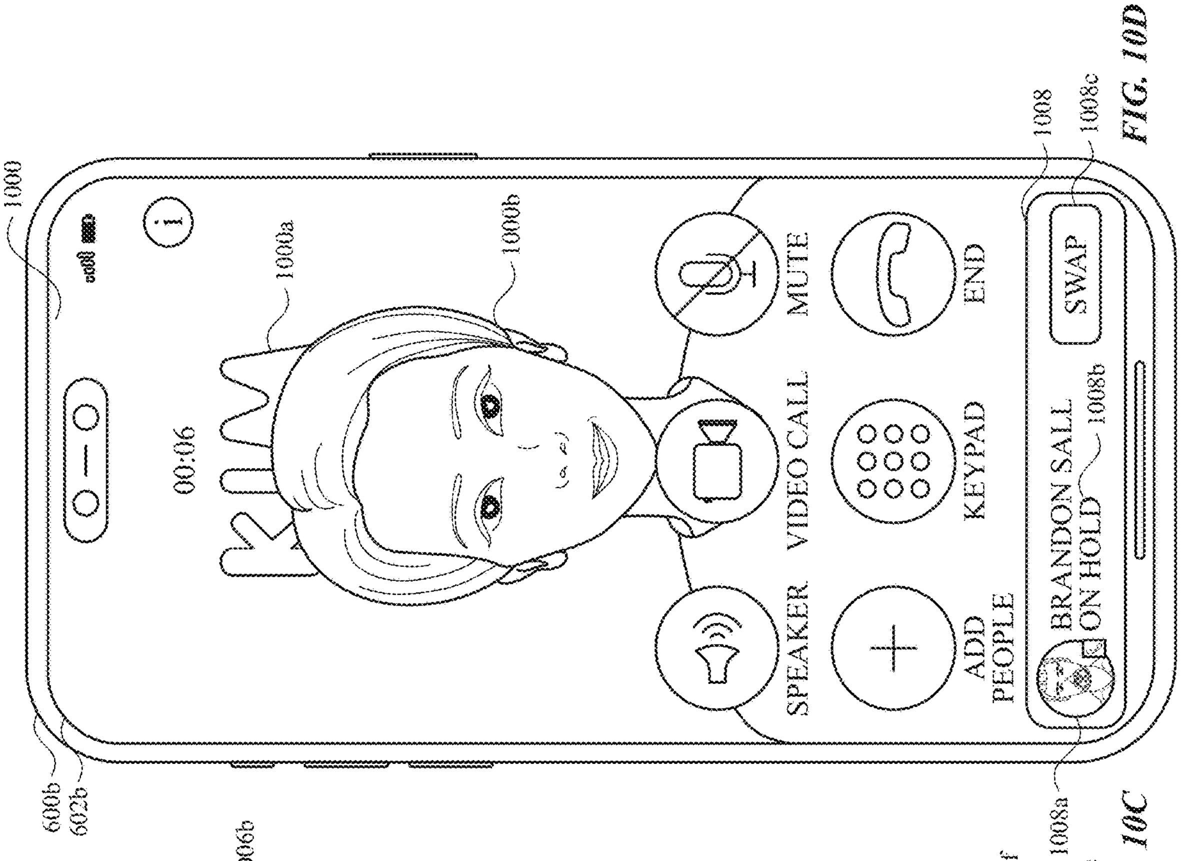
Figure 10C:
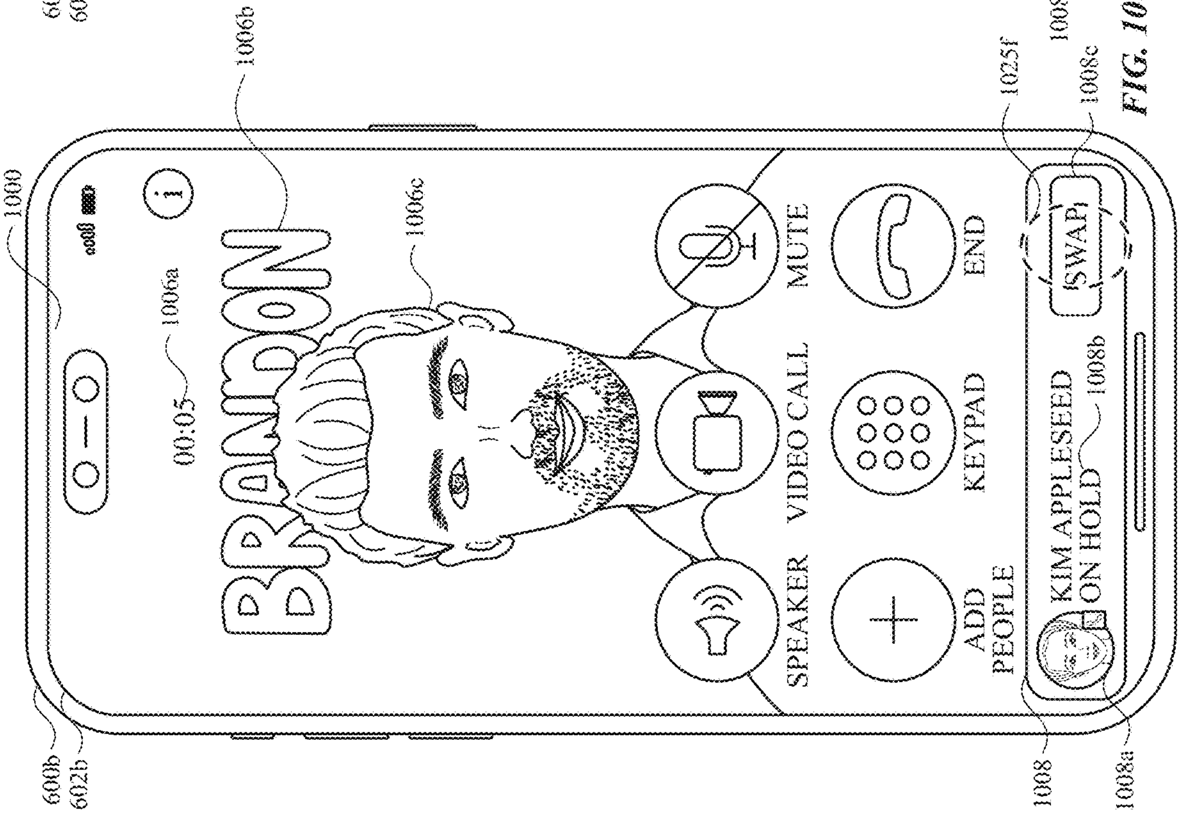
Figure 10F:
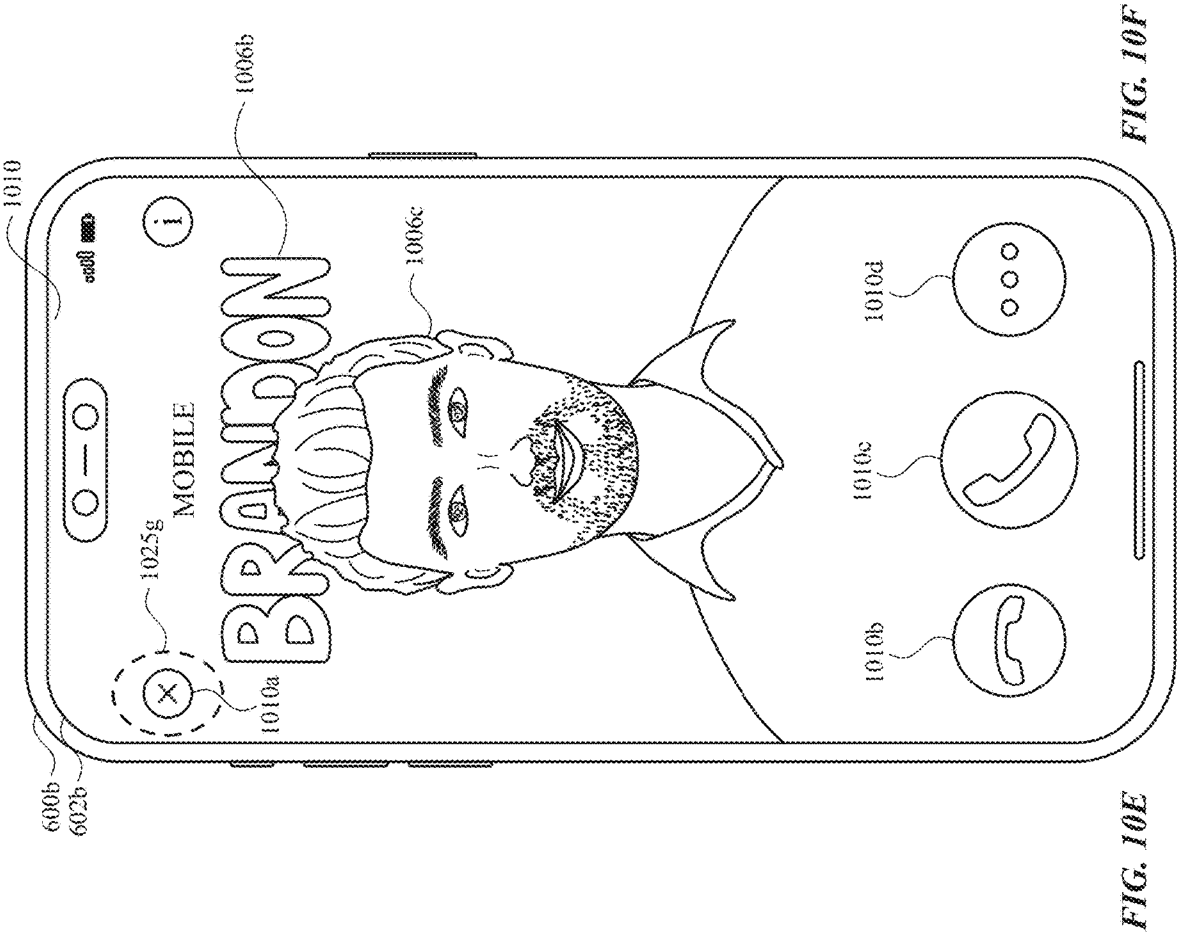
Figure 10E:
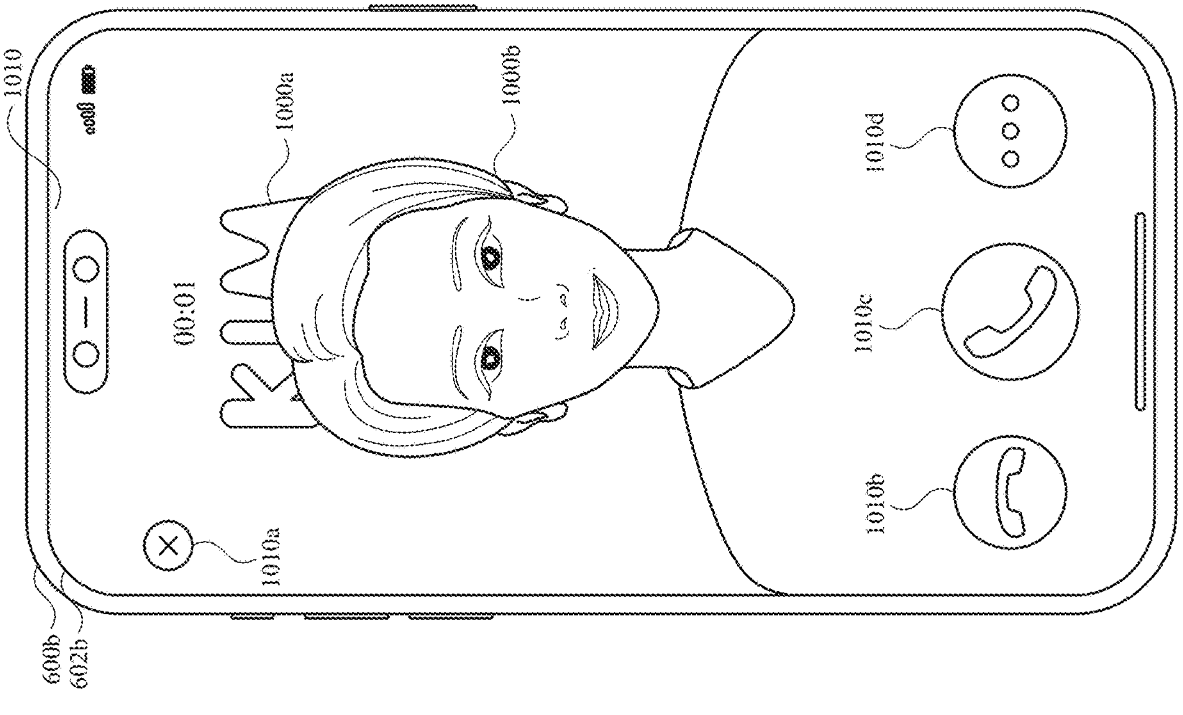
Figure 10G:

In FIG. 10B, computer system **600*b* remains connected to the first real-time communication with Kim. While the second real-time communication is incoming, computer system 600*b* can respond to request and perform operations associated with the ongoing first real-time communication session. For example, in FIG. 10B, in response to detecting selection 1025*a* of speaker option 1004*a*, computer system 600*b* activates a speaker to output audio of the ongoing first real-time communication session, while maintaining display of alert 1002. As another example, in response to detecting selection 1025*b* of end call option 1004*b*, computer system 600*b* ends the ongoing first real-time communication with Kim and displays call user interface 1012 for answering the incoming second real-time communication with Brandon, as shown in FIG. 10G. In FIG. 10G, computer system 600*b* ceases display of call user interface 1000 and alert 1002 and displays call user interface 1012. Call user interface 1012 includes information about the incoming second real-time communication, including name 1012*a*, representation 1012*b*, and answer option 1014. In response to a selection of answer option 1014, computer system 600*b*** answers the second real-time communication.

Returning to FIG. 10B, alert 1002 of the incoming second real-time communication includes decline option **1002*b* and answer option 1002*c*. In some embodiments, in response to detecting selection 1025*e* of answer option 1002*c*, computer system 600*b* connects with the second real-time communication and places the first real-time communication on hold, as shown in FIG. 10C. In FIG. 10C, computer system 600*b* displays duration 1006*a* of the second real-time communication, name 1006*b* of the remote participant (e.g., the caller) of the second real-time communication, representation (e.g., a photo) of the remote participant (e.g., the caller) of the second real-time communication, call options 1004, and alert 1008** that the first real-time communication with Kim is on hold.

Alert 1008 includes representation **1008*a* (e.g., the name and/or a graphical representation of the remote participant of the first real-time communication), status indicator 1008*b*, and user interface element 1008*c* (e.g., a swap calls option or switch calls option). Status indicator 1008*b* indicates the status (e.g., on hold) of the first real-time communication. In the example illustrated in FIG. 10C, computer system 600*b* has removed display of alert 1002 from the top of call user interface 1000 and displayed alert 1008 at the bottom of call user interface 1000**.

In FIG. 10C, computer system **600*b* detects selection 1025*f* of user interface element 1008*c*. In response to detecting selection 1025*f* of user interface element 1008*c*, computer system 600*b* places the second real-time communication with Brandon on hold and connects with the first real-time communication with Kim (e.g., computer system 600*b* make the first real-time communication the active call), as shown in FIG. 10D. In FIG. 10D, computer system 600*b* displays (e.g., re-displays) information about the first real-time communication in call user interface 1000 and displays (e.g., updates) alert 1008 with information about the second real-time communication. In some embodiments, in response to selection of user interface element 1008*c* in FIG. 10D, computer system 600*b* places the first real-time communication on hold, connects with the second real-time communication, and returns to the user interface as shown in FIG. 10C. In this way, a user can switch back and forth between the first real-time communication and the second real-time communication (e.g., between FIGS. 10C and 10D**).

In some embodiments, computer system **600*b* does not immediately connect with an on-hold real-time communication in response to selection of user interface element 1008*c*. For example, in some embodiments, in response to detecting selection 1025*f* of user interface element 1008*c* in FIG. 10C, computer system 600*b* remains connected to the second real-time communication with Brandon and displays user interface 1010 for connecting with the first real-time communication with Kim, as shown in FIG. 10E. In FIG. 10, the first real-time communication with Kim is on hold and the second real-time communication is ongoing (e.g., until the user confirms the request to switch calls). User interface 1010 includes cancel option 1010*a*, end option 1010*b*, answer option 1010*c*, and menu option 1010*d*. In response to selection of cancel option 1010*a* in FIG. 10E, computer system 600*b* returns to user interface 1000 as shown in FIG. 10C, with the second real-time communication being active and the first real-time communication on hold. In response to selection of end option 1010*b* in FIG. 10E, computer system 600*b* ends (e.g., disconnects) the first real-time communication with Kim and displays user interface 1000 as shown in FIG. 10C, except without alert 1008 (e.g., since the first real-time communication in no longer on hold). In response to selection of answer option 1010*c* in FIG. 10E, computer system 600*b* connects with the first real-time communication, places the second real-time communication on hold, and displays (e.g., returns to) user interface 1000 as shown in FIG. 10D**.

In some embodiments, computer system **600*b* does not immediately connect with an incoming real-time communication in response to selection of answer option 1002***c*. For example, in some embodiments, in response to detecting selection 1025*e* of user interface element 1002*c* in FIG. 10B, computer system 600*b* remains connected to the first real-time communication with Kim and displays user interface 1010 for connecting with the second real-time communication with Brandon, as shown in FIG. 10F. In FIG. 10F, the first real-time communication with Kim is active and the second real-time communication with Brandon is still incoming. In response to selection 1025*g* of cancel option 1010*a* in FIG. 10F, computer system 600*b* returns to user interface 1000 as shown in FIG. 10B, with the first real-time communication being active and the second real-time communication incoming. In response to selection of end option 1010*b* in FIG. 10F, computer system 600*b* declines the second real-time communication with Brandon and displays user interface 1000 as shown in FIG. 10A. In response to selection of answer option 1010*c* in FIG. 10F, computer system 600*b* connects with the second real-time communication, places the first real-time communication on hold, and displays user interface 1000 as shown in FIG. 10C.

FIG. 11 is a flow diagram illustrating a method for managing real-time communications using a computer system in accordance with some embodiments. Method 1100 is performed at a computer system (e.g., 100, 300, 500, 600*a*, 600*b*, 600*c*, and/or 600*d*) (e.g., a smart phone, a smart watch, a tablet computer, a laptop computer, a desktop computer, a wearable device, and/or head-mounted device) that is in communication with (e.g., includes and/or is connected to) a display generation component (e.g., 112, 156, 602*a*, 602*b*, 602*c*, and/or 602*d*) (e.g., a display, touch-screen display, a monitor, a holographic display system, and/or a head-mounted display system) and one or more input devices (e.g., 112, 113, 116, 204, 206, 208, 602*a*, 602*b*, 602*c*, and/or 602*d*) (e.g., a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)). Some operations in method 1100 are, optionally, combined, the orders of some operations are, optionally, changed, and some operations are, optionally, omitted.

As described below, method 1100 provides an intuitive way for managing real-time communications. The method reduces the cognitive burden on a user for managing real-time communications, thereby creating a more efficient human-machine interface. For battery-operated computing devices, enabling a user to manage real-time communications faster and more efficiently conserves power and increases the time between battery charges.

While a first real-time communication is ongoing (e.g., active and/or in progress) (e.g., FIG. 10B), the computer system concurrently displays (1102), via the display generation component: a real-time communication user interface (e.g., 814, 828, and/or 1000) (e.g., a user interface of a real-time communication application, such as a phone application or a video communication application) with information (e.g., 804, 806*a*, 806*b*, 806*c*, 806*d*, 806*e*, 806*f*, 806*g*, 810*a*, 812, 810*b*, 810*c*, 814, 816, 818, 822, 826, 838, 842, 844, 846, 1000*a*, 1000*b*, 1006*b*, 1006*c*, 1012*a*, and/or 1012*b*) about the first real-time communication (e.g., the call with Kim in FIG. 10B); and an alert (e.g., 1002, 1002*a*, 1002*b*, and/or 1002*c*) (e.g., a first alert, an incoming real-time communication alert, an incoming call alert, a visual notification, icon, and/or user-interactive interface object) that a second real-time communication is incoming (e.g., from Brandon in FIG. 10B). In some embodiments, the alert that the second real-time communication is incoming is overlaid on the real-time communication user interface. In some embodiments, a real-time communication is a phone call. In some embodiments, a real-time communication is an audio call. In some embodiments, a real-time communication is a video call. In some embodiments, a real-time communication includes real-time audio and/or video communication (e.g., an audio and/or video conference). In some embodiments, a real-time communication includes communication between two or more participants. In some embodiments, the computer system displays the incoming call alert in response to receiving the second real-time communication (or, in some embodiments, in response to receiving an indication, such as data, information, and/or a signal, that the second real-time communication is incoming). In some embodiments, the information about the first real-time communication includes, e.g., a representation of a remote participant of the first real-time communication, a phone number of the remote participant, a duration of the first real-time communication, a status of the first real-time communication, a duration of the real-time communication, and/or a connection status of the first real-time communication (e.g., calling, connecting, connected, active, no signal, or not connected). In some embodiments, the alert that the second real-time communication is incoming includes information about the second real-time communication. In some embodiments, the information about the second real-time communication includes, e.g., a representation (e.g., a photo, avatar, and/or monogram) of an entity that is attempting to initiate the second real-time communication and/or a phone number of the entity that is attempting to initiate the second real-time communication.

The computer system detects (1104) (e.g., while displaying the alert for the second real-time communication and/or the real-time communication user interface) a set of one or more inputs (e.g., one or more manual inputs, button presses, touch inputs, contacts on a touch-sensitive surface, body gestures, and/or voice inputs) that includes a request (e.g., 1025*e*) to connect with (or activate, answer, or switch to) the second real-time communication that is incoming. In some embodiments, the set of one or more input includes selection of the alert for the second real-time communication and/or selection of a selectable option (e.g., button, icon, affordance, and/or graphical element) included in the alert for the second real-time communication. In response (1106) to detecting the set of one or more inputs: the computer system connects (1108) with (or activating, answering, or switching to) the second real-time communication and places the first real-time communication on hold (e.g., as shown in FIG. 10C) (e.g., switches from the first real-time communication to the second real-time communication); and the computer system concurrently displays (1110), via the display generation component: the real-time communication user interface (e.g., 1000 in FIG. 10C) with information (e.g., 1006*a*, 1006*b*, and/or 1006*c*) about the second real-time communication (e.g., the computer system replaces the information about the first real-time communication with information about the second real-time communication); and an alert (e.g., 1008, 1008*a*, 1008*b*, and/or 1008*c*) (e.g., a second alert, an on-hold real-time communication alert, an on-hold call alert, a visual notification, icon, and/or user-interactive interface object) that the first real-time communication (e.g., with Kim in FIG. 10C) is on hold. In some embodiments, the alert that the first real-time communication is on hold includes an indication (e.g., text, a color, an animation, and/or a graphic) that indicates that the first real-time communication is on hold. In some embodiments, the alert that the first real-time communication is on hold includes information about the first real-time communication such as, e.g., a representation and/or phone number of an entity that is on hold and/or associated with the first real-time communication. In some embodiments, the alert that the first real-time communication is on hold is overlaid on the real-time communication user interface. In some embodiments, the computer system replaces the alert that the second real-time communication is incoming with the alert that the first real-time communication is on hold. Connecting with the second real-time communication, placing the first real-time communication on hold, and concurrently displaying information about the second real-time communication and an alert that the first real-time communication is on hold in response to detecting the set of one or more inputs enables the user to switch between the first real-time communication and the second real-time communication with fewer user inputs, and clearly indicates to the user that the first real-time communication is on hold, thereby providing improved visual feedback to the user and reducing the number of inputs needed to perform an operation.

In some embodiments, before detecting the set of one or more inputs that includes the request to connect with the second real-time communication that is incoming: in accordance with a determination that the computer system does not receive (or, in some embodiments, has not received) a request to connect with the second real-time communication, the computer system maintains display of the real-time communication user interface (e.g., 1000 in FIG. 10B) with the information about the first real-time communication (e.g., maintains display of the information about the first real-time communication in the real-time communication user interface). Maintaining display of the real-time communication user interface with the information about the first real-time communication in accordance with a determination that the computer system does not receive a request to connect with the second real-time communication avoids interrupting the first real-time communication and the need to navigate a user interface due to the incoming second real-time communication, thereby providing improved visual feedback to the user and reducing the number of inputs needed to perform an operation.

In some embodiments, displaying the alert (e.g., 1002) that the second real-time communication is incoming includes displaying the alert that the second real-time communication is incoming in a first portion (e.g., a top portion and/or a first area) of the real-time communication user interface (e.g., the location of 1002 in FIG. 10B). In some embodiments, the first portion of the real-time communication user interface is a portion of the real-time communication user interface that is closer to a top edge of the real-time communication user interface than a center of the real-time communication user interface. In some embodiments, displaying the alert (e.g., 1008) that the first real-time communication is on hold includes displaying the alert that the first real-time communication is on hold in a second portion (e.g., the position of 1008 in FIG. 10C) (e.g., a bottom portion and/or a second area) of the real-time communication user interface that is different from (e.g., does not overlap) the first portion of the real-time communication user interface. In some embodiments, the second portion of the real-time communication user interface is a portion of the real-time communication user interface that is closer to a bottom edge of the real-time communication user interface than a center of the real-time communication user interface. Displaying the alert that the second real-time communication is incoming and the alert that the first real-time communication is on hold in different portions of the real-time communication user interface informs the user about the state of the real-time communication that is not currently active (e.g., whether it is incoming or on hold), enables the computer system to customize placement of an alert based on the context of the alert (e.g., the alert for the incoming real-time communication can be displayed in a more conspicuous position), which makes the user interface easier to navigate with fewer inputs, thereby providing improved visual feedback to the user and reducing the number of inputs needed to perform an operation.

In some embodiments, displaying the alert (e.g., 1002) that the second real-time communication is incoming includes displaying (e.g., in the alert that the second real-time communication is incoming) a first user interface element (e.g., 1002*c*) (e.g., a swap-calls user interface element, a user-interactive user interface element, a selectable user interface element, a selectable option, a button, a selectable icon, and/or an affordance) that, when selected (e.g., via 1025*e*), causes the computer system to connect with (e.g., answer and/or make active) the second real-time communication and place the first real-time communication on hold (e.g., as shown in FIG. 10C). In some embodiments, the set of one or more inputs includes selection of the first user interface element. In some embodiments, the computer system detects selection of the first user interface element, and in response to detecting selection of the first user interface element, connects with the second real-time communication and places the first real-time communication on hold. Displaying a first user interface element for connecting with the second real-time communication and place the first real-time communication on hold enables the user to quickly and efficiently place the first real-time communication on hold with fewer inputs and errors, thereby reducing the number of inputs needed to perform an operation.

In some embodiments, displaying the alert (e.g., 1002) that the second real-time communication is incoming includes displaying (e.g., in the alert that the second real-time communication is incoming) a second user interface element (e.g., 1002*c* in some embodiments, or 1004*b* in some embodiments)) (e.g., an end-and-accept user interface element, a user-interactive user interface element, a selectable user interface element, a selectable option, a button, a selectable icon, and/or an affordance) that, when selected, causes the computer system to connect with (e.g., answer and/or make active) the second real-time communication and disconnect (e.g., end and/or hang up) the first real-time communication. In some embodiments, the set of one or more inputs includes selection of the second user interface element. In some embodiments, the computer system detects selection of the second user interface element, and in response to detecting selection of the second user interface element, connects with the second real-time communication and disconnects the first real-time communication. Displaying a second user interface element for connecting with the second real-time communication and disconnecting the first real-time communication enables the user to quickly and efficiently end the first real-time communication and connect with the incoming real-time communication with fewer inputs and errors, thereby reducing the number of inputs needed to perform an operation. In some embodiments, in response to detecting the set of one or more inputs that includes the request (e.g., 1025*e*) to connect with the second real-time communication that is incoming, the computer system ceases display of the second user interface element (e.g., 1002, 1002*a*, 1002*b*, and/or 1002*c*) (e.g., the computer system displays the second user interface element until the second real-time communication is connected and the first real-time communication is disconnected or placed on hold). Ceasing display of the second user interface element in response to detecting the set of one or more inputs that includes the request to connect with the second real-time communication that is incoming makes the user interface easier to navigate and less cluttered, which avoids unnecessary inputs and reduces errors, thereby reducing the number of inputs needed to perform an operation and providing additional control options without cluttering the user interface with additional displayed controls.

In some embodiments, displaying the alert (e.g., 1008) that the first real-time communication is on hold includes displaying (e.g., in the alert that the first real-time communication is on hold) a third user interface element (e.g., 1008*c*) (e.g., a swap-calls option, a user-interactive user interface element, a selectable user interface element, a selectable option, a button, a selectable icon, and/or an affordance) that, when selected (e.g., via 1025*f*), causes the computer system to initiate a process for connecting with (e.g., answer and/or make active) the first real-time communication and placing the second real-time communication on hold (e.g., displaying 1000 in FIG. 10D or 10E). Displaying the third user interface element for initiating a process for connecting with the first real-time communication and placing the second real-time communication on hold enables the user to quickly and efficiently reconnect with the first real-time communication and place the second real-time communication with fewer inputs and errors, thereby reducing the number of inputs needed to perform an operation. In some embodiments, the computer system detects, via the one or more input devices, selection (e.g., 1025*f*) of (e.g., a tap input, air gesture, voice command, and/or other selection input corresponding to) the third user interface element (e.g., 1008*c*); and in response to detecting selection of the third user interface element, the computer system connects with (e.g., activates and/or takes off of hold) the first real-time communication and places the second real-time communication on hold (e.g., as shown in FIG. 10D) (e.g., the computer system automatically activates the first real-time communication and places the second real-time communication on hold in response to selection of the third user interface element without further input). Connecting with the first real-time communication and placing the second real-time communication on hold in response to detecting selection of the third user interface element enables the user to quickly and efficiently reconnect with the first real-time communication and place the second real-time communication with fewer inputs and errors, thereby reducing the number of inputs needed to perform an operation. In some embodiments, the computer system detects, via the one or more input devices, selection (e.g., 1025*f*) of (e.g., a tap input, air gesture, voice command, and/or other selection input corresponding to) the third user interface element (e.g., 1008*c*); and in response to detecting selection of the third user interface element, the computer system displays an image (e.g., the image in 1010 in FIG. 10E) (e.g., a picture or photo) associated with the first real-time communication and a fourth user interface element (e.g., 1010*c*) (e.g., a swap-calls option, a user-interactive user interface element, a selectable user interface element, a selectable option, a button, a selectable icon, and/or an affordance) that, when selected, causes the computer system to connect with (e.g., answer and/or make active) the first real-time communication and place the second real-time communication on hold (e.g., the computer system automatically activates the first real-time communication and places the second real-time communication on hold in response to selection of the fourth user interface element without further input). Displaying an image associated with the first real-time communication and the fourth user interface element for connecting with the first real-time communication and placing the second real-time communication on hold provides the user with an option to confirm a request to switch the real-time communications and avoid inadvertently switching the real-time communications, causing the need for additional inputs, thereby providing improved visual feedback to the user and reducing the number of inputs needed to perform an operation.

In some embodiments, while displaying the alert (e.g., 1002) that the second real-time communication is incoming, the computer system detects, via the one or more input devices, a swipe gesture (e.g., a vertical swipe gesture, an upward swipe gesture, a downward swipe gesture, and/or a horizontal swipe gesture) (e.g., a swipe gesture on 1002 in FIG. 10B) corresponding to (e.g., on) the alert that the second real-time communication is incoming; and in response to detecting the swipe gesture corresponding to the alert that the second real-time communication is incoming, the computer system ceases display of (e.g., dismisses) the alert that the second real-time communication is incoming (and, in some embodiments, maintaining the active status of the first real-time communication and maintaining the incoming status of the second real-time communication). Ceasing display of the alert that the second real-time communication is incoming in response to detecting the swipe gesture enables the user to quickly and efficiently remove the alert and de-clutter the user interface, thereby providing improved visual feedback to the user and reducing the number of inputs needed to perform an operation.

In some embodiments, before detecting the set of one or more inputs that includes the request to connect with the second real-time communication that is incoming: in accordance with a determination that a threshold amount of time has elapsed (e.g., that the alert that the second real-time communication is incoming has been displayed for a predetermined amount of time), the computer system ceases display of (e.g., dismisses) the alert (e.g., 1002) that the second real-time communication is incoming (and, in some embodiments, maintains the active status of the first real-time communication and maintaining the incoming status of the second real-time communication). Ceasing display of the alert that the second real-time communication is incoming in accordance with a determination that a threshold amount of time has elapsed enables the computer system to remove the alert and de-clutter the user interface without requiring user input, thereby performing an operation when a set of conditions has been met without requiring further user input, providing improved visual feedback to the user, and reducing the number of inputs needed to perform an operation.

In some embodiments, while the first real-time communication is ongoing and before displaying the alert (e.g., 1002) that the second real-time communication is incoming, the computer system displays, via the display generation component, the real-time communication user interface (e.g., 1000 in FIG. 10A) with the information about the first real-time communication; and while displaying the alert (e.g., 1002) that the second real-time communication is incoming, the computer system maintains display of the real-time communication user interface (e.g., 1000 in FIG. 10B) with the information about the first real-time communication. Maintaining display of the information about the first real-time communication while displaying the alert that the second real-time communication is incoming informs the user of the state of the computer system without interrupting the user interface and distracting the user, which avoids errors and unnecessary inputs, thereby providing improved visual feedback to the user and reducing the number of inputs needed to perform an operation. In some embodiments, while displaying the alert (e.g., 1002) that the second real-time communication is incoming (and, in some embodiments, while displaying the real-time communication user interface with the information about the first real-time communication): the computer system displays a set of one or more user interface elements (e.g., 1004) (e.g., call function buttons, call function options, user-interactive user interface elements, selectable user interface elements, selectable options, buttons, selectable icons, and/or affordances) that correspond to respective functions associated with the real-time communication user interface (e.g., functions such as enabling or disabling a mute function, displaying or hiding a keypad, enabling or disabling a speaker function, adding a call to the real-time communication, initiating a video call, displaying a contacts user interface, and/or disconnecting the first real-time communication); the computer system detects selection (e.g., 1025*a*) of (e.g., a tap input, air gesture, voice command, and/or other selection input corresponding to) a first user interface element (e.g., 1004*a*) of the set of one or more user interface elements; and in response to detecting the selection of the first user interface element of the set of one or more user interface elements, the computer system performs a function (e.g., activates a speaker) corresponding to the first user interface element of the set of one or more user interface elements. Providing user interface elements for performing functions associated with the real-time communication user interface while displaying the alert that the second real-time communication is incoming enables the computer system to continue to perform operations associated with the first real-time communication while the second real-time communication is incoming without the user having to navigate a user interface, thereby providing additional control options without cluttering the user interface with additional displayed controls, providing improved visual feedback to the user, and reducing the number of inputs needed to perform an operation.

In some embodiments, the computer system detects, via the one or more input devices, selection (e.g., 1025*e*) of (e.g., a tap input, air gesture, voice command, and/or other selection input corresponding to) the alert (e.g., 1002) that the second real-time communication is incoming; and in response to detecting the selection of the alert that the second real-time communication is incoming, the computer system displays (e.g., concurrently displays), via the display generation component, a representation (e.g., 1010 in FIG. 10F includes a representation of Brandon) (e.g., an image, a picture, a photo, an expanded representation, and/or a full screen representation) of an entity associated with the second real-time communication and a user interface element (e.g., 1010*c*) (e.g., a user-interactive user interface element, a selectable user interface element, a selectable option, a button, a selectable icon, and/or an affordance) that, when selected, causes the computer system to connect with (e.g., activate, answer, and/or switch to) the second real-time communication (and, in some embodiments, disconnect the first real-time communication or place the first real-time communication on hold). Displaying a representation of an entity associated with the second real-time communication and a user interface element for connecting with the second real-time communication in response to detecting the selection of the alert that the second real-time communication is incoming provides an efficient way for the user to obtain additional information about the incoming real-time communication with fewer user inputs, thereby providing improved visual feedback to the user and reducing the number of inputs needed to perform an operation.

In some embodiments, while the second real-time communication is incoming (e.g., in FIG. 10B), the computer system detects, via the one or more input devices, a request (e.g., 1025*b* on 1004*b*)) to disconnect (e.g., end and/or hang up) the first real-time communication; and in response to detecting the request to disconnect the first real-time communication, the computer system disconnects (e.g., ends and/or hangs up) the first real-time communication and displays, via the display generation component, a representation (e.g., 804, 806*a*, 806*b*, 806*c*, 806*d*, 806*e*, 806*f*, 806*g*, 810*a*, 812, 810*b*, 810*c*, 814, 816, 818, 822, 826, 838, 842, 844, 846, 1012, 1012*a*, and/or 1012*b*) (e.g., an image, a picture, a photo, an expanded representation, and/or a full screen representation) of an entity associated with the second real-time communication without connecting with (e.g., without answering) the second real-time communication (e.g., as shown and described with reference to FIG. 10G). In some embodiments, in response to detecting the request to disconnect the first real-time communication, the computer system displays a user-interactive user interface element that, when selected, connects with (e.g., answers) the second real-time communication. Disconnecting the first real-time communication and displaying a representation of an entity associated with the second real-time communication without connecting with the second real-time communication in response to detecting the request to disconnect the first real-time communication provides and efficient way for the user to end the first real-time communication, informs the user that the second real-time communication is available, and allows the user to prepare for the second real-time communication (e.g., to answer or decline the second real-time communication), thereby providing improved visual feedback to the user and reducing the number of inputs needed to perform an operation.

In some embodiments, the computer system displays, via the display generation component, the alert (e.g., 1010 in FIG. 10F) that the second real-time communication is incoming at a first size (e.g., an expanded size and/or a full-screen size); and while displaying the alert that the second real-time communication is incoming at the first size, the computer system displays, via the display generation component, a fifth user interface element (e.g., 1010*a*) (e.g., a minimize user interface element, a minimize option, a user-interactive user interface element, a selectable user interface element, a selectable option, a button, a selectable icon, and/or an affordance) that, when selected (e.g., via 1025*g*), causes the computer system to display the alert (e.g., 1002) that the second real-time communication is incoming at a second size (e.g., the size of 1002 in FIG. 10B) that is smaller than the first size (e.g., to reduce the size of the alert that the second real-time communication is incoming). In some embodiments, the computer system detects selection of the fifth user interface element, and in response to detecting selection of the fifth user interface element, the computer system displays an alert that the second real-time communication is incoming at the second size (e.g., reduces the size of the alert that the second real-time communication is incoming or replaces display of the alert that the second real-time communication is incoming at the first size with display of an alert that the second real-time communication is incoming at the second size). Displaying the fifth user interface element for displaying the alert that the second real-time communication is incoming at a second size that is smaller than the first size while displaying the alert that the second real-time communication is incoming at the first size enables the user to easily reduce the prevalence of the alert, reduce clutter on the interface, and avoid excess inputs and errors, thereby providing improved visual feedback to the user reducing the number of inputs needed to perform an operation.

Note that details of the processes described above with respect to method 1100 (e.g., FIG. 9) are also applicable in an analogous manner to the methods described above and below. For example, methods 700, 900, 1300, and/or 1500 optionally include one or more of the characteristics of the various methods described above with reference to method 1100. For example, the techniques for managing real-time communications described in method 1100 can be used to manage the real-time communications in methods 900, 1300, and/or 1500. For brevity, these details are not repeated below.

FIGS. 12A-12I illustrate exemplary user interfaces for providing a transcript of a voice message (e.g., an ongoing audio message), in accordance with some embodiments. The user interfaces in these figures are used to illustrate the processes described below, including the processes in FIG. 13.

Figure 12A:
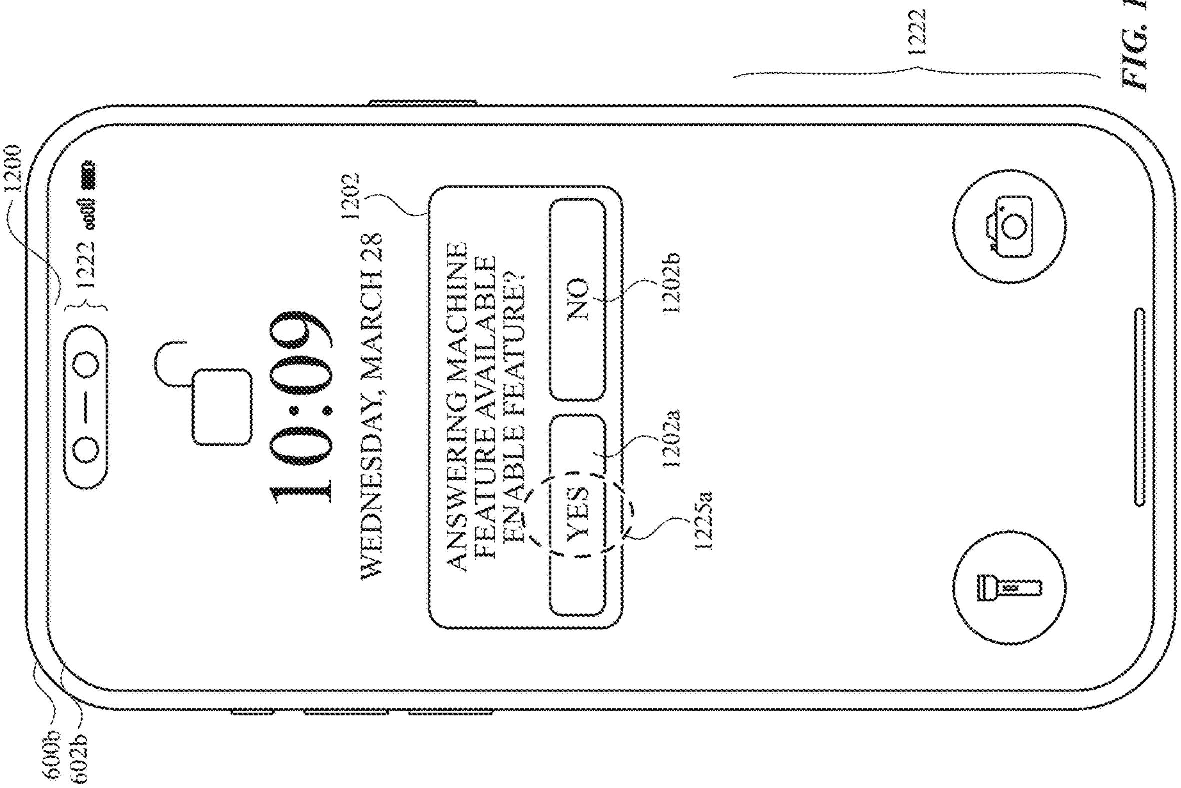
Figure 13:
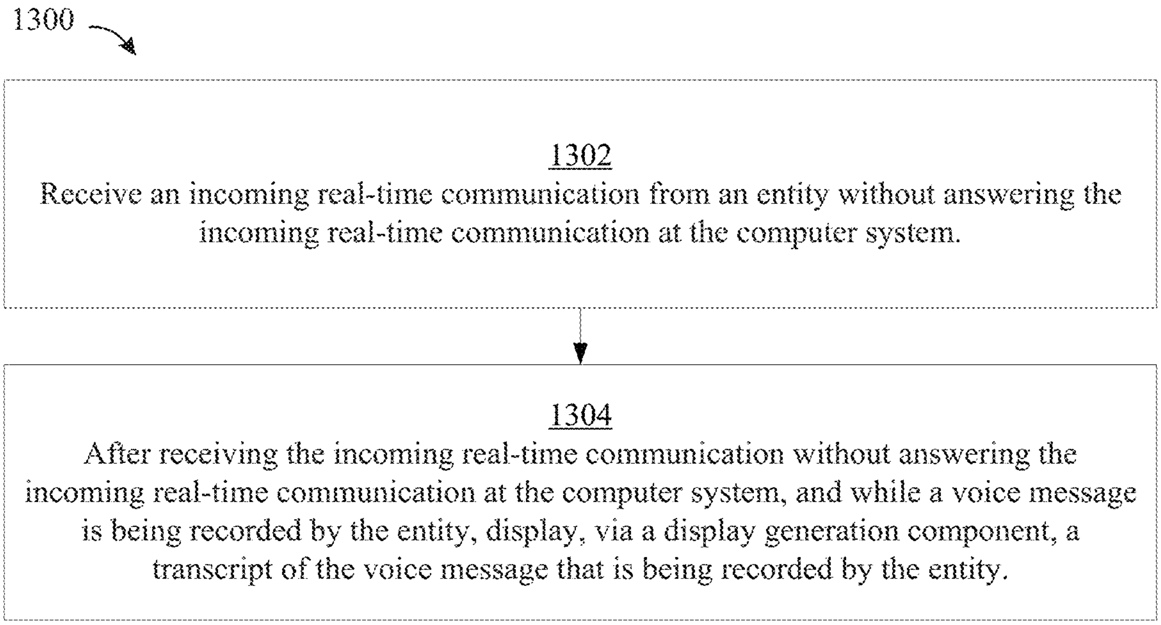
FIG. 13 is a flow diagram illustrating methods for providing a transcript of a voice message, in accordance with some embodiments.

In FIG. 12A, computer system 600*b* (e.g., John's phone) receives an indication that a capability to display a transcript of an ongoing audio message (e.g., an answering machine feature) is available (e.g., due to a software update). In response to receiving the indication that the capability to display a transcript of an ongoing audio message is available, computer system 600*b* displays notification 1202 that the feature is available on user interface 1200 (e.g., a wake screen or a lock screen). Notification 1202 include accept option 1202*a* and decline option 1202*b*. In response to detecting selection of decline option 1202*b*, computer system 600*b* does not enable the capability to display a transcript of an ongoing audio message (e.g., the capability is disabled). In response to detecting selection 1225*a* of accept option 1202*a*, computer system 600*b* enables the capability to display a transcript of an ongoing audio message.

In FIG. 12B, computer system 600*b* receives an incoming real-time communication (e.g., an incoming phone call) and displays user interface 1204*a*, which includes representation 1228 (e.g., a name and/or picture) of the incoming real-time communication (e.g., of the caller and/or entity calling computer system 600*b*) and answer option 1206. In some embodiments, user interface 1204*a* is user interface 814 or user interface 846 described above. The incoming call is not answered in FIG. 12B.

Figure 12D:
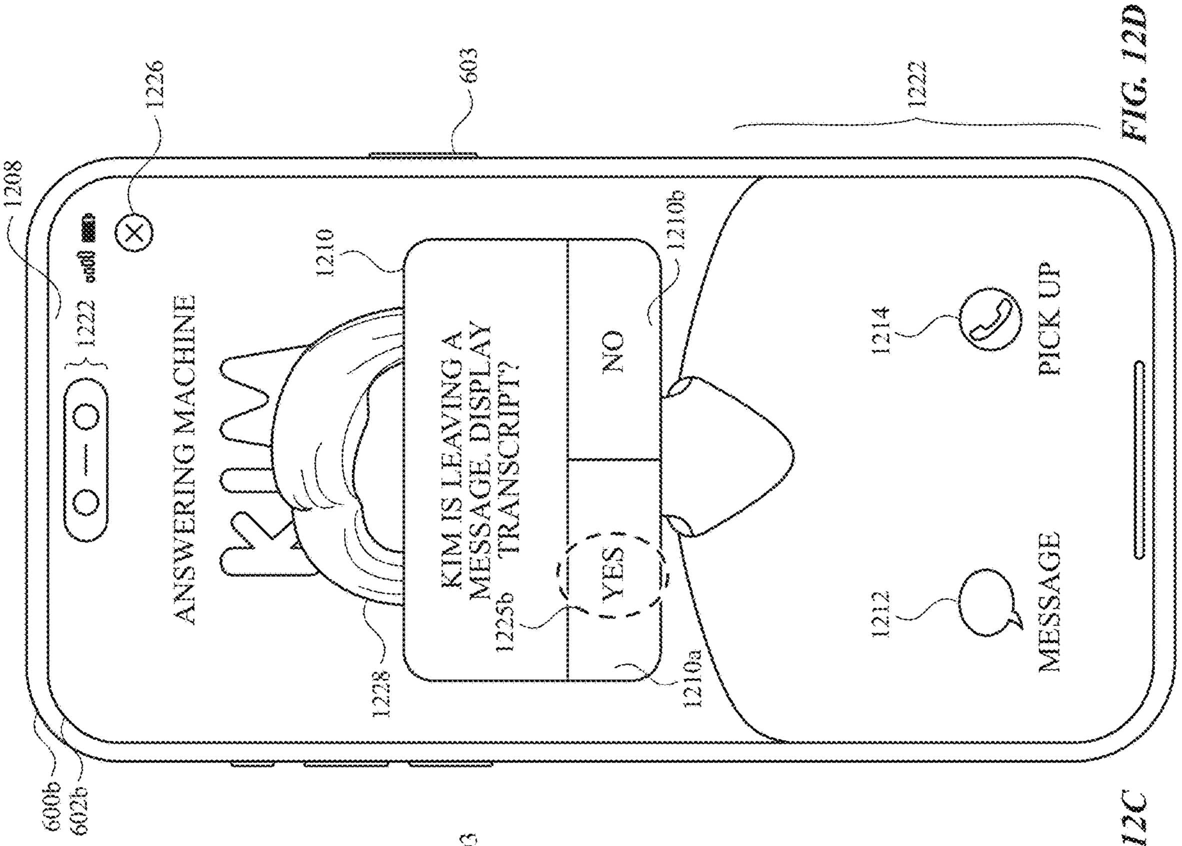
Figure 12C:
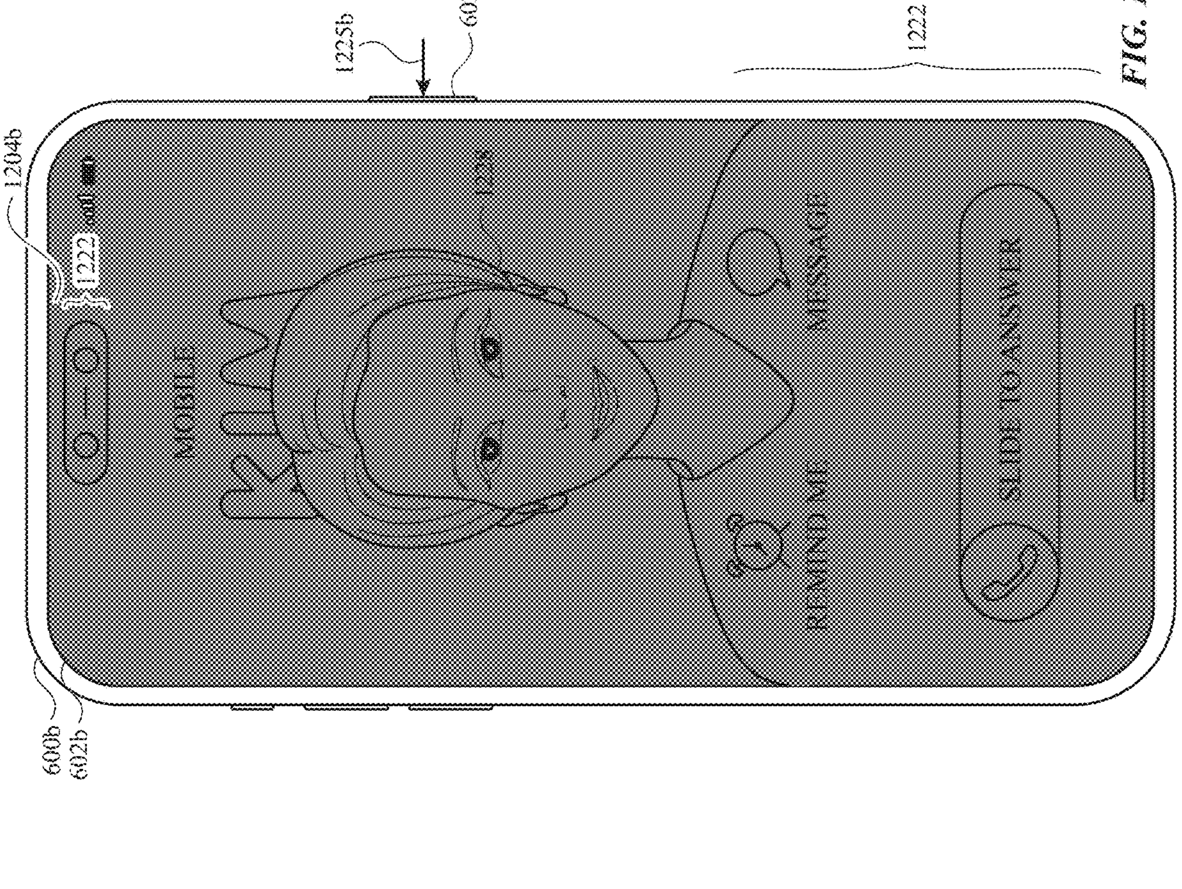

In some embodiments, if computer system 600*b* is in a reduced power state (e.g., a sleep state or an inactive state) when the incoming real-time communication is received, or if computer system 600*b* does not receive an interaction (e.g., for a predetermined amount of time) while the real-time communication is incoming, computer system 600*b* displays user interface 1204*b* as shown in FIG. 12C. In FIG. 12C, computer system 600*b* is in an inactive state in which display 602*a* has a reduced brightness (e.g., compared to user interface 1204 in FIG. 12B). In FIG. 12C, computer system 600*b* detects request 1225*b* (e.g., an input on button 603 or other input) to decline the incoming real-time communication. In response to detecting request 1225*b*, computer system 600*b* declines the incoming real-time communication and, optionally, directs the real-time communication to a voicemail service and/or function. In some embodiments, the incoming real-time communication is directed to voicemail if the real-time communication is not answered (e.g., ignored and/or not answered for a predetermined amount of time).

Turning to FIG. 12D, after the incoming real-time communication has been directed to voicemail (e.g., was not answered and/or was directed to voicemail), the entity (e.g., the caller) of the incoming real-time communication begins recording a voice message (e.g., a voicemail). In response to a determination that a voice message is being recorded, computer system 600*b* displays prompt 1210 on user interface 1208 indicating that a voice message is being recorded and that a transcript of the voice message can be displayed, as shown in FIG. 12D. Prompt 1210 includes accept option 1210*a* and decline option 1210*b*.

User interface 1208 includes representation 1228 of the entity recording the voice message, message option 1212, and answer option 1214. In some embodiments, in response to detecting selection of message option 1212, computer system 600*b* displays a messaging user interface (e.g., launches and/or opens a messaging application; e.g., displays user interface 832 shown in FIG. 8R) for creating and/or sending a message (e.g., a text message) to the entity that is recording the voice message (e.g., to the phone number of the incoming real-time communication).

In response to detecting selection of decline option 1210*b*, computer system 600*b* ceases display of prompt 1210 and, in some embodiments, ceases display of user interface 1208 (e.g., and displays a home screen or a user interface that was displayed at the time that the incoming real-time communication was received). In response to detecting selection of answer option 1214, computer system 600*b* initiates a real-time communication with the entity recording the voice message. For example, computer system 600*b* interrupts recording of the voice message and connects to (e.g., answers and/or picks up) the incoming real-time communication. In some embodiments, in response to detecting selection of answer option 1214, computer system 600*b* displays call user interface 814 (shown in FIG. 8F) or call user interface 1000 (shown in FIG. 10A).

In response to detecting selection of decline option 1210*b*, computer system 600*b* ceases display of prompt 1210 and, in some embodiments, ceases display of user interface 1208 (e.g., and displays a home screen or a user interface that was displayed at the time that the incoming real-time communication was received). In response to detecting selection 1225*b* of accept option 1210*a*, computer system 600*b* displays (e.g., begins displaying) transcript 1216 shown in FIG. 12E. Transcript 1216 includes a textual transcript in transcript region 1218 of the voice message that is being recorded (e.g., transcript 1216 is generated and/or displayed in real-time). In FIG. 12E, computer system 600*b* maintains display of message option 1212 and answer option 1214 along with transcript 1216. User interface 1208 includes cancel option 1226 that, when selected, causes computer system 600*b* to exit (e.g., cease display of) user interface 1208.

Figure 12F:
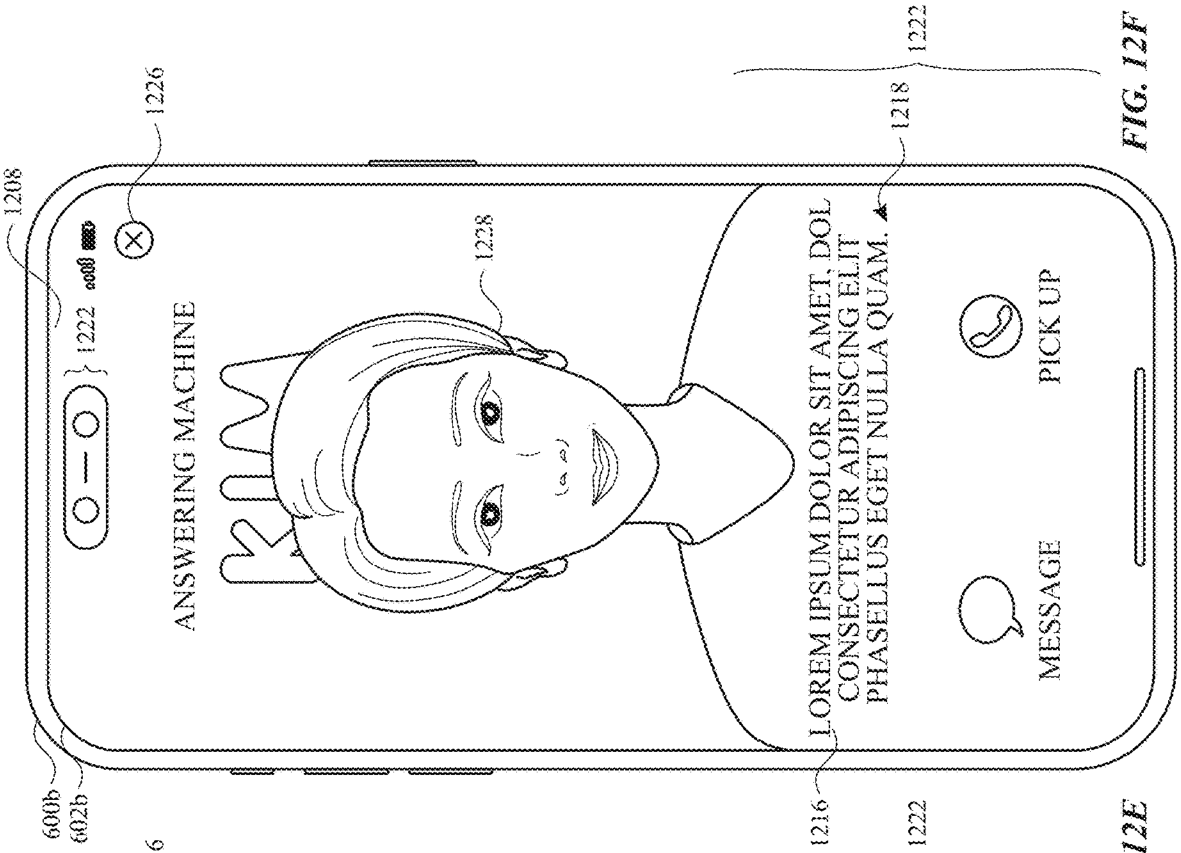
Figure 12E:
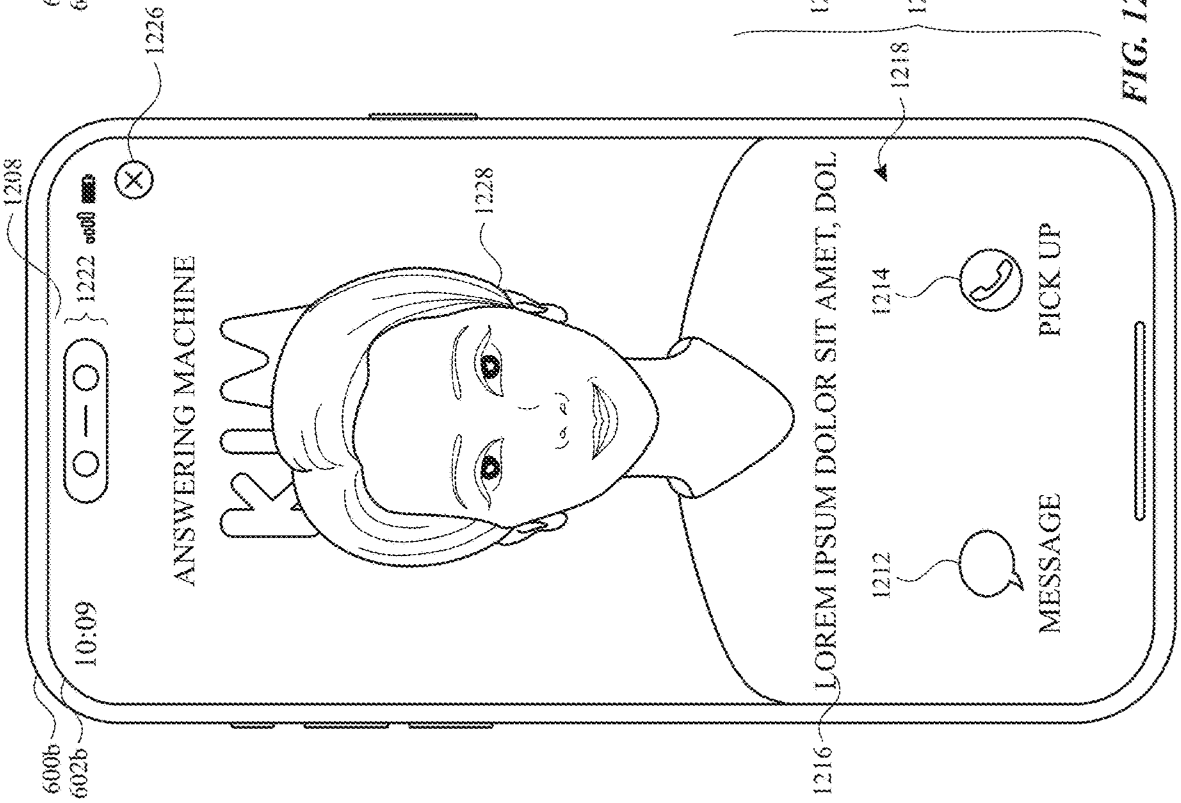

As the voice message continues to be recorded and transcribed, computer system 600*b* updates transcript 1216 as shown in FIG. 12F (e.g., there are two additional lines in transcript 1216 compared to FIG. 12E). In some embodiments, as more content is added to transcript 1216, computer system 600*b* scrolls transcript 1216 (e.g., hides an earlier portion of transcript 1216) so that newer portions of transcript 1216 can be displayed in transcript region 1218. For example, in FIG. 12G, transcript 1216 has been scrolled upward such that the top two lines of text in FIG. 12F are moved off a top edge of transcript region 1218, and the bottom line of text in FIG. 12F is moved to the top line in FIG. 12G, with two new lines of text below it.

Figure 12H:
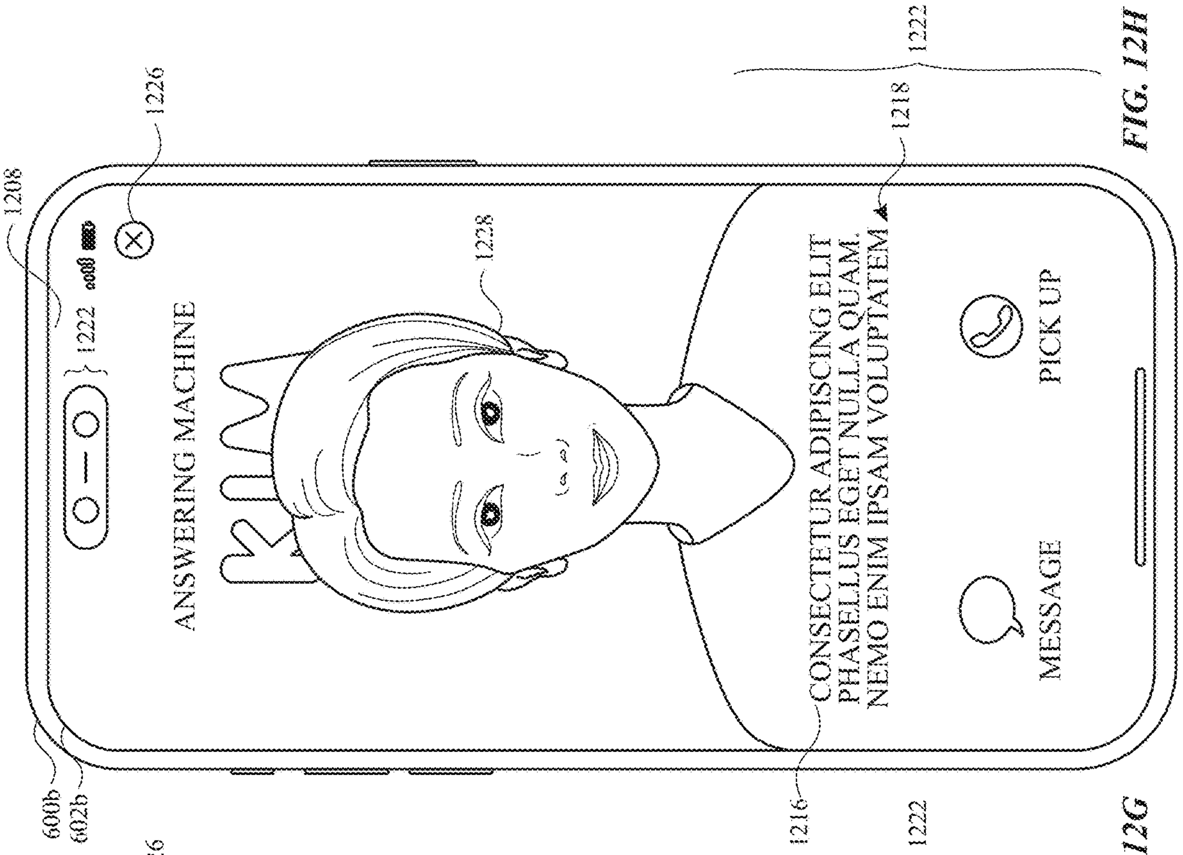

In some embodiments, transcript 1216 can be scrolled in response to input. For example, in FIG. 12G, computer system 600*b* detects request 1225*c* (e.g., a vertical swipe gesture or tap and drag gesture in transcript region 1218) to scroll transcript 1216. In response to request 1225*c* to scroll transcript 1216, computer system 600*b* scrolls transcript 1216 as shown in FIG. 12H (e.g., the bottom line of transcript 1216 in FIG. 12G is moved off a bottom edge of transcript region 1218, the top two lines of transcript 1216 in FIG. 12G are moved down to the bottom two lines in FIG. 12H, and the middle line of transcript 1216 in FIG. 12F is displayed (e.g., re-displayed) as the top line in FIG. 12H).

Figure 12G:
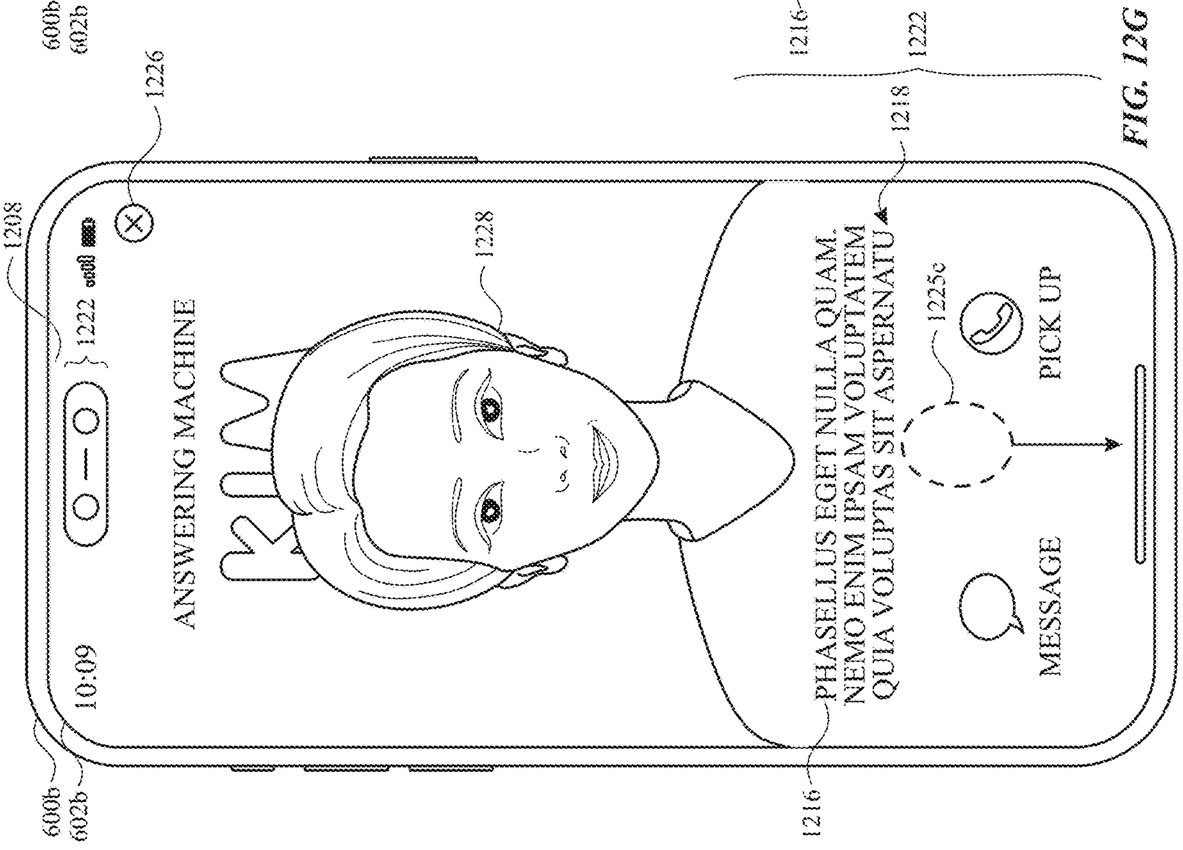
Figure 12I:
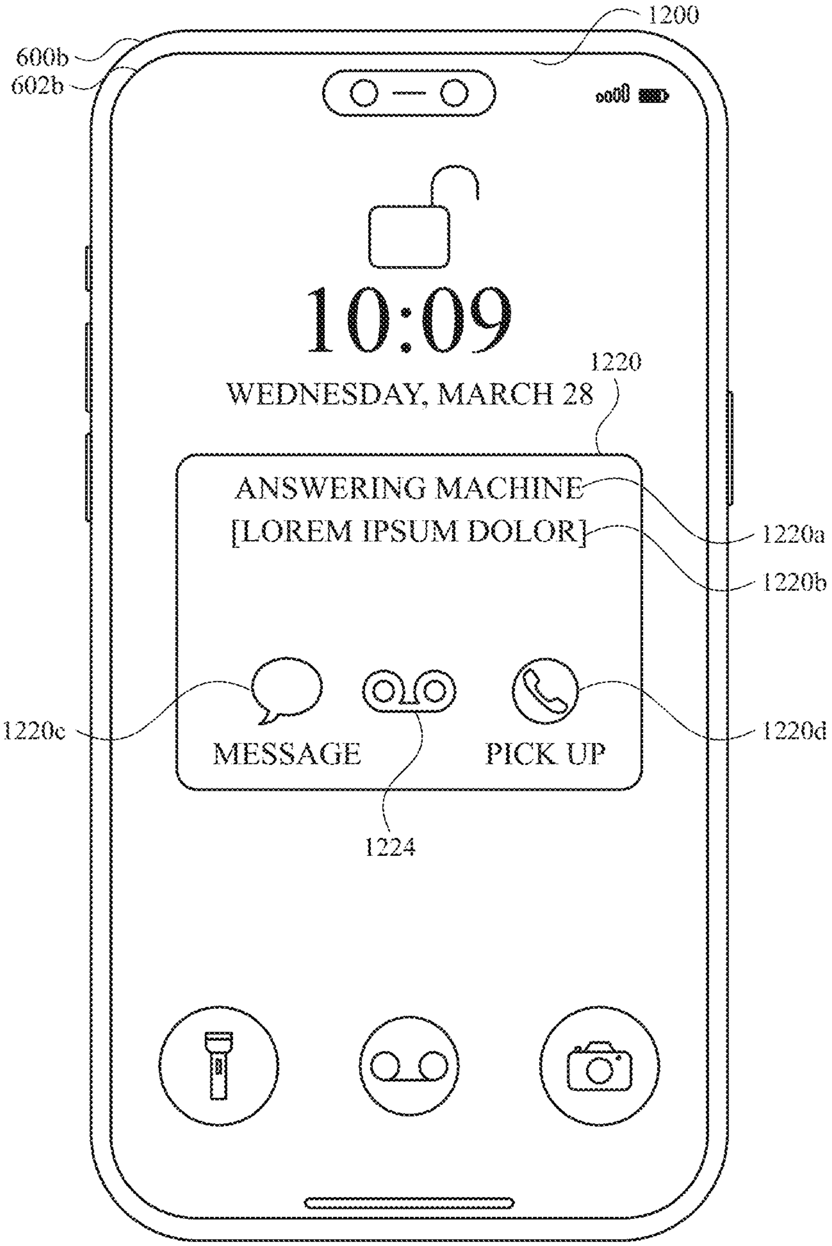

Turning to FIG. 12G, in some embodiments, computer system 600*b* displays user interface 1200 (e.g., a wake screen or a lock screen) while the voice message is being recorded. In some embodiments, computer system 600*b* displays user interface 1200 in response to determining that a user is not interacting with computer system 600*b* (or has not interacted with computer system 600*b* for a predetermined amount of time). In some embodiments, computer system 600*b* displays user interface 1200 in response to transitioning out of an inactive state. In FIG. 12G, computer system 600*b* displays active user interface element 1220 on user interface 1200. Active user interface element 1220 includes application indicator 1220*a* (e.g., "Answering machine"), preview 1220*b* of transcript 1216, message option 1212 (e.g., as described with reference to FIG. 12E), and answer option 1214 (e.g., as described with reference to FIG. 12E). In some embodiments, computer system 600*b* scrolls and/or updates preview 1220*b* to display newer portions of transcript 1216 as the voice message is being transcribed (e.g., as described with reference to FIGS. 12F-12G). In some embodiments, in response to a request to scroll preview 1220*b* (e.g., a vertical swipe gesture and/or a tap and drag gesture on preview 1220*b* or within active user interface element 1220), computer system 600*b* displays a different portion (e.g., a previous or later portion) of transcript 1216 (e.g., computer system 600*b* scrolls preview 1220*b* as described with reference to transcript 1216 in FIGS. 12G-12H).

FIG. 13 is a flow diagram illustrating a method for providing a transcript of a voice message using a computer system in accordance with some embodiments. Method 1300 is performed at a computer system (e.g., 100, 300, 500, 600*a*, 600*b*, 600*c*, and/or 600*d*) (e.g., a smart phone, a smart watch, a tablet computer, a laptop computer, a desktop computer, a wearable device, and/or head-mounted device) that is in communication with (e.g., includes and/or is connected to) a display generation component (e.g., 112, 156, 602*a*, 602*b*, 602*c*, and/or 602*d*) (e.g., a display, touchscreen display, a monitor, a holographic display system, and/or a head-mounted display system). In some embodiments, the computer system is in communication with (e.g., includes and/or is connected to) one or more input devices (e.g., 112, 113, 116, 204, 206, 208, 602*a*, 602*b*, 602*c*, and/or 602*d*) (e.g., a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)).

As described below, method 1300 provides an intuitive way for providing a transcript of a voice message. The method reduces the cognitive burden on a user for providing a transcript of a voice message, thereby creating a more efficient human-machine interface. For battery-operated computing devices, enabling a user to provide a transcript of a voice message faster and more efficiently conserves power and increases the time between battery charges. Some operations in method 1300 are, optionally, combined, the orders of some operations are, optionally, changed, and some operations are, optionally, omitted.

The computer system receives (1302) an incoming real-time communication (or, in some embodiments, receives an indication, such as data, information, and/or a signal, of an incoming real-time communication) from an entity (e.g., an entity that initiated the incoming real-time communication, a caller, a person, a user, a business, and/or a group) without answering the incoming real-time communication at the computer system (e.g., as shown and described with reference to FIGS. 12B-12D). In some embodiments, the incoming real-time communication includes (e.g., is) a request from a remote entity to initiate or establish a real-time communication. In some embodiments, the real-time communication is a phone call. In some embodiments, the real-time communication is an audio call. In some embodiments, the real-time communication is a video call. In some embodiments, the real-time communication includes real-time audio and/or video communication (e.g., an audio and/or video conference). In some embodiments, the real-time communication includes communication between two or more participants. After (or, in some embodiments, while) receiving the incoming real-time communication without answering the incoming real-time communication at the computer system, and while a voice message is being (e.g., currently being) recorded (e.g., created, left, and/or generated) by the entity (e.g., a voice message is being recorded by Kim in FIGS. 12D-12I after receiving an incoming call from Kim without answering the call from Kim), the computer system displays (1304), via the display generation component, a transcript (e.g., 1216 and/or 1220*b*) of the voice message that is being recorded by the entity (e.g., the computer system displays the transcript of the voice message while the entity is connected to a voicemail system and is creating the voice message for a user of the computer system). In some embodiments, the computer system displays the transcript of the voice message in response to a determination that the entity is recording (e.g., has begun recording) the voice message. In some embodiments, the computer system displays the transcript of the voice message that is being recorded in accordance with a determination that a set of display criteria is met; and in accordance with a determination that the set of display criteria are not met, the computer system does not display, foregoes display of, or postpones display of the transcript of the voice message. Displaying the transcript of the voice message while the voice message is being recorded informs the user that the voice message is being recorded and of the content of the voice message without the user having to navigate a user interface to view the content of the voice message and/or listen to the voice message, thereby providing improved visual feedback to the user and reducing the number of inputs needed to perform an operation.

In some embodiments, before displaying the transcript of the voice message, the computer system detects a request (e.g., 1225*b*, a touch gesture, an air gesture, a voice command, and/or a button press) to display the transcript of the voice message (e.g., the computer system does not display the transcript of the voice message until detecting the request to display the transcript of the voice message). In some embodiments, the computer system displays the transcript of the voice message in response to detecting the request to display the transcript of the voice message. In some embodiments, in response to a determination that the voice message has been initiated, the computer system displays a user-interactive user interface element for displaying the transcript of the voice message, and the request to display the transcript of the voice message includes selection of the user-interactive user interface element for displaying the transcript of the voice message. In some embodiments, the request to display the transcript of the voice message includes setting a parameter that causes the computer system to display (e.g., automatically display without user input) the transcript of the voice message. Detecting the request to display the transcript of the voice message before displaying the transcript of the voice message provides the user with the capability to request the transcript when desired, which provides the user with additional control and avoids cluttering the interface, thereby providing control options without cluttering the user interface with additional displayed controls.

In some embodiments, displaying the transcript of the voice message is performed (e.g., initiated) in response to a determination that a set of criteria is met, the set of criteria including a requirement that recording of the voice message has been initiated (e.g., the computer system displays the transcript in response to initiation of recording the voice message) (e.g., the computer system does not display 1210 and/or does not require input 1225*b*). Displaying the transcript of the voice message in response to a determination that a set of criteria is met, including that recording of the voice message has been initiated, informs the user that the voice message is being recorded and enables the computer system to automatically display the transcript when the voice message is initiated without requiring user input, thereby performing an operation when a set of conditions has been met without requiring further user input, providing improved visual feedback to the user, and reducing the number of inputs needed to perform an operation. In some embodiments, the set of criteria includes a requirement that the entity is included in a predetermined set of entities (e.g., the entity is a known caller), the method further comprising: in response to a determination that the entity is not included in the predetermined set of entities (e.g., while the voice message is being recorded), the computer system foregoes display of (e.g., does not automatically display) the transcript (e.g., 1216) of the voice message (and, in some embodiments, displays a selectable element for initiating display of the transcript of the voice message). Foregoing display of the transcript of the voice message in response to a determination that the entity is not included in a predetermined set of entities enables the computer system to avoid displaying the transcript based on context that is relevant to a user of the computer system, thereby performing an operation when a set of conditions has been met without requiring further user input, providing improved visual feedback to the user, and reducing the number of inputs needed to perform an operation.

In some embodiments, in accordance with a determination that the incoming real-time communication has been declined (e.g., via input 1225*b*), the computer system foregoes display of the transcript of the voice message (e.g., the computer system does not display the transcript of the voice message if the incoming real-time communication is declined). Foregoing display of the transcript of the voice message in accordance with a determination that the incoming real-time communication has been declined provides an efficient technique to avoid displaying the transcript with fewer user inputs, thereby performing an operation when a set of conditions has been met without requiring further user input, providing improved visual feedback to the user, and reducing the number of inputs needed to perform an operation.

In some embodiments, while the voice message is being recorded (and, in some embodiments, before displaying the transcript of the voice message), the computer system displays an indication (e.g., 1210, 1220, text, a notification, a color, an icon, an animation, and/or an indication different from the transcript of the voice message) that the voice message is being recorded. In some embodiments, computer system displays the indication that the voice message is being recorded is in response to a determination that recording of the voice message has begun and/or that the voice message is being recorded. In some embodiments, the indication that the voice message is being recorded is different from a selectable element (e.g., an affordance) for displaying the transcript of the voice message. Displaying an indication that the voice message is being recorded while the voice message is being recorded informs the user about the state of the voice message, thereby providing improved visual feedback to the user.

In some embodiments, after (or, in some embodiments, while) receiving the incoming real-time communication (and/or, in some embodiments, in response to a determination that the call has not been answered), the computer system reduces a brightness of a user interface displayed (e.g., as shown in FIG. 12C) via the display generation component (e.g., the computer system dims a display and/or changes to a reduced power mode); and when displaying the transcript of the voice message is initiated (e.g., in response to initiating display of the transcript of the voice message) (e.g., as shown in FIG. 12E), the computer system increases the brightness of the user interface displayed via the display generation component. Reducing a brightness of a user interface after receiving the incoming real-time communication and increasing the brightness of the user interface when displaying the transcript of the voice message is initiated informs the user of the voice message reduces power consumption prior to displaying the transcript, thereby providing improved visual feedback to the user and saving battery life.

In some embodiments, displaying the transcript of the voice message includes scrolling (e.g., vertically scrolling) the transcript of the voice message (e.g., the computer system displays a portion of the transcript that was previously hidden or not displayed, hides or ceases display of a portion of the transcript that was previously displayed, and/or moves at least a portion of the transcript from a first displayed position to a second displayed position) over time as the voice message is being transcribed (e.g., as shown and described with reference to FIGS. 12F-12G). In some embodiments, the voice message is transcribed while the voice message is being recorded (e.g., in real time) and the computer system updates display of the transcript as the voice message (e.g., as more of the voice message) is transcribed. Scrolling the transcript of the voice message informs the user of the state of the voice message and conserves space on the user interface, thereby providing improved visual feedback to the user.

In some embodiments, while displaying the transcript of the voice message that is being recorded by the entity (e.g., while the voice message is being recorded and/or transcribed), the computer system detects a request (e.g., 1225*c*) to scroll the transcript of the voice message; and in response to detecting the request to scroll the transcript of the voice message, the computer system scrolls the display of the transcript of the voice message (e.g., as shown in FIG. 12H) (e.g., the computer system displays a portion of the transcript that was previously hidden or not displayed, hides or ceases display of a portion of the transcript that was previously displayed, and/or moves at least a portion of the transcript from a first displayed position to a second displayed position). Scrolling the display of the transcript of the voice message in response to detecting the request to scroll the transcript of the voice message enables the user to quickly and efficiently navigate and view the transcript with fewer user inputs, thereby providing improved visual feedback to the user and reducing the number of inputs needed to perform an operation.

In some embodiments, while displaying the transcript of the voice message that is being recorded by the entity (e.g., while the voice message is being recorded and/or transcribed), the computer system displays an answer user interface element (e.g., 1214, 1220*d*, an answer option, an answer button, a user-interactive user interface element, a selectable user interface element, a selectable option, a button, a selectable icon, and/or an affordance) that, when selected, causes the computer system to connect with (e.g., answer and/or pick up) the real-time communication. In some embodiments, the computer system detects selection of the answer user interface element, and in response to detecting selection of the answer user interface element, the computer system connects with (e.g., answers) the incoming real-time communication. Displaying an answer user interface element for connecting with the real-time communication while displaying the transcript provides the user with an option to quickly and efficiently connect with the real-time communication, thereby providing additional control options without cluttering the user interface with additional displayed controls and reducing the number of inputs needed to perform an operation.

In some embodiments, while displaying the transcript of the voice message that is being recorded by the entity (e.g., while the voice message is being recorded and/or transcribed), the computer system displays a message user interface element (e.g., 1212, 1220*c*, a message option, a message button, a user-interactive user interface element, a selectable user interface element, a selectable option, a button, a selectable icon, and/or an affordance) that, when selected, causes the computer system to initiate a process that includes sending (and, in some embodiments, composing) a message (e.g., a text message and/or an email message) to the entity. In some embodiments, the computer system detects selection of the message user interface element, and in response to detecting selection of the message user interface element, the computer system initiates a process for composing and/or send a message to the entity. Displaying a message user interface element for initiating a process that includes sending a message to the entity provides the user with an option to quickly and efficiently communicate with the entity recording the voice message, thereby providing additional control options without cluttering the user interface with additional displayed controls and reducing the number of inputs needed to perform an operation.

In some embodiments, in response to a determination that an ability is available (e.g., but not enabled) for the computer system to display a transcript of a voice message that is being recorded by an entity that attempted to initiate a real-time communication with the computer system, the computer system displays a transcript-enable user interface element (e.g., 1202*a*, a user-interactive user interface element, a selectable user interface element, a selectable option, a button, a selectable icon, and/or an affordance) that, when selected, enables the computer system to display a transcript of a voice message that is being recorded by an entity that attempted to initiate a real-time communication with the computer system (e.g., the computer system prompts a user to enable the ability to display a transcript of a voice message being recorded). In some embodiments, the ability to display a transcript of a voice message being recorded is included a software and/or hardware update, and the computer system displays a prompt to inform a user that the ability to display a transcript of a voice message being recorded is available and, optionally, can be enabled. In some embodiments, the computer system detects selection of the transcript-enable user interface element, and in response to detecting selection of the transcript-enable user interface element, the computer system displays a transcript of a voice message when the voice message is being recorded by an entity that attempted to initiate a real-time communication with the computer system. Displaying a transcript-enable user interface element for enabling the computer system to display a transcript of a voice message that is being recorded by an entity that attempted to initiate a real-time communication with the computer system provides the user with an option to quickly and efficiently enable the capability to display a transcript while a voice message is being recorded, thereby providing additional control options without cluttering the user interface with additional displayed controls and reducing the number of inputs needed to perform an operation.

In some embodiments, while the voice message is being recorded (and, in some embodiments, before displaying the transcript of the voice message or after ceasing display of the transcript of the voice message), the computer system displays a display-transcript user interface element (e.g., 1224, a user-interactive user interface element, a selectable user interface element, a selectable option, a button, a selectable icon, and/or an affordance) in a region (e.g., 1222 and/or a dynamic region) of a user interface (or, in some embodiments, a region of a display or display surface), wherein the region changes (e.g., in size and/or shape) over time; the computer system detects selection of (e.g., a tap input, air gesture, voice command, and/or other selection input corresponding to) the display-transcript user interface element (e.g., a tap or other input selecting 1224); and in response to detecting the selection of the display-transcript user interface element, the computer system displays the transcript of the voice message that is being recorded (e.g., the computer system displays user interface 1208 with transcript 1216). Displaying a display-transcript user interface element in the region that changes over time and displaying the transcript of the voice message that is being recorded in response to detecting selection of the display-transcript user interface element informs the user that the transcript is available and provides the user with an option to quickly and efficiently display the transcript while a voice message is being recorded, thereby providing improved visual feedback to the user, providing additional control options without cluttering the user interface with additional displayed controls, and reducing the number of inputs needed to perform an operation.

In some embodiments, displaying the transcript of the voice message that is being recorded by the entity includes displaying the transcript (e.g., 1220*b*) of the voice message that is being recorded by the entity on a wake screen (e.g., 1200, a lock screen and/or a user interface that is displayed when the computer system transitions from an off, sleeping, low-power, and/or reduced-power state to an on, active, standard, and/or normal operating state). In some embodiments, displaying the transcript of the voice message that is being recorded by the entity on a wake screen includes updating (e.g., in 1220) the transcript as the voice message is recorded, scrolling the transcript as the voice message is recorded, scrolling the transcript in response to detecting an input displaying a user interface object for initiating a message to the entity, and/or displaying a user interface object for calling the entity. Displaying the transcript of the voice message that is being recorded by the entity on a wake screen informs the user of the status of the voice message without requiring the user to navigate the user interface and while reducing power consumption, thereby providing improved visual feedback to the user and reducing the number of inputs needed to perform an operation.

Note that details of the processes described above with respect to method 1300 (e.g., FIG. 13) are also applicable in an analogous manner to the methods described above and below. For example, methods 700, 900, 1100, and/or 1500 optionally include one or more of the characteristics of the various methods described above with reference to method 1300. For example, the techniques for providing a voice message for the real-time communication in method 1300 can be applied to the real-time communications in methods 900, 1100, and/or 1500. For brevity, these details are not repeated below.

FIGS. 14A-14K illustrate exemplary user interfaces for video messages, in accordance with some embodiments. The user interfaces in these figures are used to illustrate the processes described below, including the processes in FIG. 15.

FIGS. 14A-14K illustrate techniques for video messages, in accordance with some embodiments. In FIG. 14A, computer system 600*b* is attempting to initiate an outgoing real-time communication (e.g., a video call) to recipient Kim. Computer system 600*b* displays real-time communication interface 1400 (e.g., a user interface for a video call and/or video call application) with representation 1402 of the intended recipient, call control options 1404, camera preview 1410, and camera options 1406. Camera preview 1410 displays video captured by camera sensor 695*b* while computer system 600*b* is waiting for the real-time communication to be answered.

In the example illustrated in FIGS. 14A and 14B, the outgoing real-time communication is not answered. In response, computer system 600*b* updates representation 1402 to indicate that the intended recipient is unavailable. In accordance with a determination that the attempt to initiate the real-time communication was unsuccessful (e.g., the recipient did not answer), computer system 600*b* displays record message option 1412, call again option 1414, and close option 1408, while continuing to display camera preview 1410. In response to detecting selection 1425*b* of call again option 1414, computer system 600*b* attempts (e.g., re-attempts and/or makes another attempt) to initiate a real-time communication (e.g., a video call) with the intended recipient (e.g., Kim) and displays (e.g., re-displays) real-time communication interface 1400 described with reference to FIG. 14A. In response to detecting selection of close option 1408, computer system 600*b* ceases display of user interface 1400 (e.g., and displays a home screen, a landing interface of the real-time communication application, or a user interface that was displayed immediately prior to attempting to initiate the real-time communication).

Figure 14C:
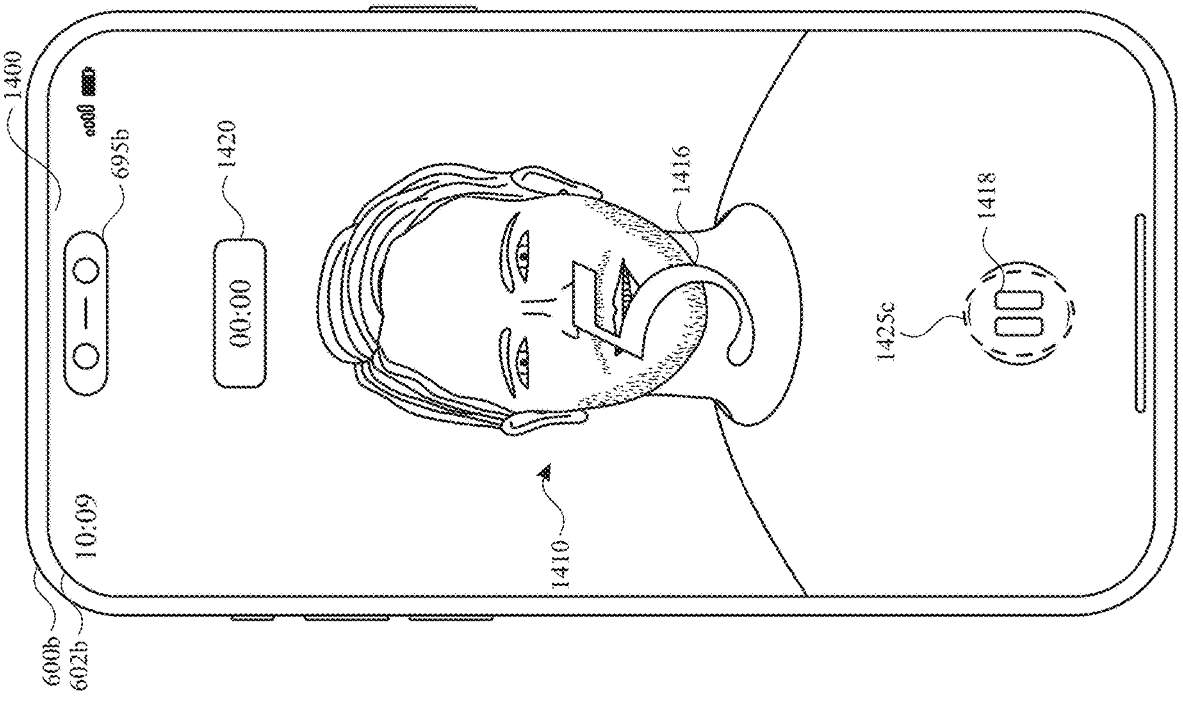
Figure 14D:
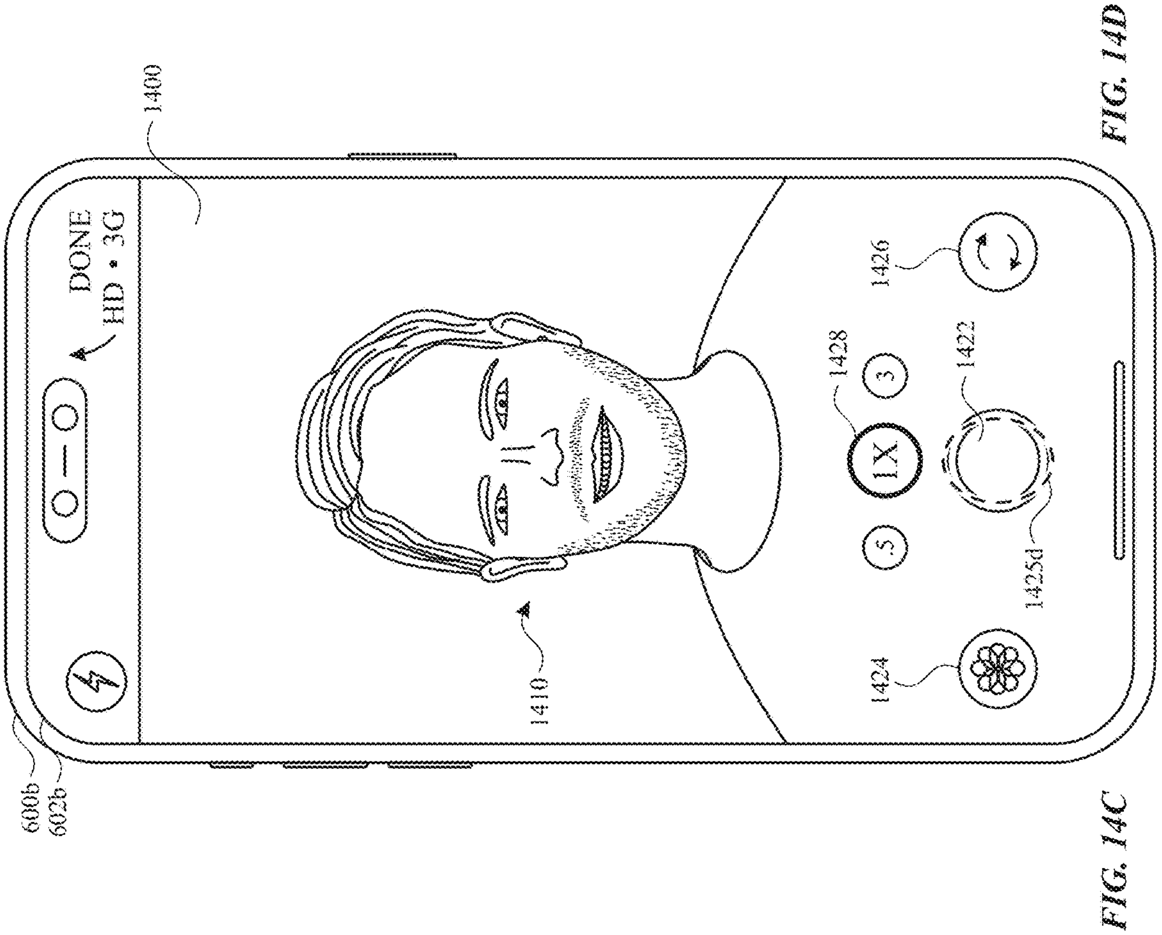

In response to detecting selection 1425*a* of record message option 1412, computer system 600*b* initiates a process for recording a video (e.g., a video message) and sending the video to the intended recipient of the unanswered real-time communication. In some embodiments, in response to detecting selection 1425*a* of record message option 1412, computer system 600*b* displays user interface 1400 as shown in FIG. 14C. In FIG. 14C, computer system 600*b* displays camera preview 1410, countdown 1416, pause option 1418, and duration indicator 1420. Countdown 1416 includes a numeric countdown indicating that computer system 600*b* has initiated a countdown for starting to record a video using camera sensor 695*b*. In some embodiments, when countdown 1416 expires, computer system 600*b* starts recording a video using camera sensor 695*b* and displays user interface 1400 as shown in FIG. 14E described below.

In the example illustrated in FIG. 14C, computer system 600*b* detects selection 1425*c* of pause option 1418. In response to detecting selection 1425*c* of pause option 1418, computer system 600*b* stops countdown 1416 and displays user interface 1400 as shown in FIG. 14D, without recording a video. In FIG. 14D, user interface 1400 includes camera preview 1410 and options for setting up computer system 600*b* and/or camera sensor 695*b* for recording a video. In response to detecting selection of effects option 1424, computer system 600*b* displays selectable options for adjusting video settings and applying visual effects to a recorded video. In response to detecting selection of camera selector option 1426, computer system 600*b* displays a preview of video captured from a different camera sensor of computer system 600*b* (e.g., a camera sensor on a back side of computer system 600*b* that faces in the opposite direction of camera sensor 695*b*. In response to detecting selection of zoom option 1428, computer system 600*b* sets a zoom level of the video captured by camera sensor 695*b* and/or displayed in camera preview 1410.

In FIG. 14D, computer system 600*b* detects selection 1425*d* of record option 1422. In response to detecting selection 1425*d* of record option 1422, computer system 600*b* begins recording a video, as shown in FIG. 14E. In FIG. 14E, user interface 1400 displays camera preview 1410 of the video being recorded, duration indicator 1420 showing the duration of the recorded video, stop option 1430, progress indicator 1432, and camera selection option 1426 (e.g., described above with reference to FIG. 14D). In response to detecting selectin of camera selection option 1426 while the video is being recorded, computer system 600*b* changes which camera sensor is used to capture video for the recording (e.g., while continuing to record the video).

In some embodiments, computer system 600*b* limits the duration of the video that can be recorded to a predetermined amount of time. Progress indicator 1432 indicates the duration of the video that has been recorded and the amount of time remaining that can be recorded, relative to the predetermined amount of time. For example, in FIG. 14E, progress indicator 1432 includes a ring surrounding stop option 1430. The amount of fill in ring indicates the percentage of the predetermined time that has been recorded. In FIG. 14E, approximately 25% of the maximum allowable duration has been recorded. Progress indicator 1432 updates as recording progresses to indicate the amount of time remaining.

Figure 14F:
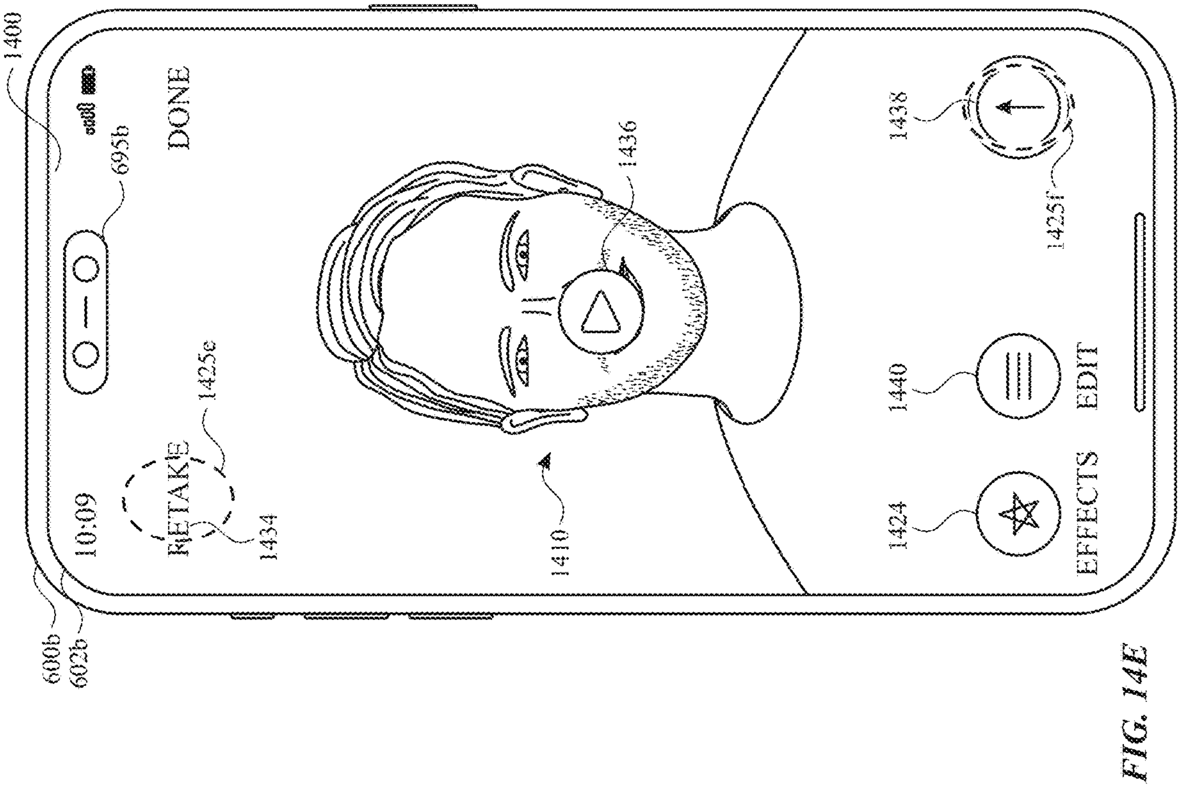
Figure 14E:
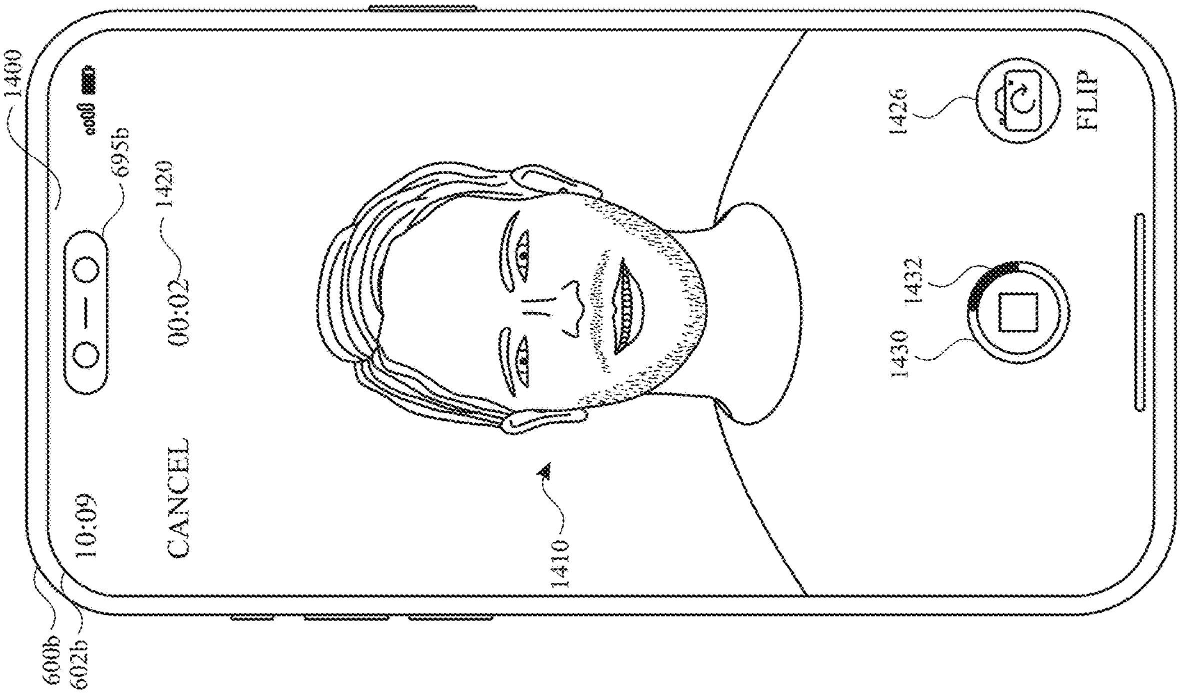

When the predetermined amount of time is reached, or in response to detecting selection of stop option 1430, computer system 600*b* stops recording the video and displays user interface 1400 as shown in FIG. 14F. User interface 1400 includes play option 1436, send option 1438, effects option 1424, edit option 1440, and retake option 1434. In response to detecting selection of play option 1436, computer system 600*b* displays playback of the recorded video. When playback of the recorded video ends, computer system 600*b* displays (e.g., returns to) user interface 1400 as shown in FIG. 14F.

In some embodiments, in response to detecting selection 1425*e* of retake option 1434, computer system 600*b* initiates a countdown to begin recording a new video (e.g., to replace the previously recorded video) and displays (e.g., returns to) user interface 1400 shown in FIG. 14C. In some embodiments, in response to detecting selection 1425*e* of retake option 1434, computer system 600*b* displays (e.g., returns to) user interface 1400 shown in FIG. 14D for setting up computer system 600*b* to record a new video (e.g., to replace the previously recorded video). In some embodiments, in response to detecting selection 1425*e* of retake option 1434, computer system 600*b* begins recording a new video (e.g., to replace the previously recorded video) and displays (e.g., returns to) user interface 1400 shown in FIG. 14E.

In FIG. 14F, computer system 600*b* detects selection 1425*f* of send option 1438. In response to detecting selection 1425*f* of send option 1438, computer system 600*b* sends the recorded video to the intended recipient (e.g., Kim) of the unanswered real-time communication shown in FIGS. 14A-14B. In some embodiments, computer system 600*b* sends the recorded video in a text message. In some embodiments, computer system 600*b* sends the recorded video in an email. In some embodiments, computer system 600*b* sends the recorded video in a voicemail. In some embodiments, computer system 600*b* sends the recorded video in a videomail.

Figure 14H:
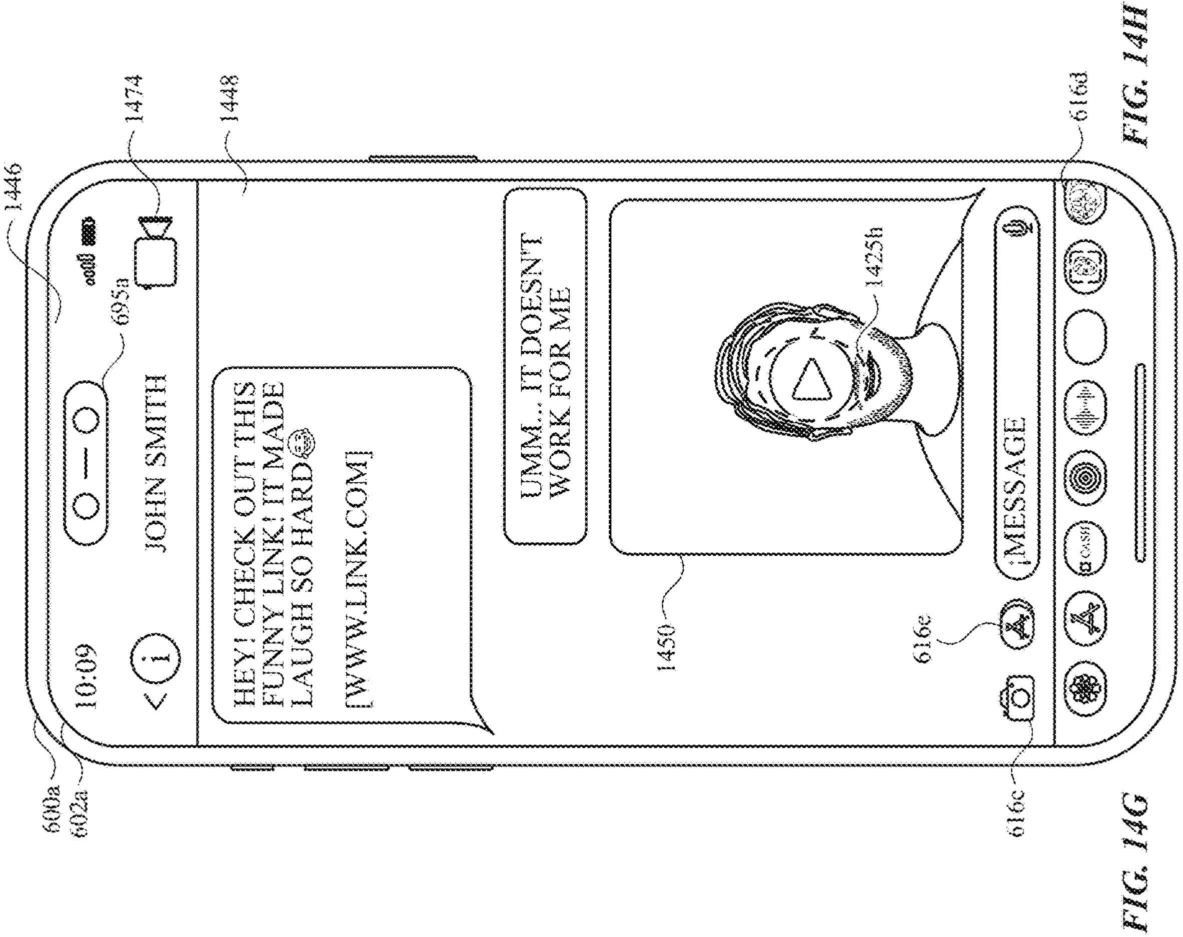
Figure 14G:
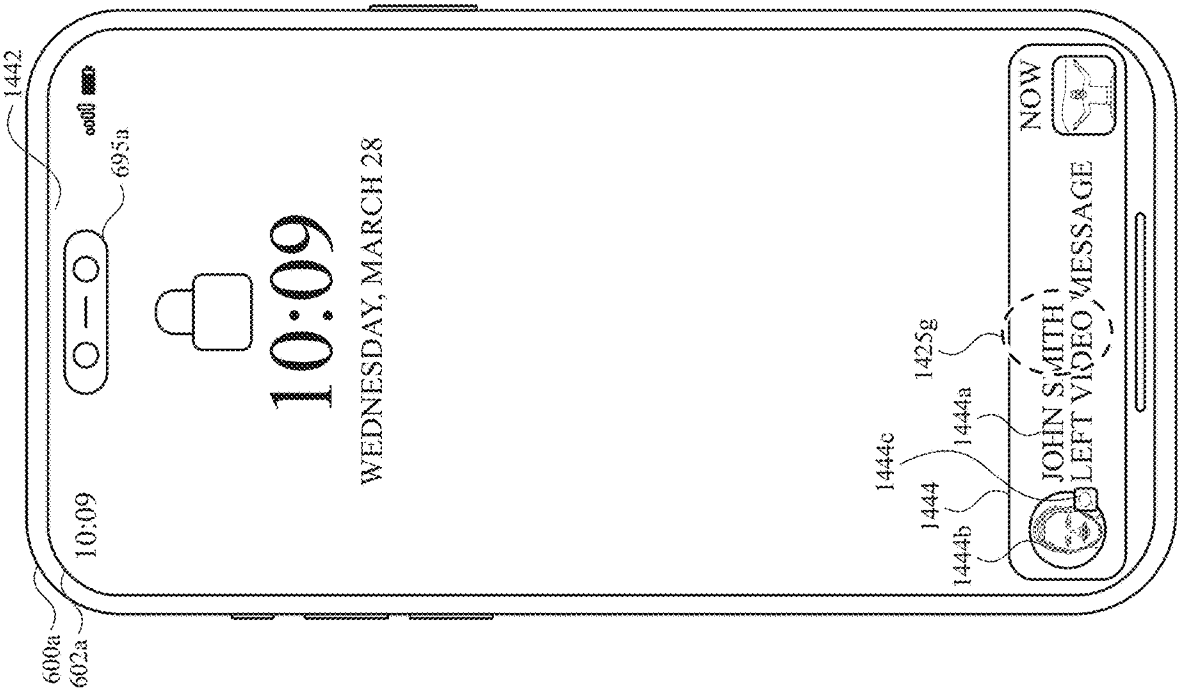

FIG. 14G illustrates computer system 600*a* of the intended recipient (e.g., Kim) of the unanswered real-time communication. In response to receiving the recorded video, computer system 600*a* displays notification 1444, which includes name 1444*a* (e.g., "John Smith") of the entity that sent the recorded video, graphical representation 1444*b* (e.g., a profile photo) of the entity that sent the recorded video, and representation 1444*c* of the recorded video.

In the embodiment illustrated in FIG. 14G, notification 1444 corresponds to a messaging application. In response to detecting selection 1425*g* of notification 1444, computer system 600*a* displays messaging user interface 1446 of the messaging application, as shown in FIG. 14H. Messaging user interface 1446 includes message region 1448 that includes a message conversation with messages between the user of computer system 600*a* and the sender of the recorded video (e.g., the user of computer system 600*b*). Representation 1450 of the recorded video is displayed as a message in message region 1448.

Figure 14I:
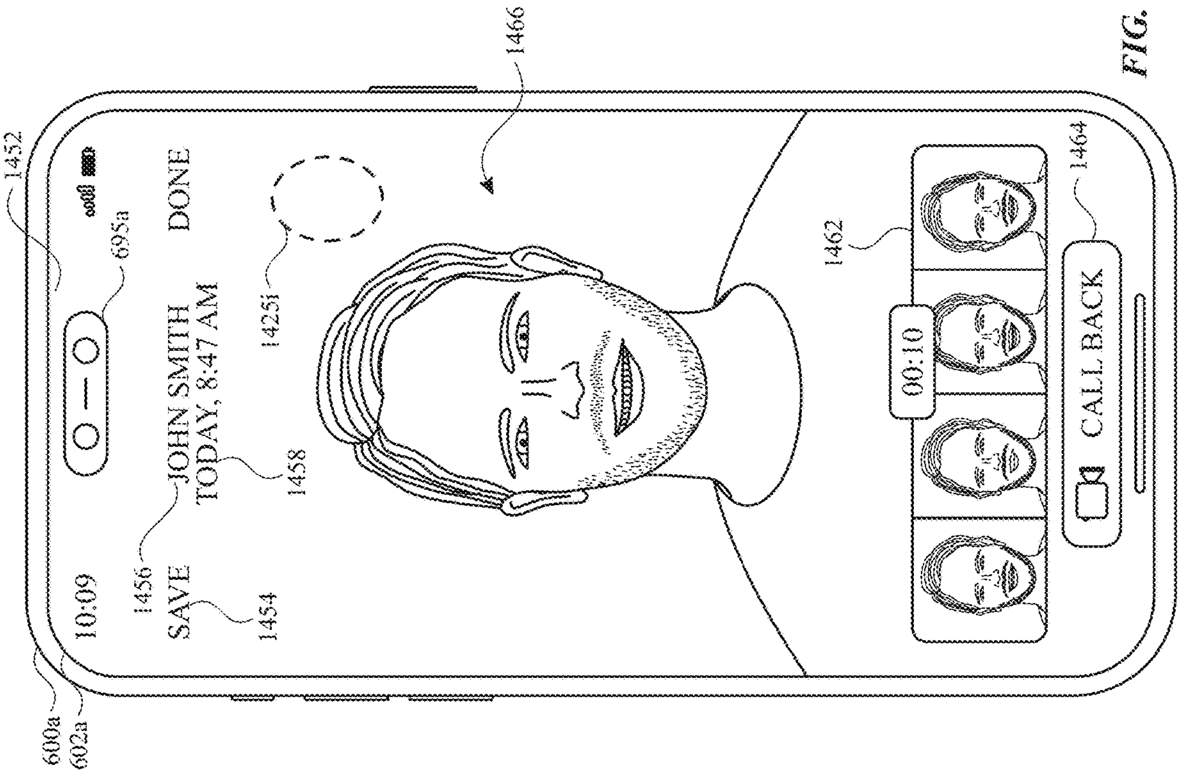

In response to detecting selection 1425*h* of representation 1450, computer system 600*a* displays playback of the recorded video. In some embodiments, computer system 600*a* displays playback of the recorded video inline in the message conversation in message region 1448 (e.g., in representation 1450). In some embodiments, in response to detecting selection 1425*h* of representation 1450, computer system 600*a* opens video player user interface 1452 (e.g., of a video player application), as shown in FIG. 14I. Video player user interface 1452 includes representation 1466 (e.g., a hero shot or first frame) of the recorded video, save option 1454, name 1456 of the entity that sent the recorded video, timestamp 1458, playback control 1462, and call back option 1464. Timestamp 1458 displays a day, date, and/or time associated with the recorded video, such as, e.g., a time that the video was recorded and/or a time that the recorded video was received.

In FIG. 14I, computer system 600*a* detects input 1425*i* (e.g., a double tap gesture, a de-pinch gesture, or other input corresponding to a request to zoom representation 1466). In response to detecting input 1425*i*, computer system 600*a* zooms in (e.g., magnifies) representation 1466 as shown in FIG. 14J.

Figure 14J:
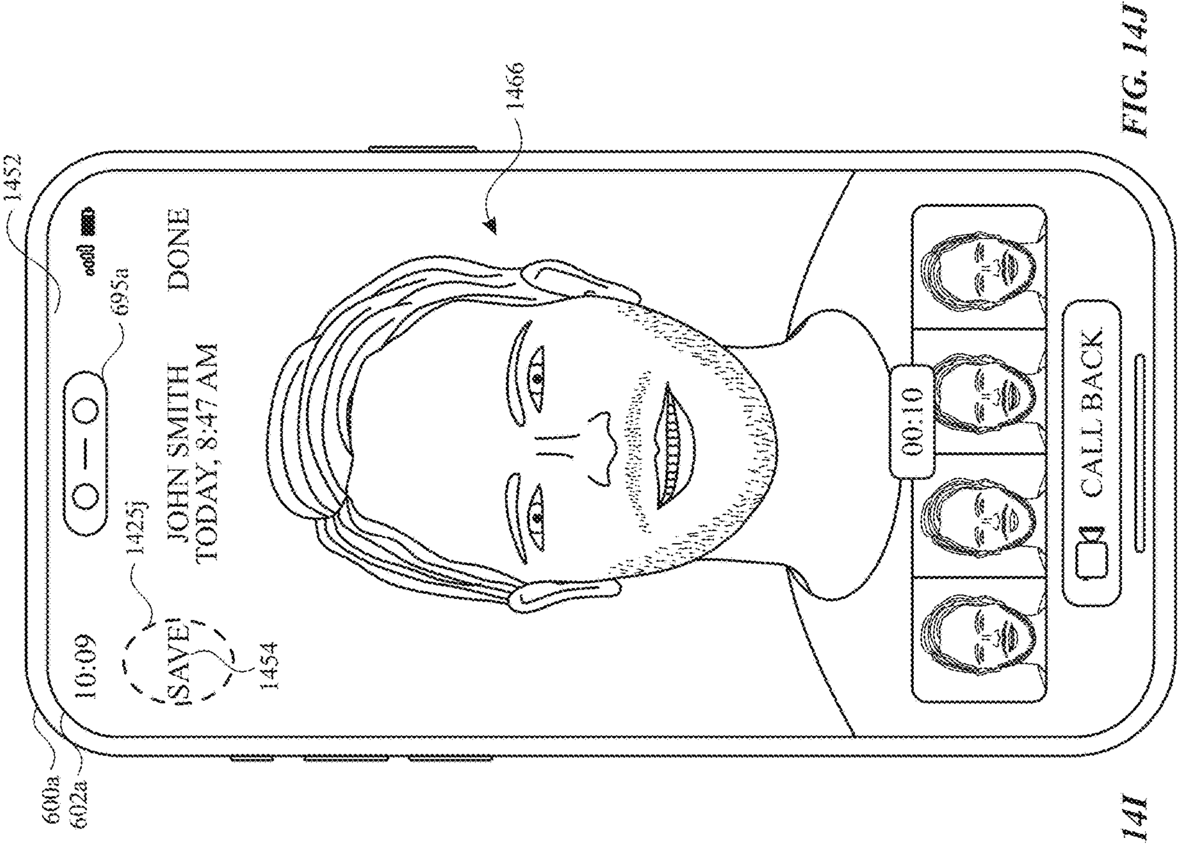
Figure 14K:
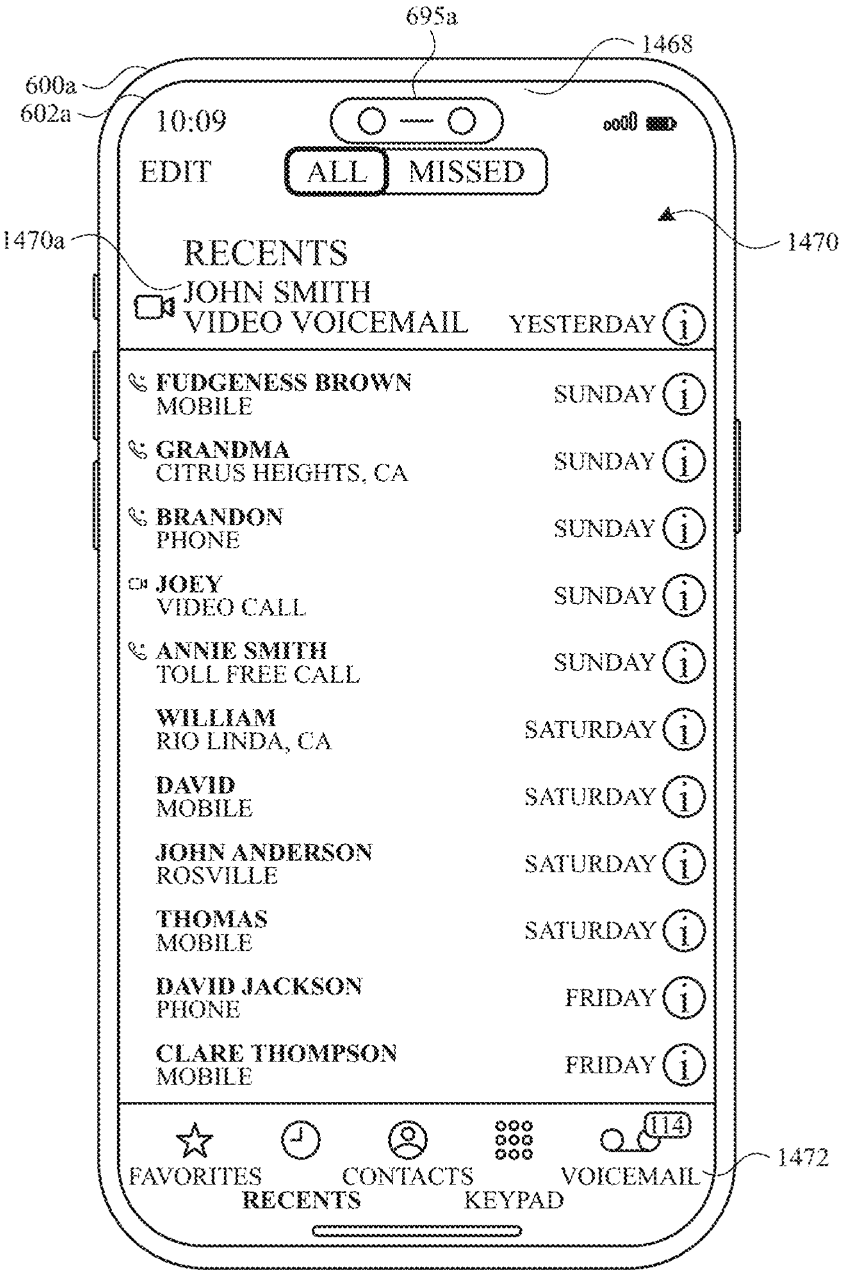

In FIG. 14J, computer system 600*a* detects selection 1425*j* of save option 1454. In some embodiments, in response to detecting selection 1425*j* of save option 1454, computer system 600*a* saves the recorded video (e.g., in a video library, a photos library, the messaging application, a phone application, a voicemail application, and/or a video call application). For example, FIG. 14K shows computer system 600*a* displaying user interface 1468 of a phone application. User interface 1468 displays list 1470 of recent calls (e.g., phone calls, voice messages, voicemails, video calls, video messages, and/or video voicemails). List 1470 includes representation 1470*a* of the recorded video received from John Smith. Representation 1470*a* includes information about the recorded video such as, e.g., the sender (e.g., "John Smith), the type of item (e.g., video voicemail), a date (e.g., yesterday), and a graphical indication (e.g., a thumbnail, glyph, and/or video camera icon). In some embodiments, representation 1470*a* is displayed in a voicemail tab of user interface 1468 (e.g., by selecting voicemail option 1472).

FIG. 15 is a flow diagram illustrating a method for video messages using a computer system in accordance with some embodiments. Method 1500 is performed at a computer system (e.g., 100, 300, 500, 600*a*, 600*b*, 600*c*, and/or 600*d*) (e.g., a smart phone, a smart watch, a tablet computer, a laptop computer, a desktop computer, a wearable device, and/or head-mounted device) that is in communication with (e.g., includes and/or is connected to) a display generation component (e.g., 112, 156, 602*a*, 602*b*, 602*c*, and/or 602*d*) (e.g., a display, a touch-screen display, a monitor, a holographic display system, and/or a head-mounted display system) and one or more input devices (e.g., 112, 113, 116, 204, 206, 208, 602*a*, 602*b*, 602*c*, and/or 602*d*) (e.g., a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)). Some operations in method 1500 are, optionally, combined, the orders of some operations are, optionally, changed, and some operations are, optionally, omitted.

As described below, method 1500 provides an intuitive way for recording, sending, and/or receiving video messages. The method reduces the cognitive burden on a user for recording, sending, and/or receiving video messages, thereby creating a more efficient human-machine interface. For battery-operated computing devices, enabling a user to record, send, and/or receive video messages faster and more efficiently conserves power and increases the time between battery charges.

The computer system attempts (1502) to initiate an outgoing real-time communication with an entity (e.g., 600*b* attempts to initiate a video call in FIG. 14A with entity Kim) (e.g., a person, a user, a business, and/or a group). In some embodiments, attempting to initiate the outgoing real-time communication includes (e.g., is) transmitting a request to initiate the outgoing real-time communication. In some embodiments, the real-time communication is a phone call. In some embodiments, the real-time communication is an audio call. In some embodiments, the real-time communication is a video call. In some embodiments, the real-time communication includes real-time audio and/or video communication (e.g., an audio and/or video conference). In some embodiments, the real-time communication includes communication between two or more participants.

In response to a determination that attempting to initiate the real-time communication with the entity was unsuccessful (e.g., the video call is unsuccessful in FIG. 14B) (e.g., the attempt to initiate the outgoing real-time communication was declined, denied, not answered, and/or re-directed to a voicemail system), the computer system displays (1504), via the display generation component, a video message user interface element (e.g., 1412) (e.g., a selectable icon, button, affordance, object, and/or option). In some embodiments, the computer system displays the video message user interface element in response to a determination that a request to initiate the outgoing real-time communication has been declined, denied, not answered, and/or re-directed to a voicemail system. Displaying the video message user interface element in response to a determination that attempting to initiate the real-time communication with the entity was unsuccessful informs the user of the ability to record a video message, thereby providing improved visual feedback to the user.

The computer system detects (1506), via the one or more input devices, selection (e.g., 1425*a*) of (e.g., a tap input, air gesture, voice command, and/or other selection input corresponding to) the video message user interface element (e.g., 1412) (e.g., a user-interactive user interface element, a selectable user interface element, a selectable option, a button, a selectable icon, and/or an affordance). In some embodiments, selection of the video message user interface element includes a tap or mouse click on the video message user interface element, a voice command, and/or other input selecting the video message user interface element.

In response to detecting selection of the video message user interface element, the computer system initiates (1508) a process (e.g., the process started in FIG. 14C) that includes recording a video (e.g., via one or more cameras in communication with the computer system) and sending the video to the entity. Initiating a process for recording a video and sending the video to the entity in response to detecting selection of the video message user interface element enables the user to quickly and efficiently record and send a video message, thereby providing improved visual feedback to the user, providing additional control options without cluttering the user interface with additional displayed controls, and reducing the number of inputs needed to perform an operation.

In some embodiments, in response to the determination that attempting to initiate the real-time communication with the entity was unsuccessful, the computer system displays, via the display generation component, a call again user interface element (e.g., 1414) (e.g., a redial user interface element, a user-interactive user interface element, a selectable user interface element, a selectable option, a button, a selectable icon, and/or an affordance) that, when selected (e.g., via 1425*b*), causes the computer system to attempt (e.g., re-attempt) to initiate an outgoing real-time communication with the entity. In some embodiments, the computer system displays the call again user interface element in response to a determination that a request to initiate the outgoing real-time communication has been declined, denied, not answered, and/or re-directed to a voicemail system. In some embodiments, the computer system detects, via the one or more input devices, selection of the call again user interface element (e.g., a tap or mouse click on the video message user interface element, a voice command, and/or other input selecting the video message user interface element); and in response to detecting selection of the call again user interface element, the computer system attempts (e.g., re-attempts) to initiate an outgoing real-time communication with the entity. Displaying a call again user interface element for attempting to initiate an outgoing real-time communication with the entity in response to the determination that attempting to initiate the real-time communication with the entity was unsuccessful enables the user to quickly and efficiently make another attempt to initiate a real-time communication with the entity, thereby providing improved visual feedback to the user, providing additional control options without cluttering the user interface with additional displayed controls, and reducing the number of inputs needed to perform an operation.

In some embodiments, in response to detecting selection (e.g., 1425*a*) of the video message user interface element, the computer system displays, via the display generation component, a countdown (e.g., 1416 and/or a timer) that indicates an amount of time until recording the video will begin. In some embodiments, the process that includes recording the video and sending the video to the entity includes displaying the countdown that indicates an amount of time until recording the video will begin. Displaying, via the display generation component, a countdown (e.g., a timer) that indicates an amount of time until recording the video will begin in response to detecting selection of the video message user interface element informs the user that the video message is going to start recording and enables the user to adjust the computer system for recording the video message, thereby providing improved visual feedback to the user, providing additional control options without cluttering the user interface with additional displayed controls, and reducing the number of inputs needed to perform an operation.

In some embodiments, while displaying the countdown (e.g., 1416), the computer system detects, via the one or more input devices, a request (e.g., 1425*c*) to stop (e.g., cancel) the countdown; and in response to detecting the request to stop the countdown, the computer system displays, via the display generation component, a set of one or more recording control user interface elements (e.g., 1422, 1424, 1426, and/or 1428) (e.g., user-interactive user interface elements, selectable user interface elements, selectable options, buttons, selectable icons, and/or affordances) that, when selected (e.g., individually selected), cause the computer system to perform respective functions associated with recording the video (e.g., functions such as recording the video, displaying options for applying an effect to the video, applying an effect to the video, switching from using a first camera to a second camera, zooming, selecting a flash setting, selecting a resolution, selecting a frame rate, and/or selecting an exposure setting). In some embodiments, the computer system detects selection of a first recording control user interface element of the set of one or more recording control user interface elements; and in response to detecting selection of the first recording control user interface element, the computer system performs a first function corresponding to the first recording control user interface element. Displaying a set of one or more recording control user interface elements for performing respective functions associated with recording the video in response to detecting the request to stop the countdown enables the user to quickly and efficiently adjust the computer system for recording the video message, thereby providing improved visual feedback to the user, providing additional control options without cluttering the user interface with additional displayed controls, and reducing the number of inputs needed to perform an operation.

In some embodiments, while recording the video (e.g., in FIG. 14E), the computer system displays, via the display generation component, a progress user interface element (e.g., 1432) (e.g., a ring or a bar) that includes a visual indication (e.g., an amount of fill) of a progress (or, in some embodiments, a status) of recording the video. In some embodiments, the progress user interface element includes a visual indication of an amount of time remaining (e.g., an absolute amount of time remaining, such as a number of seconds; and/or a relative amount of time remaining, such as 50 percent). In some embodiments, the progress user interface element includes a visual indication of a duration or length of the video (e.g., how long the computer system has been recording). Displaying a progress user interface element that includes a visual indication of a progress of recording the video while recording the video informs the user of the status of the recording, thereby providing improved visual feedback to the user.

In some embodiments, while recording the video (e.g., in FIG. 14E), the computer system displays, via the display generation component, a stop-recording user interface element (e.g., 1430) (e.g., a user-interactive user interface element, a selectable user interface element, a selectable option, a button, a selectable icon, and/or an affordance) that, when selected, causes the computer system to stop recording the video. In some embodiments, the computer system detects selection of the stop-recording user interface element; and in response to detecting the selection of the stop-recording user interface element, the computer system stops recording the video. Displaying a stop-recording user interface element to stop recording the video enables the user to quickly and efficiently stop the recording, thereby providing additional control options without cluttering the user interface with additional displayed controls and reducing the number of inputs needed to perform an operation.

In some embodiments, the computer system is in communication with (e.g., includes and/or is connected to) a plurality of camera sensors (e.g., 695*a* and/or 695*b*) including a first camera sensor (e.g., a camera on a front side of 600*a* or 600*b*) and a second camera sensor (e.g., a camera on a back side of 600*a* or 600*b*); and while recording the video with the first camera sensor, the computer system displays, via the display generation component, a switch-camera user interface element (e.g., 1426) (e.g., a user-interactive user interface element, a selectable user interface element, a selectable option, a button, a selectable icon, and/or an affordance) that, when selected, causes the computer system to record (e.g., start recording) the video with the second camera sensor and stop recording the video with the first camera sensor (e.g., selecting the switch-camera user interface element causes the computer system to switch which camera is used to capture images for recording the video). In some embodiments, the computer system detects selection of the switch-camera user interface element; and in response to detecting the selection of the switch-camera user interface element, the computer system records the video with the second camera sensor and stops recording the video with the first camera sensor. Displaying a switch-camera user interface element for recording the video with the second camera sensor and stopping recording the video with the first camera sensor while recording the video with the first camera sensor enables the user to quickly and efficiently change the camera sensor being used to record the video message without having to navigate to a different user interface, thereby providing additional control options without cluttering the user interface with additional displayed controls and reducing the number of inputs needed to perform an operation.

In some embodiments, in response to a determination that recording the video has stopped (e.g., in FIG. 14F) (e.g., the user stopped the recording or a time limit for recording was reached), the computer system displays, via the display generation component, a send user interface element (e.g., 1438) (e.g., a user-interactive user interface element, a selectable user interface element, a selectable option, a button, a selectable icon, and/or an affordance); the computer system detects, via the one or more input devices, selection (e.g., 1425*f*) of (e.g., a tap input, air gesture, voice command, and/or other selection input corresponding to) the send user interface element; and in response to detecting the selection of the send user interface element, the computer system sends the video to the entity. Displaying a send user interface element in response to a determination that recording the video has stopped and sending the video to the entity in response to detecting selection of the send user interface element automatically informs the user of the ability to send the video and enables the user to quickly and efficiently send the video without navigating the user interface, thereby performing an operation when a set of conditions has been met without requiring further user input, providing additional control options without cluttering the user interface with additional displayed controls, and reducing the number of inputs needed to perform an operation.

In some embodiments, in response to a determination that recording the video has stopped (e.g., in FIG. 14F) (e.g., the user stopped the recording or a time limit for recording was reached), the computer system displays (e.g., concurrently with the send user interface element), via the display generation component, a retake user interface element (e.g., 1434) (e.g., a user-interactive user interface element, a selectable user interface element, a selectable option, a button, a selectable icon, and/or an affordance) that, when selected (e.g., via 1425*e*), causes the computer system to begin recording a second video (or, in some embodiments, to initiate a process for recording a second video). Displaying a retake user interface element to begin recording a second video in response to a determination that recording the video has stopped automatically informs the user of the ability to record another video and enables the user to quickly and efficiently record another video without navigating the user interface, thereby performing an operation when a set of conditions has been met without requiring further user input, providing additional control options without cluttering the user interface with additional displayed controls, and reducing the number of inputs needed to perform an operation.

In some embodiments, the computer system detects, via the one or more input devices, selection (e.g., 1425*e*) of (e.g., a tap input, air gesture, voice command, and/or other selection input corresponding to) the retake user interface element (e.g., 1434); and in response to detecting the selection of the retake user interface element, the computer system records (e.g., as shown in FIG. 14E) a second video. Recording a second video in response to detecting the selection of the retake user interface element enables the user to quickly and efficiently record another video without navigating the user interface, thereby providing additional control options without cluttering the user interface with additional displayed controls and reducing the number of inputs needed to perform an operation.

In some embodiments, in response to a determination that recording the video has stopped (e.g., in FIG. 14F) (e.g., the user stopped the recording or a time limit for recording was reached), the computer system displays (e.g., concurrently with the send user interface element), via the display generation component, a set of one or more editing user interface elements (e.g., 1424 and/or 1440) (e.g., user-interactive user interface elements, selectable user interface elements, selectable options, buttons, selectable icons, and/or affordances) that, when selected (e.g., individually selected), causes the computer system to edit (or, in some embodiments, display controls for editing) the video (e.g., the recorded video). In some embodiments, editing the video includes clipping, adding one or more visual elements and/or effects, changing a lighting effect, applying a filter, changing a style, and/or changing a color. Displaying, in response to a determination that recording the video has stopped, a set of one or more editing user interface elements for editing the video automatically informs the user of the ability to edit the video and enables the user to quickly and efficiently edit the video without navigating the user interface, thereby performing an operation when a set of conditions has been met without requiring further user input, providing additional control options without cluttering the user interface with additional displayed controls, and reducing the number of inputs needed to perform an operation.

In some embodiments, in response to a determination that recording the video has stopped (e.g., in FIG. 14F) (e.g., the user stopped the recording or a time limit for recording was reached), the computer system displays (e.g., concurrently with the send user interface element), via the display generation component, a replay user interface element (e.g., 1436) (e.g., a user-interactive user interface element, a selectable user interface element, a selectable option, a button, a selectable icon, and/or an affordance) that, when selected (e.g., individually selected), causes the computer system to play the video (e.g., the recorded video). In some embodiments, the computer system detects selection of the replay user interface element; and in response to detecting the selection of the replay user interface element, the computer system plays the video. Displaying, in response to a determination that recording the video has stopped, a replay user interface element for playing the video automatically informs the user of the ability to play the video and enables the user to quickly and efficiently play the video without navigating the user interface, thereby performing an operation when a set of conditions has been met without requiring further user input, providing additional control options without cluttering the user interface with additional displayed controls, and reducing the number of inputs needed to perform an operation.

In some embodiments, recording the video is limited to a predetermined amount of time (e.g., 5 seconds, 10 seconds, 30 seconds, 60 seconds, or 90 seconds). In some embodiments, in accordance with a determination that a duration of recording the video satisfies (e.g., is greater than; or is equal to or greater than) the predetermined amount of time, the computer system stops recording the video. Limiting recording the video to a predetermined amount of time reduces power consumption by conserving processing and bandwidth resources, thereby improving battery life. In some embodiments, while recording the video (e.g., in FIG. 14E), the computer system displays, via the display generation component, an indication (e.g., 1432) of the predetermined amount of time. In some embodiments, the indication of the predetermined amount of time includes a progress indicator, such as, e.g., a ring or a bar, that changes (e.g., fills in) over time to indicate the amount of time remaining in the predetermined amount of time. In some embodiments, the indication of the predetermined amount of time at least partially surrounds a record button and/or a pause button. Displaying an indication of the predetermined amount of time while recording the video informs the user of the time limit and avoid the user having to make additional inputs to retake the video due to not knowing about the time limit, thereby providing improved visual feedback to the user and reducing the number of inputs needed to perform an operation.

In some embodiments, after sending the video to the entity, a representation (e.g., 1450) of the video is displayed (e.g., at the computer system and/or at a computer system associated with the entity) in a message conversation (e.g., 1448) (e.g., a text message conversation and/or an instant message conversation) that includes the entity (e.g., Kim) and a user (e.g., John Smith) associated with the computer system. In some embodiments, the message conversation is displayed in a user interface of a messaging application. In some embodiments, the user interface includes (e.g., in a message region) one or more messages between the entity and the user associated with the computer system. Displaying a representation of the video in a message conversation informs the user about the video and enables the user to quickly and efficiently access the video with fewer user inputs, thereby providing improved visual feedback to the user and reducing the number of inputs needed to perform an operation. In some embodiments, the video (e.g., 1450) is played (e.g., automatically or in response to a user input) (e.g., at the computer system and/or at a computer system associated with the entity) while displaying the message conversation (e.g., 1448) (e.g., in a user interface of a messaging application and/or in a message region of a user interface of a messaging application that includes one or more messages between the entity and the user associated with the computer system). Playing the video while displaying the message conversation enables the user to view the video without navigating away from the message conversation, thereby reducing the number of inputs needed to perform an operation. In some embodiments, a video communication application (e.g., 1452) (e.g., a user interface of a video communication application) is displayed (e.g., at the computer system and/or at a computer system associated with the entity) in response to selection of the representation (e.g., 1450) of the video displayed in the message conversation (e.g., 1448). Displaying a video communication application in response to selection of the representation of the video displayed in the message conversation provides an efficient user interface for playing the video and initiating video communication with the user of the computer system, thereby providing improved visual feedback and reducing the number of inputs needed to perform an operation. In some embodiments, a call user interface element (e.g., 1472, 1470*a*, 1474, and/or 1464) (e.g., a user-interactive user interface element, a selectable user interface element, a selectable option, a button, a selectable icon, and/or an affordance) is displayed (e.g., at the computer system and/or at a computer system associated with the entity) (e.g., in the message conversation) concurrently with the representation (e.g., 1444, 1450, 1466, and/or 1470*a*) of the video displayed in the message conversation (e.g., 1448), wherein the call user interface element, when selected, initiates an outgoing real-time communication (e.g., a phone call, a video call, and/or an audio/video call) to a user associated with the computer system (e.g., from the entity to whom the video was sent to a device of the user that recorded the video). Displaying a call user interface element concurrently with the representation of the video displayed in the message conversation enables the user to quickly and efficiently initiate communication with the user of the computer system, thereby providing improved visual feedback and reducing the number of inputs needed to perform an operation.

In some embodiments, after (e.g., in response to) sending the video to the entity (or, in some embodiments, receiving the video), a representation (e.g., 1444, 1450, 1466, and/or 1470*a*) of the video is displayed (e.g., at the computer system and/or at a computer system associated with the entity) in a user interface (e.g., 1452 and/or 1468) of a real-time communication application (e.g., a phone application, a video chat application, and/or a video conference application). In some embodiments, the user interface of the real-time communication application includes a set (e.g., a list) of one or more real-time communications (e.g., recent communications, outgoing communications, incoming communications, attempted communications, missed communications, voicemails, and/or video messages). In some embodiments, after (e.g., in response to) receiving the video, a computer system associated with the entity displays a notification; the computer system associated with the entity detects selection of the notification; and in response to detecting selection of the notification, the computer system associated with the entity launches a video voicemail player (or, in some embodiments, a video call application). In some embodiments, a keypad user interface element that, when selected, causes a computer system to display a soft keypad, is displayed (e.g., in a phone application) in a position (e.g., a fixed position, an upper left corner, and/or a predetermined position) on a user interface, where the position is separate from (e.g., not in) a list (e.g., a scrollable list and/or a list of menu options). Displaying the representation of the video in a user interface of a real-time communication application after sending the video to the entity provides an efficient user interface for playing the video and initiating communication with the user of the computer system, thereby providing improved visual feedback and reducing the number of inputs needed to perform an operation.

In some embodiments, after sending the video to the entity (e.g., in response to the video being received or while displaying a user interface for playing the video), a callback user interface element (e.g., 1464) (e.g., a user-interactive user interface element, a selectable user interface element, a selectable option, a button, a selectable icon, and/or an affordance) is displayed (e.g., at the computer system and/or at a computer system associated with the entity), wherein the callback user interface element, when selected, initiates an outgoing real-time communication to a user associated with the computer system. In some embodiments, the callback user interface element is displayed in a user interface that displays (e.g., plays) the video. In some embodiments, a video recording user interface element is displayed (e.g., at a computer system associated with the entity), wherein the video recording user interface element, when selected, initiates a process for recording a video (e.g., a reply video) and sending the video to a user associated with the computer system (e.g., the user that sent the video to the entity). In some embodiments, a time that the video was sent to the entity is displayed (e.g., at a computer system associated with the entity). In some embodiments, in response to detecting a first input (e.g., a double tap gesture) while the video is zoomed out, the video is zoomed in; and, in response to detecting a second input (e.g., a double tap gesture) while the video is zoomed in, the video is zoomed out. Displaying the callback user interface element after sending the video to the entity provides an efficient user interface for initiating communication with the user of the computer system, thereby providing improved visual feedback and reducing the number of inputs needed to perform an operation.

Note that details of the processes described above with respect to method 1500 (e.g., FIG. 9) are also applicable in an analogous manner to the methods described above and below. For example, methods 700, 900, 1100, and/or 1300 optionally include one or more of the characteristics of the various methods described above with reference to method 1300. For example, the techniques for recording and/or sending a video message in method 1500 can be applied to the real-time communications in methods 900, 1100, and/or 1300. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve communication using electronic devices. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve communication using electronic devices. Accordingly, use of such personal information data enables users to have calculated control of communication using electronic devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of communication using electronic devices, the present technology can be configured to allow users to select to "opt in" or "opt out" of participation in the collection of personal information data during registration for services or anytime thereafter. In another example, users can select not to provide information for communication using electronic devices. In yet another example, users can select to limit the length of time data is maintained or entirely prohibit the maintenance of data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

What is claimed is:

1. A computer system configured to communicate with a display generation component, comprising:
- one or more processors; and
- memory storing one or more programs configured to be executed by the one or more processors, the one or more programs including instructions for:
  - receiving an incoming real-time communication from an entity; and
  - in response to receiving the incoming real-time communication and before the incoming real-time communication is accepted, displaying, via the display generation component, a respective representation of the entity, including:
    - in accordance with a determination that a first set of criteria is met, wherein the first set of criteria includes a criterion that is met when the entity that initiated the incoming real-time communication has selected a first representation of the entity, displaying, via the display generation component, the first representation of the entity; and
    - in accordance with a determination that a second set of criteria is met, wherein the second set of criteria includes a criterion that is met when the entity that initiated the incoming real-time communication has selected a second representation of the entity that is different from the first representation of the entity, displaying, via the display generation component, the second representation of the entity.

2. The computer system of claim 1, wherein the respective representation of the entity includes a visual representation that has been selected by the entity.

3. The computer system of claim 2, wherein the visual representation of the entity includes a photo.

4. The computer system of claim 2, wherein the visual representation of the entity includes an avatar.

5. The computer system of claim 4, the one or more programs further including instructions for:
- before the incoming real-time communication is accepted, displaying, via the display generation component, an animation that includes movement over time of the avatar.

6. The computer system of claim 2, wherein the visual representation of the entity includes a monogram.

7. The computer system of claim 2, wherein displaying the respective representation of the entity before the incoming real-time communication is accepted includes displaying the respective representation of the entity at a first magnification, the one or more programs further including instructions for:

accepting the incoming real-time communication; and in response to accepting the incoming real-time communication, displaying, via the display generation component, the respective representation of the entity at a second magnification that is greater than the first magnification.

8. The computer system of claim 1, the one or more programs further including instructions for:

after displaying the respective representation of the entity, receiving an incoming second real-time communication from the entity; and in response to receiving the incoming second real-time communication, and before the incoming real-time communication is accepted, displaying, via the display generation component, an updated respective representation selected by the entity that is different from the respective representation of the entity.

9. The computer system of claim 1, the one or more programs further including instructions for:

after displaying the respective representation of the entity, receiving an incoming third real-time communication from the entity;

detecting a request to accept the incoming third real-time communication from the entity; and in response to detecting the request to accept the incoming third real-time communication, accepting the incoming third real-time communication and displaying, via the display generation component, an updated respective representation selected by the entity that is different from the respective representation of the entity.

10. The computer system of claim 1, the one or more programs further including instructions for:

after displaying the respective representation of the entity, in response to a determination that a current respective representation selected by the entity is different from the respective representation of the entity displayed in response to receiving the incoming real-time communication, displaying, via the display generation component, an indication that the current respective representation is an updated respective representation.

11. The computer system of claim 10, the one or more programs further including instructions for:

detecting a selection of the indication that the current respective representation is an updated respective representation;

in response to detecting the selection of the indication that the current respective representation is an updated respective representation, displaying, via the display generation component, a revert user interface element;

detecting a selection of the revert user interface element; and after detecting the selection of the revert user interface element, displaying, via the display generation component, the respective representation of the entity displayed in response to receiving the incoming real-time communication.

12. The computer system of claim 11, wherein displaying the revert user interface element includes displaying the revert user interface element in a user interface of a messaging application.

13. The computer system of claim 1, wherein displaying the respective representation of the entity is performed while the computer system is in a reduced-power state.

14. The computer system of claim 13, wherein displaying the respective representation of the entity while the computer system is in a reduced-power state includes displaying the respective representation of the entity without displaying a user-interactive graphical user interface element, the one or more programs further including instructions for:

while displaying the respective representation of the entity while the computer system is in the reduced-power state, detecting a predefined movement of the computer system; and in response to detecting the predefined movement of the computer system, displaying the respective representation of the entity without displaying a user-interactive graphical user interface element.

15. The computer system of claim 14, wherein the computer system is in communication with a touch-sensitive surface, the one or more programs further including instructions for:

after displaying the respective representation of the entity without displaying a user-interactive graphical user interface element in response to detecting the predefined movement of the computer system, detecting a contact on the touch-sensitive surface; and in response to detecting the contact on the touch-sensitive surface, displaying, via the display generation component, one or more user interface elements for performing respective functions associated with the incoming real-time communication.

16. The computer system of claim 1, wherein displaying the respective representation of the entity includes displaying the respective representation of the entity with a black background.

17. The computer system of claim 1, wherein the respective representation of the entity includes a name selected by the entity.

18. The computer system of claim 17, wherein displaying the respective representation of the entity includes:

in accordance with a determination that the name selected by the entity is different from a name associated with the entity by the computer system and the name selected by the entity has been approved by a user associated with the computer system, displaying the respective representation of the entity with the name selected by the entity; and in accordance with a determination that the name selected by the entity is different from a name associated with the entity by the computer system and the name selected by the entity has not been approved by a user associated with the computer system, displaying the respective representation of the entity with the name associated with the entity by the computer system.

19. The computer system of claim 1, wherein displaying the respective representation of the entity includes displaying a name of the entity in a font selected by the entity.

20. The computer system of claim 1, wherein displaying the respective representation of the entity includes displaying a name of the entity and an image in a format selected by the entity.

21. The computer system of claim 1, wherein displaying the respective representation of the entity includes displaying a visual representation of the entity with a color selected by the entity.

22. The computer system of claim 1, wherein displaying the respective representation of the entity includes:

in accordance with a determination that a user associated with the computer system has selected a third representation of the entity that is different from a representation selected by the entity, displaying, via the display generation component, the third representation of the entity.

23. The computer system of claim 22, wherein displaying the third representation of the entity includes displaying the third representation of the entity with a first layout and displaying the first representation of the entity includes displaying the first representation with a second layout that is different from the first layout.

24. The computer system of claim 1, wherein the first set of criteria includes a criterion that is met when the computer system is a first type of computer system or a second type of computer system that is different from the first type of computer system.

25. The computer system of claim 1, wherein displaying the respective representation of the entity includes:

in accordance with a determination that the incoming real-time communication is from an unknown entity, displaying the respective representation of the entity with a first predefined color.

26. The computer system of claim 25, wherein the first predefined color is not available for selection as a color for the respective representation.

27. The computer system of claim 1, wherein displaying the respective representation of the entity includes:

in accordance with a determination that the incoming real-time communication is from a business, displaying the respective representation of the entity with a second predefined color.

28. The computer system of claim 27, wherein the second predefined color is not available for selection as a color for the respective representation.

29. The computer system of claim 1, wherein displaying the respective representation of the entity includes:

in accordance with a determination that a visual representation has not been selected for the entity, displaying the respective representation of the entity with a predefined visual representation.

30. The computer system of claim 1, wherein displaying the respective representation of the entity includes:

in accordance with a determination that a respective geographic region associated with the incoming real-time communication is a first geographic region, displaying the respective representation of the entity in a first format; and in accordance with a determination that the respective geographic region associated with the incoming real-time communication is a second geographic region that is different from the first geographic region, displaying the respective representation of the entity in a second format that is different from the first format.

31. The computer system of claim 30, wherein the respective geographic region is a geographic region associated with the entity.

32. The computer system of claim 30, wherein the respective geographic region is a geographic region associated with a recipient of the incoming real-time communication.

33. The computer system of claim 30, wherein the respective geographic region is a geographic region associated with a setting of the computer system.

34. The computer system of claim 30, wherein the respective geographic region is a geographic region associated with a language setting of the computer system.

35. The computer system of claim 30, wherein the respective representation is displayed in a format associated with the respective geographic region when the computer system is not physically located in the respective geographic region.

36. The computer system of claim 1, wherein the incoming real-time communication includes three or more participants.

37. The computer system of claim 36, the one or more programs further including instructions for:

in response to a determination that a number of active participants of the incoming real-time communication has changed, outputting a tactile output.

38. The computer system of claim 37, the one or more programs further including instructions for:

after outputting the tactile output, detecting a predefined movement of the computer system; and in response to detecting the predefined movement of the computer system, displaying a notification that includes information about the change in the number of active participants of the incoming real-time communication.

39. A non-transitory computer-readable storage medium storing one or more programs configured to be executed by one or more processors of a computer system that is in communication with a display generation component, the one or more programs including instructions for:

receiving an incoming real-time communication from an entity; and in response to receiving the incoming real-time communication and before the incoming real-time communication is accepted, displaying, via the display generation component, a respective representation of the entity, including:

in accordance with a determination that a first set of criteria is met, wherein the first set of criteria includes a criterion that is met when the entity that initiated the incoming real-time communication has selected a first representation of the entity, displaying, via the display generation component, the first representation of the entity; and in accordance with a determination that a second set of criteria is met, wherein the second set of criteria includes a criterion that is met when the entity that initiated the incoming real-time communication has selected a second representation of the entity that is different from the first representation of the entity, displaying, via the display generation component, the second representation of the entity.

40. A method, comprising:

at a computer system that is in communication with a display generation component:

receiving an incoming real-time communication from an entity; and in response to receiving the incoming real-time communication and before the incoming real-time communication is accepted, displaying, via the display generation component, a respective representation of the entity, including:

in accordance with a determination that a first set of criteria is met, wherein the first set of criteria includes a criterion that is met when the entity that initiated the incoming real-time communication has selected a first representation of the entity, displaying, via the display generation component, the first representation of the entity; and in accordance with a determination that a second set of criteria is met, wherein the second set of criteria includes a criterion that is met when the entity that initiated the incoming real-time communication has selected a second representation of the entity that is different from the first representation of the entity, displaying, via the display generation component, the second representation of the entity.

* * * * *